(12) United States Patent
Friedland

(10) Patent No.: US 10,839,196 B2
(45) Date of Patent: Nov. 17, 2020

(54) SURVEILLANCE AND MONITORING SYSTEM THAT EMPLOYS AUTOMATED METHODS AND SUBSYSTEMS THAT IDENTIFY AND CHARACTERIZE FACE TRACKS IN VIDEO

(71) Applicant: ImageSleuth, Inc., Renton, WA (US)

(72) Inventor: Noah S. Friedland, Seattle, WA (US)

(73) Assignee: ImageSleuth, Inc., Renton, WA (US)

( * ) Notice: Subject to any disclaimer, the term of this patent is extended or adjusted under 35 U.S.C. 154(b) by 0 days.

(21) Appl. No.: 16/460,806

(22) Filed: Jul. 2, 2019

(65) Prior Publication Data

US 2019/0325198 A1  Oct. 24, 2019

Related U.S. Application Data

(63) Continuation-in-part of application No. 15/273,579, filed on Sep. 22, 2016, now Pat. No. 10,366,277.

(60) Provisional application No. 62/222,108, filed on Sep. 22, 2015.

(51) Int. Cl.
| | |
|---|---|
| *G08B 13/196* | (2006.01) |
| *G06K 9/00* | (2006.01) |
| *G06F 16/583* | (2019.01) |
| *G06F 16/538* | (2019.01) |

(52) U.S. Cl.
CPC ....... *G06K 9/00248* (2013.01); *G06F 16/538* (2019.01); *G06F 16/583* (2019.01); *G06K 9/00268* (2013.01); *G06K 9/00711* (2013.01); *G08B 13/196* (2013.01)

(58) Field of Classification Search
CPC .......... G06K 9/00288; G06K 9/00711; G06K 9/00281; G06K 9/00261; G06K 9/00973; G06K 2009/00322; G06K 9/527; G06K 9/4671
USPC ....... 382/100, 118, 173, 128, 232, 233, 247, 382/224; 345/419, 424, 420, 427, 426, 345/423, 606, 418, 581
See application file for complete search history.

(56) References Cited

U.S. PATENT DOCUMENTS

| | | | |
|---|---|---|---|
| 9,842,353 B1 * | 12/2017 | Sivertsen | G06Q 30/0272 |
| 9,858,474 B2 * | 1/2018 | Brewer | G06K 9/00302 |
| 10,360,599 B2 * | 7/2019 | Costello | G06Q 20/20 |
| 2004/0240542 A1 * | 12/2004 | Yeredor | G06K 9/00771 375/240.01 |

(Continued)

*Primary Examiner* — Sheela C Chawan
(74) *Attorney, Agent, or Firm* — Olympic Patent Works PLLC

(57) ABSTRACT

The present document is directed to automated and semi-automated surveillance and monitoring methods and systems that continuously record digital video, identify and characterize face tracks in the recorded digital video, store the face tracks in a face-track database, and provide query processing functionalities that allow particular face tracks to be quickly identified and used for a variety of surveillance and monitoring purposes. The currently disclosed methods and systems provide, for example, automated anomaly and threat detection, alarm generation, rapid identification of images of parameter-specified individuals within recorded digital video and mapping the parameter-specified individuals in time and space within monitored geographical areas or volumes, functionalities for facilitating human-witness identification of images of individuals within monitored geographical areas or volumes, and many additional functionalities.

20 Claims, 118 Drawing Sheets

(56) References Cited

U.S. PATENT DOCUMENTS

| | | | |
|---|---|---|---|
| 2007/0076922 A1* | 4/2007 | Living | G06K 9/00362 382/118 |
| 2008/0198159 A1* | 8/2008 | Liu | G08B 13/19641 345/420 |
| 2008/0279424 A1* | 11/2008 | Berrani | G06K 9/00288 382/118 |
| 2016/0104509 A1* | 4/2016 | Loscalzo | G06F 16/51 386/290 |
| 2016/0203499 A1* | 7/2016 | Yamashita | G06Q 30/0201 705/7.29 |

* cited by examiner

H = angle from red
$S = \dfrac{d'}{d}$
L = ⊥ to black

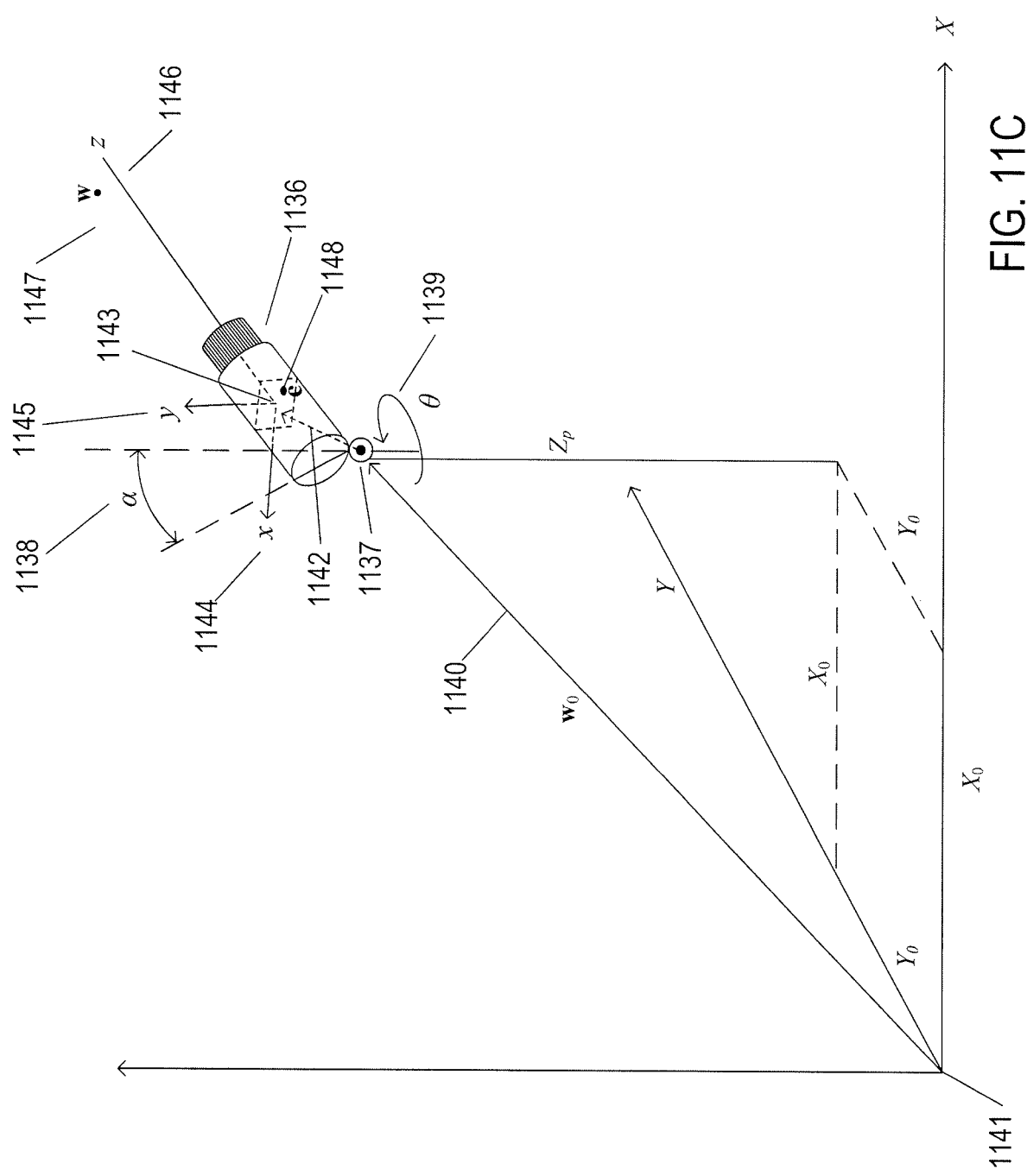

$$T_{w_0} = \begin{bmatrix} 1 & 0 & 0 & -X_0 \\ 0 & 1 & 0 & -Y_0 \\ 0 & 0 & 1 & -Z_0 \\ 0 & 0 & 0 & 1 \end{bmatrix} \text{—} 1170$$

$$R = R_\alpha R_\theta = \begin{bmatrix} \cos\gamma & \sin\gamma & 0 & 0 \\ -\sin\gamma\sin\alpha & \cos\gamma\cos\alpha & \sin\alpha & 0 \\ \sin\gamma\sin\alpha & -\cos\gamma\sin\alpha & \cos\alpha & 0 \\ 0 & 0 & 0 & 1 \end{bmatrix} \text{—} 1172$$

$$C = \begin{bmatrix} 1 & 0 & 0 & -r_1 \\ 0 & 1 & 0 & -r_2 \\ 0 & 0 & 1 & -r_3 \\ 0 & 0 & 0 & 1 \end{bmatrix} \text{—} 1174$$

$c_h = P\,C\,R\,T_{w_0}\,w_h$ —1176

$w_h = T_{w_0}^{-1}\,R^{-1}\,C^{-1}\,P^{-1}\,c_h$ —1178

$(x,z) = f(X,Y,Z, \text{camera\_parameters})$ —1180

$(X,Y,Z) = f^{-1}(x,z, \text{camera\_parameters})$ —1181

FIG. 11E $\mathbf{c}_h = \mathbf{M}\mathbf{w}_h$ —— 1190

$\mathbf{c}'_h = \mathbf{MTRS}\mathbf{w}_h$ —— 1191

$\mathbf{M}^{-1}\mathbf{c}_h = \mathbf{w}_h$ —— 1192

$\mathbf{c}'_h = \mathbf{MTRSM}^{-1}\mathbf{c}_h$ —— 1194

$\mathbf{c}'_h = \mathbf{M} * \mathbf{c}_h$ —— 1195

$\begin{bmatrix} k'x' \\ k'y' \\ k'z' \\ k' \end{bmatrix} = \mathbf{M} * \begin{bmatrix} kx \\ ky \\ kz \\ k \end{bmatrix}$ —— 1196

$\begin{bmatrix} k'x' \\ k'y' \\ 0 \\ k' \end{bmatrix} = \mathbf{M} * \begin{bmatrix} kx \\ ky \\ 0 \\ k \end{bmatrix}$ —— 1197

$\mathbf{M} * \begin{bmatrix} a & b & c & d \\ e & f & g & h \\ i & j & k & l \\ m & n & o & p \end{bmatrix}$ —— 1198

$\mathbf{M} * \begin{bmatrix} a & b & d \\ e & f & h \\ m & n & p \end{bmatrix}$ —— 1199a $\begin{bmatrix} k'x' \\ k'y' \\ k' \end{bmatrix} = \mathbf{M}  \begin{bmatrix} kx \\ ky \\ k \end{bmatrix}$ —— 1199b $\begin{bmatrix} k'x'_1 & k'x'_2 & k'x'_3 & k'x'_4 \\ k'y'_1 & k'y'_2 & k'y'_3 & k'y'_4 \\ k' & k' & k' & k' \end{bmatrix} = \mathbf{M}  \begin{bmatrix} kx_1 & kx_2 & kx_3 & kx_4 \\ ky_1 & ky_2 & ky_3 & ky_4 \\ k & k & k & k \end{bmatrix}$ —— 1199c

FIG. 11F

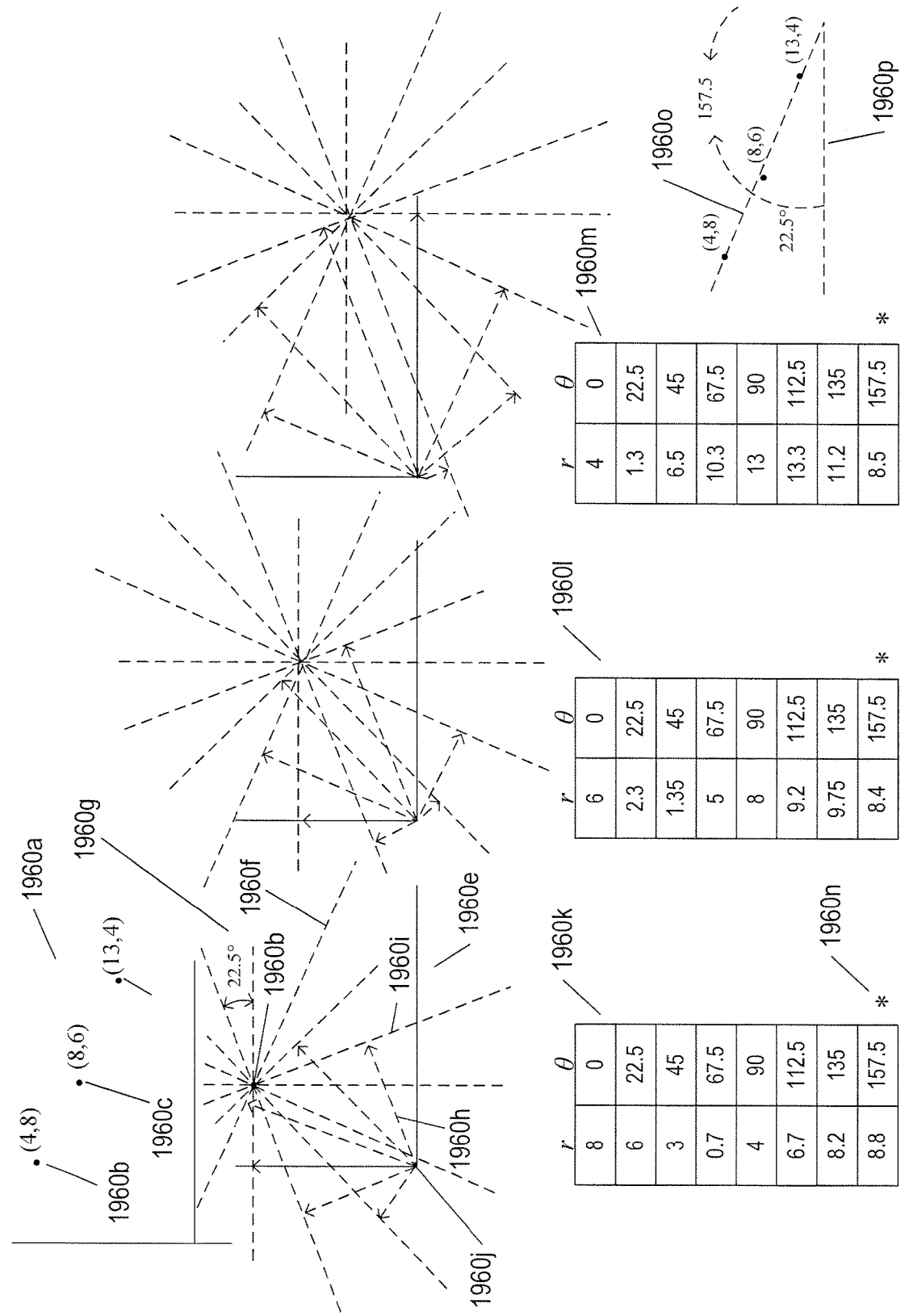

image → cells → cell vectors

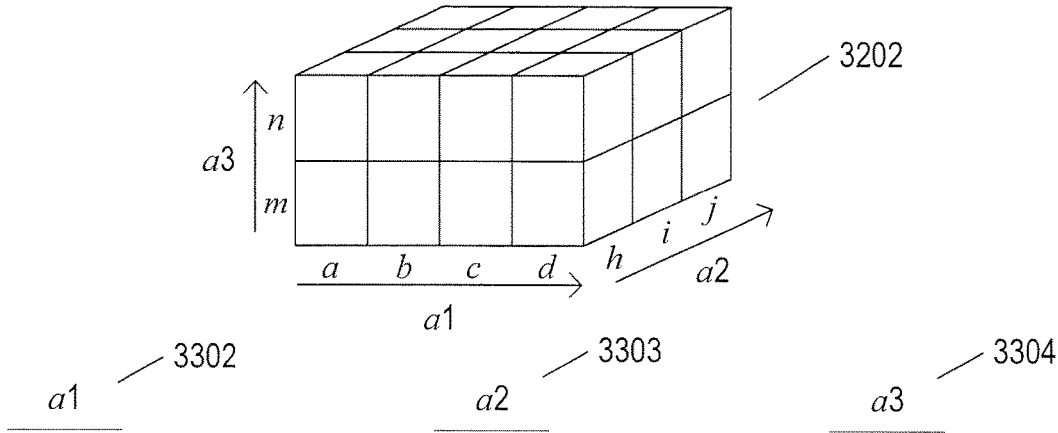

| (1) | $a1$ | (13) | $a2$ | (28) | $a3$ |
|---|---|---|---|---|---|
| (2) | $a1 \mid a2 = h$ | (14) | $a2 \mid a1 = a$ | (29) | $a3 \mid a1 = a$ |
| (3) | $a1 \mid a2 = i$ | (15) | $a2 \mid a1 = b$ | (30) | $a3 \mid a1 = b$ |
| (4) | $a1 \mid a2 = j$ | (16) | $a2 \mid a1 = c$ | (31) | $a3 \mid a1 = c$ |
| (5) | $a1 \mid a3 = m$ | (17) | $a2 \mid a1 = d$ | (32) | $a3 \mid a1 = d$ |
| (6) | $a1 \mid a3 = n$ | (18) | $a2 \mid a3 = m$ | (33) | $a3 \mid a2 = h$ |
| (7) | $a1 \mid a2 = h \wedge a3 = m$ | (19) | $a2 \mid a3 = n$ | (34) | $a3 \mid a2 = i$ |
| (8) | $a1 \mid a2 = h \wedge a3 = n$ | (20) | $a2 \mid a1 = a \wedge a3 = m$ | (35) | $a3 \mid a2 = j$ |
| (9) | $a1 \mid a2 = i \wedge a3 = m$ | (21) | $a2 \mid a1 = a \wedge a3 = n$ | (36) | $a3 \mid a2 = h \wedge a1 = a$ |
| (10) | $a1 \mid a2 = i \wedge a3 = n$ | (22) | $a2 \mid a1 = a \wedge a3 = m$ | (37) | $a3 \mid a2 = h \wedge a1 = b$ |
| (11) | $a1 \mid a2 = j \wedge a3 = m$ | (23) | $a2 \mid a1 = a \wedge a3 = n$ | (38) | $a3 \mid a2 = h \wedge a1 = c$ |
| (12) | $a1 \mid a2 = j \wedge a3 = n$ | (24) | $a2 \mid a1 = a \wedge a3 = m$ | (39) | $a3 \mid a2 = h \wedge a1 = d$ |
|  |  | (25) | $a2 \mid a1 = a \wedge a3 = n$ | (40) | $a3 \mid a2 = i \wedge a1 = a$ |
|  |  | (26) | $a2 \mid a1 = a \wedge a3 = m$ | (41) | $a3 \mid a2 = i \wedge a1 = b$ |
|  |  | (27) | $a2 \mid a1 = a \wedge a3 = n$ | (42) | $a3 \mid a2 = i \wedge a1 = c$ |
|  |  |  |  | (43) | $a3 \mid a2 = i \wedge a1 = d$ |
|  |  |  |  | (44) | $a3 \mid a2 = j \wedge a1 = a$ |
|  |  |  |  | (45) | $a3 \mid a2 = j \wedge a1 = b$ |
|  |  |  |  | (46) | $a3 \mid a2 = j \wedge a1 = c$ |
|  |  |  |  | (47) | $a3 \mid a2 = j \wedge a1 = d$ |

FIG. 33

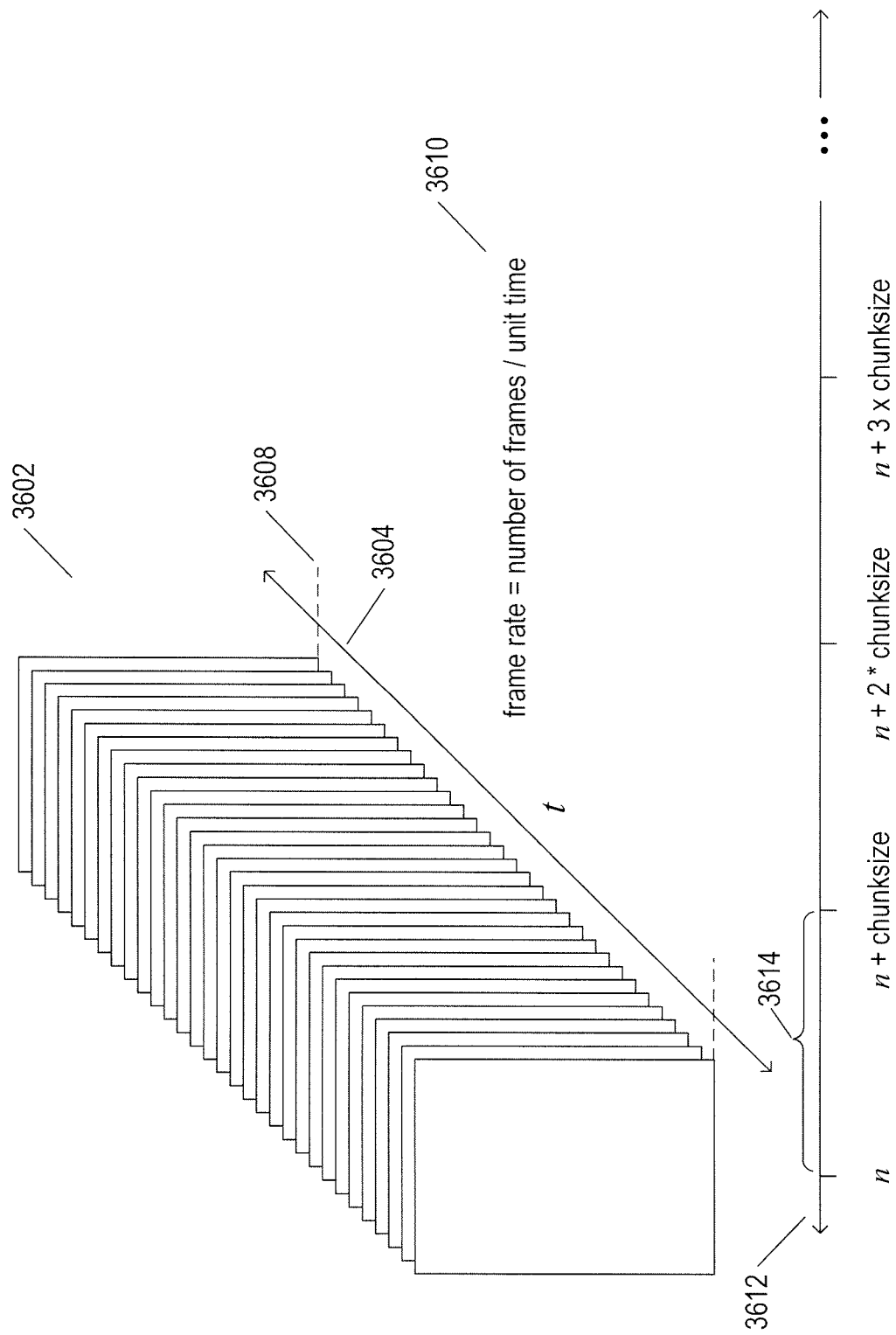

```
CREATE TABLE Local_Tracks                              ╱ 3860
(
        Local_Track_ID          INTEGER,
        Video_ID                INTEGER,
        Local_Track_Profile_ID  INTEGER,
        First_Frame             INTEGER,
        Last_Frame              INTEGER,
        Start_Time              TIME,
        End_Time                TIME,
        Num_Frames              INTEGER,
        Track_Active            LOGICAL,
        Track_Redacted          LOGICAL,
3862
                :

Track_Date              DATE
);
                                                       ╱ 3864
INSERT
INTO      Local_Tracks (Local_Track_ID, Video_ID,
                        Local_Track_Profile_ID,
                                :
                        Track_Date)                    ╲ 3866
VALUES                  (361124, 1261,
                         360321,
                                :
                                                       ╲ 3867
          );

SELECT    First_Frame, Last_Frame
FROM      Local_Tracks                                 — 3868
WHERE     Local_Track_ID = 211302;

— 3869
CREATE INDEX ON   Local_Tracks (Local_Track_ID);

SELECT COUNT(*) FROM   Local_Tracks;
                                                       — 3870
```

FIG. 38C

```
{
    "track" : {                              ⟵ 4102
        "cid" : "10.0.0.15"
        "shirtcolor" : "darkslategrey",  ⎫
        "shirtbasiccolor" : "grey",       ⎪
        "shirtcolor2" : "darkslategrey",  ⎬ 4104
        "shirtbasiccolor2" : "grey",      ⎪
        "hatcolor" : "dimgrey",           ⎪
        "hatbasiccolor" : "grey",         ⎭
4106 ⟶  "id" : "00000014",
        "firstframe" : 1511216516826,    ⟵ 4108
        "lastframe" : 1511216523234,     ⟵ 4109
        "bestframe" : 1511216516925,
        "isface" : 0.7781194997772406,   ⟵ 4110
        "isfacemax" : 0.8653846153846154,
        "redact" : false,
        "c2" : {                          ⟵ 4112
            "picID" : "na",
            "humanID" : "na",
            "isActive" : true,
            "gtAge" : -1.0,
            "fittedAge" : -1.0,
            "cic2" : [
                {
                    "name" : "AGE",
                    "value" : 5,          ⟵ 4118
                    "valuestring" : "40to55"   ⟵ 4116
                    "value2" : 2,
                    "valuestring2" : "12to17",   ⟵ 4119
         4120 ⟶    "values" : [ "0to3", "4to11", "12to17", "18to25",
                                "26to39", "40to55", "55plus" ],
4114 ⟨      4122 ⟶  "scores" : [ 0.02381444356907221,
                                 0.29644720713304695,
                                 0.3216806418453154,
                                 0.055373157079393664,  ⎬ 4124
                                 0.22744738014073798,
                      4126 ⟶    0.8470101532900025,
                                 0.12159603675203239 ]
                },
                {
                    "name" : "BEARD",
                    "value" : 0,
                    "valuestring" : "NO",
                    "values" : [ "NO", "YES" ],
                    "scores" : [ 0.8377200277864224,
                                 0.07175273311450016 ]
```

FIG. 41A

```
},
{
  "name" : "EYE",
  "value" : 1,
  "valuestring" : "BROWN",
  "value2" : 3,
  "valuestring2" : "GREEN",
  "values" : [ "BLUE", "BROWN", "DARK",
            "GREEN", "HAZEL" ],
  "scores" : [ 0.3074867242396803,
            0.6722760991778969,
            0.3372857239433097,
            0.6716412833828699, 0.0 ]
},
{
  "name" : "FACE",
  "value" : 0,
  "valuestring" : "THIN",
  "value2" : 1,
  "valuestring2" : "NORMAL",
  "values" : [ "THIN", "NORMAL", "ROUND" ],
  "scores" : [ 0.485165995582954,
            0.3484219279179377,
            0.253354097562391 ]
},
{
  "name" : "GLASSES",
  "value" : 1,
  "valuestring" : "YES",
  "values" : [ "NO", "YES" ],
  "scores" : [ 0.2144738702559578,
            0.7562059298909836 ]
},
{
  "name" : "HAIR",
  "value" : 5,
  "valuestring" : "RED",
  "value2" : 2,
  "valuestring2" : "BRUNETTE",
  "values" : [ "BALD", "BLONDE", "BRUNETTE",
            "DARK", "GREY", "RED" ],
  "scores" : [ 0.07912130936061111,
            0.022278726014958356,
            0.4544114588849644,
            0.26496393567708104,
            0.04433924324071926,
            0.7904684100360722 ]
```

FIG. 41B

```
},
{
  "name" : "HASFOCUS",
  "value" : 1,
  "valuestring" : "YES",
  "values" : [ "NO", "YES" ],
  "scores" : [ 0.3972926820891097,
              0.5857153995692354 ]
},
{
  "name" : "HAT",
  "value" : 0,
  "valuestring" : "NO",
  "values" : [ "NO", "YES" ],
  "scores" : [ 0.8465678711847932,
              0.12786593390347825 ]
},
{
  "name" : "ISFACE",
  "value" : 1,
  "valuestring" : "YES",
  "values" : [ "NO", "YES" ],
  "scores" : [ 0.11101906617920863,
              0.7781194997772406 ]
},
{
  "name" : "MUSTACHE",
  "value" : 0,
  "valuestring" : "NO",
  "values" : [ "NO", "YES" ],
  "scores" : [ 0.8237634405036874,
              0.12389557667857383 ]
},
{
  "name" : "POSE",
  "value" : 2,
  "valuestring" : "CENTER",
  "value2" : 1,
  "valuestring2" : "LEFT45",
  "values" : [ "LEFTPRO", "LEFT45", "CENTER",
              "RIGHT45", "RIGHTPRO" ],
  "scores" : [ 0.0, 0.1339851923350804,
              0.6122454454411563,
              0.06241531170080239, 0.0 ]
},
{
```

FIG. 41C

```
            "name" : "RACE",
            "value" : 0,
            "valuestring" : "WHITE"
            "value2" : 2,
            "valuestring2" : "ASIAN",
            "values" : [ "WHITE", "BLACK", "ASIAN",
                         "HISPANIC", EINDIAN", "ARAB" ],
            "scores" : [ 0.7996147830222217,
                         0.039351839235000517,
                         0.17284896703169478,
                         0.10747719334485391,
                         0.1142603689619762, 0.0 ]
        },
        {
            "name" : "SEX",
            "value" : 0,
            "valuestring" : "MALE",
            "values" : [ "MALE", "FEMALE" ],
            "scores" : [ 0.7510457915918978,
                         0.13596925462642134 ]
        },
        {
            "name" : "SMILING",
            "value" : 0,
            "valuestring" : "NO",
            "values" : [ "NO", "YES" ],
            "scores" : [ 0.6719009142521798,
                         0.30137915370153495 ]
        },
        {
            "name" : "SUNGLASSES",
            "value" : 0,
            "valuestring" : "NO",
            "values" : [ "NO", "YES" ],
            "scores" : [ 0.7803082097415048,
                         0.22212270232786666 ]
        }
    ]
},
"human4array" : [
    {
        "timestamp" : 1511216516826,
        "facerect" : {
                "x" : 981,
                "y" : 0,
                "width" : 168,
```

FIG. 41D

```
                        "height" : 216,
                        "type" : 0,
                        "pangle" : 0.0,
                    }
            },
            {
                "timestamp" : 1511216516925,
                "facerect" : {
                        "x" : 981,
                        "y" : 0,
                        "width" : 168,
                        "height" : 216,
                        "type" : 0,
                        "pangle" : 0.0,
                    }
            }
        ]
}
```

FIG. 41E $$\text{sum} = W_{A_2} * fA_{2,0} + W_{A_3} * (fA_{3,1} + fA_{3,5}) + W_{A_4} * fA_{4,3} + \ldots +$$
$$W_{C_2} * fC_{2,0} + W_{C_3} fC_{3,0} + W_{C_4} fC_{4,3} + \ldots + W_{C_m} fC_{m,3} ;$$

$$\text{score} = \text{sum} / \sum_i W_i$$

FIG. 46

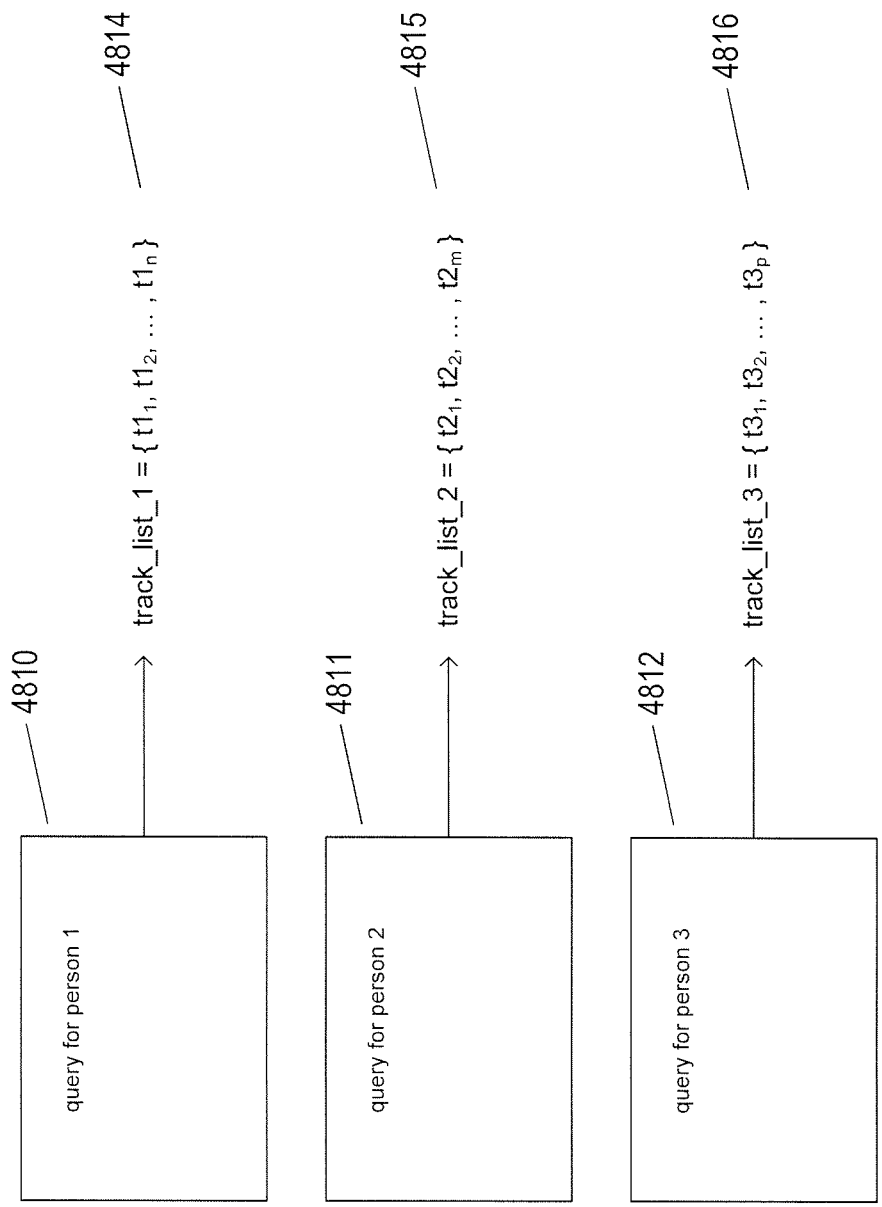

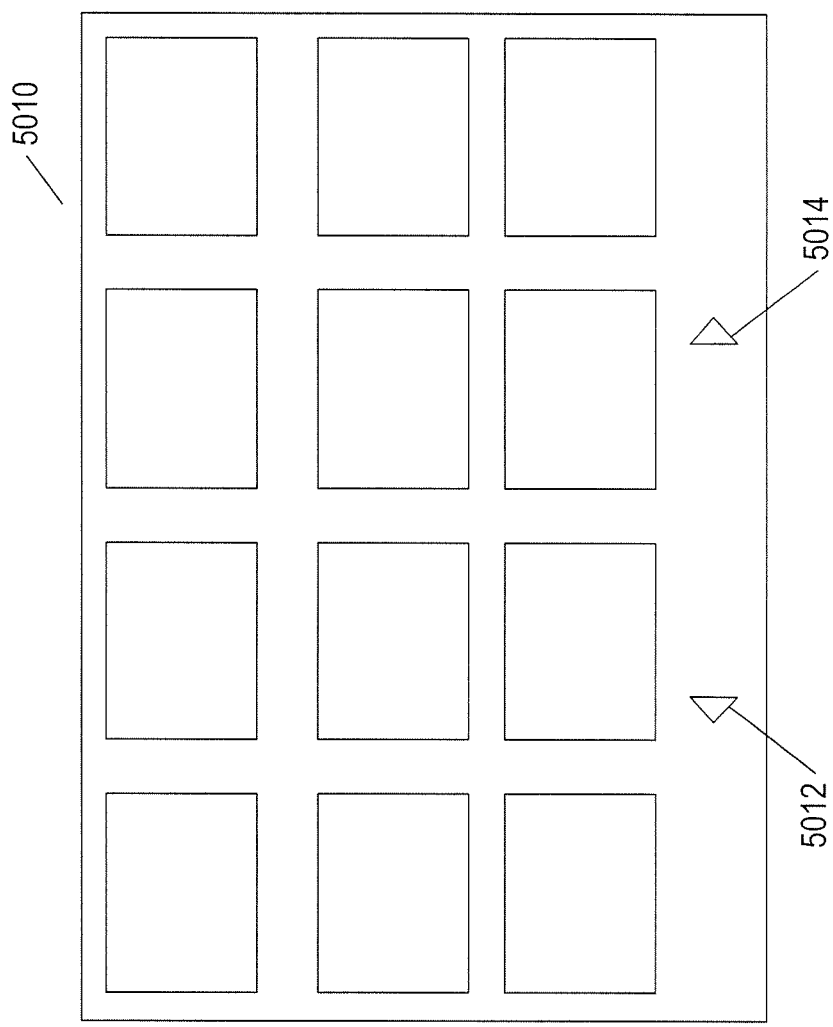

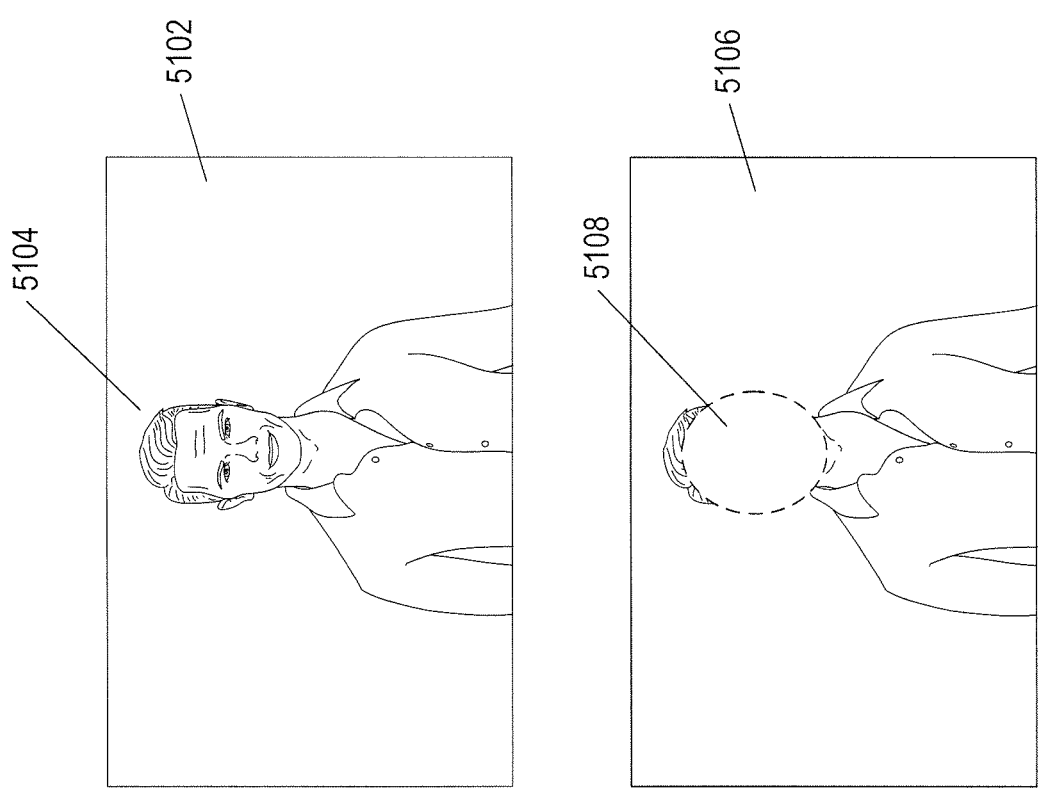

SURVEILLANCE AND MONITORING SYSTEM THAT EMPLOYS AUTOMATED METHODS AND SUBSYSTEMS THAT IDENTIFY AND CHARACTERIZE FACE TRACKS IN VIDEO

CROSS-REFERENCE TO RELATED APPLICATIONS

This application is a continuation-in-part of application Ser. No. 15/273,579, filed Sep. 22, 2016, now U.S. Pat. No. 10,366,277 which claims benefit of Provisional Application No. 62/222,108, filed Sep. 22, 2015, which is herein incorporated by reference.

TECHNICAL FIELD

The present document is related to surveillance and monitoring systems and, in particular, to surveillance and monitoring systems that employ automated video-processing and facial-image-characterization subsystems.

BACKGROUND

While, for many years, computer scientists assumed that many complex tasks carried about by humans, including recognition and characterization of objects in images, would be rapidly automated by various techniques and approaches that were referred to as "artificial intelligence" ("AI"), the optimistic forecasts for optimization were not, in most cases, reflected in actual technical and scientific developments and progress. Many seemingly tractable computational problems proved to be far more complex than originally imagined and the hardware platforms, despite rapid evolution in capabilities and capacities, fell short of the computational bandwidths needed for automation of the complex tasks.

During the past 10 years, significant advances in distributed computing, including the emergence of cloud computing, have placed enormous computational bandwidth at the disposal of computational-bandwidth consumers, and is now routinely used for data analytics, scientific computation, web-site hosting, and for carrying out AI computations. However, even with the computational-bandwidth constraints relieved by massive distributed-computing systems, many problems remain difficult. For example, many digital-video-based surveillance systems used to monitor institutional facilities, manufacturing facilities, military installations, and other buildings and areas do not provide even semi-automated methods and systems for analyzing digital video streams from multiple digital video cameras to monitor human traffic and activity within the facilities, buildings, and other areas, to detect anomalous and potentially threatening activities, and to track particular individuals within the facilities and areas. Instead, most currently available digital-video-based surveillance systems collect and store vast quantities of video data which must be subsequently manually reviewed by human personnel in order to make use of the stored video data. Designers, developers, manufacturers, and users of surveillance systems continue to seek more efficient, automated methodologies and subsystems that would provide more time-efficient and cost-efficient use of digital video for surveillance and monitoring purposes.

SUMMARY

The present document is directed to automated and semi-automated surveillance and monitoring methods and systems that continuously record digital video, identify and characterize face tracks in the recorded digital video, store the face tracks in a face-track database, and provide query processing functionalities that allow particular face tracks to be quickly identified and used for a variety of surveillance and monitoring purposes. The currently disclosed methods and systems provide, for example, automated anomaly and threat detection, alarm generation, rapid identification of images of parameter-specified individuals within recorded digital video and mapping the parameter-specified individuals in time and space within monitored geographical areas or volumes, functionalities for facilitating human-witness identification of images of individuals within monitored geographical areas or volumes, and many additional functionalities.

BRIEF DESCRIPTION OF THE DRAWINGS

FIGS. 11A-F illustrate one approach to mapping points in a world coordinate system to corresponding points on an image plane of a camera.

FIGS. 19H-I illustrate a simple, one-parameter application of the Hough transform.

FIGS. 32-34 illustrate an efficient attribute-assignment method used in many implementations of the attribute-assigning image-processing system to which the current document is directed.

FIG. 36 illustrates a video.

FIGS. 38A-C illustrate one relational-database implementation of a data-storage subsystem for the video-processing methods and systems to which the current document is directed.

FIGS. 41A-E illustrate one implementation of a track data structure that is stored in a track database to represent a face track.

FIG. 46 illustrates one possible face-track scoring implementation.

FIGS. 48A-E illustrate multi-person searches.

FIGS. 50A-C illustrate the lineup functionality.

FIG. 51 illustrates the redaction operation.

DETAILED DESCRIPTION

The present document is directed to automated and semi-automated surveillance and monitoring systems that employ methods and subsystems that identify and characterize face tracks in one or more continuously recorded digital video. The following discussion is subdivided into a number of subsections, including: (1) An Overview of Computer Systems and Architecture; (2) An Overview of Digital Images; (3) Perspective Transformations; (4) Feature Detectors; (5) Attribute Assignment to Face-Containing Subimages; (6) Methods and Systems that Identify and Characterize Face Tracks in Video; and (7) Currently Disclosed Surveillance and Monitoring Systems.

Overview of Computer Systems and Computer Architecture

Figure 1:
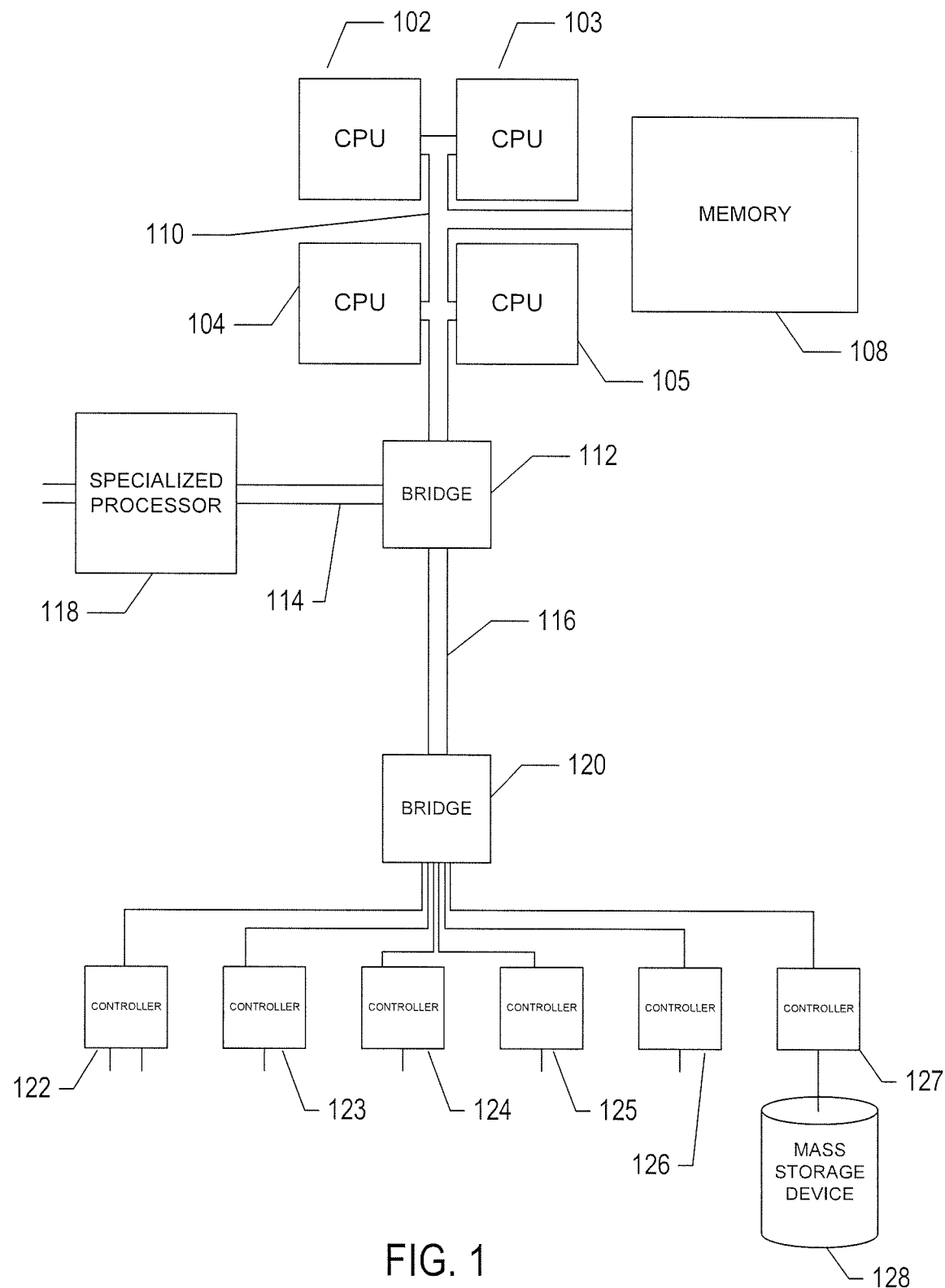
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
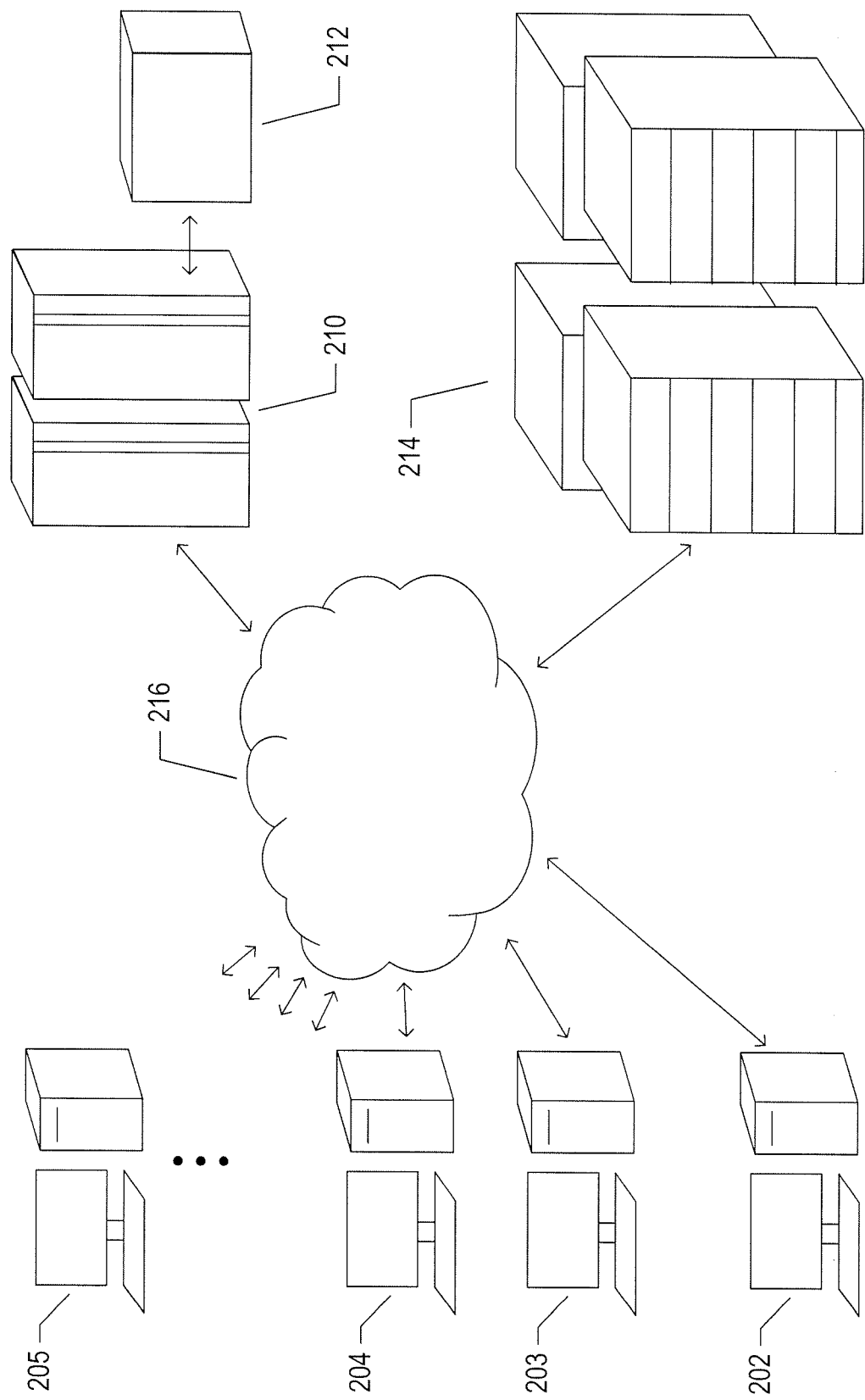
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
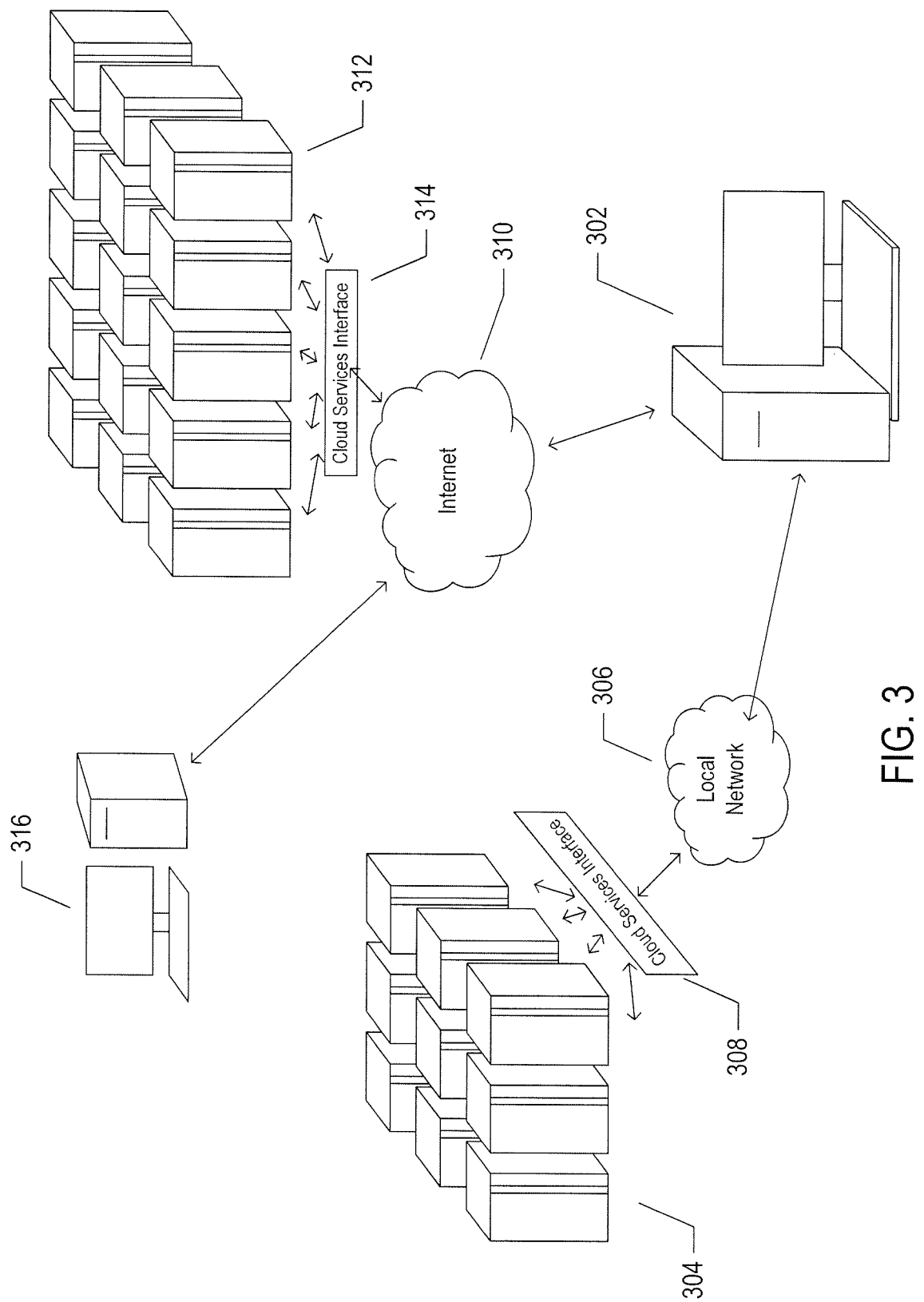
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Figure 4:
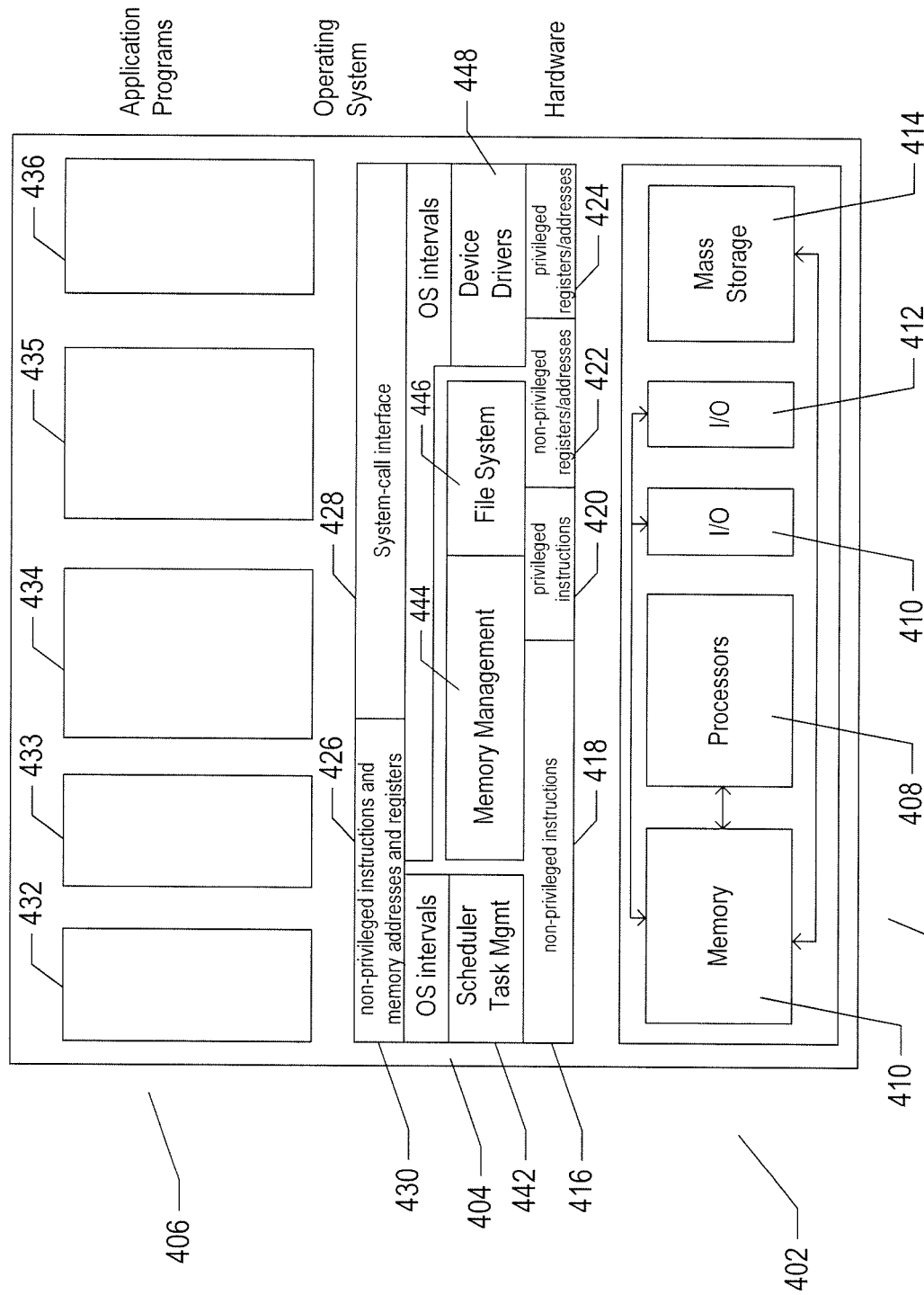
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
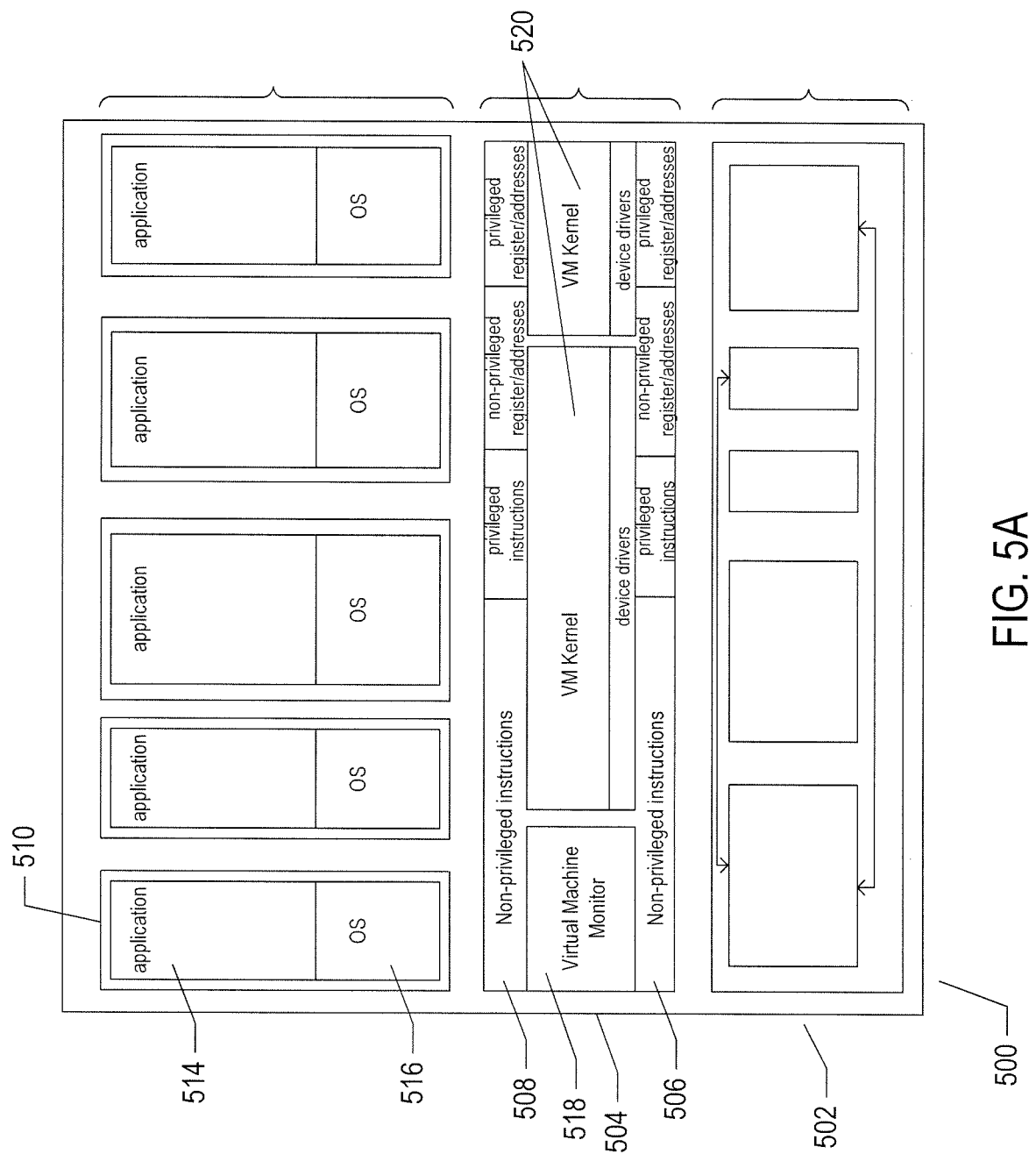
FIGS. 5A-D illustrate several types of virtual machine and virtual-machine execution environments.

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-D use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 5B:
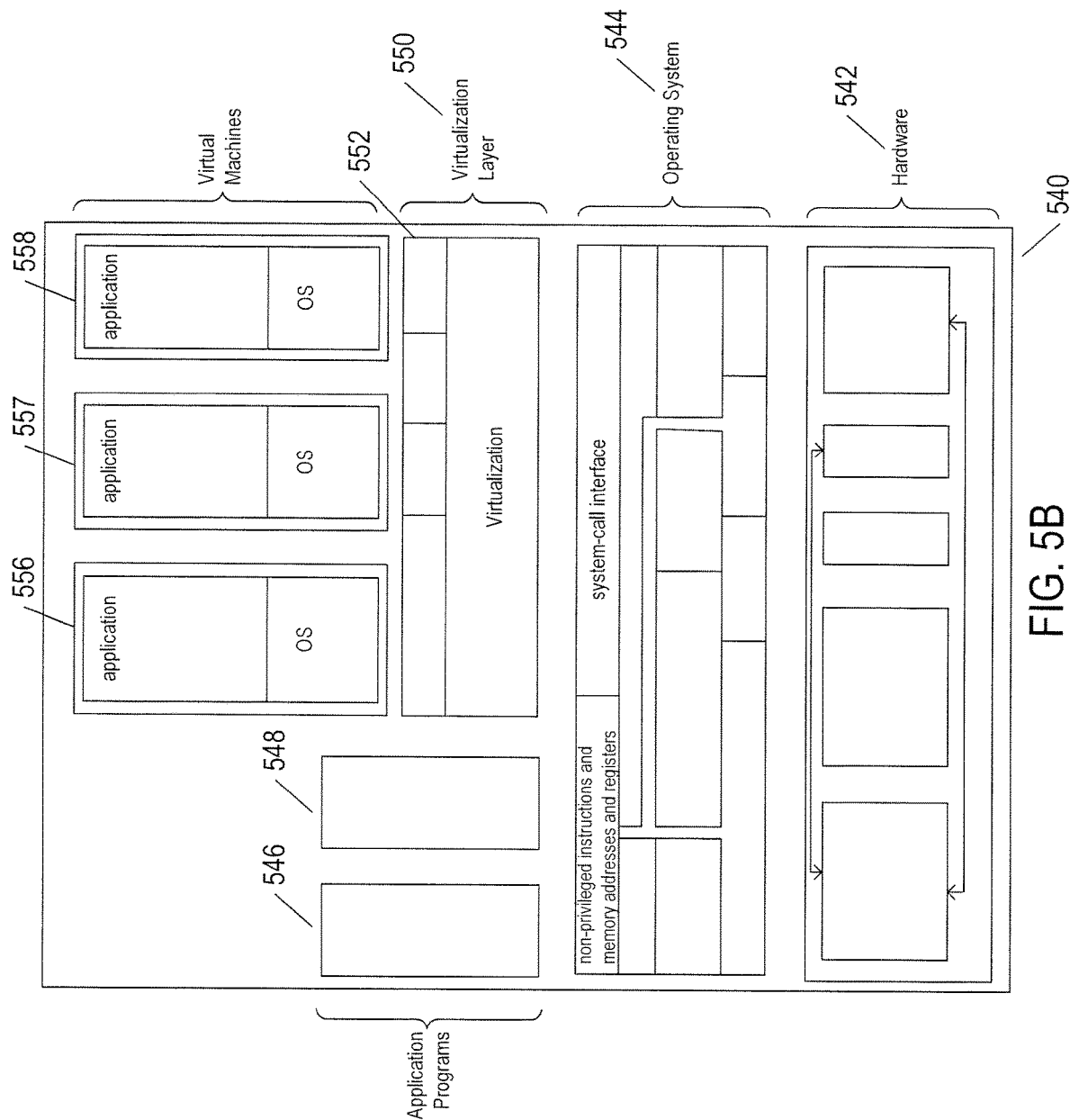

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
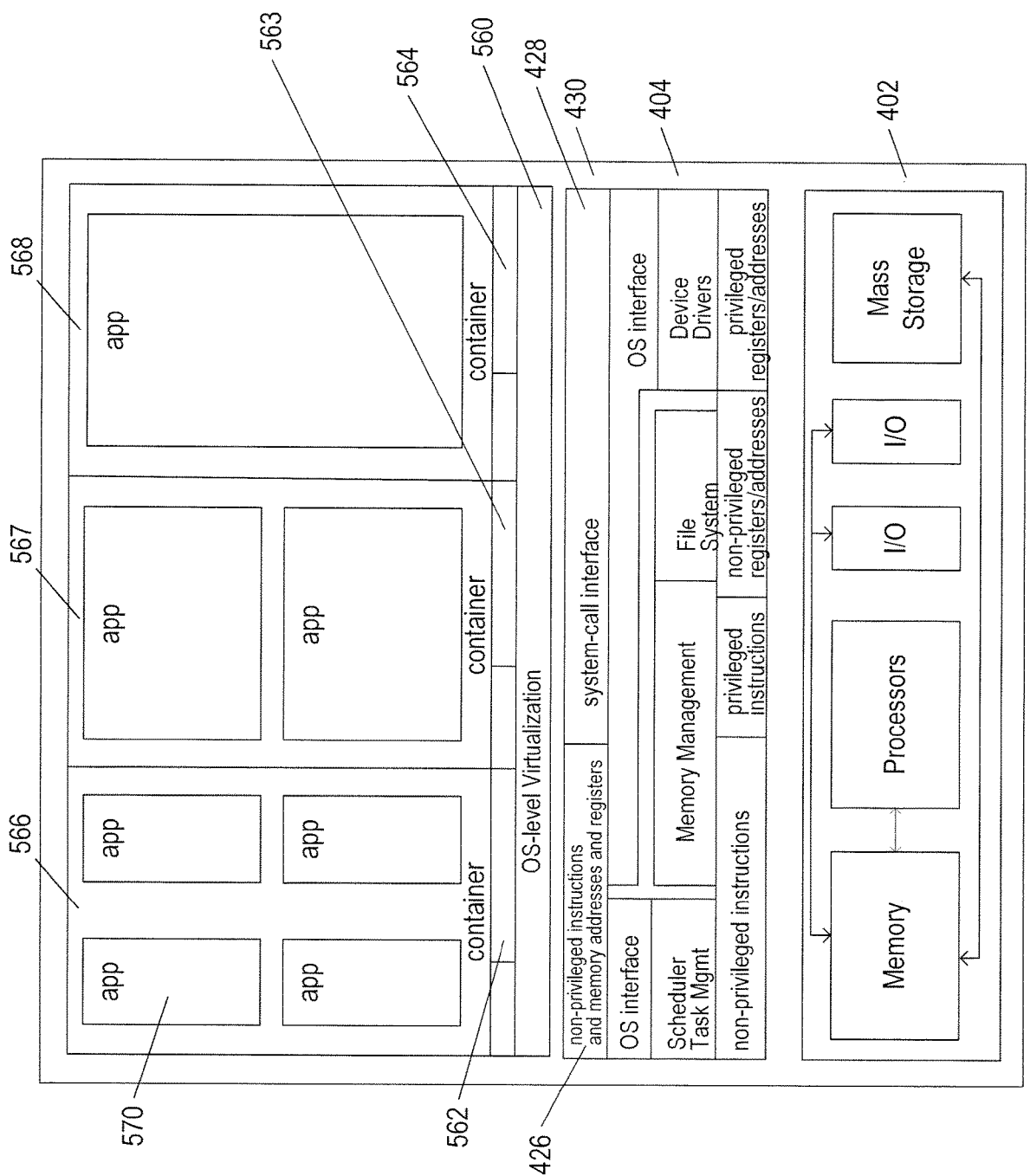

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
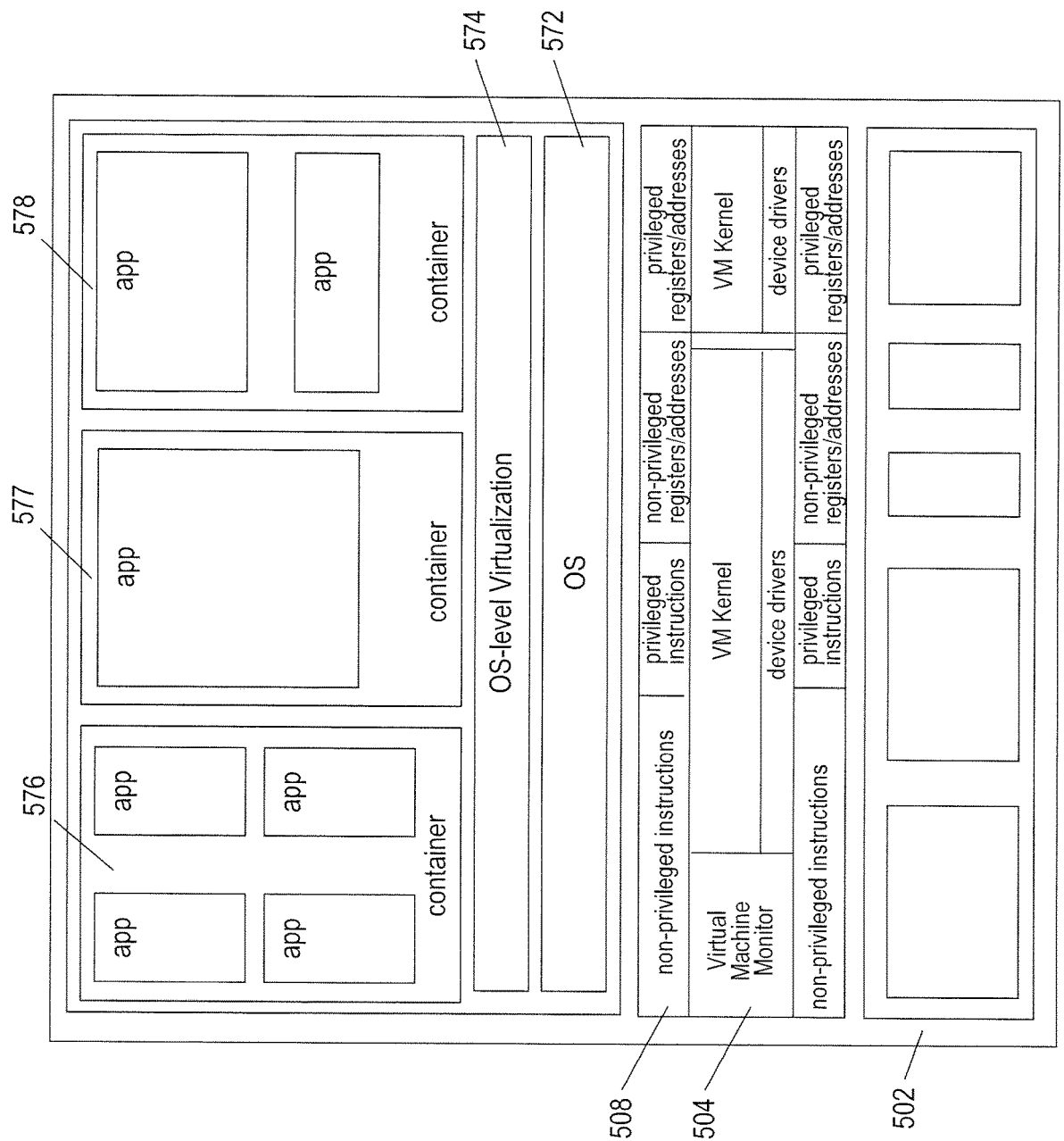

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

In FIGS. 5A-D, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, operating systems, containers, and computer-instruction implemented systems that execute within execution environments provided by virtualization layers, operating systems, and containers are all physical entities that include electromechanical components and computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, operating systems, containers, and higher-level systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
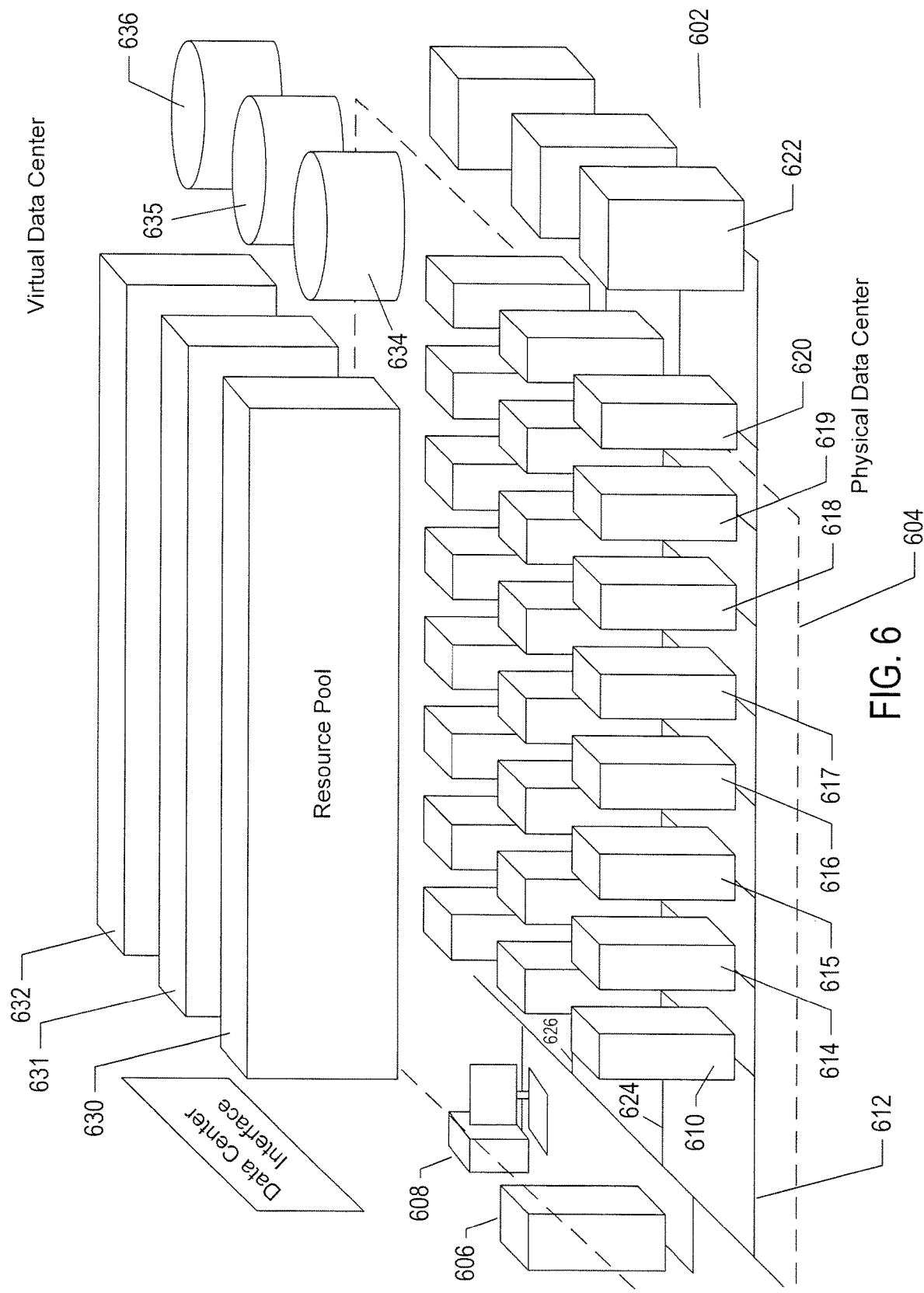
FIG. 6 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 6 illustrates virtual data centers provided as an abstraction of underlying physical-data-center hardware components. In FIG. 6, a physical data center 602 is shown below a virtual-interface plane 604. The physical data center consists of a virtual-infrastructure management server ("VI-management-server") 606 and any of various different computers, such as PCs 608, on which a virtual-data-center management interface may be displayed to system administrators and other users. The physical data center additionally includes generally large numbers of server computers, such as server computer 610, that are coupled together by local area networks, such as local area network 612 that directly interconnects server computer 610 and 614-620 and a mass-storage array 622. The physical data center shown in FIG. 6 includes three local area networks 612, 624, and 626 that each directly interconnects a bank of eight servers and a mass-storage array. The individual server computers, such as server computer 610, each includes a virtualization layer and runs multiple virtual machines. Different physical data centers may include many different types of computers, networks, data-storage systems and devices connected according to many different types of connection topologies. The virtual-data-center abstraction layer 604, a logical abstraction layer shown by a plane in FIG. 6, abstracts the physical data center to a virtual data center comprising one or more resource pools, such as resource pools 630-632, one or more virtual data stores, such as virtual data stores 634-636, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

An Overview of Digital Images

Figure 7:
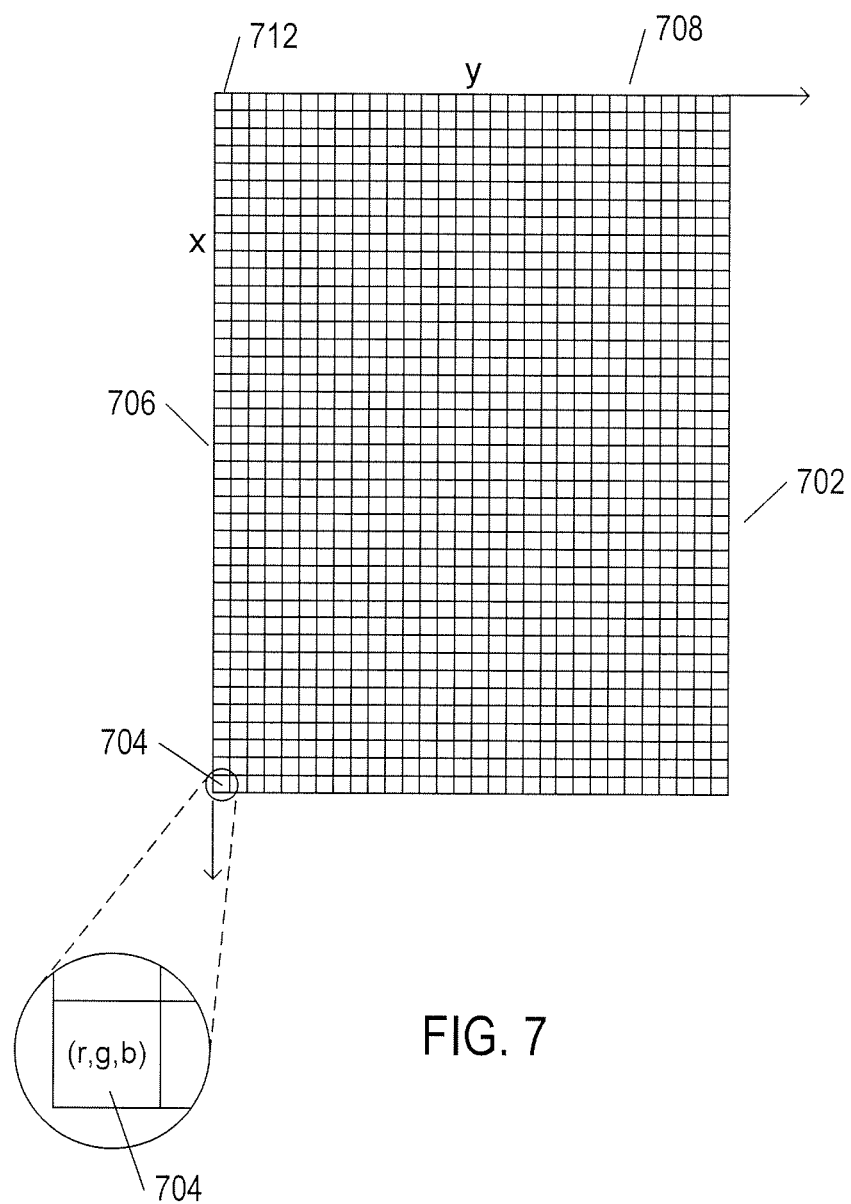
FIG. 7 illustrates a typical digitally encoded image.

FIG. 7 illustrates a typical digitally encoded image. The encoded image comprises a two dimensional array of pixels 702. In FIG. 7, each small square, such as square 704, is a pixel, generally defined as the smallest-granularity portion of an image that is numerically specified in the digital encoding. Each pixel is a location, generally represented as a pair of numeric values corresponding to orthogonal x and y axes 706 and 708, respectively. Thus, for example, pixel 704 has x, y coordinates (39,0), while pixel 712 has coordinates (0,0). In the digital encoding, the pixel is represented by numeric values that specify how the region of the image corresponding to the pixel is to be rendered upon printing, display on a computer screen, or other display. Commonly, for black-and-white images, a single numeric value range of 0-255 is used to represent each pixel, with the numeric value corresponding to the grayscale level at which the pixel is to be rendered. In a common convention, the value "0" represents black and the value "255" represents white. For color images, any of a variety of different color-specifying sets of numeric values may be employed. In one common color model, as shown in FIG. 4, each pixel is associated with three values, or coordinates (r,g,b), which specify the red, green, and blue intensity components of the color to be displayed in the region corresponding to the pixel.

Figure 8:
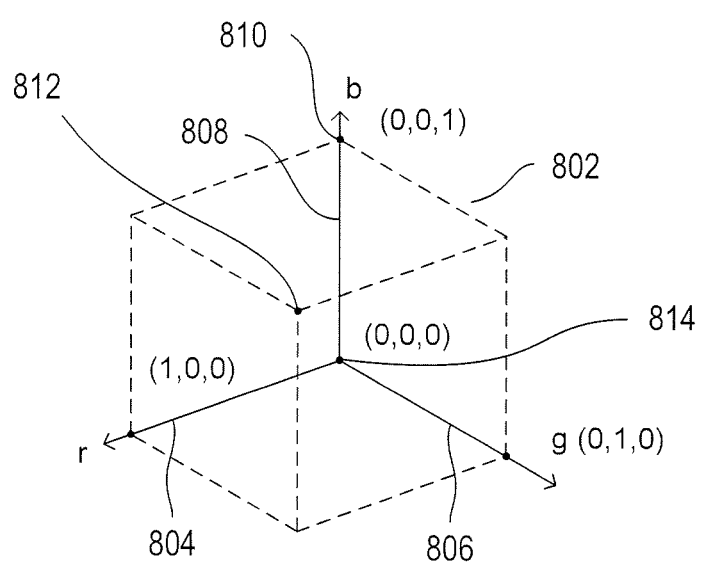
FIG. 8 illustrates one version of the RGB color model.

FIG. 8 illustrates one version of the RGB color model. The entire spectrum of colors is represented, as discussed above with reference to FIG. 3, by a three-primary-color coordinate (r,g,b). The color model can be considered to correspond to points within a unit cube 802 within a three-dimensional color space defined by three orthogonal axes: (1) r 804; (2) g 806; and (3) b 808. Thus, the individual color coordinates range from 0 to 1 along each of the three color axes. The pure blue color, for example, of greatest possible intensity corresponds to the point 810 on the b axis with coordinates (0,0,1). The color white corresponds to the point 812, with coordinates (1,1,1) and the color black corresponds to the point 814, the origin of the coordinate system, with coordinates (0,0,0).

Figure 9:
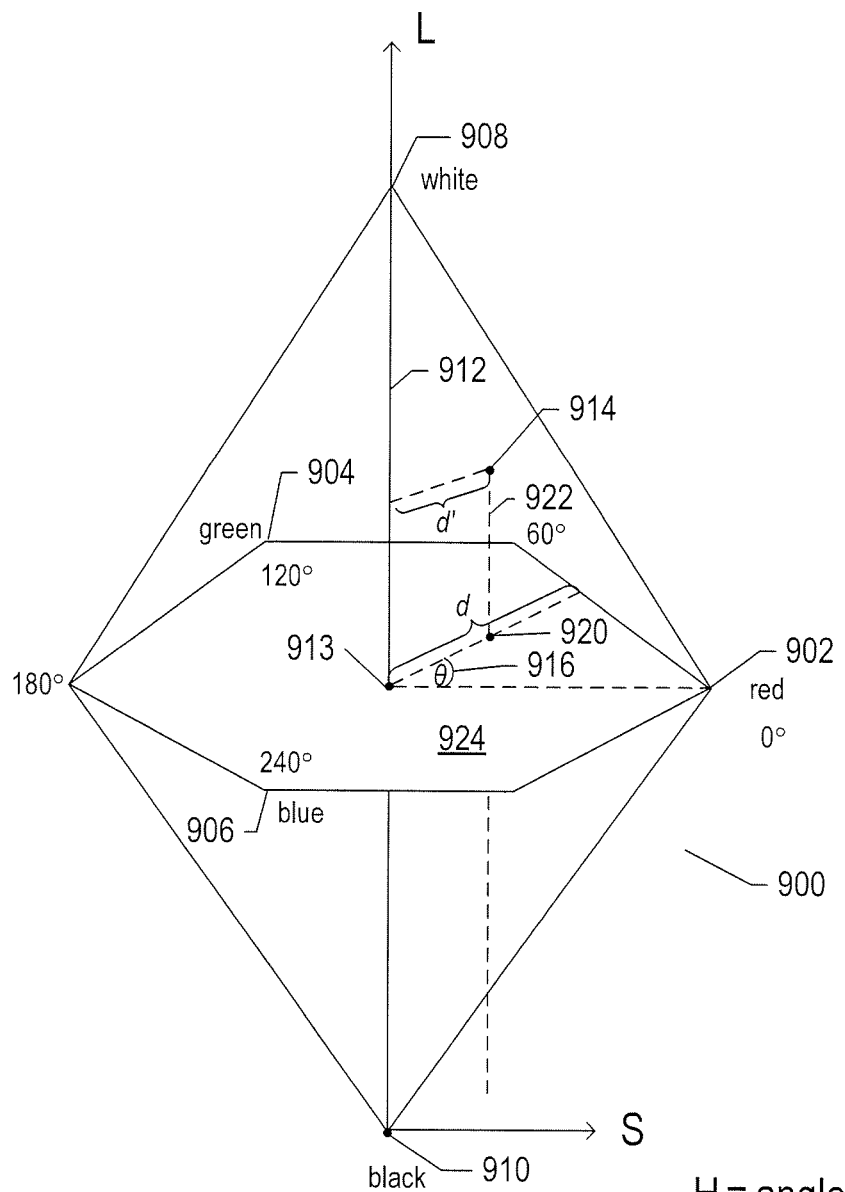
FIG. 9 shows a different color model, referred to as the "hue-saturation-lightness" ("HSL") color model.

FIG. 9 shows a different color model, referred to as the "hue-saturation-lightness" ("HSL") color model. In this color model, colors are contained within a three-dimensional bi-pyramidal prism 900 with a hexagonal cross section. Hue (h) is related to the dominant wavelength of a light radiation perceived by an observer. The value of the hue varies from 0° to 360° beginning with red 902 at 0°, passing through green 904 at 120°, blue 906 at 240°, and ending with red 902 at 360°. Saturation (s), which ranges from 0 to 1, is inversely related to the amount of white and black mixed with a particular wavelength, or hue. For example, the pure red color 902 is fully saturated, with saturation s=1.0, while the color pink has a saturation value less than 1.0 but greater than 0.0, white 908 is fully unsaturated, with s=0.0, and black 910 is also fully unsaturated, with s=0.0. Fully saturated colors fall on the perimeter of the middle hexagon that includes points 902, 904, and 906. A gray scale extends from black 910 to white 908 along the central vertical axis 912, representing fully unsaturated colors with no hue but different proportional combinations of black and white. For example, black 910 contains 100% of black and no white, white 908 contains 100% of white and no black and the origin 913 contains 50% of black and 50% of white.

Lightness (l), or luma, represented by the central vertical axis 912, indicates the illumination level, ranging from 0 at black 910, with l=0.0, to 1 at white 908, with l=1.0. For an arbitrary color, represented in FIG. 9 by point 914, the hue is defined as angle θ 916, between a first vector from the origin 913 to point 902 and a second vector from the origin 913 to point 920 where a vertical line 922 that passes through point 914 intersects the plane 924 that includes the origin 913 and points 902, 904, and 906. The saturation is represented by the ratio of the distance of representative point 914 from the vertical axis 912, d', divided by the length of a horizontal line passing through point 920 from the origin 913 to the surface of the bi-pyramidal prism 900, d. The lightness is the vertical distance from representative point 914 to the vertical level of the point representing black 910. The coordinates for a particular color in the HSL color model, (h,s,l), can be obtained from the coordinates of the color in the RGB color model, (r,g,b), as follows:

$$l = \frac{(C_{max} - C_{min})}{2},$$

$$h = \begin{cases} 60° \times \left(\frac{g-b}{\Delta} \bmod 6\right), \text{ when } C_{max} = r \\ 60° \times \left(\frac{b-r}{\Delta} + 2\right), \text{ when } C_{max} = g \\ 60° \times \left(\frac{r-g}{\Delta} + 4\right), \text{ when } C_{max} = b \end{cases}, \text{ and}$$

$$s = \begin{cases} 0, \Delta = 0 \\ \frac{\Delta}{1 - |2l - 1|}, \text{ otherwise} \end{cases},$$

where r, g, and b values are intensities of red, green, and blue primaries normalized to the range [0, 1]; $C_{max}$ is a normalized intensity value equal to the maximum of r, g, and b; $C_{min}$ is a normalized intensity value equal to the minimum of r, g, and b; and Δ is defined as $C_{max}-C_{min}$.

Figure 10:
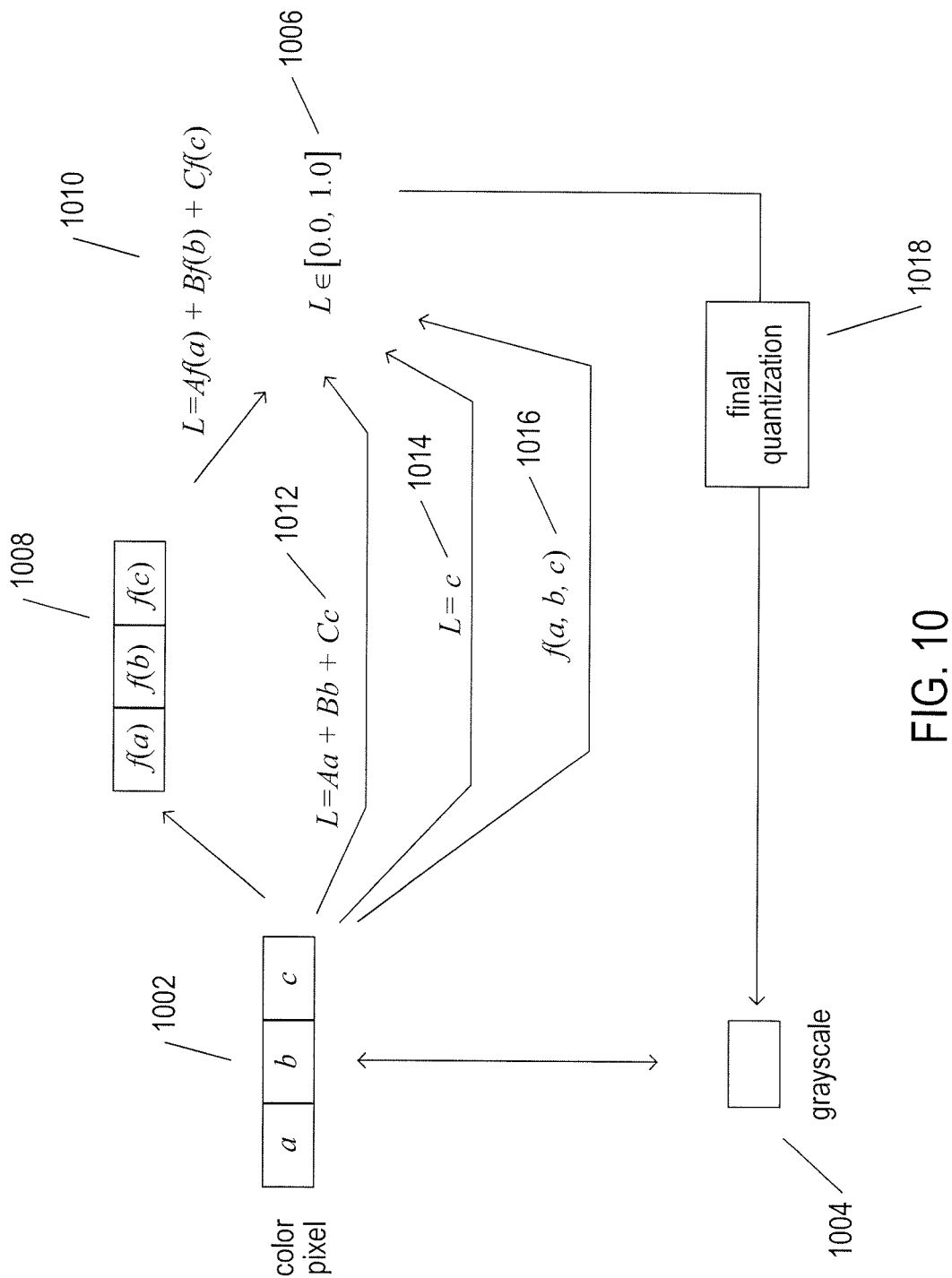
FIG. 10 illustrates generation of a grayscale or binary image from a color image.

FIG. 10 illustrates generation of a grayscale or binary image from a color image. In a color image, each pixel is generally associated with three values: a, b, and c 1002. Different color models employ different values of a, b, and c to represent a particular color. A grayscale image includes only a single intensity value 1004 for each pixel. A binary image is a special case of a grayscale image with only two different intensity values, 0 and 1. Commonly, grayscale images may have 256 or 65,536 different intensity values, with each pixel represented by a byte or 16-bit word, respectively. Thus, to transform a color image to grayscale, the three values a, b, and c in the color pixels need to be translated to single intensity values for the grayscale or binary image. In a first step, the three color values a, b, and c are transformed to a luminosity value L, generally in a range of [0.0, 1.0] 1006. For certain color models, a function is applied to each of the color values 1008 and the results are summed 1010 to produce the luminosity value. In other color models, each color value is multiplied by a coefficient and the results are summed 1012 to produce the luminosity value. In yet other color systems, one of the three color values is, in fact, the luminosity value 1014. Finally, in the general case, a function is applied to the three color values 1016 to produce the luminosity value. The luminosity value is then quantized 1018 to produce a grayscale intensity value within the desired range, generally [0, 255] for grayscale images and (0,1) for binary images.

Perspective Transformations

Figure 11A:
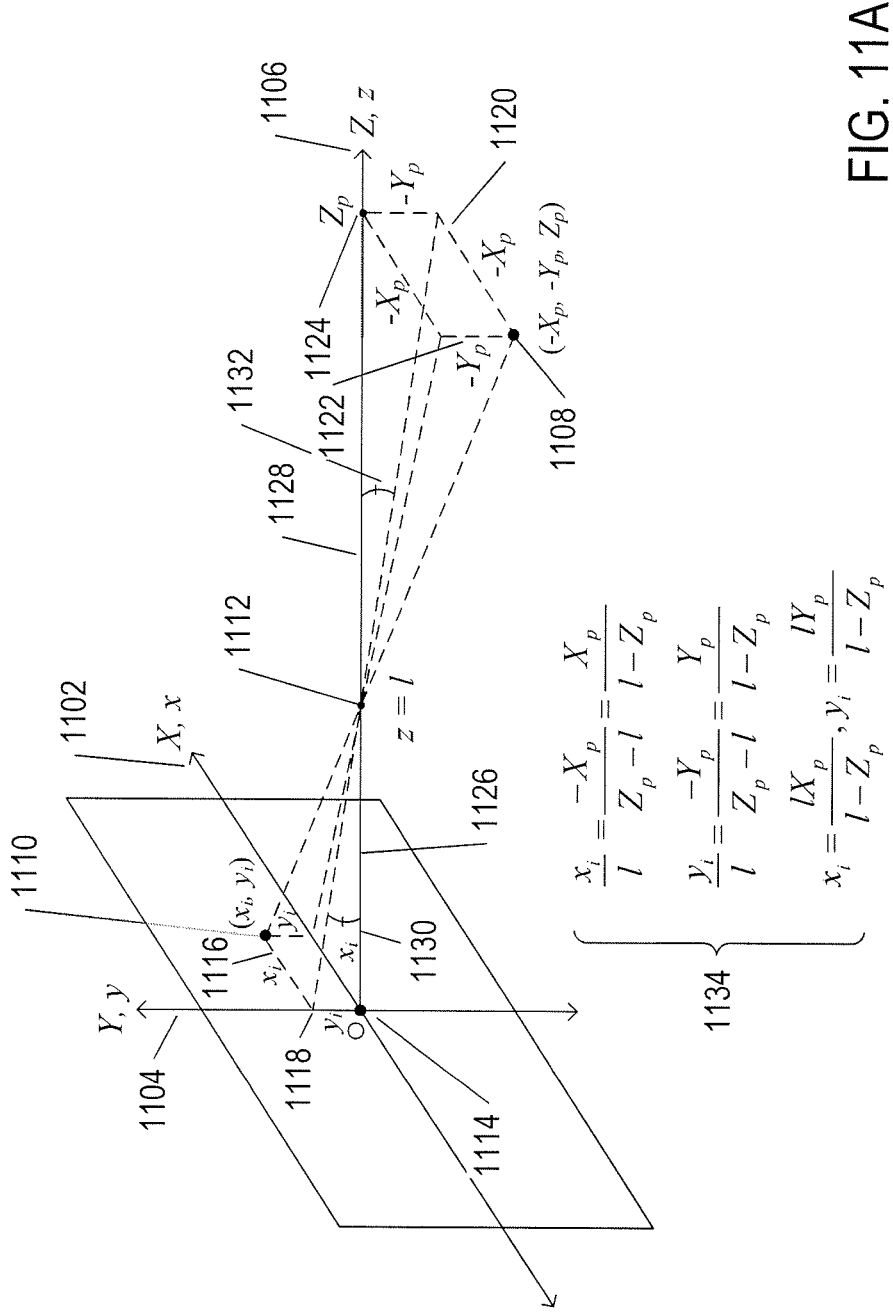

FIGS. 11A-F illustrate one approach to mapping points in a world coordinate system to corresponding points on an image plane of a camera. FIG. 11A illustrates the image plane of a camera, an aligned camera coordinate system and world coordinate system, and a point in three-dimensional space that is imaged on the image plane of the camera. In FIG. 11A, the camera coordinate system, comprising the x, y, and z axes, is aligned and coincident with the world-coordinate system X, Y, and Z. This is indicated, in FIG. 11A, by dual labeling of the x and X axis 1102, the y and Y axis 1104, and the z and Z axis 1106. The point that is imaged 1108 is shown to have the coordinates $(X_p, Y_p, \text{ and } Z_p)$. The image of this point on the camera image plane 1110 has the coordinates $(x_i, y_i)$. The virtual lens of the camera is centered at the point 1112, which has the camera coordinates (0, 0, l) and the world coordinates (0, 0, l). When the point 1108 is in focus, the distance l between the origin 1114 and point 1112 is the focal length of the camera. A small rectangle is shown, on the image plane, with the corners along one diagonal coincident with the origin 1114 and the point 1110 with coordinates $(x_i, y_i)$. The rectangle has horizontal sides, including horizontal side 1116, of length $x_i$, and vertical sides, including vertical side 1118, with lengths $y_i$. A corresponding rectangle with horizontal sides of length $-X_p$, including horizontal side 1120, and vertical sides of length $-Y_p$, including vertical side 1122. The point 1108 with world coordinates $(-X_p, -Y_p, \text{ and } Z_p)$ and the point 1124 with world coordinates $(0, 0, Z_p)$ are located at the corners of one diagonal of the corresponding rectangle. Note that the positions of the two rectangles are inverted through point 1112. The length of the line segment 1128 between point 1112 and point 1124 is $Z_p-l$. The angles at which each of the lines shown in FIG. 11A passing through point 1112 intersects the z, Z axis are equal on both sides of point 1112. For example, angle 1130 and angle 1132 are identical. As a result, the principal of the correspondence between the lengths of similar sides of similar triangles can be used to derive expressions for the image-plane coordinates $(x_i, y_i)$ for an imaged point in three-dimensional space with world coordinates $(X_p, Y_p, \text{ and } Z_p)$ 1134:

$$\frac{x_i}{l} = \frac{-X_p}{Z_p - l} = \frac{X_p}{l - Z_p}$$

$$\frac{y_i}{l} = \frac{-Y_p}{Z_p - l} = \frac{Y_p}{l - Z_p}$$

$$x_i = \frac{lX_p}{l - Z_p}, y_i = \frac{lY_p}{l - Z_p}$$

Camera coordinate systems are not, in general, aligned with the world coordinate system. Therefore, a slightly more complex analysis is required to develop the functions, or processes, that map points in three-dimensional space to points on the image plane of a camera.

Figure 11B:
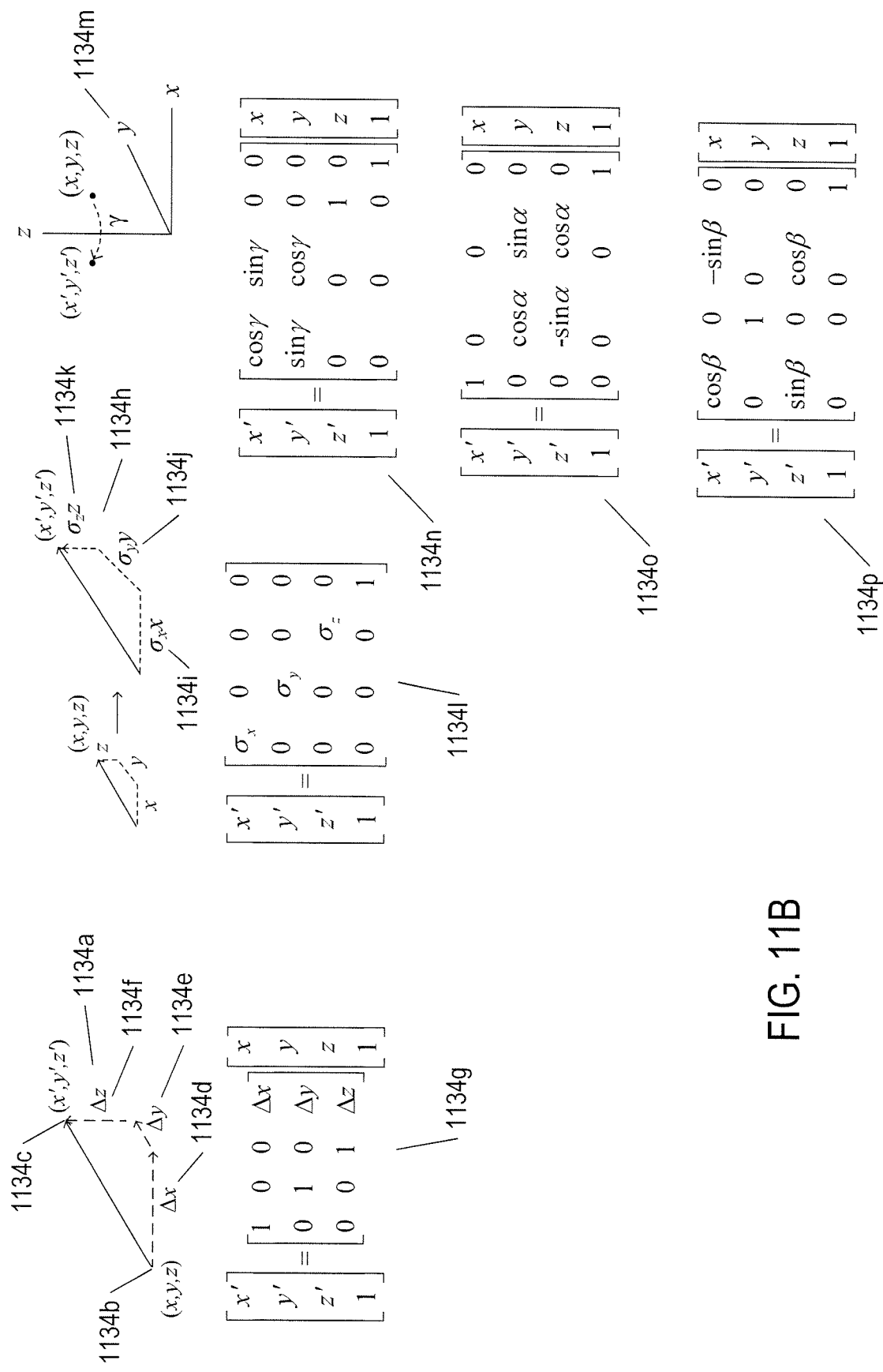

FIG. 11B illustrates matrix equations that express various types of operations on points in a three-dimensional space. A translation 1134a moves a first point with coordinates (x,y,z) 1134b to a second point 1134c with coordinates (x', y', z'). The translation involves displacements in the x 1134d, y 1134e, and z 1134f directions. The matrix equation for the translation 1134g is provided below the illustration of the translation 1134a. Note that a fourth dimension is added to the vector representations of the points in order to express the translation as a matrix operation. The value "1" is used for the fourth dimension of the vectors and, following computation of the coordinates of the translated point, can be discarded. Similarly, a scaling operation 1134h multiplies each coordinate of a vector by a scaling factor $\sigma_x$, $\sigma_y$, and $\sigma_z$, respectively 1134i, 1134j, and 1134k. The matrix equation for a scaling operation is provided by matrix equation 1134l. Finally, a point may be rotated about each of the three coordinate axes. Diagram 1134m shows rotation of a point (x,y,z) to the point (x',y',z') by a rotation of γ radians about the z axis. The matrix equation for this rotation is shown as matrix equation 1134n in FIG. 3B. Matrix equations 1134o and 1134p express rotations about the x and y axis, respectively, by α and β radians, respectively.

Figure 11D:
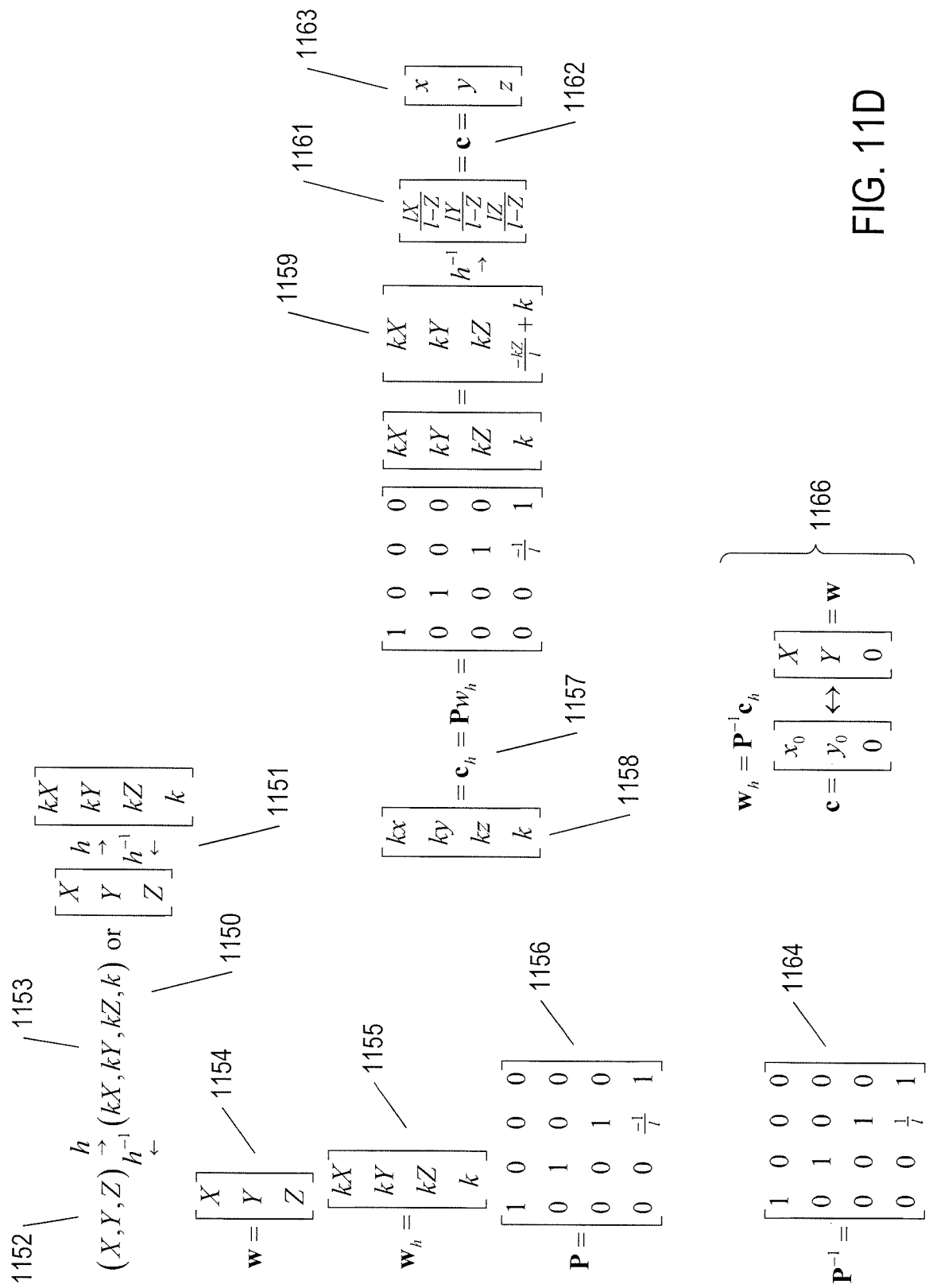

FIGS. 11C-E illustrate the process for computing the image of points in a three-dimensional space on the image plane of an arbitrarily oriented and positioned camera. FIG. 11C shows the arbitrarily positioned and oriented camera. The camera 1136 is mounted to a mount 1137 that allows the camera to be tilted by an angle α 1138 with respect to the vertical Z axis and to be rotated by an angle θ 1139 about a vertical axis. The mount 1137 can be positioned anywhere in three-dimensional space, with the position represented by a position vector $w_0$ 1140 from the origin of the world coordinate system 1141 to the mount 1137. A second vector r 1142 represents the relative position of the center of the image plane 1143 within the camera 1136 with respect to the mount 1137. The orientation and position of the origin of the camera coordinate system coincides with the center of the image plane 1143 within the camera 1136. The image plane 1143 lies within the x, y plane of the camera coordinate axes 1144-1146. The camera is shown, in FIG. 11C, imaging a point w 1147, with the image of the point w appearing as image point c 1148 on the image plane 1143 within the camera. The vector $w_0$ that defines the position of the camera mount 1137 is shown, in FIG. 11C, to be the vector $$w_0 = \begin{bmatrix} X_0 \\ Y_0 \\ Z_0 \end{bmatrix}.$$

FIGS. 11D-E show the process by which the coordinates of a point in three-dimensional space, such as the point corresponding to vector w in world-coordinate-system coordinates, is mapped to the image plane of an arbitrarily positioned and oriented camera. First, a transformation between world coordinates and homogeneous coordinates h and the inverse transformation $h^{-1}$ is shown in FIG. 11D by the expressions 1150 and 1151. The forward transformation from world coordinates 1152 to homogeneous coordinates 1153 involves multiplying each of the coordinate components by an arbitrary constant k and adding a fourth coordinate component having the value k. The vector w corresponding to the point 1147 in three-dimensional space imaged by the camera is expressed as a column vector, as shown in expression 1154 in FIG. 11D. The corresponding column vector $w_h$ in homogeneous coordinates is shown in expression 1155. The matrix P is the perspective transformation matrix, shown in expression 1156 in FIG. 11D. The perspective transformation matrix is used to carry out the world-to-camera coordinate transformations (1134 in FIG. 11A) discussed above with reference to FIG. 11A. The homogeneous-coordinate-form of the vector c corresponding to the image 1148 of point 1147, $c_h$, is computed by the left-hand multiplication of $w_h$ by the perspective transformation matrix, as shown in expression 1157 in FIG. 11D. Thus, the expression for $c_h$ in homogeneous camera coordinates 1158 corresponds to the homogeneous expression for $c_h$ in world coordinates 1159. The inverse homogeneous-coordinate transformation 1160 is used to transform the latter into a vector expression in world coordinates 1161 for the vector c 1162. Comparing the camera-coordinate expression 1163 for vector c with the world-coordinate expression for the same vector 1161 reveals that the camera coordinates are related to the world coordinates by the transformations (1134 in FIG. 11A) discussed above with reference to FIG. 11A. The inverse of the perspective transformation matrix, $P^{-1}$, is shown in expression 1164 in FIG. 11D. The inverse perspective transformation matrix can be used to compute the world-coordinate point in three-dimensional space corresponding to an image point expressed in camera coordinates, as indicated by expression 1166 in FIG. 11D. Note that, in general, the Z coordinate for the three-dimensional point imaged by the camera is not recovered by the perspective transformation. This is because all of the points in front of the camera along the line from the image point to the imaged point are mapped to the image point. Additional information is needed to determine the Z coordinate for three-dimensional points imaged by the camera, such as depth information obtained from a set of stereo images or depth information obtained by a separate depth sensor.

Three additional matrices are shown in FIG. 11E that represent the position and orientation of the camera in the world coordinate system. The translation matrix $T_{w_0}$ 1170 represents the translation of the camera mount (1137 in FIG. 11C) from its position in three-dimensional space to the origin (1141 in FIG. 11C) of the world coordinate system. The matrix R represents the α and θ rotations needed to align the camera coordinate system with the world coordinate system 1172. The translation matrix C 1174 represents translation of the image plane of the camera from the camera mount (1137 in FIG. 11C) to the image plane's position within the camera represented by vector r (1142 in FIG. 11C). The full expression for transforming the vector for a point in three-dimensional space $w_h$ into a vector that represents the position of the image point on the camera image plane $c_h$ is provided as expression 1176 in FIG. 11E. The vector $w_h$ is multiplied, from the left, first by the translation matrix 1170 to produce a first intermediate result, the first intermediate result is multiplied, from the left, by the matrix R to produce a second intermediate result, the second intermediate result is multiplied, from the left, by the matrix C to produce a third intermediate result, and the third intermediate result is multiplied, from the left, by the perspective transformation matrix P to produce the vector $c_h$. Expression 1178 shows the inverse transformation. Thus, in general, there is a forward transformation from world-coordinate points to image points 1180 and, when sufficient information is available, an inverse transformation 1181. It is the forward transformation 1180 that is used to generate two-dimensional images from a three-dimensional model or object corresponding to arbitrarily oriented and positioned cameras. Each point on the surface of the three-dimensional object or model is transformed by forward transformation 1180 to points on the image plane of the camera.

FIG. 11F illustrates matrix equations that relate two different images of an object, when the two different images differ because of relative changes in the position, orientation, and distance from the camera of the objects, arising due to changes in the position and orientation of the camera, position and orientation of the objects being imaged, or both. Because multiplications of square matrices produce another square matrix, equation 1176 shown in FIG. 11E can be concisely expressed as equation 1190 in FIG. 11F. This equation determines the position of points in an image to the position of the corresponding points in a three-dimensional space. Equation 1191 represents computation of the points in a second image from corresponding points in a three-dimensional space where the points in the three-dimensional space have been altered in position or orientation from the corresponding points used to produce the points $c_h$ in a first imaging operation represented by equation 1190. The T, R, and S matrices in equation 1191 represent translation, rotation, and scaling operations. Equation 1190 can be recast as equation 1192 by multiplying both sides of equation 1190 by the inverse of matrix M. Substituting the left side of equation 1192 into equation 1191 produces equation 1194, which relates positions in the first image, $c_h$, to positions in the second image, $c'_h$. Equation 1194 can be more succinctly represented as equation 1195 and alternatively as equation 1196. Because equation 1196 is expressing a relationship between positions of points in two images, and therefore the z coordinate is of no interest, equation 1196 can be recast as equation 1197 where the z-coordinate values are replaced by 0. Representing the matrix M* abstractly in equation 1198, a new matrix M** can be created by removing the third row and third column from matrix M*, as shown in equation 1199a. Removing the z-coordinate values from the $c_h$ and $c'_h$ vectors, equation 1199b is obtained. In the case that there are four pairs of points with known coordinates in each of the two images, the relationship between these four pairs of points can be expressed as equation 1199c. This equation is slightly over-determined, but can be used to determine, by known techniques, values for the nine elements of the matrix M**. Thus, regardless of the differences in orientation, position, and distance from the camera of a set of objects during two different image-acquisition operation, a matrix can be determined, by comparing the positions of a number of known corresponding features in the two images, that represents the transformation and reverse transformation relating the two images.

Feature Detectors

Feature detectors are another type of image-processing methodology, various types of which are used in the methods and systems to which the current document is directed, as discussed below. A particular feature detector, referred to as the "Scale Invariant Feature Transform" ("SIFT"), is discussed in some detail, in the current subsection, as an example of the various feature detectors that may be employed in methods and systems to which the current document is directed.

Figure 12:
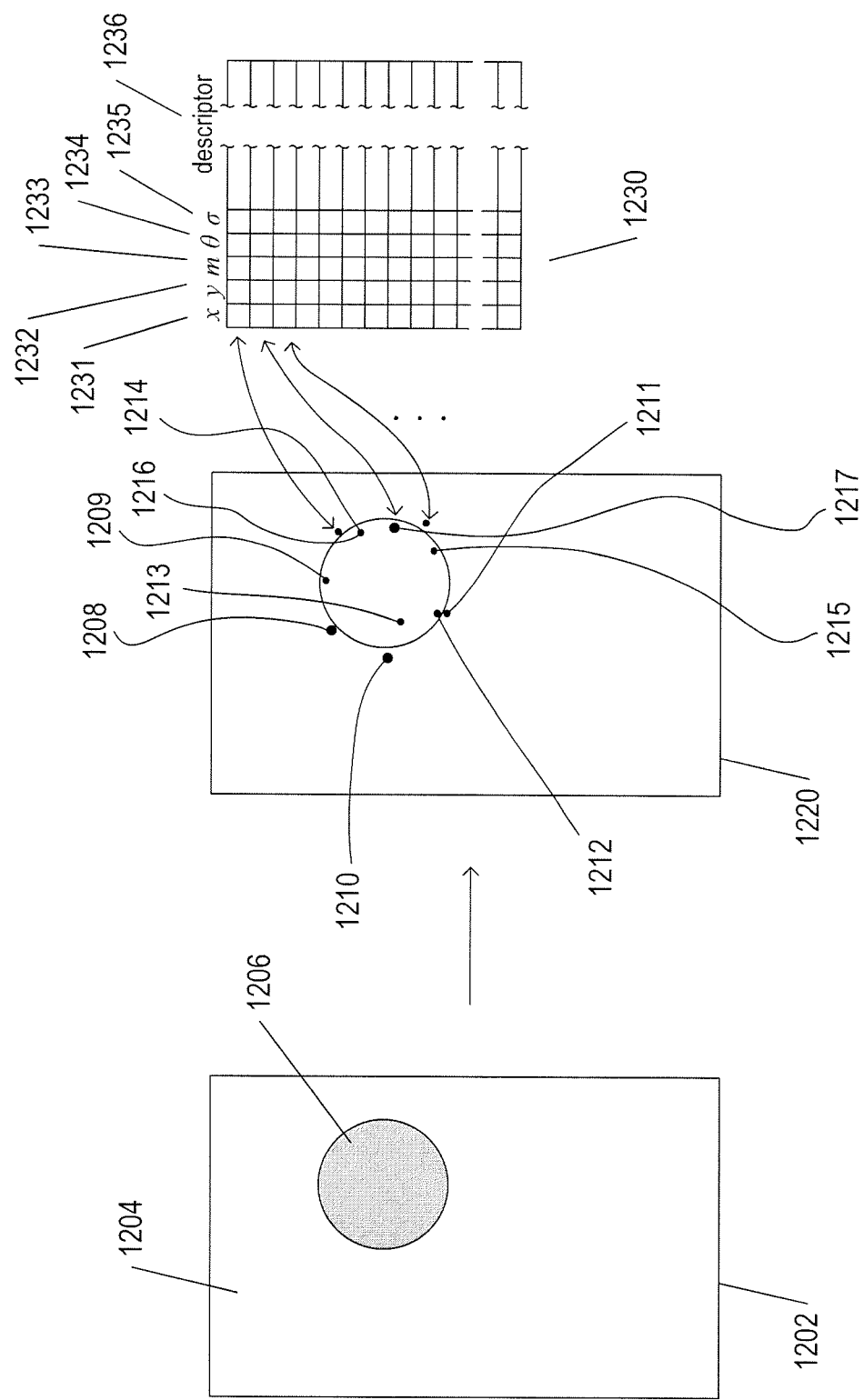
FIG. 12 illustrates feature detection by the SIFT technique.

FIG. 12 illustrates feature detection by the SIFT technique. In FIG. 12, a first simple digital image 1202 is shown to include a generally featureless background 1204 and a shaded disk region 1206. Application of SIFT feature detection to this image generates a set of keypoints or features, such as the features 1208-1217 overlaid on a copy 1220 of the original image, shown in FIG. 12 to the right of the original image. The features are essentially annotated points within the digital image, having coordinates (x,y) relative to image coordinate axes generally parallel to the top and left-hand edges of the image. These points are selected to be relatively invariant to image translation, scaling, and rotation and partially invariant to illumination changes and affine projection. Thus, in the case that a particular object is first imaged to generate a canonical image of the object, features generated by the SIFT technique for this first canonical image can be used to locate the object in additional images in which image acquisition differs in various ways, including perspective, illumination, location of the object relative to the camera, orientation of the object relative to the camera, or even physical distortion of the object. Each feature generated by the SIFT technique is encoded as a set of values and stored in a database, file, in-memory data structure, or other such data-storage entity. In FIG. 12, the stored descriptors are arranged in a table 1230, each row of which represents a different feature. Each row contains a number of different fields corresponding to columns in the table: (1) x 1231, the x coordinate of the feature; (2) y 1232, they coordinate of the feature; (3) m 1233, a magnitude value for the feature; (4) θ 1234, an orientation angle for the feature; (5) σ 1235, a scale value for the feature; and (6) a descriptor 1236, an encoded set of characteristics of the local environment of the feature that can be used to determine whether a local environment of a point in another image can be considered to be the same feature identified in the other image.

Figure 13:
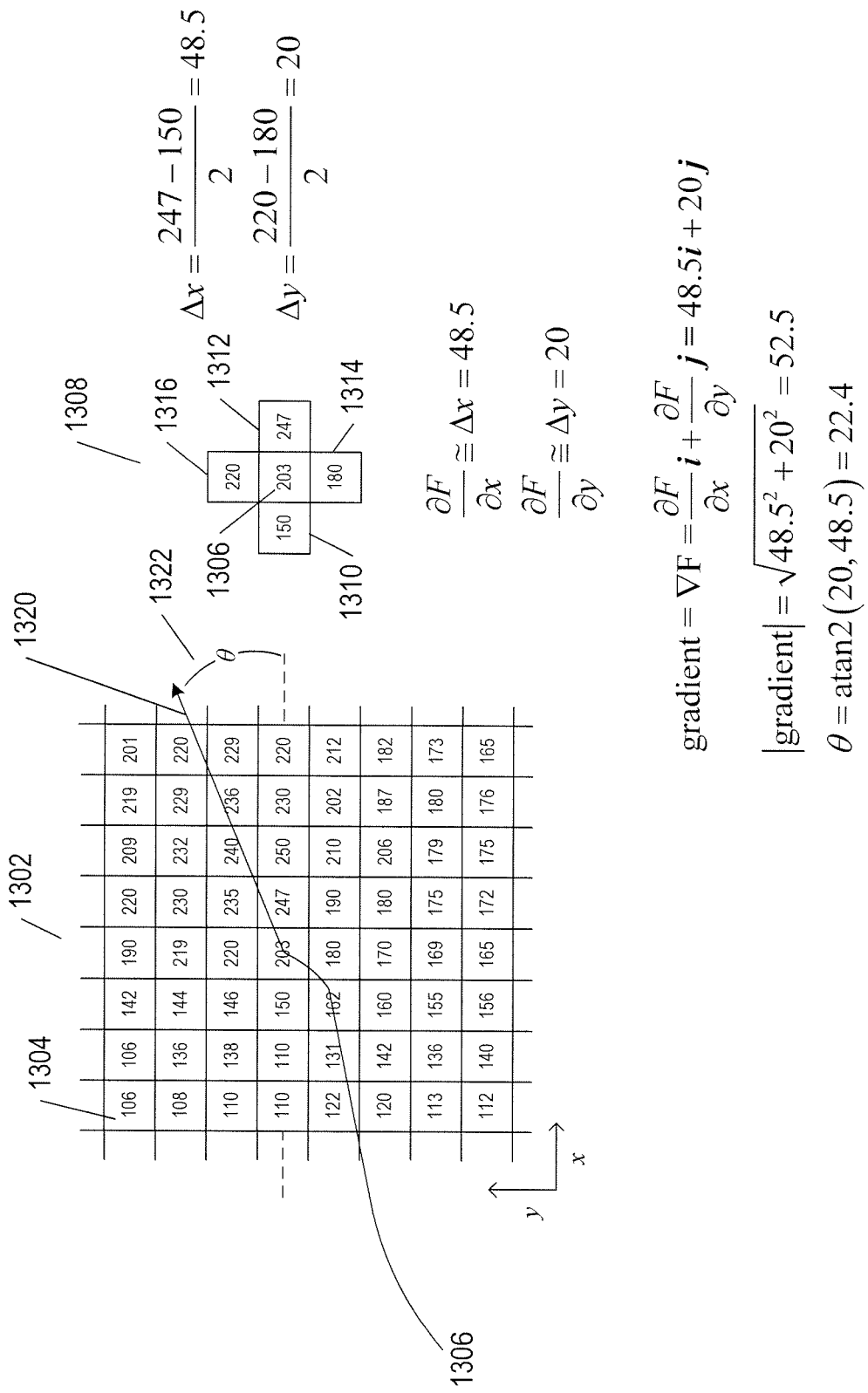
FIGS. 13-18 provide background information for various concepts used by the SIFT technique to identify features within images.

FIGS. 13-18 provide background information for various concepts used by the SIFT technique to identify features within images. FIG. 13 illustrates a discrete computation of an intensity gradient. In FIG. 13, a small square portion 1302 of a digital image is shown. Each cell, such as cell 1304, represents a pixel and the numeric value within the cell, such as the value "106" in cell 1304, represents a grayscale intensity. Consider pixel 1306 with the intensity value "203." This pixel, and four contiguous neighbors, are shown in the cross-like diagram 1308 to the right of the portion 1302 of the digital image. Considering the left 1310 and right 1312 neighbor pixels, the change in intensity value in the x direction, Δx, can be discretely computed as:

$$\Delta x = \frac{247 - 150}{2} = 48.5.$$

Considering the lower 1314 and upper 1316 pixel neighbors, the change in intensity in the vertical direction, Δy, can be computed as:

$$\Delta y = \frac{220 - 180}{2} = 20.$$

The computed Δx is an estimate of the partial differential of the continuous intensity function with respect to the x coordinate at the central pixel 1306:

$$\frac{\partial F}{\partial x} \cong \Delta x = 48.5.$$

The partial differential of the intensity function F with respect to the y coordinate at the central pixel 1306 is estimated by Δy:

$$\frac{\partial F}{\partial y} \cong \Delta y = 20.$$

The intensity gradient at pixel 1306 can then be estimated as:

$$\text{gradient} = \nabla F = \frac{\partial F}{\partial x}i + \frac{\partial F}{\partial y}j = 48.5i + 20j$$

where i and j are the unit vectors in the x and y directions. The magnitude of the gradient vector and the angle of the gradient vector are then computed as:

$$|\text{gradient}| = \sqrt{48.5^2 + 20^2} = 52.5$$

$$\theta = \text{atan2}(20, 48.5) = 22.4$$

The direction of the intensity gradient vector 1320 and the angle θ 1322 are shown superimposed over the portion 1302 of the digital image in FIG. 13. Note that the gradient vector points in the direction of steepest increase in intensity from pixel 1306. The magnitude of the gradient vector indicates an expected increase in intensity per unit increment in the gradient direction. Of course, because the gradient is only estimated by discrete operations, in the computation illustrated in FIG. 13, both the direction and magnitude of the gradient are merely estimates.

Figure 14:
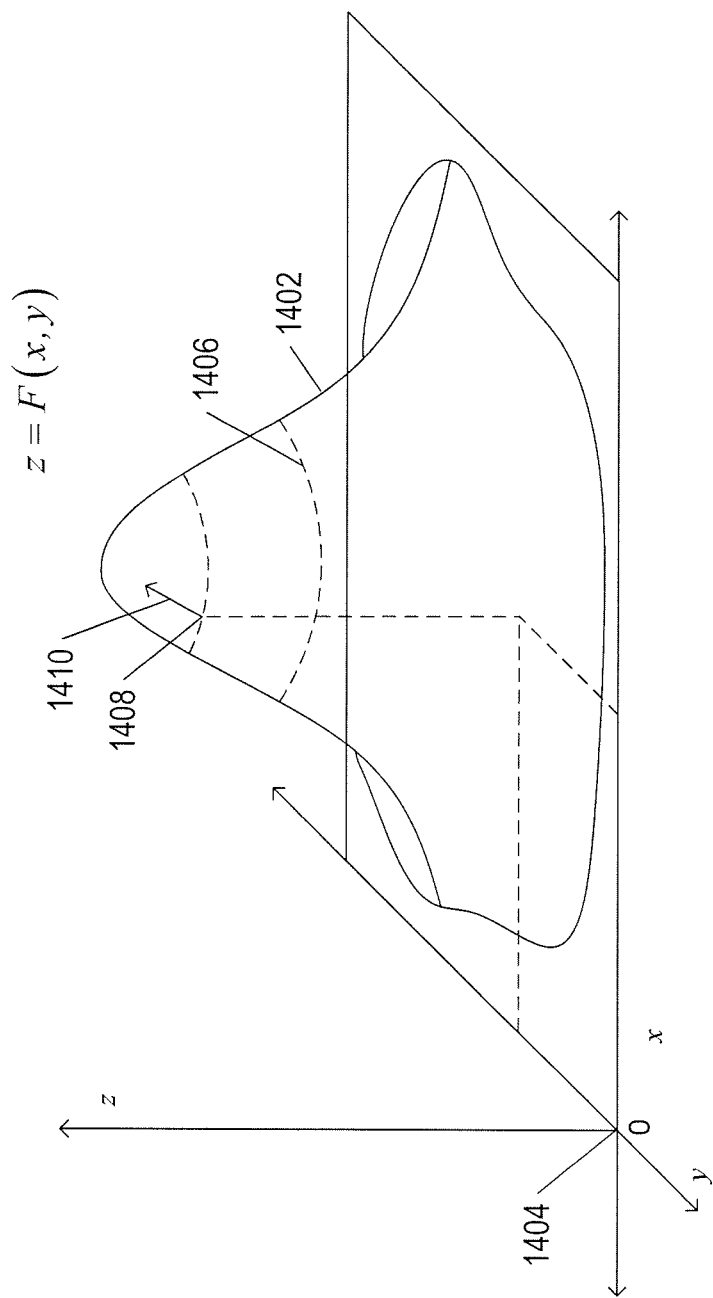

FIG. 14 illustrates a gradient computed for a point on a continuous surface. FIG. 14 illustrates a continuous surface z=F(x,y). The continuous surface 1402 is plotted with respect to a three-dimensional Cartesian coordinate system 1404, and has a hat-like shape. Contour lines, such as contour line 1406, can be plotted on the surface to indicate a continuous set of points with a constant z value. At a particular point 1408 on a contour plotted on the surface, the gradient vector 1410 computed for the point is perpendicular to the contour line and points in the direction of the steepest increase along the surface from point 1408.

Figure 15:
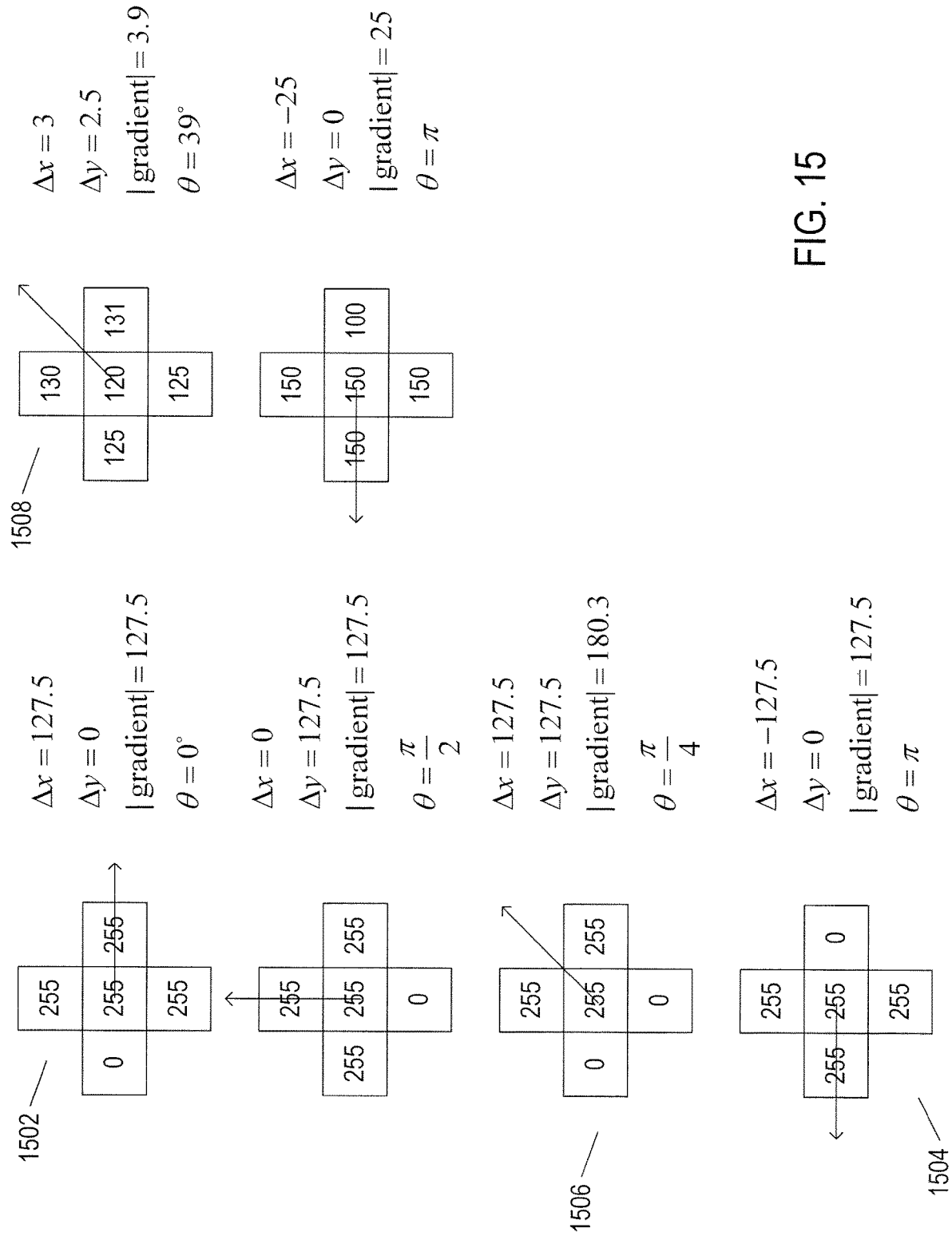

In general, an intensity gradient vector is oriented perpendicularly to an intensity edge, and the greater the magnitude of the gradient, the sharper the edge or the greatest difference in intensities of the pixels on either side of the edge. FIG. 15 illustrates a number of intensity-gradient examples. Each example, such as example 1502, includes a central pixel for which the gradient is computed and the four contiguous neighbors used to compute Δx and Δy. The sharpest intensity boundaries are shown in the first column 1504. In these cases, the magnitude of the gradient is at least 127.5 and, for the third case 1506, 180.3. A relatively small difference across an edge, shown in example 1508, produces a gradient with a magnitude of only 3.9. In all cases, the gradient vector is perpendicular to the apparent direction of the intensity edge through the central pixel.

Figure 16:
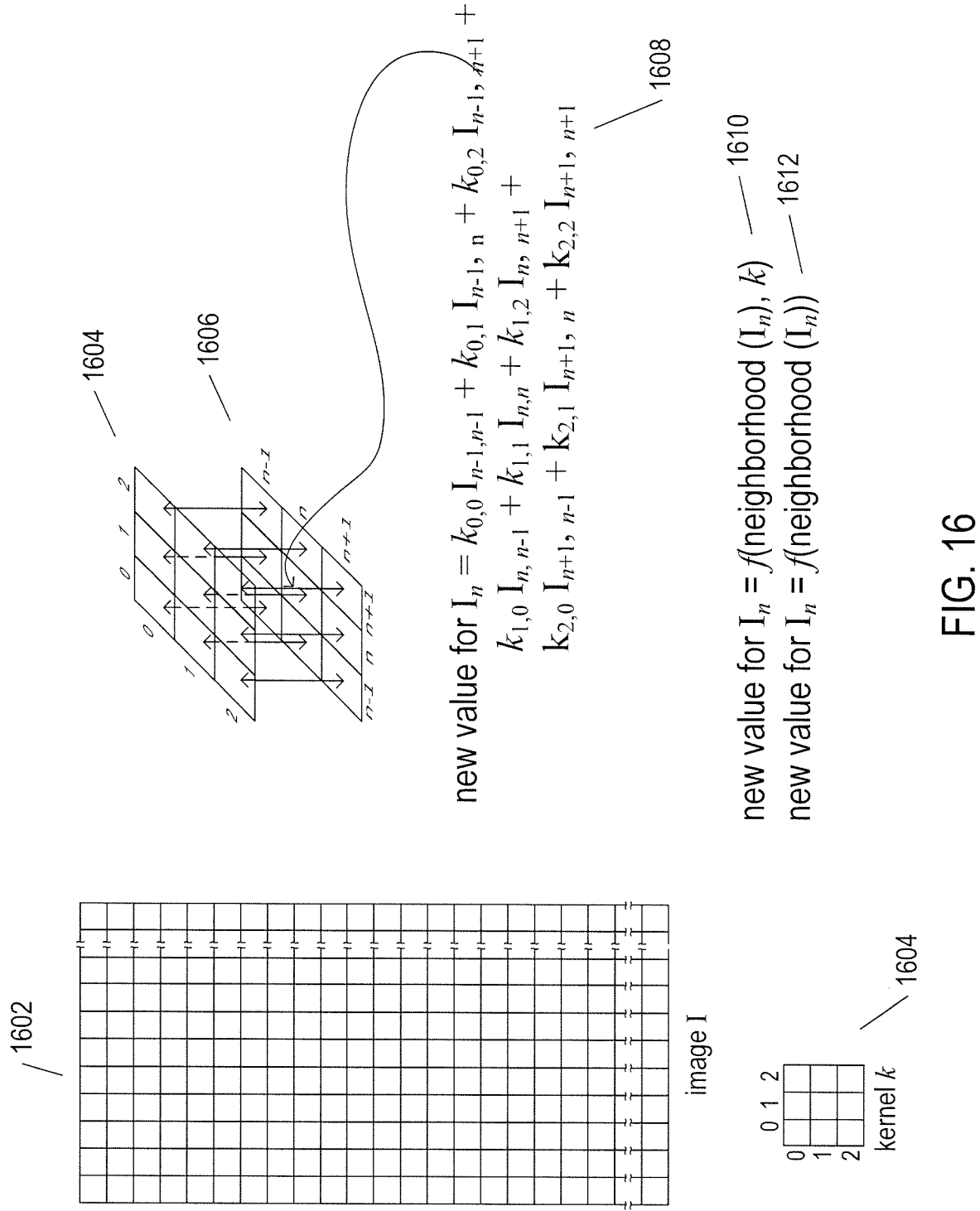

Many image-processing methods involve application of kernels to the pixel grid that constitutes the image. FIG. 16 illustrates application of a kernel to an image. In FIG. 16, a small portion of an image 1602 is shown as a rectilinear grid of pixels. A small 3×3 kernel k 1604 is shown below the representation of image I 1602. A kernel is applied to each pixel of the image. In the case of a 3×3 kernel, such as kernel k 1604 shown in FIG. 16, a modified kernel may be used for edge pixels or the image can be expanded by copying the intensity values in edge pixels to a circumscribing rectangle of pixels so that the kernel can be applied to each pixel of the original image. To apply the kernel to an image pixel, the kernel 1604 is computationally layered over a neighborhood of the pixel to which the kernel is applied 1606 having the same dimensions, in pixels, as the kernel. Application of the kernel to the neighborhood of the pixel to which the kernel is applied produces a new value for the pixel in a transformed image produced by applying the kernel to pixels of the original image. In certain types of kernels, the new value for the pixel to which the kernel is applied, $I_n$, is obtained as the sum of the products of the kernel value and pixel aligned with the kernel value 1608. In other cases, the new value for the pixel is a more complex function of the neighborhood about the pixel and the kernel 1610. In yet other types of image processing, a new value for a pixel is generated by a function applied to the neighborhood of the pixel, without using a kernel 1612.

Figure 17:
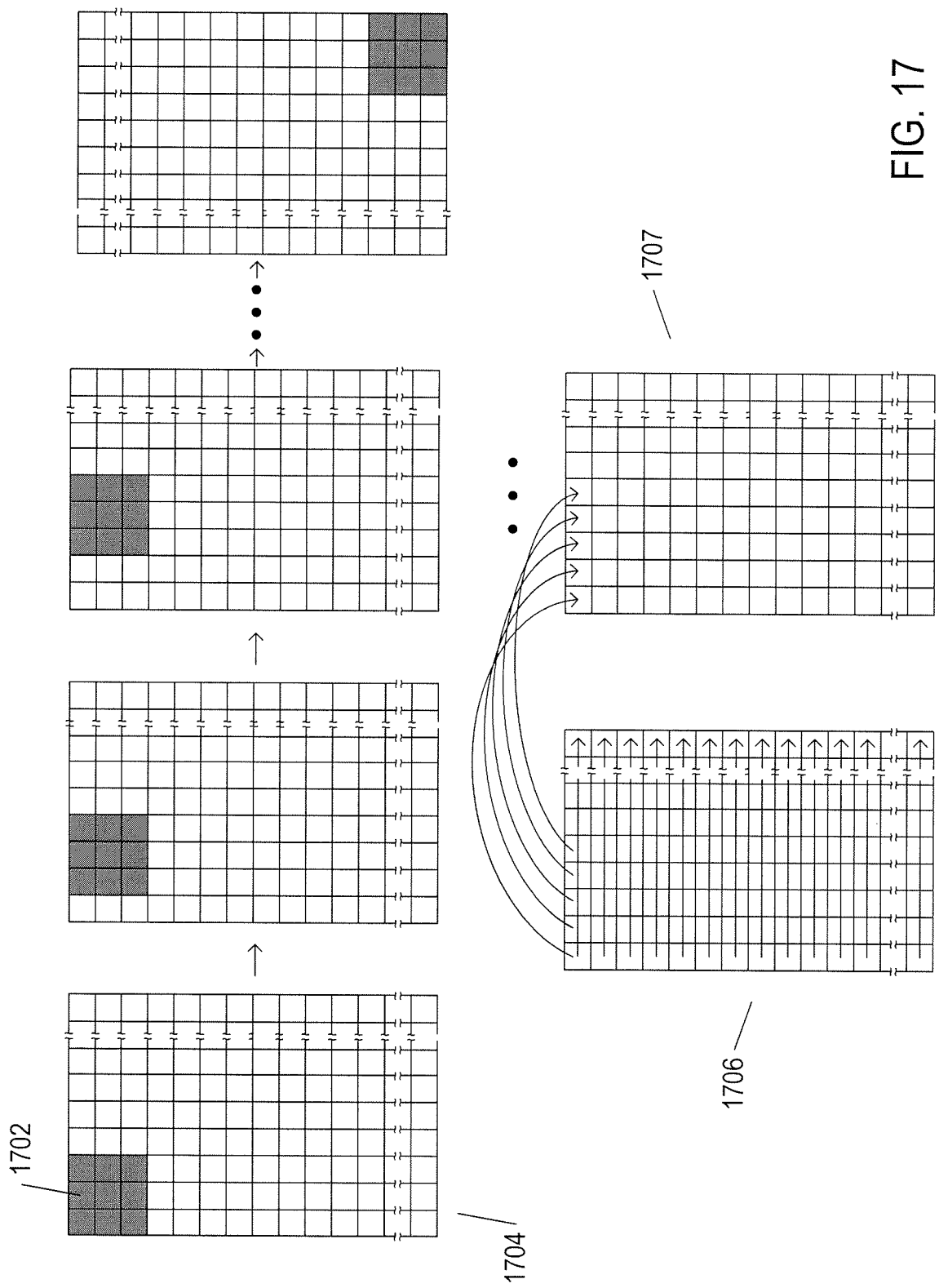

FIG. 17 illustrates convolution of a kernel with an image. In general, the kernel is sequentially applied to each pixel of an image, in some cases, into each non-edge pixel of an image; in other cases, to produce new values for a transformed image. In FIG. 17, a 3×3 kernel, shown by shading 1702, is sequentially applied to the first row of non-edge pixels in an image 1704. Each new value generated by application of a kernel to a pixel in the original image 1706 is then placed into the transformed image 1707. In other words, the kernel is sequentially applied to the original neighborhoods of each pixel in the original image to produce the transformed image. This process is referred to as "convolution," and is loosely related to the mathematical convolution operation computed by multiplying Fourier-transformed images and then carrying out an inverse Fourier transform on the product.

Figure 18:
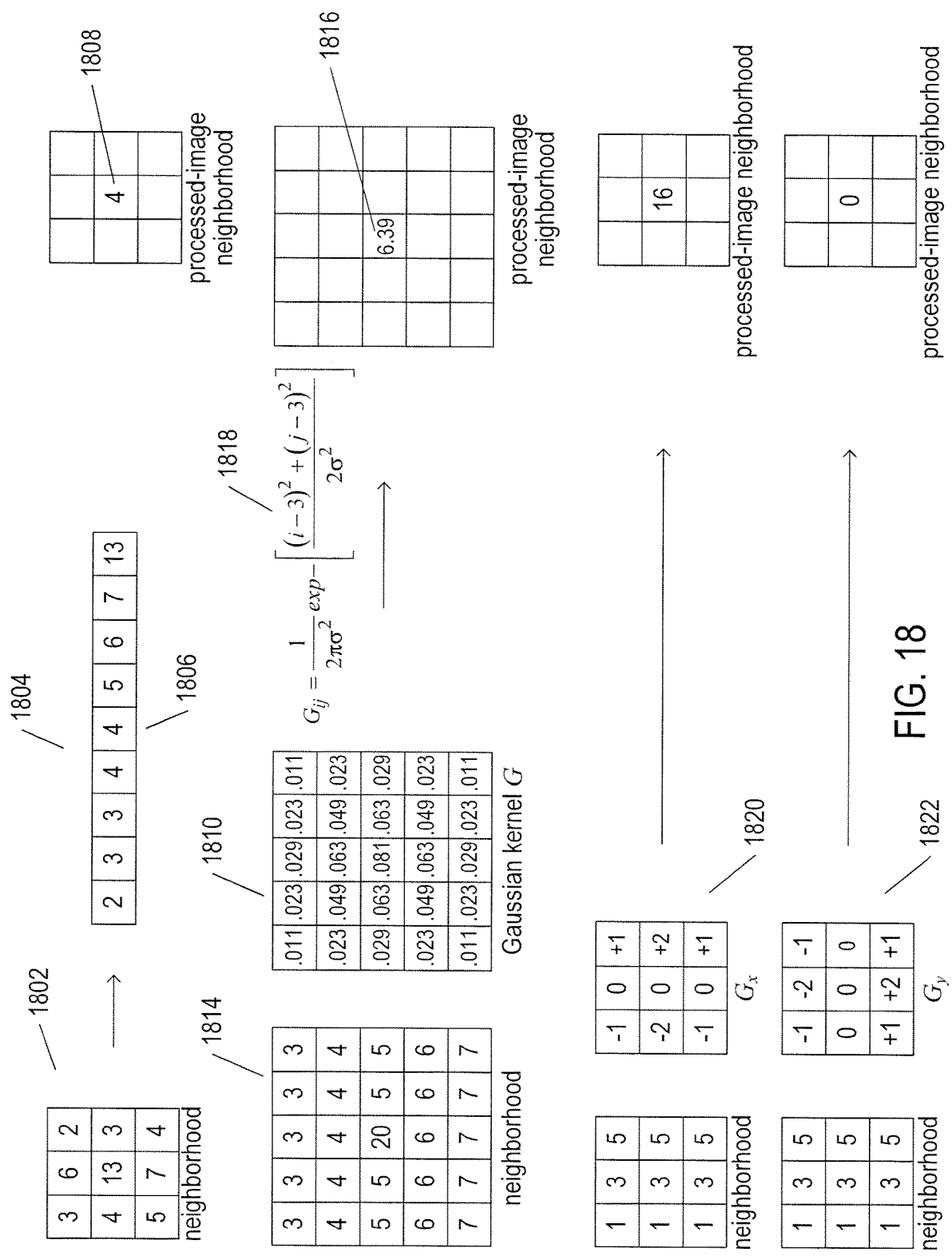

FIG. 18 illustrates some example kernel and kernel-like image-processing techniques. In the process referred to as "median filtering," the intensity values in a neighborhood of the original image 1802 are sorted 1804 in ascending-magnitude order and the median value 1806 is selected as a new value 1808 for the corresponding neighborhood of the transformed image. Gaussian smoothing and denoising involves applying a Gaussian kernel 1810 to each neighborhood 1814 of the original image to produce the value for the central pixel of the neighborhood 1816 in the corresponding neighborhood of the processed image. The values in the Gaussian kernel are computed by an expression such as expression 1818 to produce a discrete representation of a Gaussian surface above the neighborhood formed by rotation of a bell-shaped curve about a vertical axis coincident with the central pixel. The horizontal and vertical components of the image gradient for each pixel can be obtained by application of the corresponding $G_x$ 1820 and $G_y$ 1822 gradient kernels. These are only three of the many different types of convolution-based image-processing techniques.

Returning to the SIFT technique, a first task is to locate candidate points in an image for designation as features. The candidate points are identified using a series of Gaussian filtering or smoothing and resampling steps to create a first Gaussian pyramid and then computing differences between adjacent layers in the first Gaussian pyramid to create a second difference-of-Gaussians ("DoG") pyramid. Extrema points within neighborhoods of the DoG pyramid are selected as candidate features, with the maximum value of a point within the neighborhood used to determine a scale value for the candidate feature.

Figure 19A:
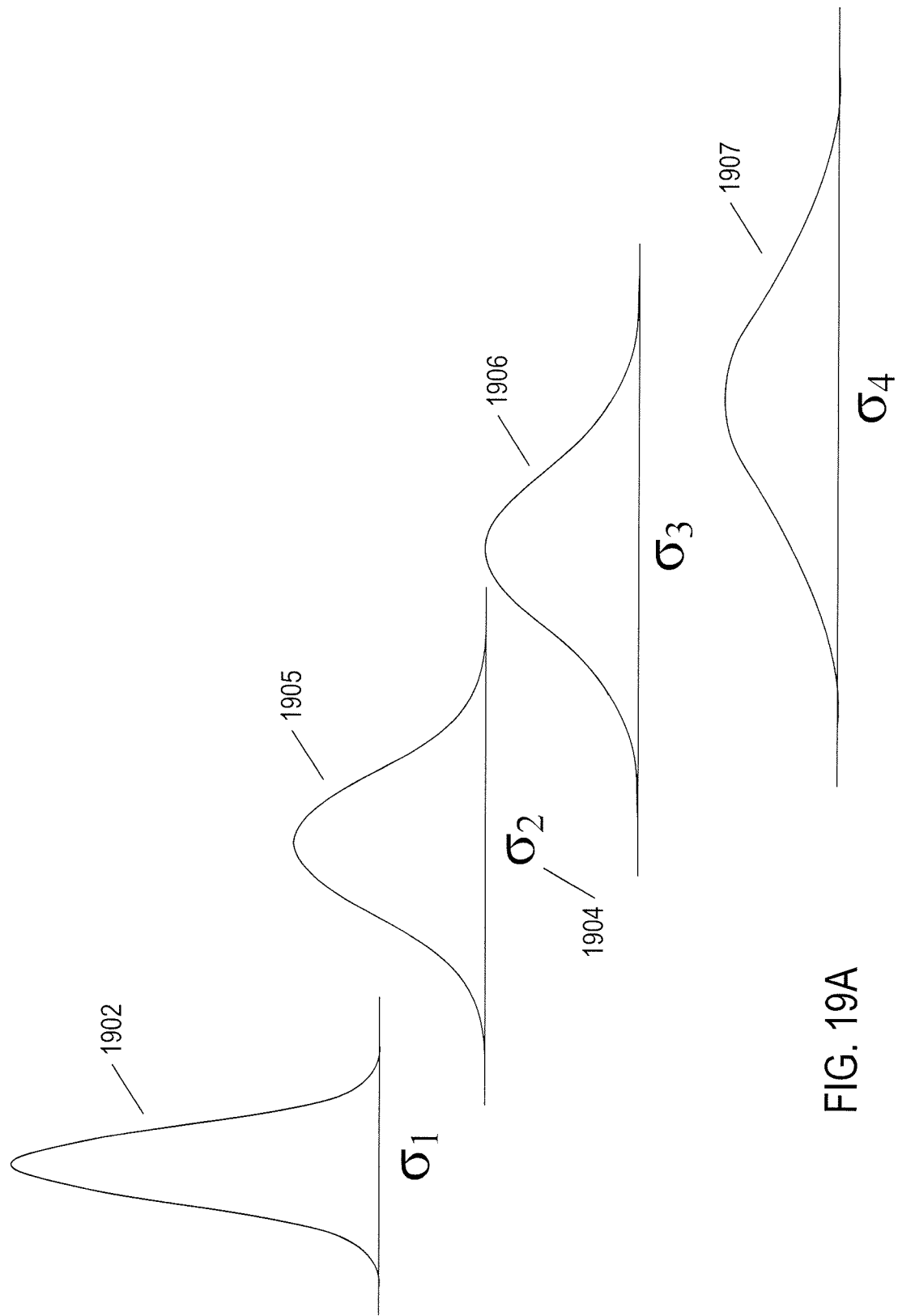
FIGS. 19A-D illustrate the selection of candidate feature points from an image.

FIGS. 19A-D illustrate the selection of candidate feature points from an image. FIG. 19A shows changes in the shape of a one-dimensional Gaussian curve with increasing values of the variance parameter for the curve. A first one-dimensional Gaussian curve 1902 is obtained using an initial variance parameter 1903. By increasing the value of the variance parameter to produce a second variance parameter 1904, a broader Gaussian curve 1905 is obtained. As the variance parameter increases, the Gaussian curve becomes broader and broader, as can be seen in the series of Gaussian curves 1902, 1905, and 1906-1907. Convolution of a Gaussian kernel with an image generally removes fine-granularity detail and produces a smoothing of the image. As the variance parameter increases, the corresponding Gaussian kernel removes increasing levels of detail from an image, resulting in increasing blurring of the image, since the value assigned to the central pixel by a Gaussian kernel is the average of an increasing number of neighboring pixels.

Figure 19B:
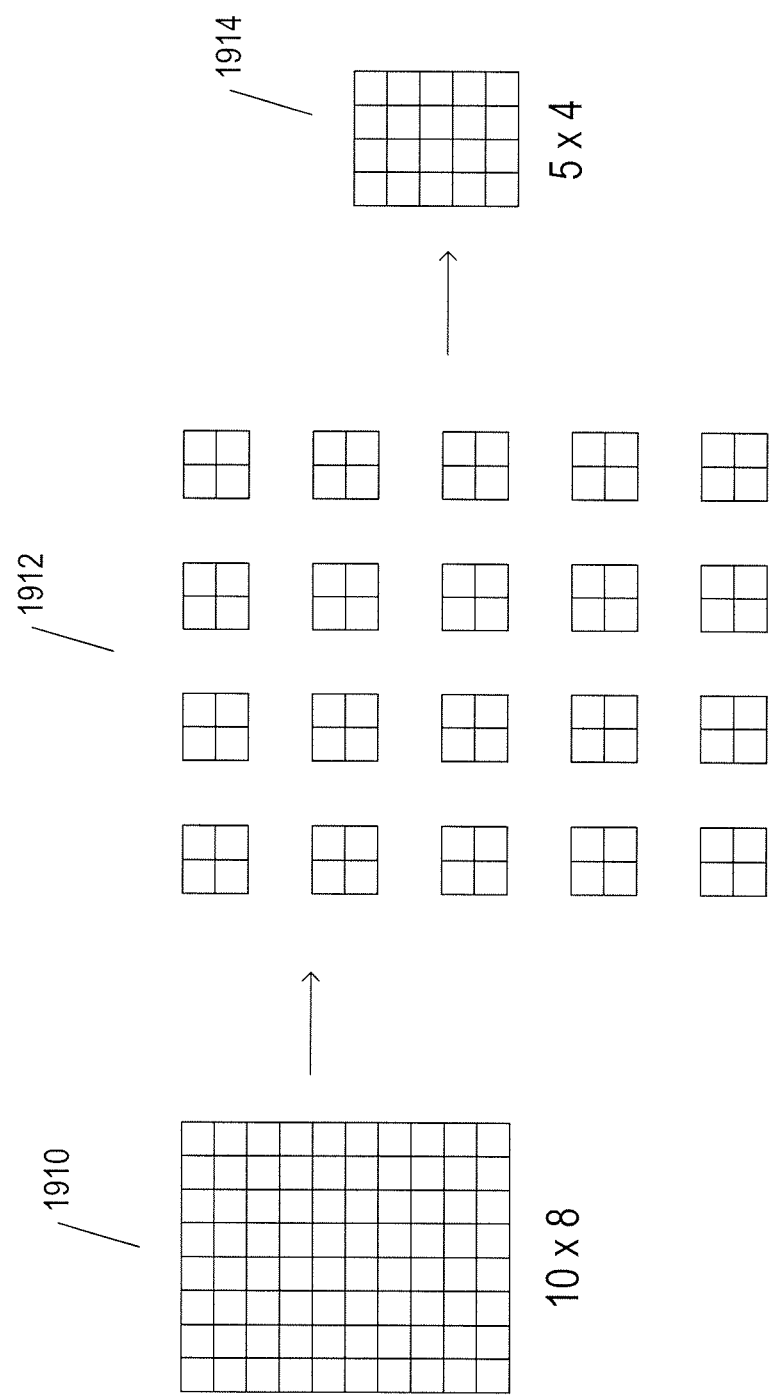

FIG. 19B illustrates rescaling of an image. An initial image 1910 has ten rows of pixels and eight columns of pixels. The pixels in this image can be partitioned into 20 groups of four pixels each 1912, and the average value of the four pixels assigned to each group. These average values can then be reassembled into a rescaled image 1914 having fewer pixels. This is one, simplistic rescaling method. In general, rescaling can choose an arbitrary rescaling parameter with the values for the rescaled pixels computed from neighborhoods centered around grid points in the original image defined by the rescaling parameter.

Figure 19C:
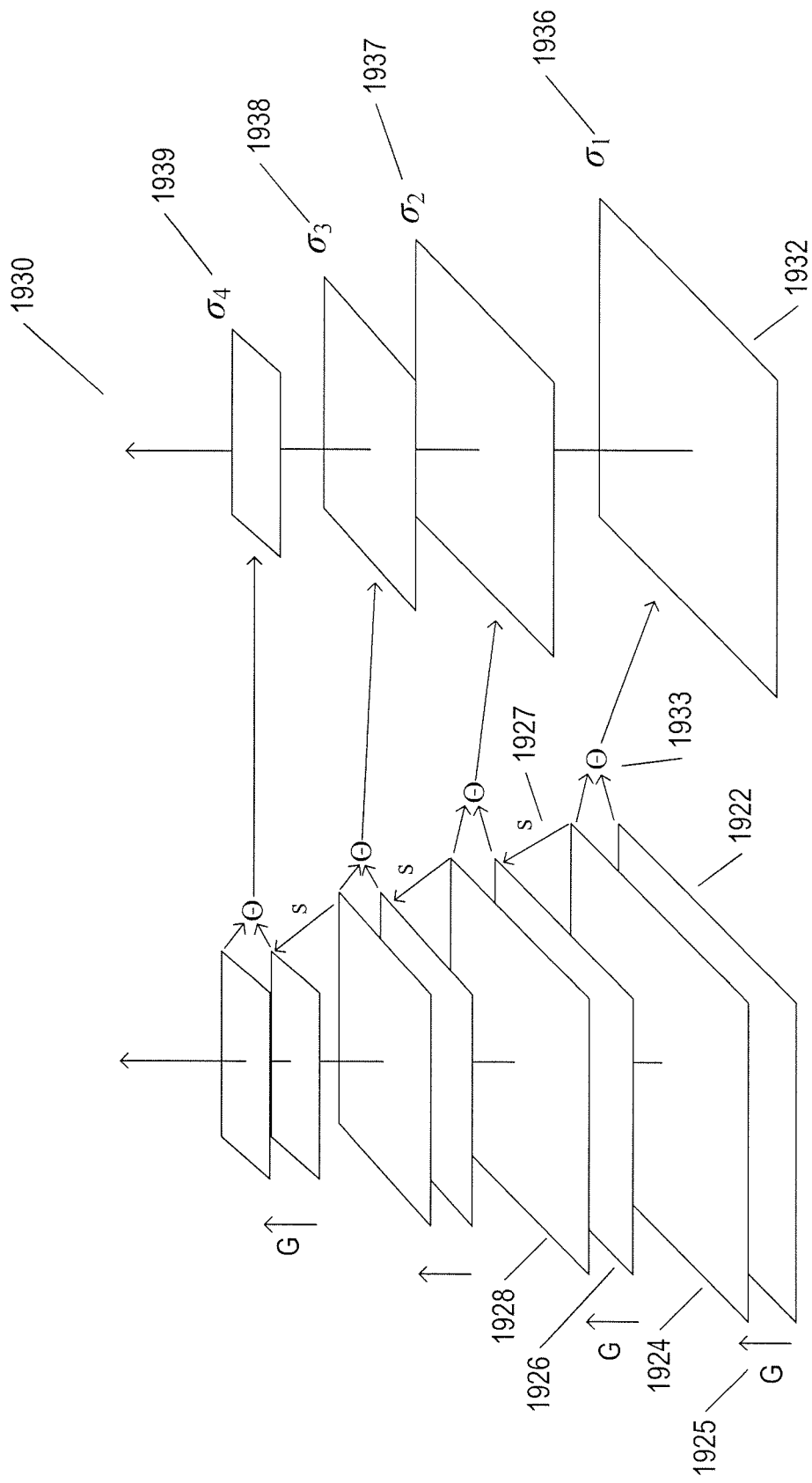

FIG. 19C illustrates construction of the initial Gaussian pyramid and second DoG pyramid. The initial Gaussian pyramid 1920 begins with the original image 1922 as its lowest level. The original image is smoothed using a Gaussian kernel to produce a corresponding smoothed image 1924. The symbol "G" and vertical arrow 1925 represent the Gaussian smoothing operation. Next, the smooth image 1924 is rescaled to produce a rescaled image 1926. This rescaling operation is represented by the symbol "S" and arrow 1927. The rescaled image is then smoothed by application of a Gaussian filter to produce a smoothed rescale image 1928. These operations are repeated to create successive double layers within the initial Gaussian pyramid. The second, DoG pyramid 1930 is obtained by computing a difference image from each pair of adjacent images in the initial Gaussian pyramid 1920. For example, the first image 1932 in the second, DoG pyramid is obtained by computing the difference 1933 of the initial two images 1922 and 1924 in the initial Gaussian pyramid 1920. Because the Gaussian kernel is applied to ever-greater rescalings of the initial image, the smoothing operation represented by each successive Gaussian smoothing operation from bottom to the top of the Gaussian pyramid is effectively carrying out smoothing at greater values of the variance parameter. Thus, the images from bottom to top of the Gaussian pyramid 1920 are increasingly blurred. A scale value 1936-1939 is associated with each layer in the DoG pyramid 1930 reflective of the combined effects of rescaling and Gaussian smoothing, with a greater value of the scale parameter indicating increasing blurring of the image.

Figure 19D:
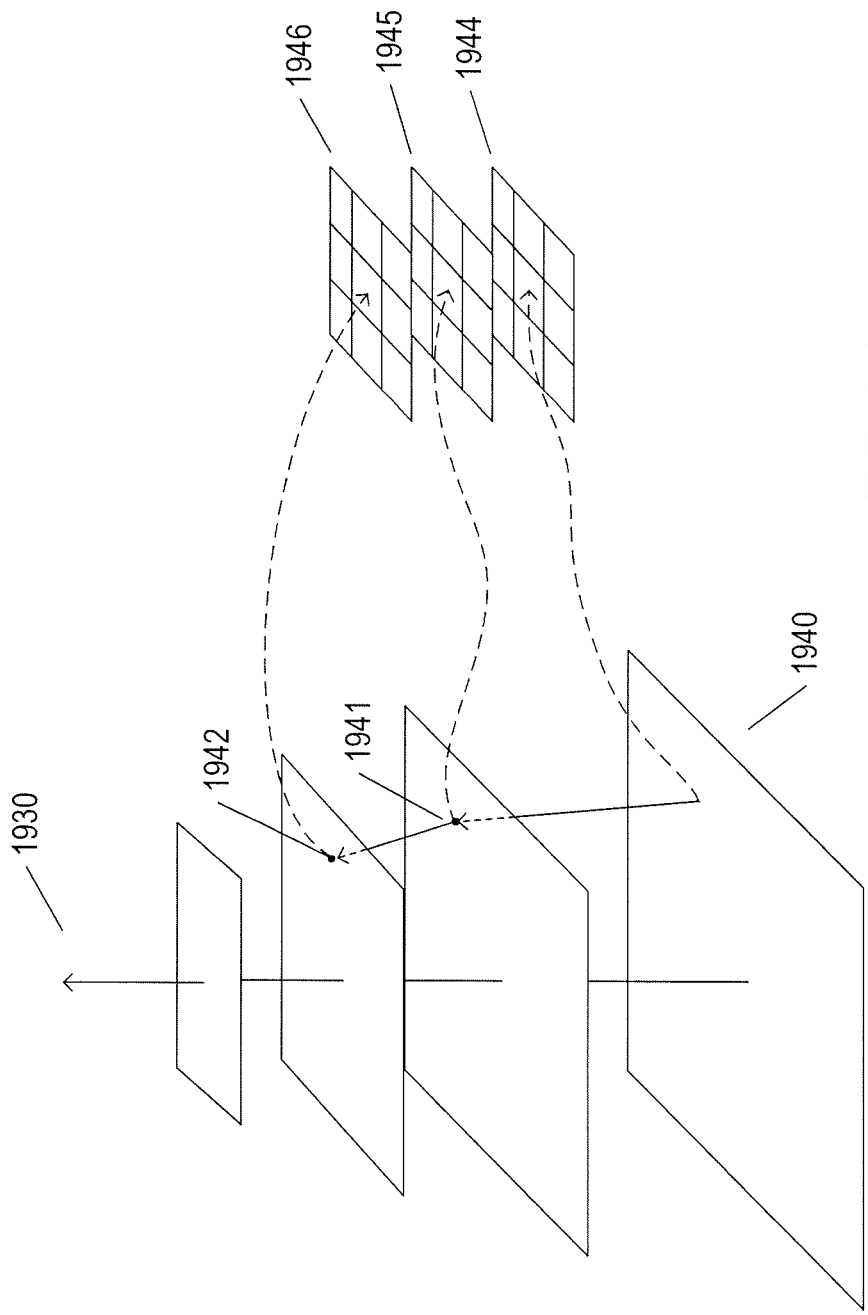

FIG. 19D illustrates selection of a candidate feature using the DoG pyramid obtained by the methods discussed above with reference to FIGS. 19A-C. A point in the lowest level of the DoG pyramid, such as point 1940, has corresponding locations in higher-level images 1941 and 1942 in the DoG pyramid 1930. A 3×3 neighborhood of the point in each of three successive layers 1944-1946 constitutes a neighborhood of the point within the DoG pyramid. If the value of the point is the maximum value in each neighborhood layer, then the point is selected as a candidate feature point. Furthermore, the scale parameter associated with the image from which the neighborhood layer is selected for the neighborhood layer in which the point has maximum value is selected as the scale for the candidate feature point (1235 in FIG. 12). Thus, by the method discussed with reference to FIGS. 19A-D, a set of candidate feature points is obtained along with the x, y, and σ parameters for the candidate feature point.

It should be noted that the above discussion is somewhat simplified. For example, the original image may be added as a lowest level of the DoG pyramid and minimization of a Taylor series may be used to more precisely locate the positions of points within layers of the Gaussian pyramid and DoG pyramids. In fact, this method is an approximation to generating a scale space as the Laplacian of Gaussians, a mathematical operation that lies at the foundation of a variety of different image-processing techniques.

Figure 19E:
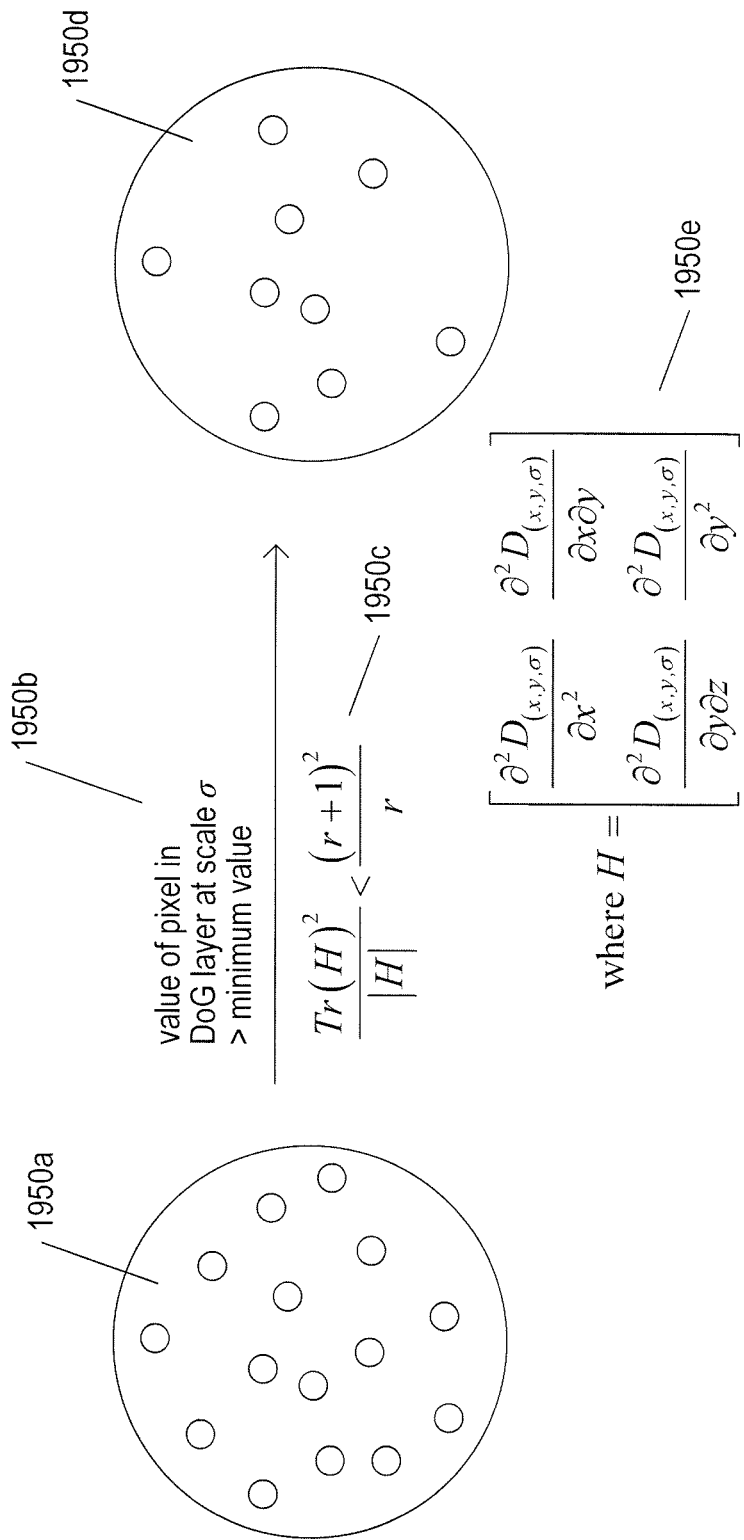
FIG. 19E illustrates filtering of candidate keypoints, or features, in the difference-of-Gaussian layers generated by the SIFT technique.

FIG. 19E illustrates filtering of candidate keypoints, or features, in the DoG layers generated by the SIFT technique. Extreme values in these layers are candidate keypoints or features. Because the DoG procedure tends to emphasize points lying on edges, candidate keypoints or features are filtered to remove candidate keypoints or features close to edges as well as candidate keypoints or features with values less than a minimum or threshold value. Thus, of the initial set of candidate keypoints or features 1950a, those candidate features with values less than the minimum or threshold value or with a ratio of principal curvatures greater than a value obtained using a different threshold r 1950c are removed to produce a smaller, filtered set of candidate features 1950d. The ratio of principal curvatures is obtained from the Hessian matrix 1950e which describes the local curvature of a surface.

Figure 19F:
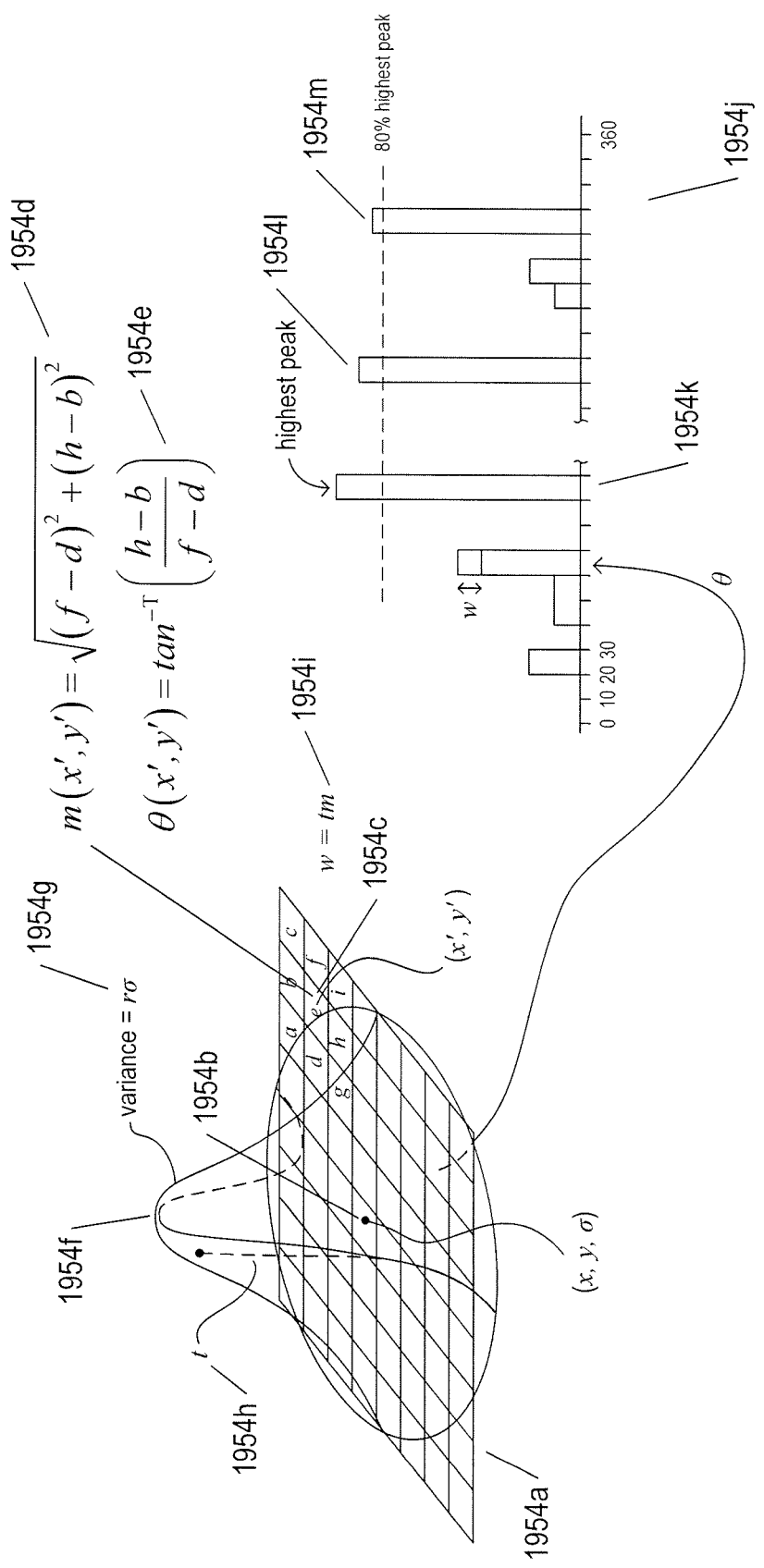
FIG. 19F illustrates how the magnitude and orientation of a feature is assigned from values in a difference-of-Gaussian layer.

FIG. 19F illustrates how the magnitude and orientation of a feature is assigned from values in a DoG layer. A pixel neighborhood 1954a about an identified candidate feature point 1954b is considered. For each point in the neighborhood, such as point 1954c, a gradient magnitude 1954d and orientation angle 1954e are estimated using differences in neighboring pixel values. A Gaussian weighting surface 1954f is constructed above the local neighborhood 1954a using the Gaussian parameter a equal to a value v times the scale value for the DoG plane 1954g. The height 1954h of the weighting surface above a particular point, t, is used as a multiplier of the computed magnitude for the pixel to generate a weight w 1954i. The weighted magnitudes of the pixels are then entered into a histogram 1954j that includes 36 bins for each 10° range of the computed gradient orientations for the pixels. The magnitude and θ value for the highest peak produced 1954k is used as the magnitude and θ value for the feature 1954b. Any histogram peaks greater than or equal to 80 percent of the height of the highest peak, such as peaks 1954l and 1954m, are treated as additional features that are assigned the corresponding magnitudes and θ values of those peaks.

Figure 19G:
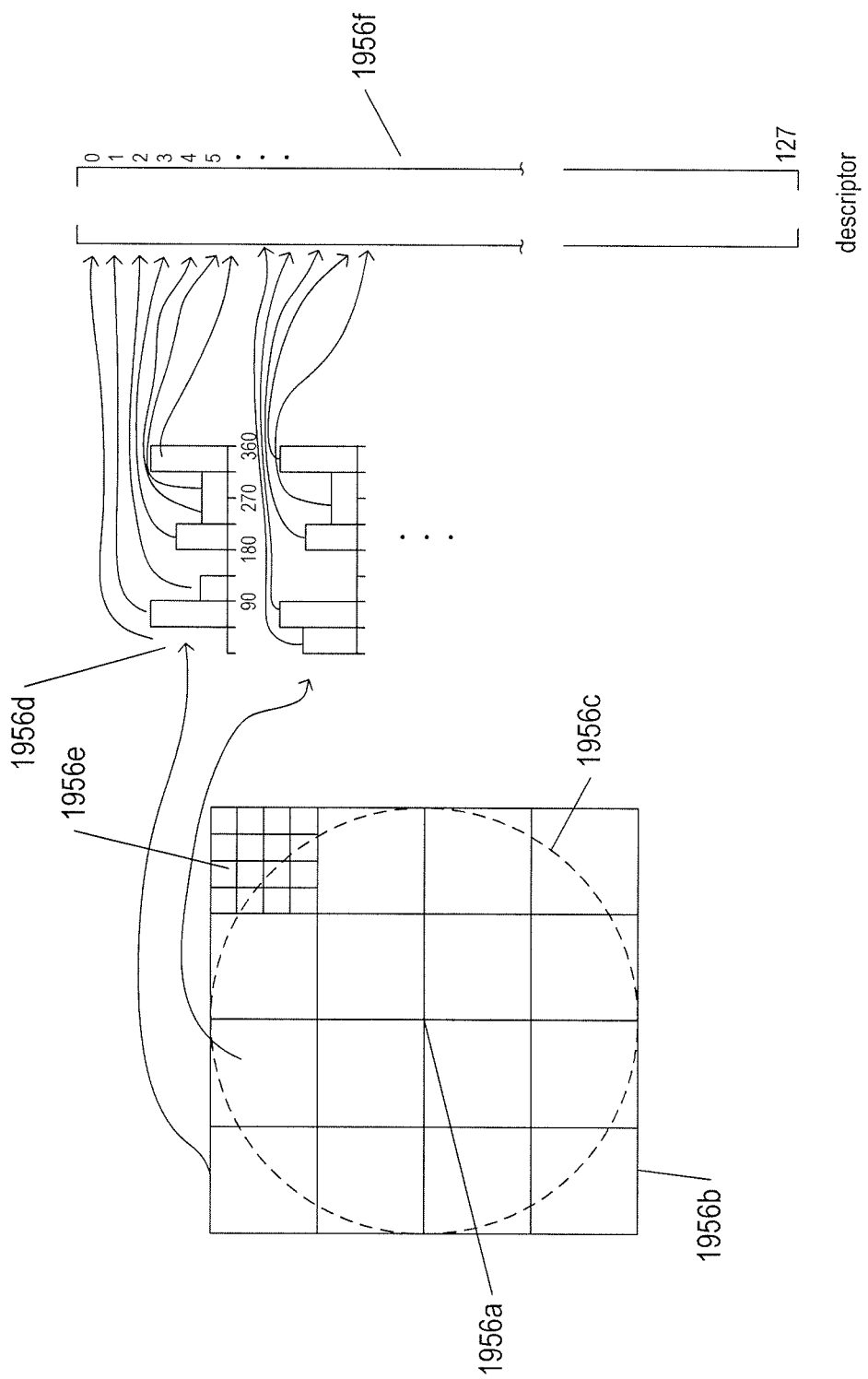
FIG. 19G illustrates computation of a descriptor for a feature.

FIG. 19G illustrates computation of a descriptor for a feature. In FIG. 19G, a feature is located at position 1956a within a 16×16 pixel neighborhood 1956b. As with the Gaussian surface constructed as shown in FIG. 19F, a similar Gaussian surface is constructed above neighborhood 1956b, as indicated by the dashed circle 1956c in FIG. 19G. The height of the surface of a point above a point is used to weight gradient magnitudes determined for each pixel in neighborhood 1956b. A histogram, such as histogram 1956d, is constructed for each 4×4 neighborhood within neighborhood 1956b, such as 4×4 neighborhood 1956e. The weighted magnitudes for the pixels in each 4×4 neighborhood are placed into the histogram according to the computed gradient orientations for the pixels. In this case, the histogram has eight bins, each bin corresponding to a 45° range of θ values. The column heights, or magnitudes, of the histogram are then entered into a 128-element vector 1956f to a form a feature descriptor. Determination of all of the attributes for SIFT features, shown as columns in table 1230 of FIG. 12, have now been described.

Figure 19H:
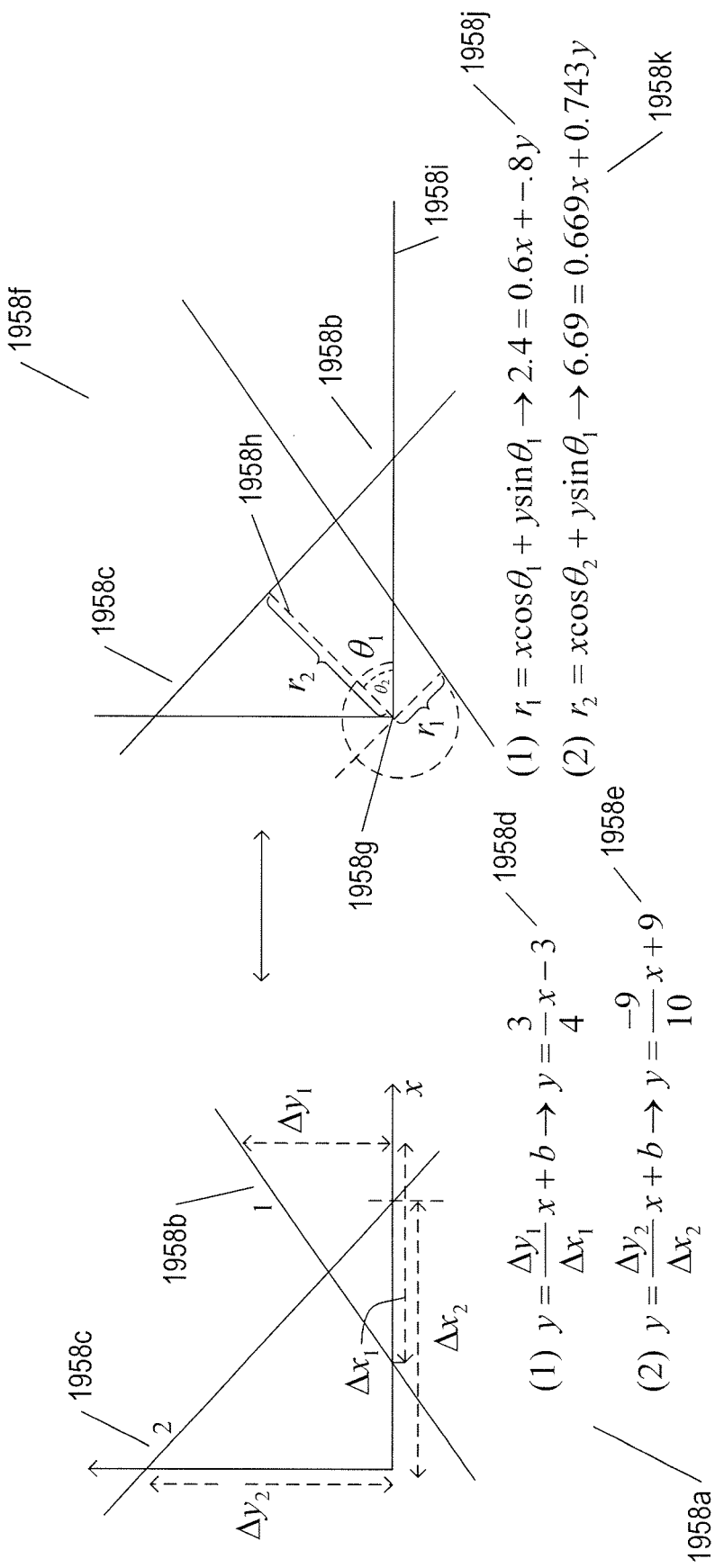

Another technique used both in identifying and characterizing SIFT features as well as in many other image-processing techniques is referred to as the Hough transform. FIGS. 19H-I illustrate a simple, one-parameter application of the Hough transform. It is the application for which the Hough transform was initially proposed in the image-processing context. As shown in FIG. 19H, the equations for lines in a two-dimensional plane can be expressed in a normal y=mx+b form 1958a. In this left-hand plot, there are two lines: line 1 1958b and line 2 1958c. The y=mx+b equations for these lines are shown as expressions 1958d and 1959e, respectively. The lines can alternatively be represented in a r=x cos θ+y sin θ, as shown in the right-hand plot 1958f in FIG. 19H. In this plot, the same two lines 1958b and 1958c are again plotted in a two-dimensional plane. The parameter r is the shortest distance between a line and the origin 1958g of the coordinate axes that define coordinate assignments to points in the two-dimensional plane. The angle of the line segment that connects the line to the origin, such as line segment 1958h, shown as a dashed line segment connecting line 1958b to the origin 1958g, with respect to the horizontal coordinate axis 1958i is the parameter θ in the r=x cos θ+y sin θ form of the equations of the lines. The r=x cos θ+y sin θ forms for the expressions for the two lines 1958b and 1958c are shown as expressions 1958j and 1958k, below plot 1958f.

FIG. 19I illustrates an example problem of determining whether or not a set of three data points plotted within a two-dimensional plane can be described as falling on a line and, if so, the equation for the line. Plot 1960a, in the top right-hand corner of FIG. 19I, shows a plot of three data points 1960b, 1960c, and 1960d, with their Cartesian coordinates shown next to the data points. These data points do not exactly fall on a line, but fall close to a line. In the Hough-Transform method, each data point places values in an r/θ parameter space corresponding to possible lines on which the data point is located. For example, data point 1960b is shown in plot 1960e as lying on seven different lines indicated by dashed-line segments, such as dashed-line segment 1960f. These lines are equally spaced from one another in orientation by a relative orientation of 22.5° 1960g. The r and θ parameters for each of these lines are computed from the shortest-distance line segments from each of the lines to the origin, such as shortest-distance line segment 1960h connecting line 1960i to the origin 1960j. The r and θ values for each of the possible lines on which data point 1960b is located are then tabulated in table 1960k. The r and θ values for the lines on which data points 1960c and 1960d may reside are similarly tabulated in tables 1960l and 1960m. These tabulated values may be considered as votes by each data point for particular r/θ pairs. The r/θ parameter space can be considered to be a grid of rectilinear cells, each cell representing a small range of r and θ values. The cell receiving the most votes, indicated in FIG. 19I by asterisks next to the votes, such as asterisk 1960n, is selected as the r and θ value for the best line coincident with the positions of the data points. This line 1960o is shown plotted with respect to the data points in plot 1960p in the lower right-hand portion of FIG. 19I. As can be seen, the data points lie very close to this line. Thus, the Hough Transform can be described as a parameter-voting method by which data points vote for cells within a parameter space to which they may correspond, and cells with the greatest number of votes are selected as candidate sets of parameter values for a mathematical model of the relative position of the data points. The Hough-Transform technique is generally applicable to selecting mathematical models with an arbitrary number of parameters.

Figure 19J:
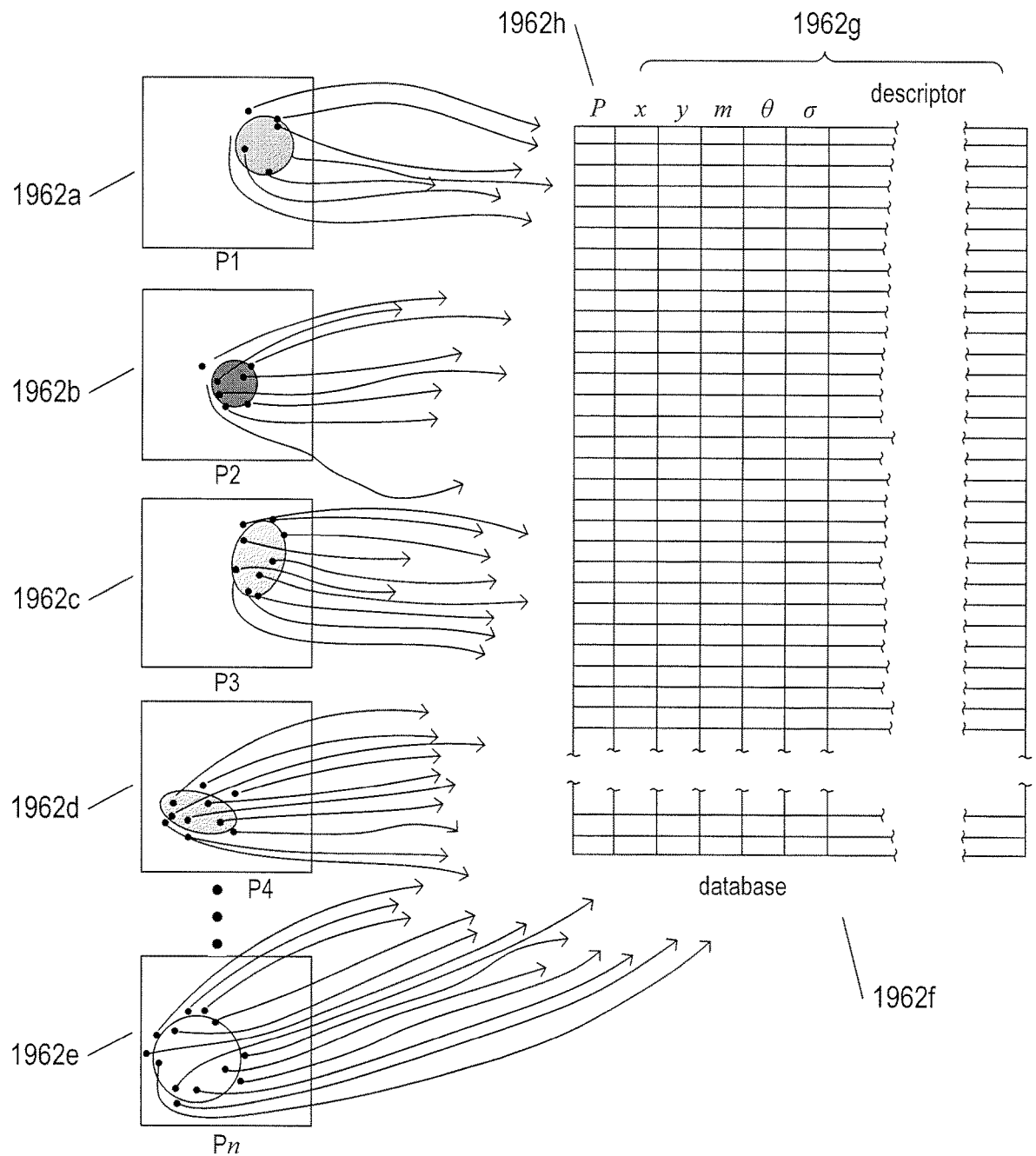
FIGS. 19J-K illustrate use of SIFT points to recognize objects in images.
Figure 19K:
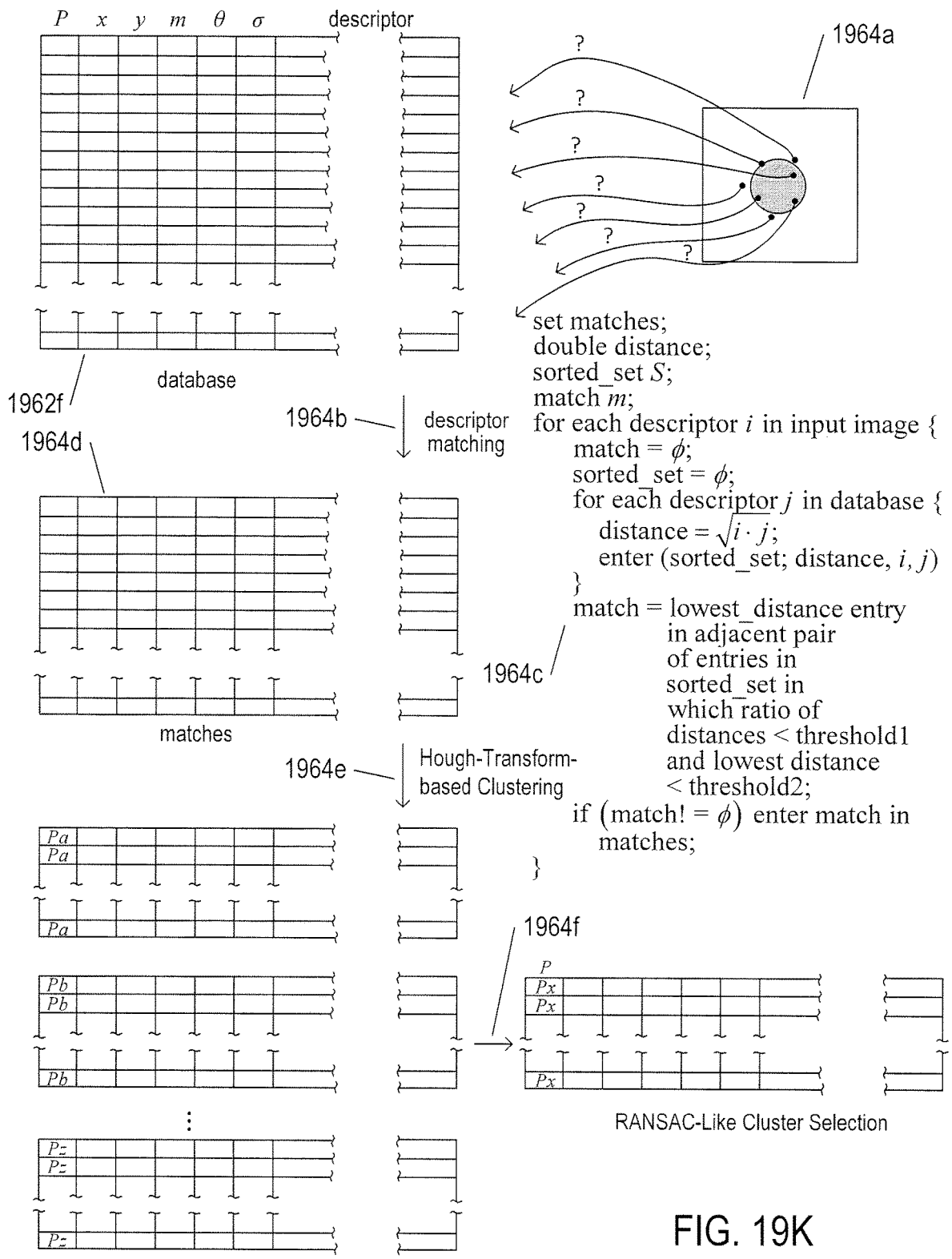

FIGS. 19J-K illustrate use of SIFT points to recognize objects in images. As shown in FIG. 19J, a number of different images that include a particular object, referred to as images "P1" to "Pn" 1962a-e, are acquired. In general, each of these different images 1962a-e are taken from different angles and positions with respect to the object in order to capture various different ways that the object may appear in a two-dimensional image. A set of SIFT features, or keypoints, are determined for each image and placed into a database of SIFT keypoints 1962f. Note that each feature or keypoint is characterized by the above-discussed SIFT feature attributes 1962g as well as an attribute 1962h corresponding to the particular image, or pose, from which the feature was extracted. Note that, in addition, the features or keypoints are selected for lying within or close to the particular object that is to be characterized in subsequent, input images.

FIG. 19K illustrates how an object may be identified within an input image. In FIG. 19K, the input image, containing a subimage of the object 1964a is shown in the top right-hand corner of the figure. The database of SIFT features 1962f is again represented in FIG. 19K in the top left-hand corner. In a first step, SIFT features are extracted from input image 1964a and matched to SIFT features in the database, as represented in FIG. 19K by labeled arrow 1964b and pseudocode 1964c. This produces a set of matches 1964d in which successive pairs of adjacent rows represent an extracted SIFT feature from the input image and the corresponding SIFT feature from the database. The matching, as indicated in pseudocode 1964c, is based on a matching of the 128-element descriptors of the extracted SIFT features with the descriptors of the database-resident SIFT features. This is carried out using a nearest-neighbor method that finds the database SIFT feature with a descriptor closest, in high-dimensional distance, to the descriptor of a considered SIFT point extracted from the input image. However, in order to avoid spurious matching, a match occurs only when the ratio of distances for the best-matching descriptor and the next-best-matching descriptor is lower than a first threshold and the lowest distance is lower than a second threshold.

In a next step, represented by vertical arrow 1964e, Hough-Transform-based clustering is carried out in order to cluster the matches by pose. Each match of an input-image feature to a database feature can be considered to be a vote for a particular x,y translation, scale, and orientation angle. Clusters of a maxima in the four-dimensional Hough space correspond to the most probable object poses. Then, a RANSAC-like selection technique, represented by horizontal arrow 1964f, is employed to select the most likely pose for the object from the clusters produced by Hough-Transform-based clustering. The features in the selected cluster can then be used to identify the location of the object in the input image.

Figure 20:
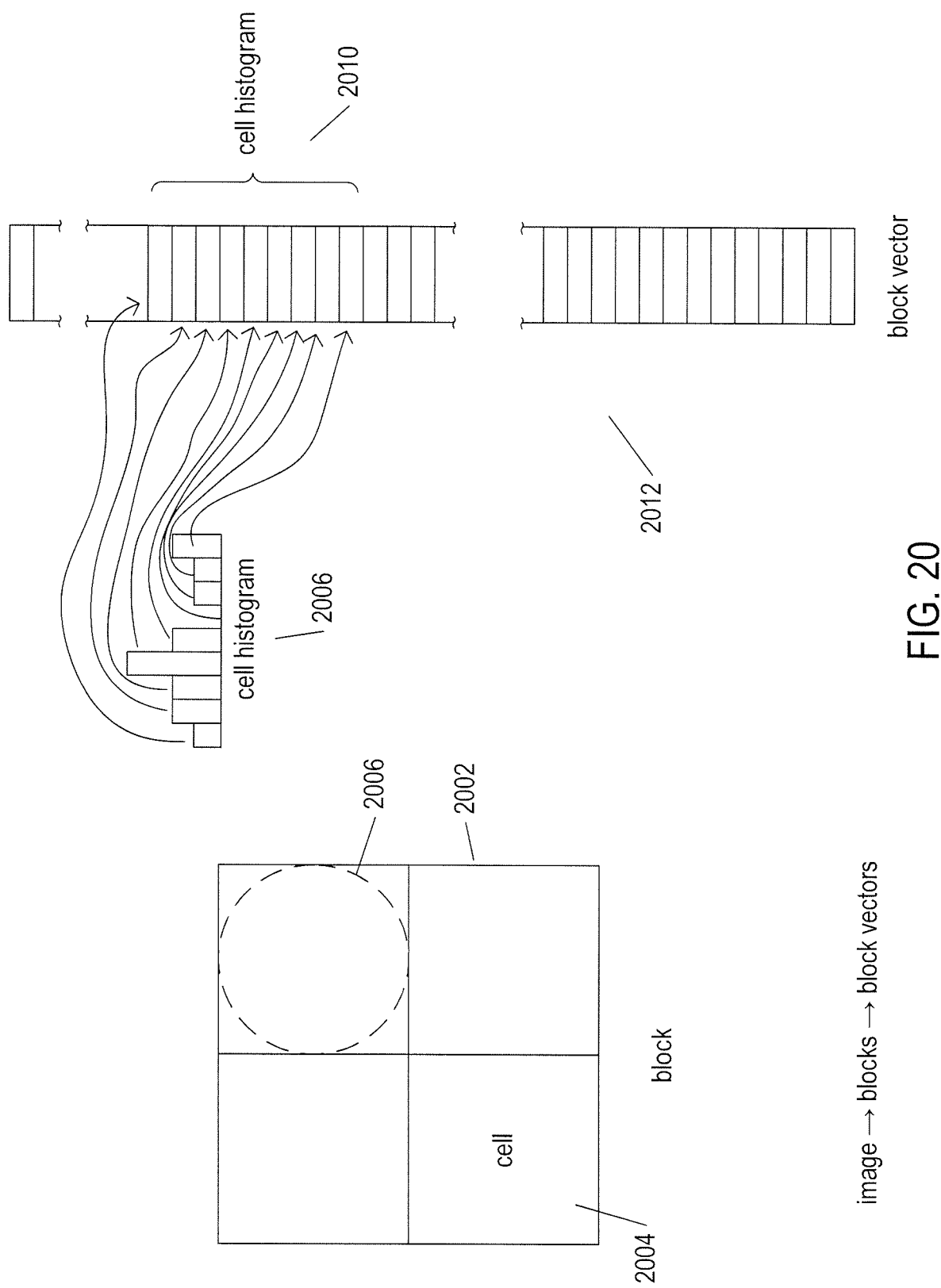
FIG. 20 illustrates a second type of feature detector, referred to as the "Histogram of Gradients" ("HoG") feature detector.

FIG. 20 illustrates a second type of feature detector, referred to as the "Histogram of Gradients" ("HoG") feature detector. HoG features are computed using similar computations used for a portion of the SIFT-feature-extraction methods, discussed above. In the HoG method, an input image is decomposed into blocks, such as block 2002 in FIG. 20, each block consisting of multiple cells, such as cell 2004. For example, a block may include 16×16=256 pixels while each cell includes 8×8=64 pixels. The gradient magnitudes and orientations are computed for each pixel in a cell and are weighted by the distances between pixels and an overlying Gaussian surface, indicated in FIG. 20 by the dashed circle 2006. Just as in the SIFT-feature-extraction method, the weighted gradient magnitudes are used to construct a cell histogram 2008, with bins representing ranges of orientation angles, for each cell in a block. The heights of the histogram bars are then encoded in adjacent elements 2010 of a block feature vector 2012. The block feature vectors are then combined to generate an extracted image feature for an image.

Figure 21A:
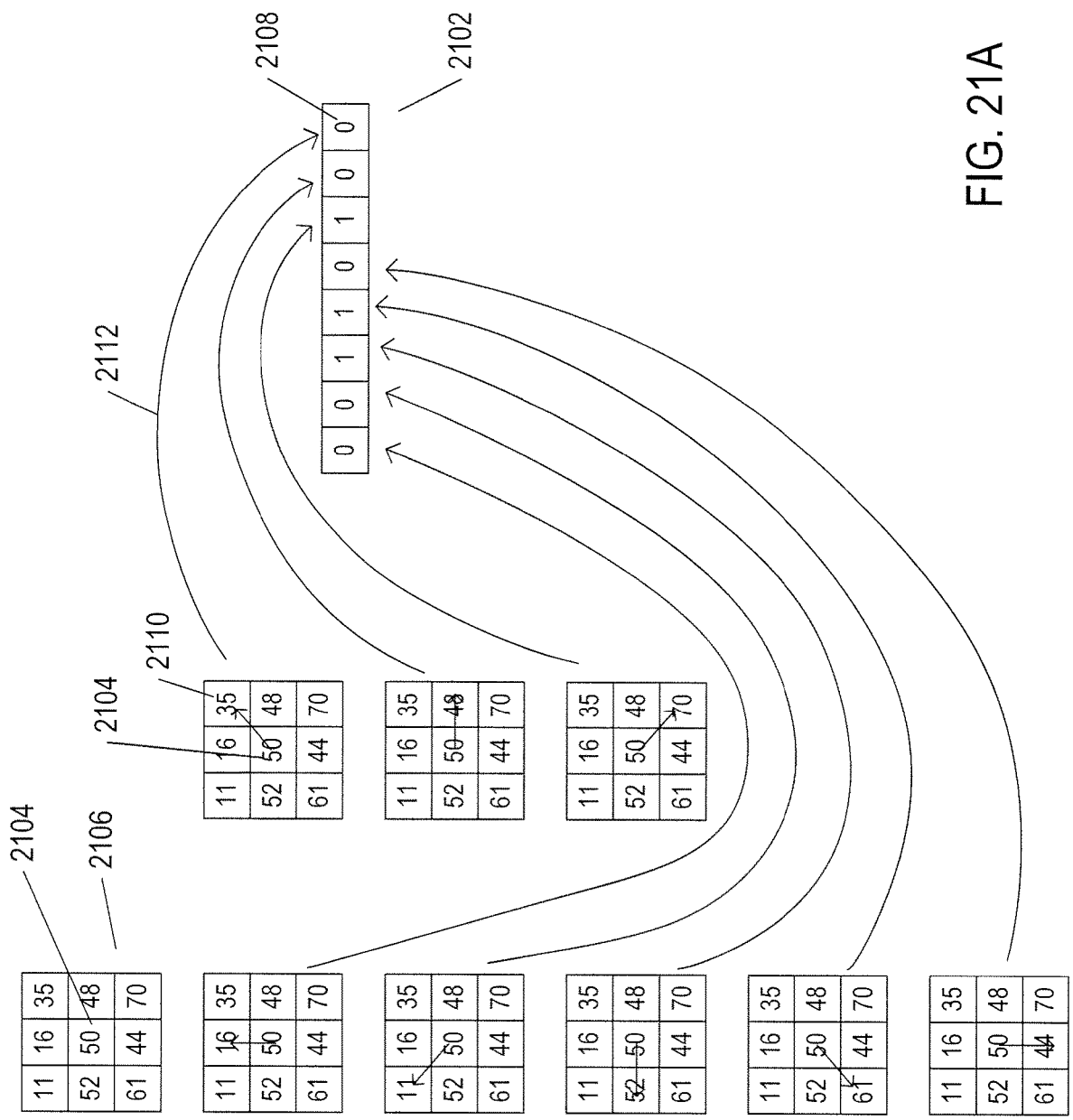
FIGS. 21A-B illustrate a third type of feature detector, referred to as the "Linear Binary Patterns" ("LBP") feature detector.
Figure 21B:
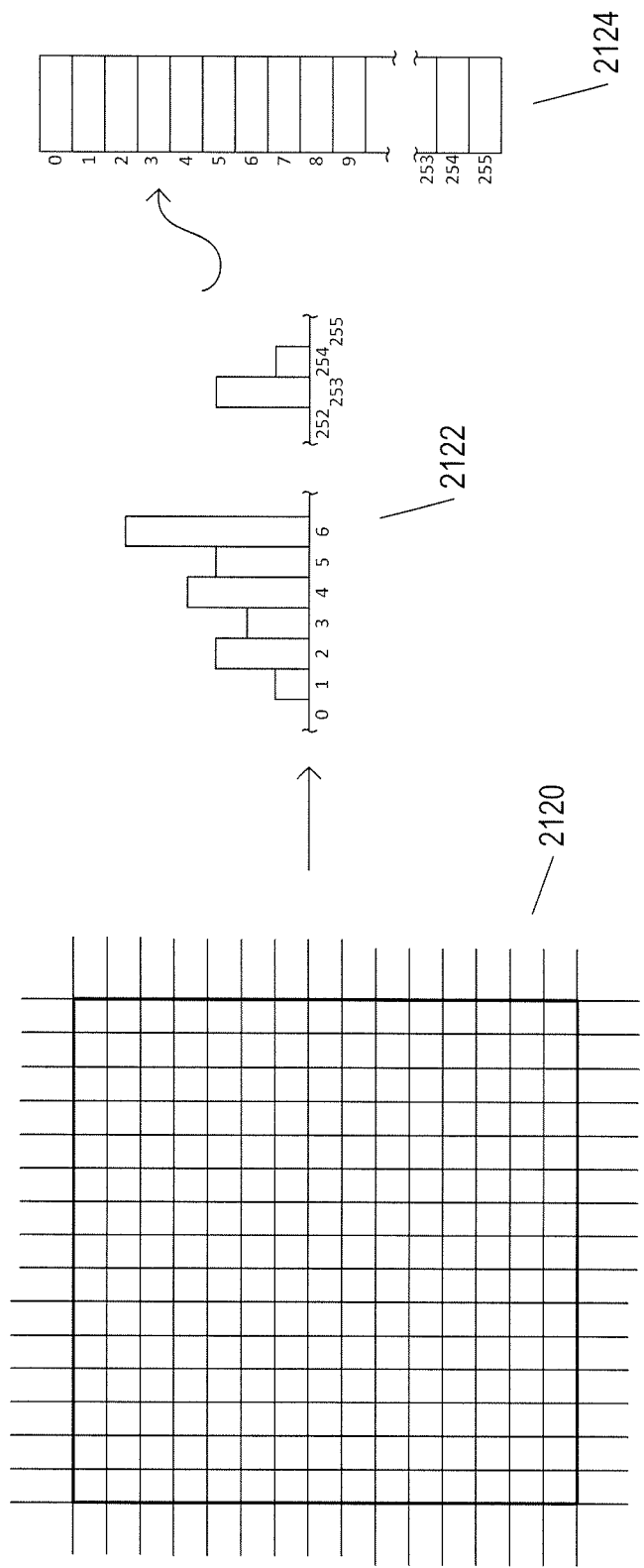

FIGS. 21A-B illustrate a third type of feature detector, referred to as the "Linear Binary Patterns" ("LBP") feature detector. As shown in FIG. 21A, and eight-bit numeric value, or bit vector 2102 is generated for a currently considered pixel 2104 within a neighborhood of pixels 2106 within a digital image. Each bit in the eight-bit numeric value 2102 is generated from a comparison of the currently considered pixel with a neighboring pixel. For example, bit 2108 is generated from a comparison of the currently considered pixel 2104 with neighbor pixel 2110. When the currently considered pixel has a value greater than that of the neighboring pixel, as is the case for pixels 2104 and 2110, the bit value generated by the comparison is "0." Otherwise, a bit value "1" is generated. Each bit in the eight-bit numeric value 2102 is generated from a comparison of the currently considered pixel with a unique neighboring pixel, as can be seen in FIG. 21A from the curved-arrows, such as curved arrow 2112, each indicating a correspondence between the comparison of the currently considered pixel with a different neighboring pixel. As shown in FIG. 21B, an image is partitioned into cells, such as 16×16 cell 2120, and an LBP eight-bit numeric value is computed for each pixel in the cell, using, for edge pixels, replicated cells or pixels from neighboring cells. The eight-bit numeric values are then used to create a cell histogram with 256 bins corresponding to the 256 possible numeric values for an integer represented by eight bits. The cell histogram can be alternatively considered to be a 256-element cell feature vector, and the cell feature vectors are then combined to generate an extracted image feature for an image.

Attribute Assignment to Face-Containing Subimages

Figure 22:
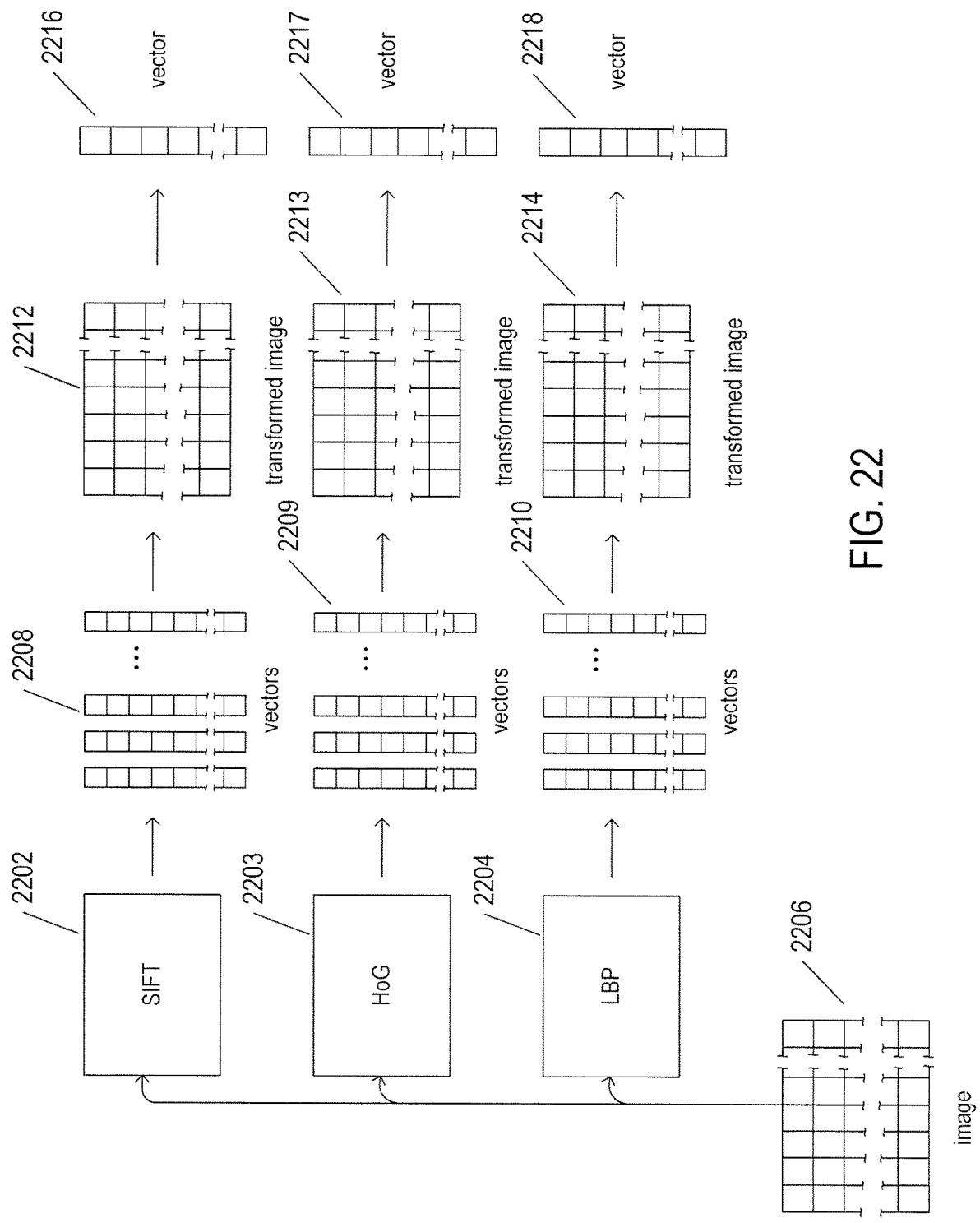
FIG. 22 illustrates use of feature detectors in the methods and systems to which the current document is directed.

FIG. 22 illustrates use of feature detectors in the methods and systems to which the current document is directed. Each of various different types of feature detector 2202-2204, which may include the previously discussed SIFT, HoG, and LBP feature detectors as well as other feature detectors, are separated applied to an image 2202, generally a normalized face-containing subimage of an input image, to generate a corresponding set of feature vectors 2208-2210, each set including one feature vector for each portion of the image, as defined by the particular feature detector, such as a cell, block, or other such portion. For some feature detectors, the portions are distinct while, for others, the portions are overlapping. The sets of feature vectors and be alternatively considered to be a two-dimensional, transformed image 2212-2214 by arranging the feature vectors as columns or rows within a two-dimensional matrix. These two-dimensional, transformed images may be linearized to form one-dimensional vectors 2216-2218. These one-dimensional vectors can be input into each of many different classifiers to generate attribute values for the human face contained in the image 2206.

Figure 23A:
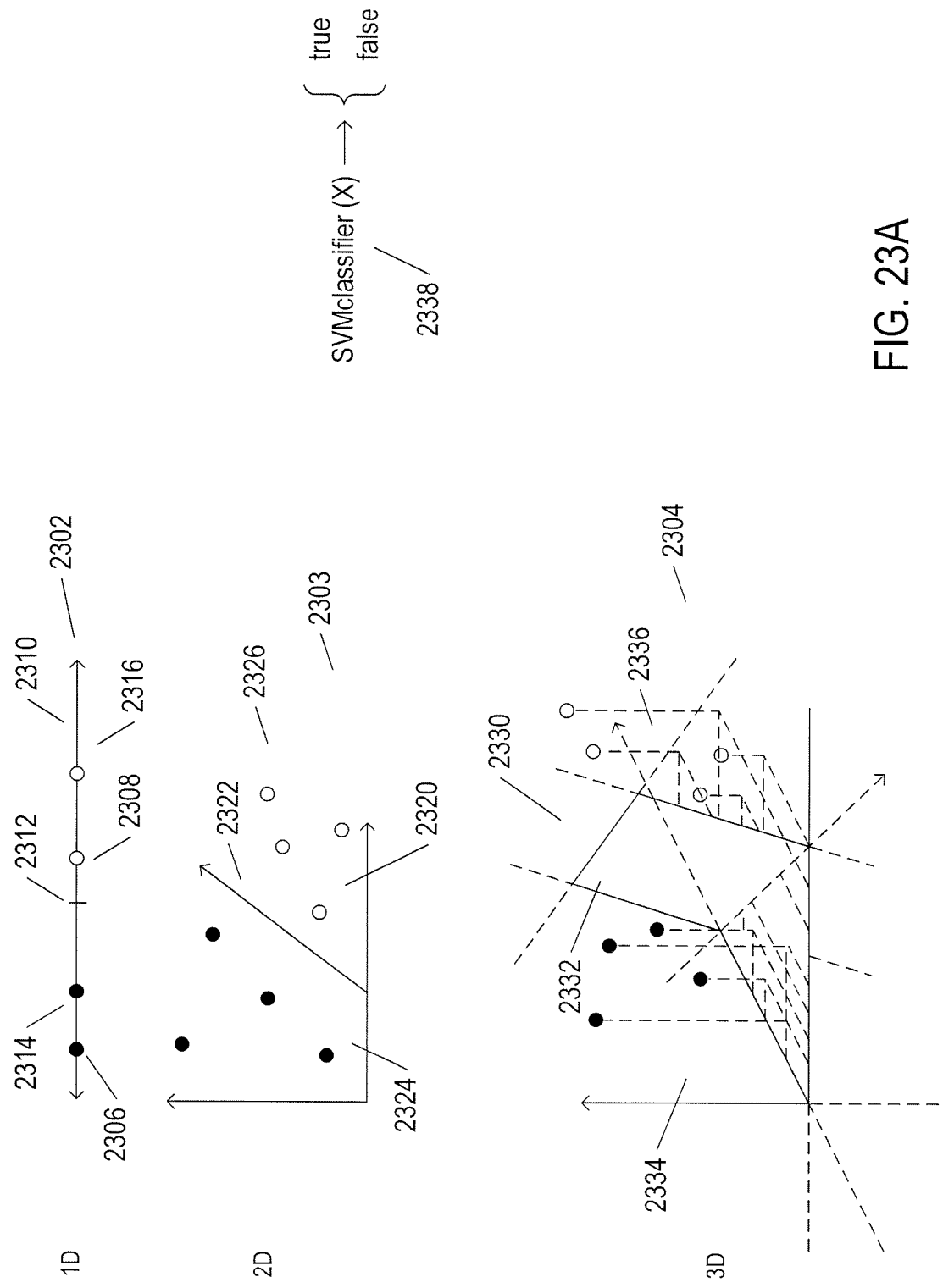
FIGS. 23A-B illustrate a type of classifier referred to as a support vector machine ("SVM").
Figure 23B:
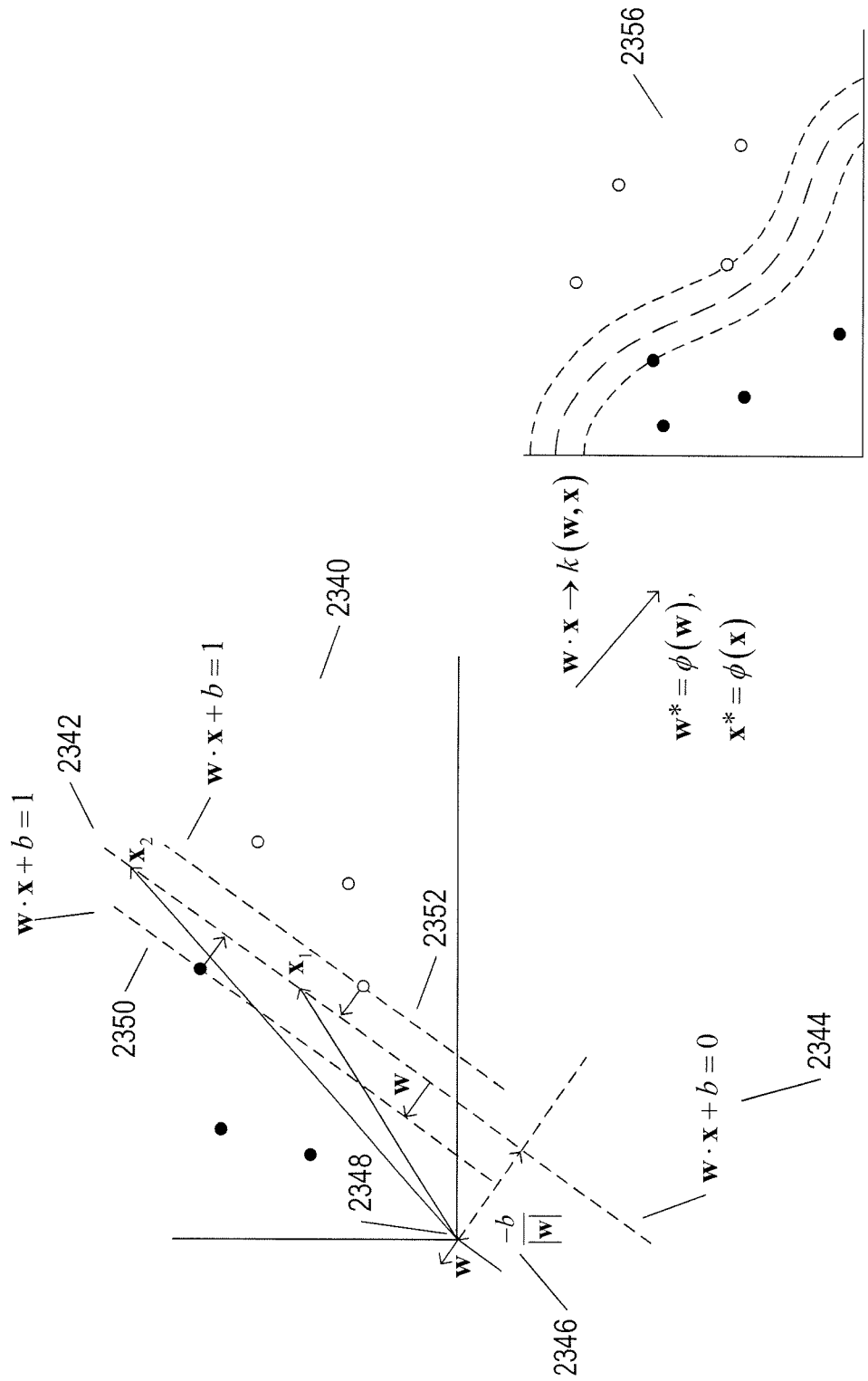

FIGS. 23A-B illustrate a type of classifier referred to as a support vector machine ("SVM"). In general, a classifier receives input data and returns a value that represents a characteristic of the data. In the currently disclosed methods and systems, the one-dimensional vectors produced by feature detectors in response to input subimages can be considered to be data points in a very high-dimensional space, just as a vector of three coordinates in the x, y, and z directions of a Cartesian volume can be considered to specify a point in three-dimensional space. A binary classifier produces one of two possible output values, such as {0, 1}, {male, female}, {white, non-white}, or {true, false}. An SVM is generally trained, using training input data points for which desired output values are known, to partition a data-point space into two regions. Following training, the SVM, upon input of a data point with an unknown output value, determines in which of the two partitions of the data-point space the input data point is located and returns the output value associated with the partition of the data-point space in which the input data point is located. In FIG. 23A, example one-dimensional 2302, two-dimensional 2303, and three-dimensional 2304 SVMs are illustrated. In each example SVM, data points in a first partition are represented by filled disks, such as filled disk 2306, and data points in a second partition are represented by unfilled disks, such as unfilled disk 2308. In the one-dimensional SVM 2302, the horizontal line 2310 representing the data-point space is partitioned by a point on the line 2312 into a first, left-hand region 2314 and a second right-hand region 2316. In the two-dimensional SVM 2303, the plane 2320 representing the data-point space is partitioned by a line 2312 into a first region 2324 and a second region 2326. In the three-dimensional SVM 2304, the volume 2330 representing the data-point space is partitioned by a plane 2332 into a first region 2334 and a second region 2336. In these examples, each SVM classifier receives an input data point x and returns one of the two values {true, false} 2338.

FIG. 23B illustrates linear and non-linear SVMs. In a linear SVM 2340, the partition 2342 is an (n−1)-dimensional object within an n-dimensional data-point space. The partition can therefore be described by the expression 2344:

$$w \cdot x + b = 0,$$

where w is a vector normal to the partition,
x is a data point on or within the partition, and
b is a constant.
The value $$\frac{-b}{|w|}$$

is the shortest distance 2346 from the origin 2348 to the partition 2342. There are two additional partition-like elements 2350 and 2352 on either side of the partition 2342 with equations:

$$w \cdot x + b = 1, \text{ and}$$

$$w \cdot x + b = 1.$$

The shortest distance between the partition and the additional partition-like elements 2350 and 2352 is $|w|$, the magnitude of vector w. The SVM is constructed by determining an equation for the partition that correctly partitions the two different sets of data points and that minimizes $|w|$, as an optimization problem. A non-linear SVM 2356 can be generated by replacing the dot-product operation with a function k( ):

$$w \cdot x \rightarrow k(w, x),$$

which is equivalent to a vector-space transform ϕ

$$w^* = \phi(w),$$

$$x^* = \phi(x)$$

that transforms vectors in an original vector space S to a transformed vector space S*. The same optimization method can be used to generate a linear partition in the transformed vector space which is generally a curved partition in the original vector space.

Figure 24:
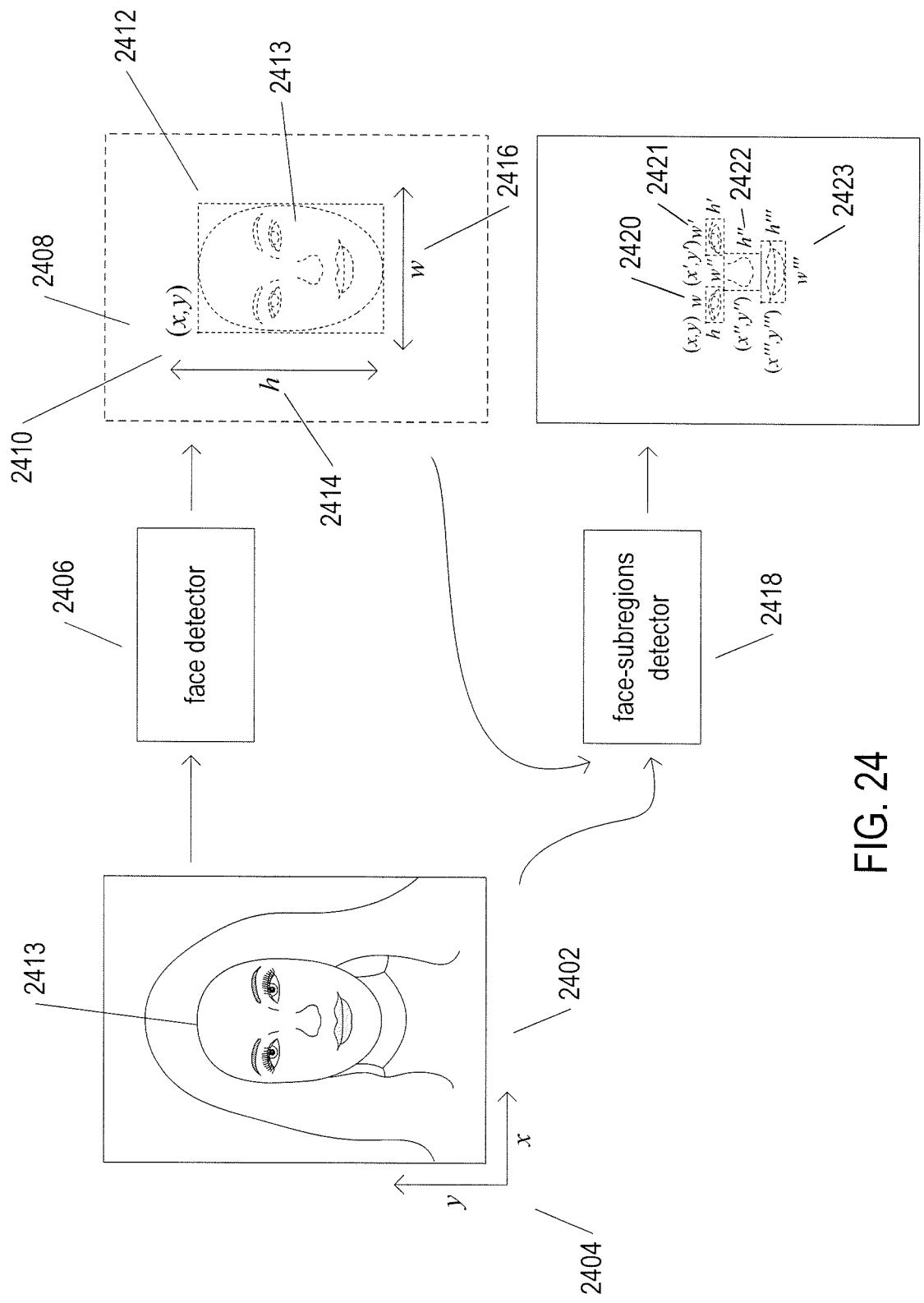
FIG. 24 illustrates two additional, higher-level feature detectors used in the methods and systems to which the current document is directed.

FIG. 24 illustrates two additional, higher-level feature detectors used in the methods and systems to which the current document is directed. In FIG. 24, an initial input image 2402 is shown with a superimposed Cartesian two-dimensional coordinate system. Often, in image processing, the origin is assigned to the top, left corner of the image, with the y axis descending downward along the left edge of the image. However, any coordinate system may be used, including the traditional coordinate system 2404 with y and x axes coincident with the left and bottom image edges and the origin at the left, bottom corner. A face detector 2406 receives the input image 2402 and returns the coordinates 2408 for a corner 2410 of each rectangular subimage 2412 that frames a face 2413 in the input image. In addition, the face detector returns the height h 2414 and width w 2416 of each face-containing subimage. Face detectors generally use a variety of feature-extraction methods and classifiers, and may additionally use rules and other logic. A face-subregions detector 2418 receives, as input, an original input image 2402 and the parameters 2408, 2414, and 1416 that describe a face-containing subimage 2412 and returns parameters for rectangular sub-subimages 2420-2423, or regions, that contain, respectively, an image of the left eye, right eye, nose, and mouth. Separate face region detectors may be used rather than an aggregate face-regions detector. The parameters that specify the location and dimensions of regions and subimages may also differ for different detectors. For example, the coordinates for the top left and lower right corners of a subimage, sub-subimage, or region also completely specify the location and dimensions of the subimage, sub-subimage, or region.

Figure 25:
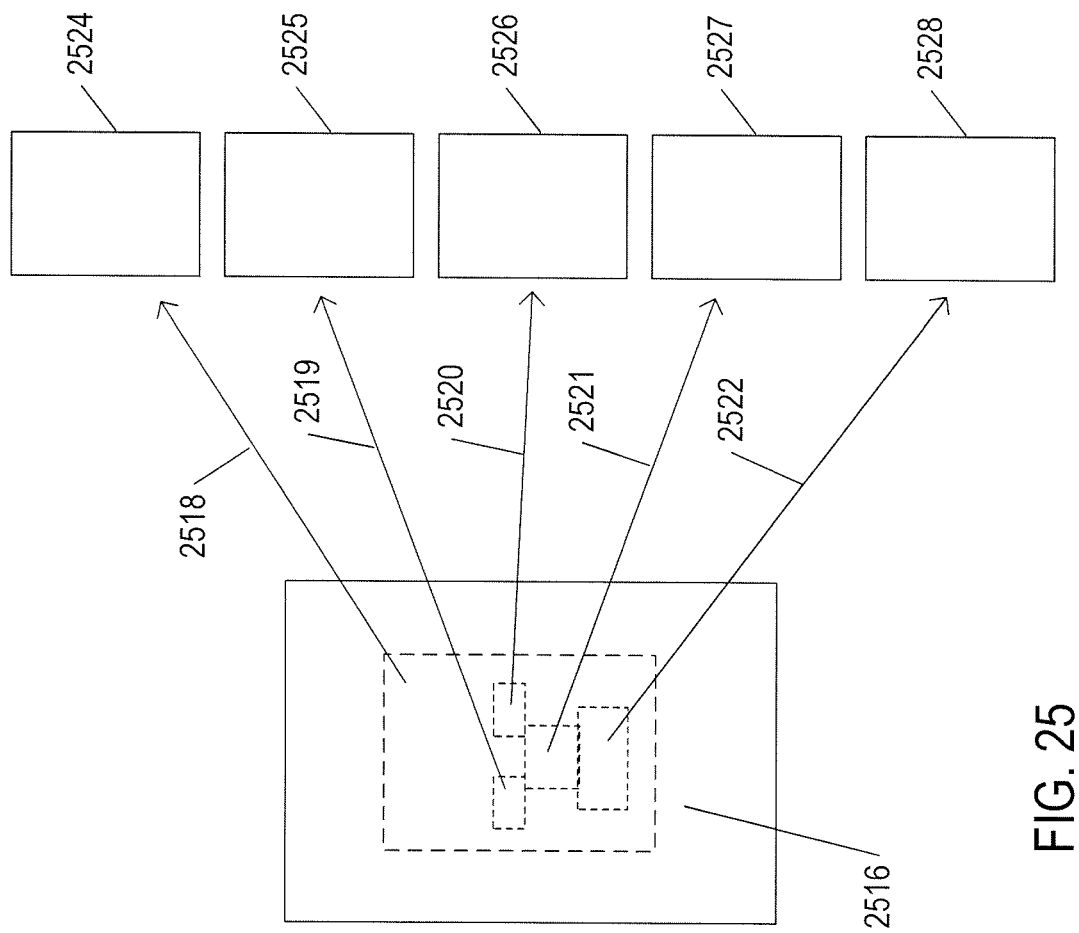
FIG. 25 illustrates normalization of the regions obtained by application of a face detector and face-subregions detector, discussed above with reference to FIG. 24.

FIG. 25 illustrates normalization of the regions obtained by application of a face detector and face-subregions detector, discussed above with reference to FIG. 24. As shown in the original input image 2502 in FIG. 25, the face region 2504 may be oriented differently than the input-image edges 2506-2509. In addition, the relative positions and orientations of the eye, nose, and mouth regions 2510-1523 may not coincide with expected positions and orientations, based on analysis of many human-face images. Therefore, rotation-matrix and translation-matrix operations, discussed above, may be performed to reorient the face region 2504 and eye, nose, and mouth regions 2510-1523 to produce a canonical region arrangement 2516. In certain cases, perspective transformations may also be employed to normalized regions containing perspective-distorted images. In cases in which the arrangement and orientations of the regions cannot be brought into conformance with a range of arrangements and orientations expected of human faces, the face-containing subimage may be rejected and removed from further consideration. Finally, as indicated by arrows 2518 and rectangles 2514-2528, the regions in the canonical region arrangement 2516 are extracted and resealed, when necessary, to produce face, left-eye, right-eye, node, and mouth regions of the same size, in on implementation 114×144 pixels. Of course, in alternative implementations, fewer regions or a greater number of regions may be generated for each face image in an input image, using fewer or more feature detectors. In addition, it is often the case that the input image is initially processed to normalize the input image with respect to dimensions, contrast, and digital representation, which may involve resealing and color-model transformations. In certain cases, multiple versions of input images are generated to provide the type of image needed by each different feature detector. Some feature detectors, for example, may use binary or grayscale images, while others may use color images.

Figure 26:
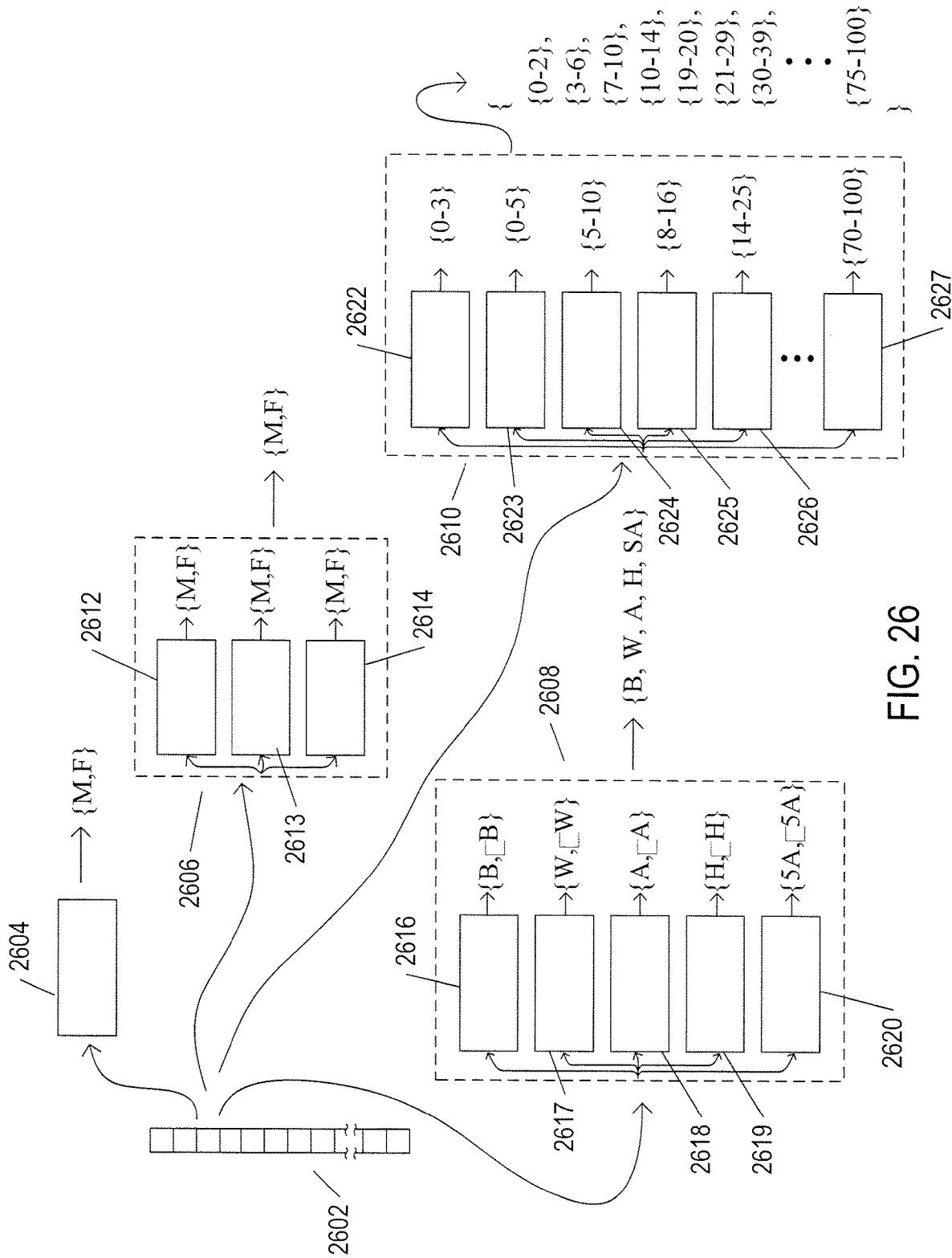
FIG. 26 illustrates attribute classifiers employed in the methods and systems to which the current application is directed.

FIG. 26 illustrates attribute classifiers employed in the methods and systems to which the current application is directed. As discussed above, with reference to FIG. 22, various type of feature-extraction methods, including SIFT, HoG, and LBP, are applied to the normalized regions, discussed above with reference to FIG. 26, to generate feature vectors for the regions, one-dimensional transformed images. These feature vectors 2606 are input to each of a number of attribute classifiers 2604, 2606, 2608, and 2610. Attribute classifiers may be single SVMs or other such classifiers, such as binary classifier 2604 that returns an indication of whether or not the region corresponding to the submitted feature vector corresponds to a male face or a female face. Alternatively, an attribute classifier may include multiple individual classifiers, such as classifier 2606, which includes three binary classifiers 2612-2614. In the case of aggregate attribute classifier 2606, the three composing classifiers all return output values indicating whether the region corresponding to a submitted feature vector corresponds to a male face or a female face. In this case, the output of the aggregate attribute classifier is computed from the outputs of the composing, individual classifiers, further discussed below. An aggregate attribute classifier may include multiple different composing classifiers, such as classifiers 2616-2620 within aggregate attribute classifier 2608. In this case, the aggregate attribute classifier returns an indication of the ethnicity of the person from whose image the submitted feature vector was extracted. Each composing classifier, such as classifier 2616, returns a value indicating whether or not the input feature vector was computed from an image of a particular ethnicity type. Similarly, aggregate attribute classifier 2610 returns an indication of the age range of the person whose image generated the input feature vector, while the individual composing classifiers 2622-2627 return a value indicating whether or not the age of the person is within a particular age range.

Figure 27:
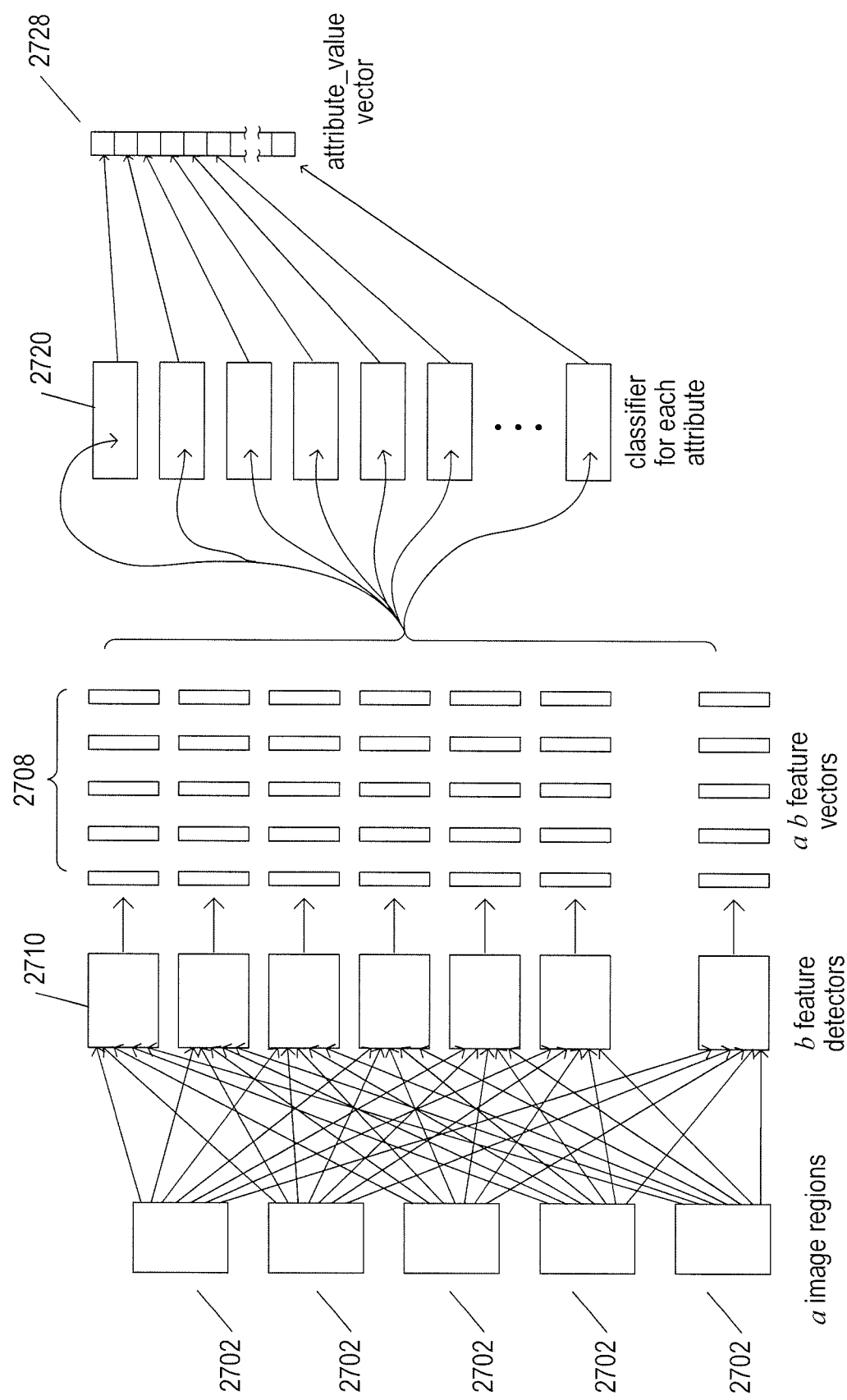
FIG. 27 illustrates the high-level architecture for the attribute-assignment image-processing system to which the current document is directed.

FIG. 27 illustrates the high-level architecture for the attribute-assignment image-processing system to which the current document is directed. A number a of normalized regions 2702-2706 are produced by the face and face-subregions detectors, discussed above with referenced to FIGS. 24-25, for each face-containing subimage of an input image. Feature vectors 2708 are produced by each of b feature detectors 2710-2716, discussed above with reference to FIGS. 19A-21B. Each feature detector produces a generally different feature vector for each of the normalized regions 2702-2706. Thus, in general, a×b feature vectors are produced from a face-containing subimage of an input image. These feature vectors are then distributed among the individual attribute classifiers and individual classifiers within aggregate attribute classifiers 2720-2726 which produce output attribute values that are collected in an output attribute-value vector 2728. Because the attribute-assignment image-processing system is generally implemented in a distributed computer system, the feature-extraction and classification tasks may be carried out in parallel over many different servers and processor cores.

Figure 28A:
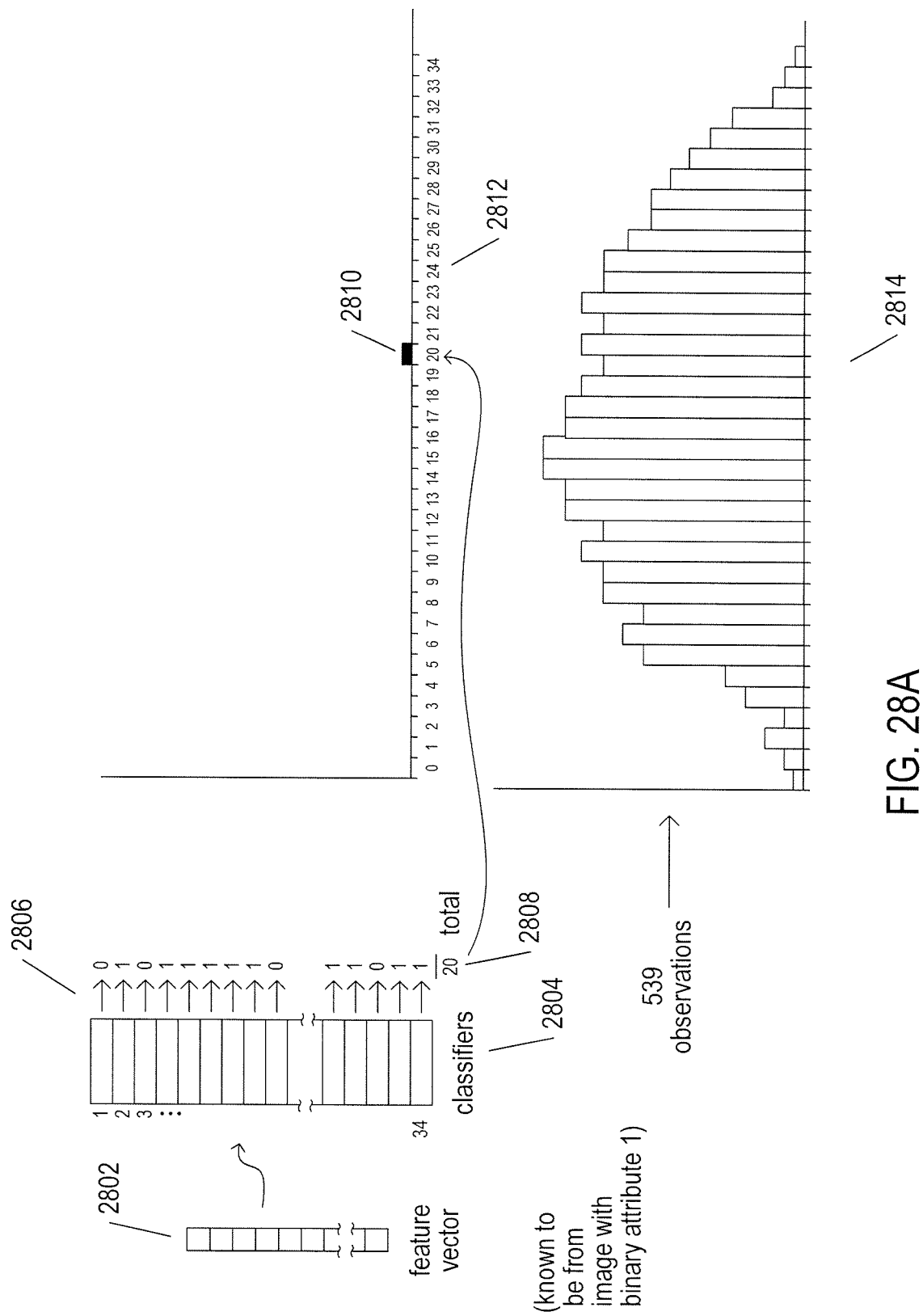
FIGS. 28A-D illustrate how aggregate classifiers produce output values and associated probabilities.

FIGS. 28A-D illustrate how aggregate classifiers produce output values and associated probabilities. FIG. 28A illustrates generation of a discrete probability density function for internal-classifier outputs within an aggregate classifier using a set of input feature vectors from regions with a known attribute value. For example, feature vectors computed from regions containing male facial components may be input to the individual classifiers within a male/female aggregate classifier. When a feature vector 2802 is input to the aggregate classifier, the outputs from the individual composing classifiers, shown as an array 2804 of classifiers, are collected 2806. In FIG. 28A, the outputs are either "0" or "1," and the input feature vector is computed from a region with attribute value "1." The total number of correct, or positive, output values 2808 is then determined, and a corresponding bin 2810 in a histogram of total-positive results 2812 is incremented. After input of 539 different feature vectors for regions with attribute "1," a discrete probability density function 2814 is generated, in the example of FIG. 28A.

Figure 28B:
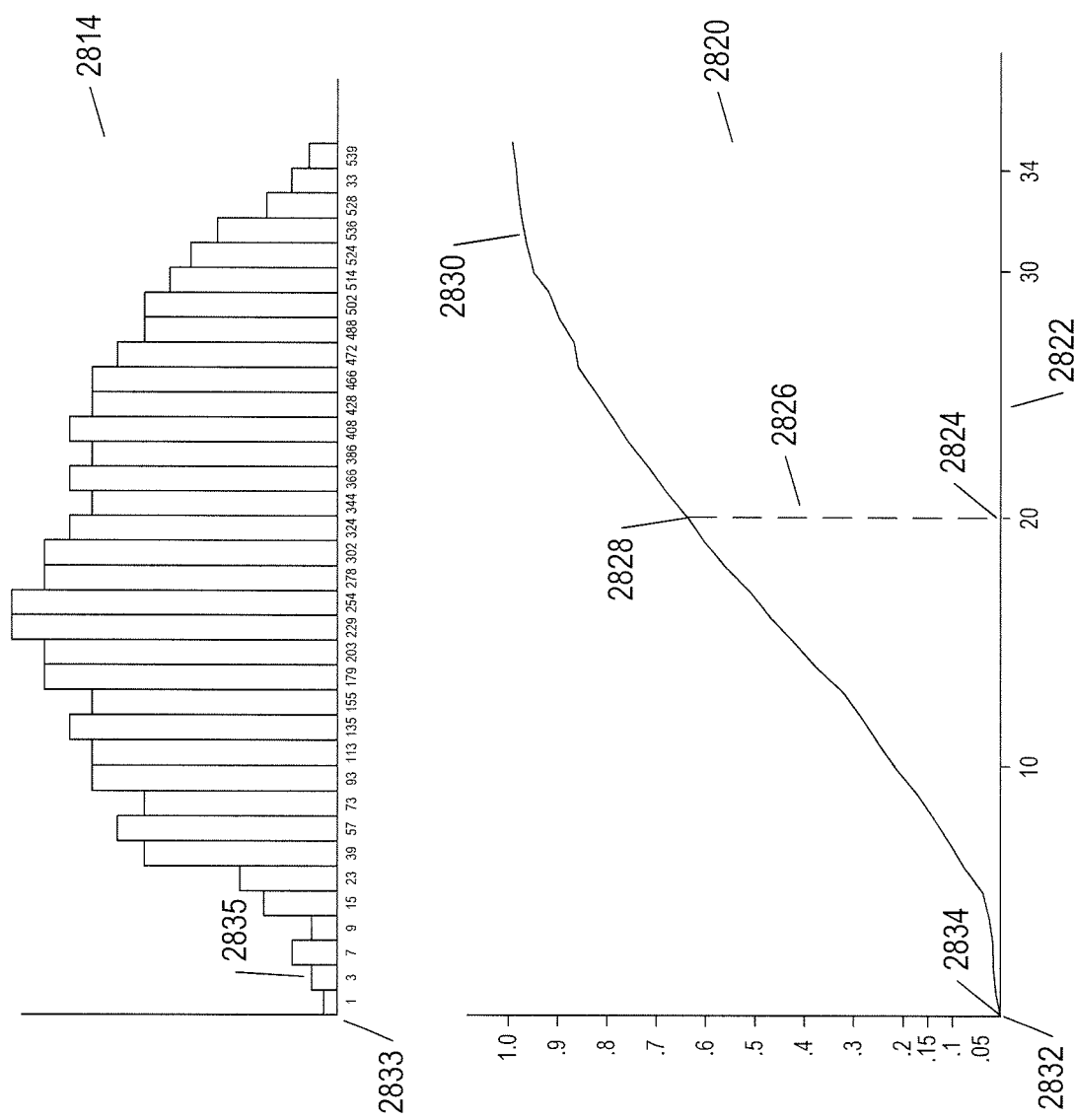

As shown in FIG. 28B, a probability distribution function is easily computed from the probability density function 2814. In FIG. 28B, the probability distribution function is shown as a curve in which discrete values are connected by small line segments. In fact, the probability distribution function is discrete and is accurately represented as a set of points, rather than as a curve. Nonetheless, the continuous approximation shown in FIG. 28B is perhaps more readily understood. The meaning of the probability distribution function is that, for a given value along the horizontal axis 2822, such as point 2824 representing 20 individual classifiers, the percentage of the input feature vectors for which 20 or fewer individual classifiers output a positive or correct attribute value, in the current example, "1," is given by the height of a vertical line segment 2826 passing through the given point along the horizontal axis 2824 and ending at a point 2828 on the probability-distribution curve 2830. This percentage, expressed as a fractional value in the range [0, 1], can be considered to be an estimate of the probability that, when a feature vector computed from a region with attribute value "1," 20 or fewer individual classifiers will output the attribute value "1." The first probability-distribution-curve point 2832 is computed as the number of counts in the first histogram bin 2833, 1, divided by the total number of experiments, or submitted feature vectors 539. This is the percentage of experiments in which no component classifier returned a "1" response. The second probability-distribution-curve point 2834 is computed as the number of counts in the first two histogram bins 2833 and 2835, 1+2=3, divided by 539. The accumulated counts for each bin and all preceding bins are shown below the classifier-positive-result-count values on the horizontal axis of the probability density function 2814.

Figure 28C:
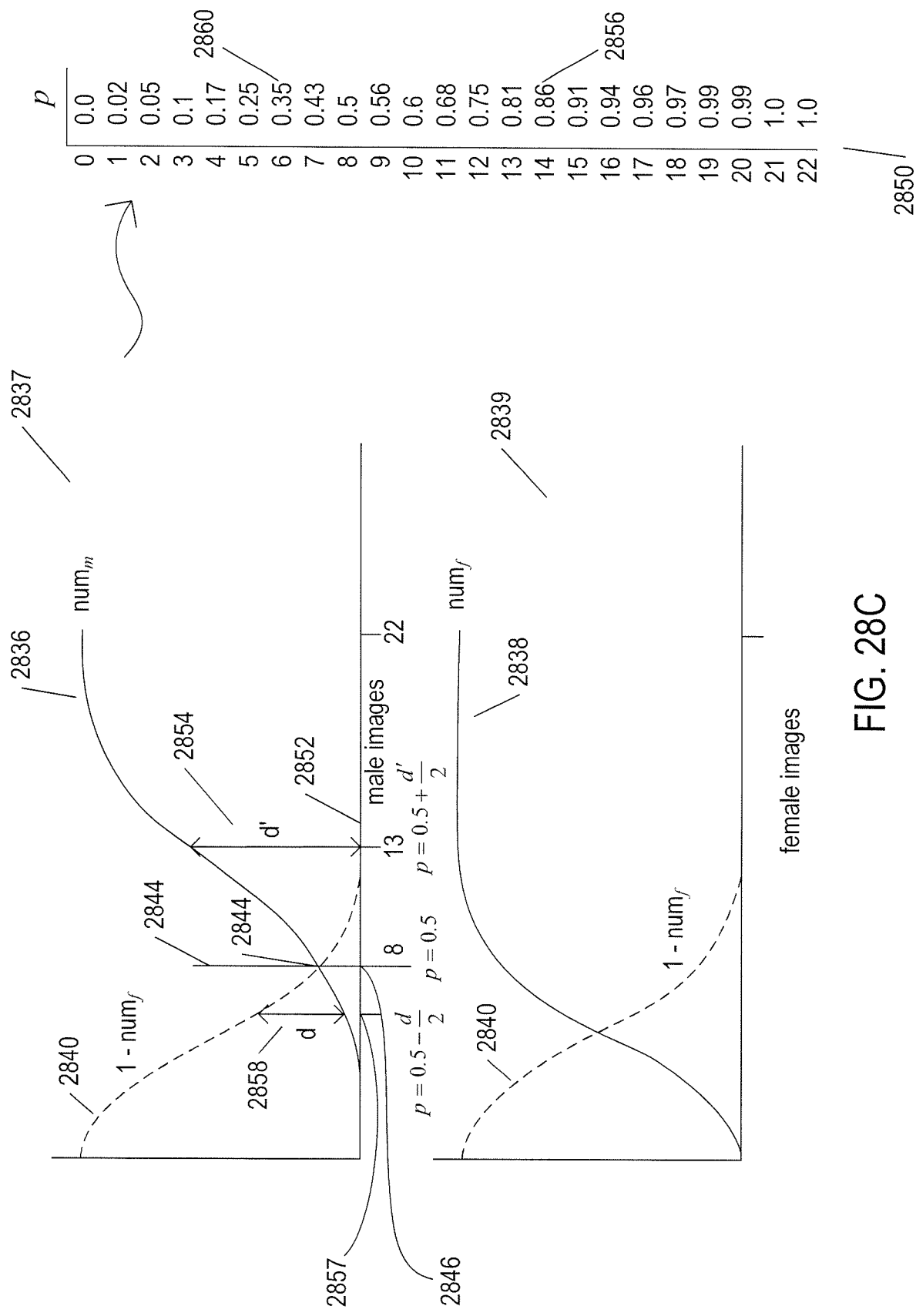

In FIG. 28C, a probability-distribution curve 2836, plotted in a first plot 2837, is generated from many experiments in which feature vectors computed from male regions, or regions with a gender attribute assigned the value m, are submitted to a male/female aggregate classifier containing 22 individual classifiers. A second probability-distribution curve 2838, plotted in a second plot 2839, is generated from many experiments in which feature vectors computed from female regions are submitted to the male/female aggregate classifier and the number of $f$ attribute-value individual classifiers for each input feature vector are tabulated in a histogram. These two curves are positive response curves—one for male input feature vectors and the other for female input vectors. A negative response curve 2840 for the female experiments is obtained by subtracting each curve point of the positive curve 2838 from 1. In other words, the positive-result probability-distribution curve 2838 gives an estimate of the probability of up to a selected number of component classifiers returning a positive result and the negative-result probability-distribution curve 2840 gives an estimate of the probability of up to a selected number of component classifiers returning a negative result.

The negative-result probability-distribution curve 2840 is imported into the first plot 2837 in FIG. 28C, so that the first plot 2837 contains both the negative-result probability-distribution curve 2840 obtained from female-region experiments and the positive probability-distribution curve 2836 obtained from male-region experiments. There is a point 2842 where the two curves cross, referred to as the "cross-over point." A vertical line segment 2844 through that point crosses the horizontal axis at point 2846, which indicates the number of component classifiers, eight in the current example, returning the attribute value m when the input feature vector has an equal probability of having been computed from either a male or female region. When eight component classifiers return the value m, the probability that the region from which the input feature vector was generated is male is therefore 0.5. A probability table 2850 can be generated from the both the positive probability-distribution curve 2836 and the negative-result probability-distribution curve 2840. The probability of the region from which an input feature vector was generated being a male region when 13 (2852 in FIG. 28C) return the attribute value m is equal to 0.5+one half the vertical distance d' 2854 between the intersection points of the two curves and the vertical line, 0.86 (2856 in FIG. 28C). For a point 2857 to the left of the cross-over point, one half the vertical distance d 2858 between the intersection points of the two curves and s vertical line through the point 2857 is subtracted from 0.5 to produce the result (2860 in FIG. 28C).

Figure 28D:
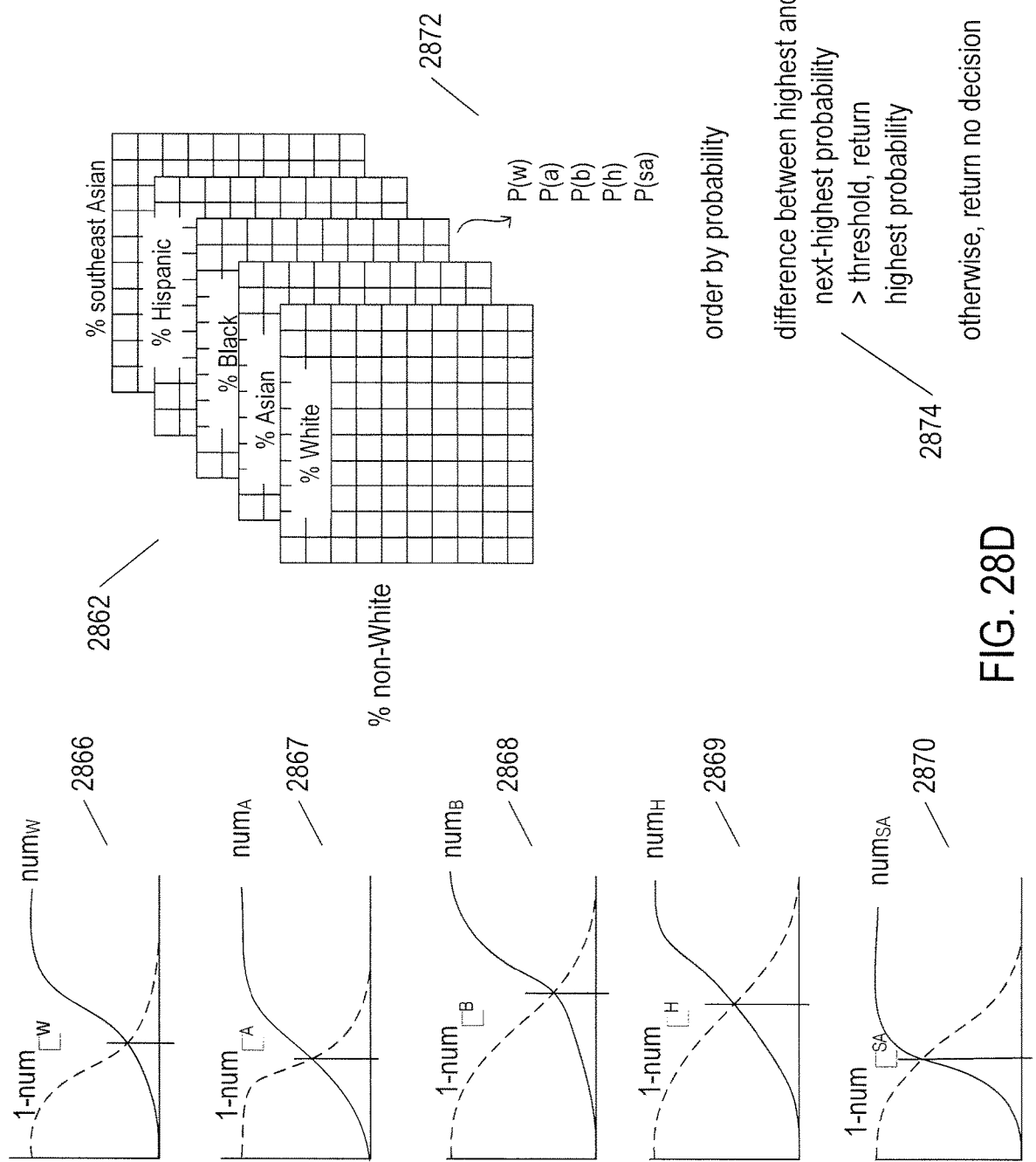

As shown in FIG. 28D, a similar approach is used to generate probability tables 2862 for aggregate classifiers that return one of multiple possible attribute values, such as the ethnicity aggregate classifier 2608 discussed above with reference to FIG. 26. In this case, multiple plots of positive and negative probability-distribution curves 2866-2870 are used to each generate a two-dimensional table, from which the probabilities 2872 of the ethnicity being each of the possible ethnicities can be computed from results output by the component classifiers. In one approach 2874, the most probable value is selected as the attribute value, when the difference in probability between the top two most probable attribute values is greater than a threshold difference. Otherwise, a no-decision result is returned. In other approaches, the most probably attribute value may be returned.

Figure 29:
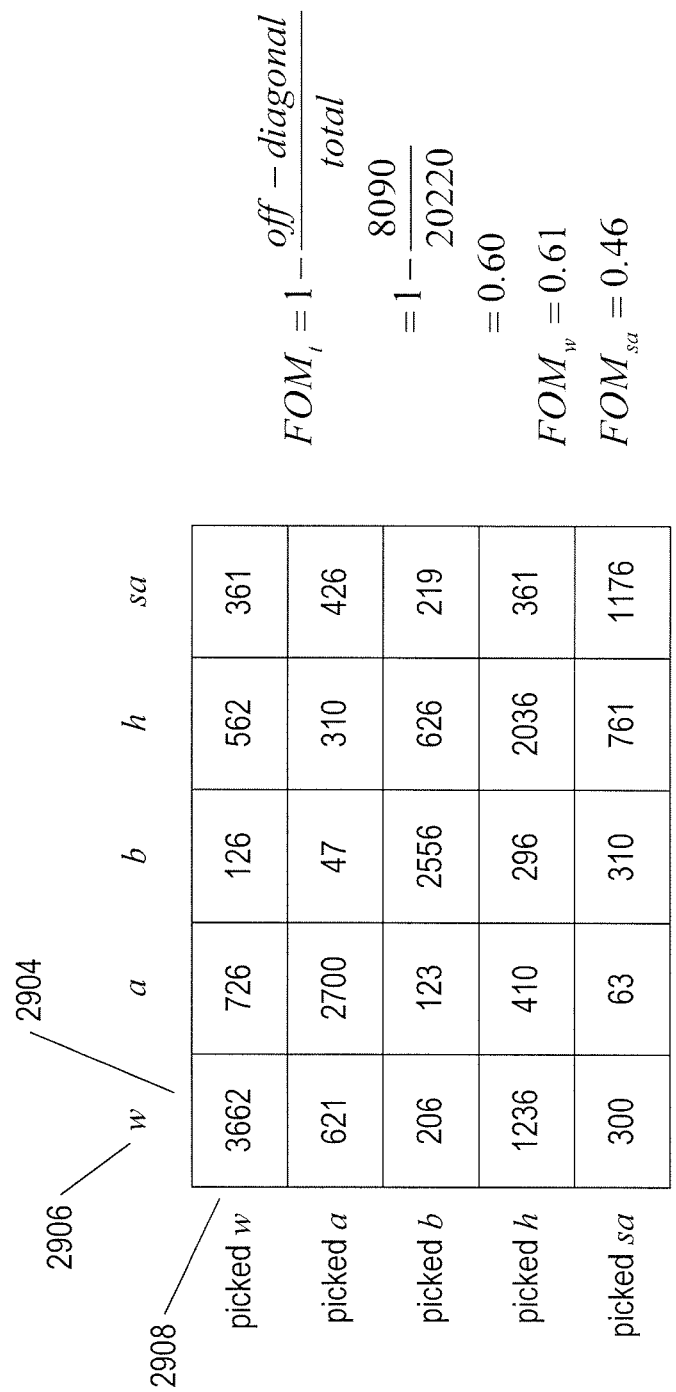
FIG. 29 illustrates a confusion matrix. The confusion matrix is obtained by observing the attribute values returned by a classifier for a number of input feature vectors with known attribute values.

FIG. 29 illustrates a confusion matrix. The confusion matrix is obtained by observing the attribute values returned by a classifier for a number of input feature vectors with known attribute values. The confusion matrix 2902 shown in FIG. 29 is a hypothetical confusion matrix for the ethnicity aggregate classifier 2608 discussed above with reference to FIG. 26. Each column, such as the first column 2904, represents a number of experiments in which feature vectors with a known attribute value, indicated above the column, such as the symbol "w" 2906 above column 2904, are input to the aggregate classifier and results collected. Each cell in the column, such as cell 2908, includes the number of input feature vectors with the known attribute corresponding to the column that returned the attribute value associated with the row in which the cell is located. Cell 2908 indicates that of 6025 feature vectors with known attribute w submitted to the aggregate classifier, where 6025 is the total number of counts in the first column 2904, the aggregate classifier returned the result w 3662 times. The diagonal dells in the confusion matrix represent correct classifications by the aggregate classifier and the off-diagonal cells represent incorrect classifications. Thus, a figure of merit ("FOM") can be computed for the full confusion matrix as:

$$FOM_{total} = 1 - \frac{\sum_{i \neq j} count_{i,j}}{\sum_{i,j} count_{i,j}}$$

or for a single column as:

$$FOM_j = 1 - \frac{\sum_{i \neq j} count_i}{\sum_i count_i}.$$

The FOM ranges over the interval [0,1] with the value 1 representing the best possible confusion matrix. The confusion matrices and corresponding FOMs corresponding to different collections of individual component classifiers can be used, in an optimization method, to select the component classifiers for any given aggregate classifier in order to achieve an aggregate classifier with the maximum possible FOM.

Figure 30:
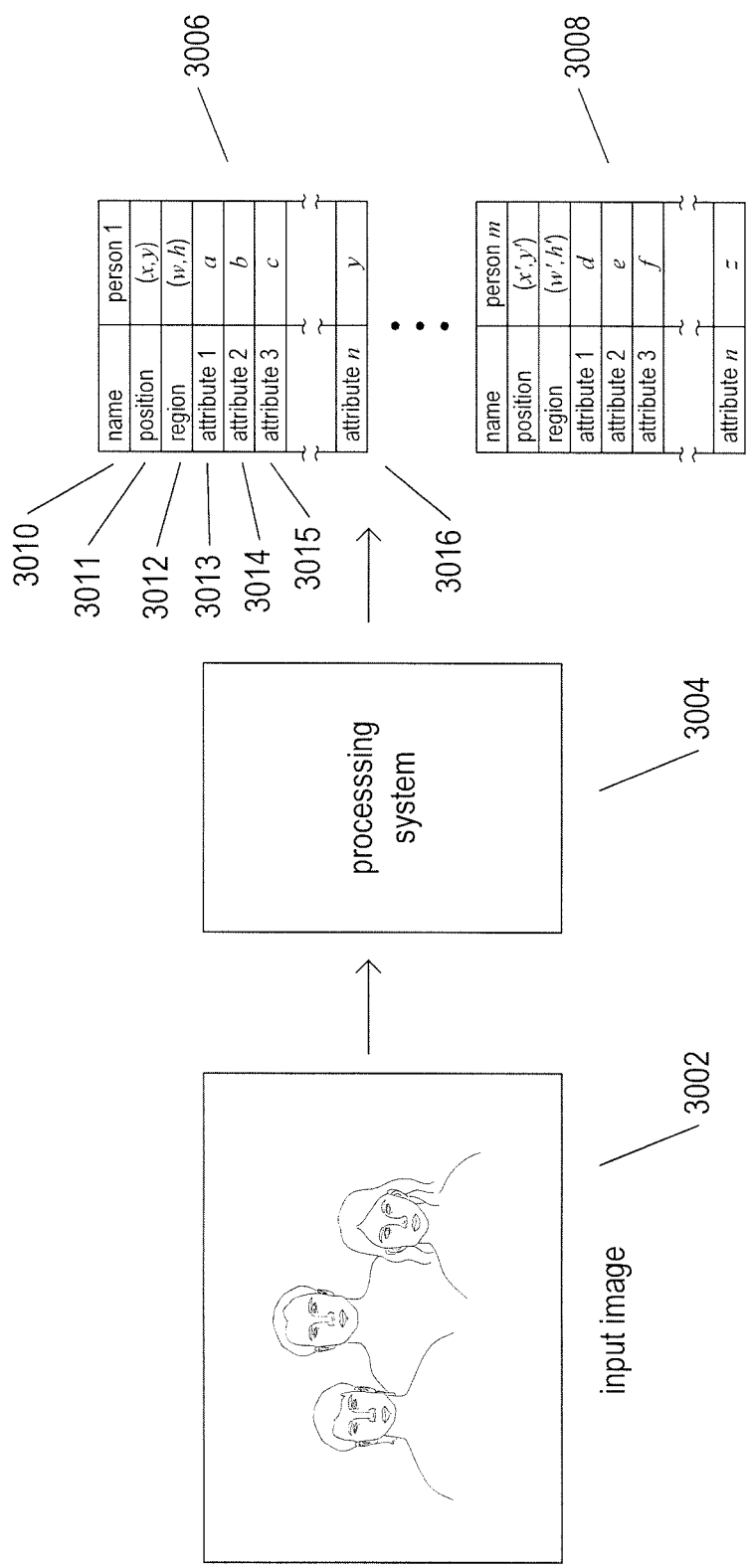
FIG. 30 illustrates the high-level operation of the attribute-assigning image-processing system to which the current document is directed.

FIG. 30 illustrates the high-level operation of the attribute-assigning image-processing system to which the current document is directed. An input image containing subimages of one or more human faces 3002 is input to the processing system 3004, and the processing system, in response, returns descriptors 3006 and 2008 for each face-containing subimage in the input image. Each descriptor, such as descriptor 3006, may include a name and/or identifier for the subimage 3010, values 3011 and 3012 that specify the location and size of the subimage, and attribute values assigned to each of a number of face-containing-subimage attributes 3013-3016, such as gender, ethnicity, and age. Many additional types of attributes may be assigned values by different implementations of the attribute-assigning image-processing system.

Figure 31:
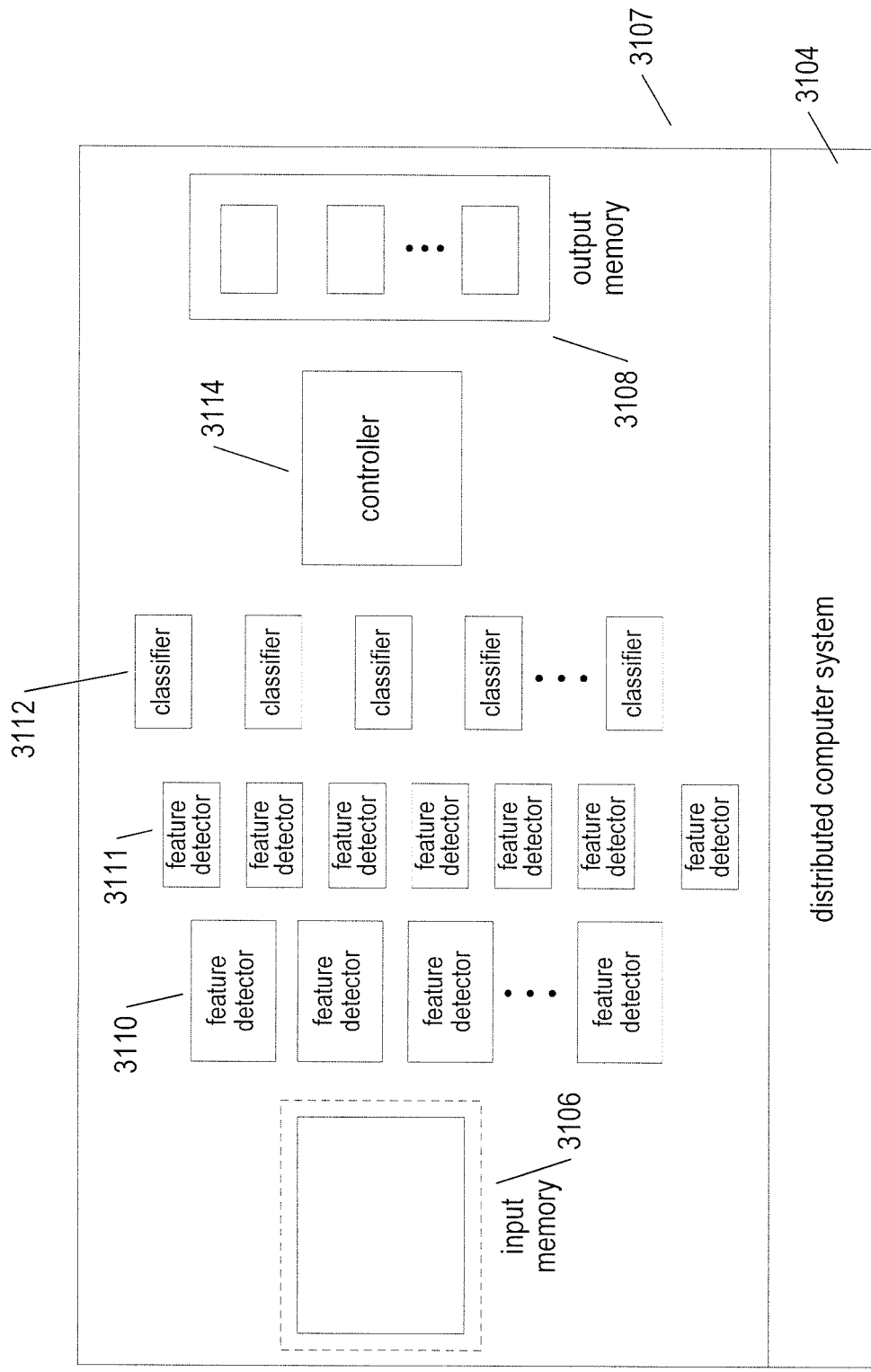
FIG. 31 illustrates one physical implementation of the attribute-assigning image-processing system to which the current document is directed.

FIG. 31 illustrates one physical implementation of the attribute-assigning image-processing system to which the current document is directed. The attribute-assigning image-processing system is implemented within a distributed computer system 3104, described in the first subsection of this document. Components of the attribute-assigning image-processing system include an input memory for storing input images 3106, and output memory in which descriptors of face-containing subimages are stored 3108, a set of first-level feature detectors 3110, such as the feature detectors discussed above with reference to FIGS. 24-25, a set of second-level feature detectors, such as feature detectors 2710-2716 discussed above with reference to FIG. 27, a set of attribute classifiers 3112, such as attribute classifiers 2720-2726 discussed above with reference to FIG. 27, and a controller 3114 that controls operations of the feature detectors and classifiers.

Figure 32:
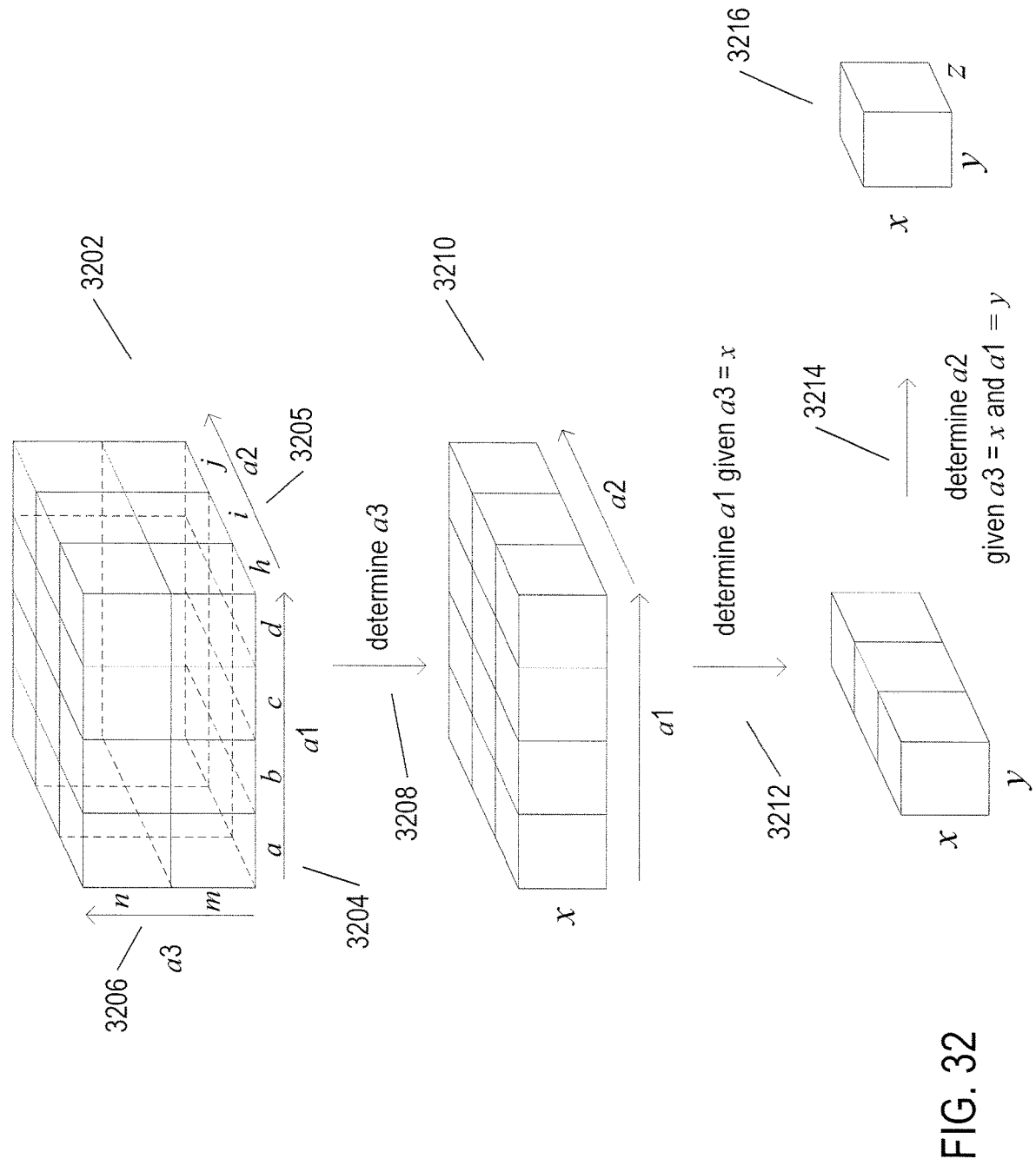
Figure 34:
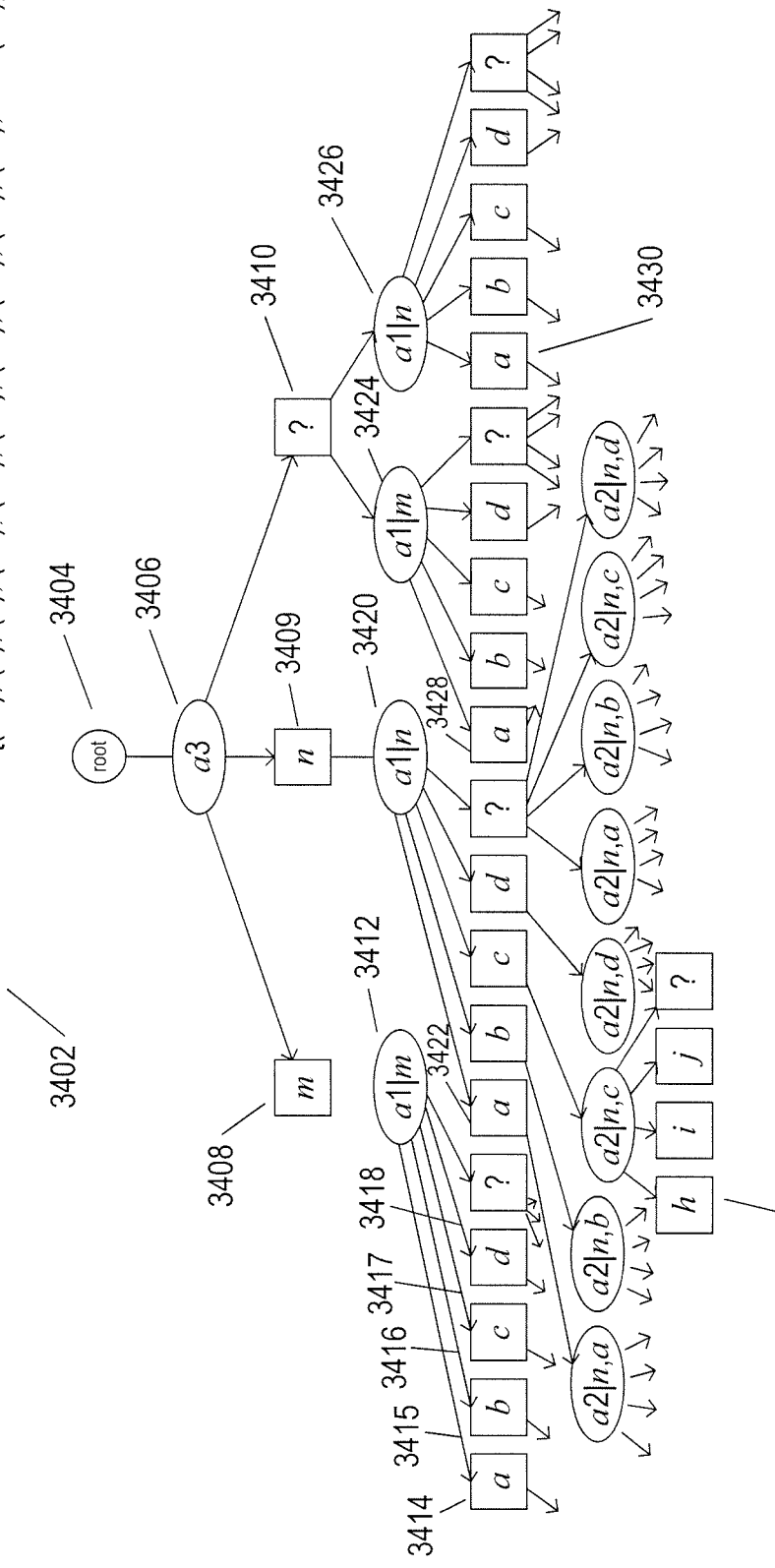

FIGS. 32-34 illustrate an efficient attribute-assignment method used in many implementations of the attribute-assigning image-processing system to which the current document is directed. In the discussion of this method, an example attribute-assignment problem is used in which the attribute-assigning image-processing system assigns values for the three attributes a1, a2, and a3 to each face-containing subimage in an input image. The full attribute-value space 3202 is represented in FIG. 32 by a Cartesian volume defined by mutually orthogonal axes 3204-3206 corresponding to attributes a1, a2, and a3, respectively. Attribute a1 can be assigned one of four values a, b, c, and d. Attribute a2 can be assigned one of three values i, j, and k. Attribute a3 can be assigned one of two values m and n.

The efficient method for attribute assignment orders the attributes a1, a2, and a3 by the reliability and robustness of the attribute classifiers used to determine values for the attributes. In the example of FIGS. 32-34, the order is: a3>a1>a2. The order can be determined from the FOMs for the attribute classifiers or by other means. Because the attribute classifier for attribute a3 is most reliable in classifying subimages, that classifier is first applied 3208 to greatly reduce the volume of the attribute-value space. The remaining attribute-value space 3210 is half the volume of the initial attribute-value space 3202. Because attribute classifiers return a probability along with the determined attribute value, whether or not the first-applied attribute classifier is effective in reducing the size of the attribute-value space can be ascertained from the probability associated with the returned attribute value. Given that the attribute assignment made by the first-applied attribute classifier appears reliable, then the next most reliable attribute classifier, in the current example, the attribute classifier for attribute a2, is next applied 3212. However, a modified attribute classifier is applied, when available. The modified attribute classifier is trained to return a value for attribute a2 assuming that attribute a1 has the value assigned by the first-applied attribute classifier. By using a more specific training, the reliability of a conditional classifier is often greater than that of an unconditional classifier. In other words, the task carried out by a conditional classifier is generally simpler, because the attribute-value space operated on by a conditional classifier is smaller than the attribute-value space remaining after successful previous application of one or more other attribute classifiers. Thus, the modified attribute classifier is trained on subimages with a known value for attribute a1. This type of attribute classifier is referred to as a conditional attribute classifier, since the conditional attribute classifier returns an attribute value with a conditional probability based on the value of the attribute previously assigned by the first-applied attribute classifier. When the second attribute assignment is associated with an acceptable probability, a third conditional attribute classifier for attribute a2 is then applied 3214 to assign a final value to the final attribute. This conditional attribute classifier returns an assignment of value to attribute a2 assuming that the previous assignments of values to attributes a3 and a1 are correct. At this point, a single set of values for all three attributes 3216 has been determined.

FIG. 33 illustrates the various possible unconditional and conditional attribute classifiers that may be developed for the example attribute-value space discussed above with reference to FIG. 32. The attribute-value space 3202 is shown again at the top of the figure. Three columns labeled a1 3302, a2 3303, and a3 3304 show the possible unconditional and conditional attribute classifiers for the three attributes a1, a2, and a3. In general, the reliability order for the unconditional classifiers may be determined, so that only a subset of the unconditional classifiers are need. However, various additional attribute classifiers may be developed for handling different types of input images in various implementations of the currently disclosed attribute-assigning image-processing system. Note that the various attribute classifiers are labeled with identifying integers, in parentheses.

FIG. 34 illustrates, using a possible-search-path-like tree, the method for efficient attribute assignment discussed above with reference to FIG. 32. As indicated at the top of FIG. 34, 3402, the attribute order a3>a1>a2 is assumed and attribute classifiers 28, 5, 16, 20, 21, 22, 23, 24, 25, 26, and 27, discussed above with reference to FIG. 33, are available. The root node 3404 represents the beginning of attribute assignment. Node 3406 represents application of the unconditional attribute classifier for attribute a3. The three child nodes 3408-3410 of node 3406 represent the possible outcomes of the application of the unconditional attribute classifier for attribute a3. When the unconditional attribute classifier for attribute a3 returns the attribute value in with a sufficiently high associated probability, as represented by node 3408, then a conditional attribute classifier for attribute a1 is applied, assuming a3=m, as represented by node 3412, and further child nodes 3414-1418 represent the possible outcomes. When the unconditional attribute classifier for attribute a3 returns the attribute value n with a sufficiently high associated probability, as represented by node 3409, then a conditional attribute classifier for attribute a1 is applied, assuming a3=n, as represented by node 3420, and further child nodes, such as child node 3422, again represent the possible outcomes. When the unconditional attribute classifier for attribute a3 cannot choose between attribute values m and n with a sufficiently high associated probability, as represented by node 3410, then the attribute-assignment path bifurcates, at node 3410, with two conditional attribute classifiers for attribute a1 applied, as represented by nodes 3424 and 3426, and further child nodes, such as child nodes 3428 and 3430, again represent the possible outcomes. The attribute assignments made in each of the assignment paths represented by nodes 3424 and 3426, and lower nodes, are compared, once completed, and the attribute assignments with highest probability are selected. Note that, should the remaining attribute values for attributes a1 and a2 be assigned in one or both of the branching assignment paths represented by nodes 3424 and 3426, and if the conditional attribute classifier for attribute a3 appropriate for those assignments available (one of attribute classifiers 7-12 in FIG. 33), then that conditional attribute classifier for attribute a3 can be applied to determine whether, with the additional attribute assignments now made, whether attribute a3 can now be assigned a value with sufficient probability.

Figure 35A:
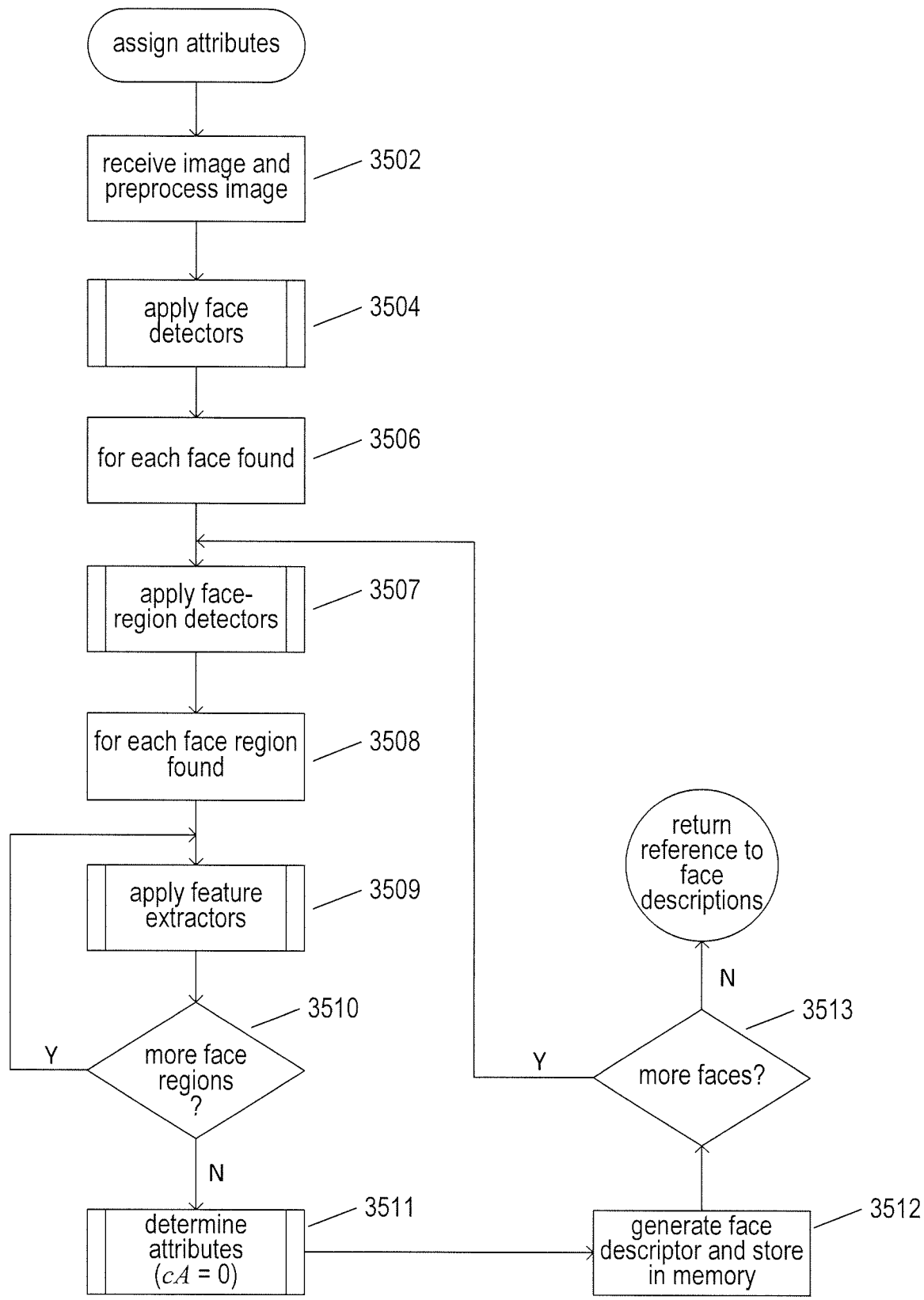
FIGS. 35A-D illustrate one implementation of controller 3114 discussed with reference to FIG. 31.

FIGS. 35A-D illustrate one implementation of controller 3114 discussed with reference to FIG. 31. This controller employs the attribute-assignment method discussed above with reference to FIGS. 32-34. FIG. 35A provides a control-flow diagram for the controller. In step 3502, an input image is received and preprocessed, as discussed above, to normalize the image with respect to digital representation, scale, contrast, and other factors. In step 3504, the face-region detector is applied, as discussed above with reference to FIG. 24, to generate a face-containing subimage for each face image in the input image. In the outer for-loop of steps 3506-3513, each identified face subimage is processed. In step 3507, normalized regions are generated for the currently considered face subimage by applying the face-subregions detector and normalization operations, as discussed above with reference to FIGS. 24-25. In the inner for-loop of steps 3508-3510, second-level feature extractors are applied to the normalized regions, as discussed above with reference to FIG. 27. In step 3511, the recursive routine "determine attributes" is called to apply attribute classifiers, as discussed above with reference to FIGS. 27 and 32-34, to assign attribute values to the attributes for the currently considered face-containing subimage. In step 3512, a descriptor is generated for the currently considered face-containing subimage, as discussed above with reference to FIG. 30. When the outer for-loop of steps 3506-3513 terminates, descriptors are produced for the identified face-containing subimages.

Figure 35B:
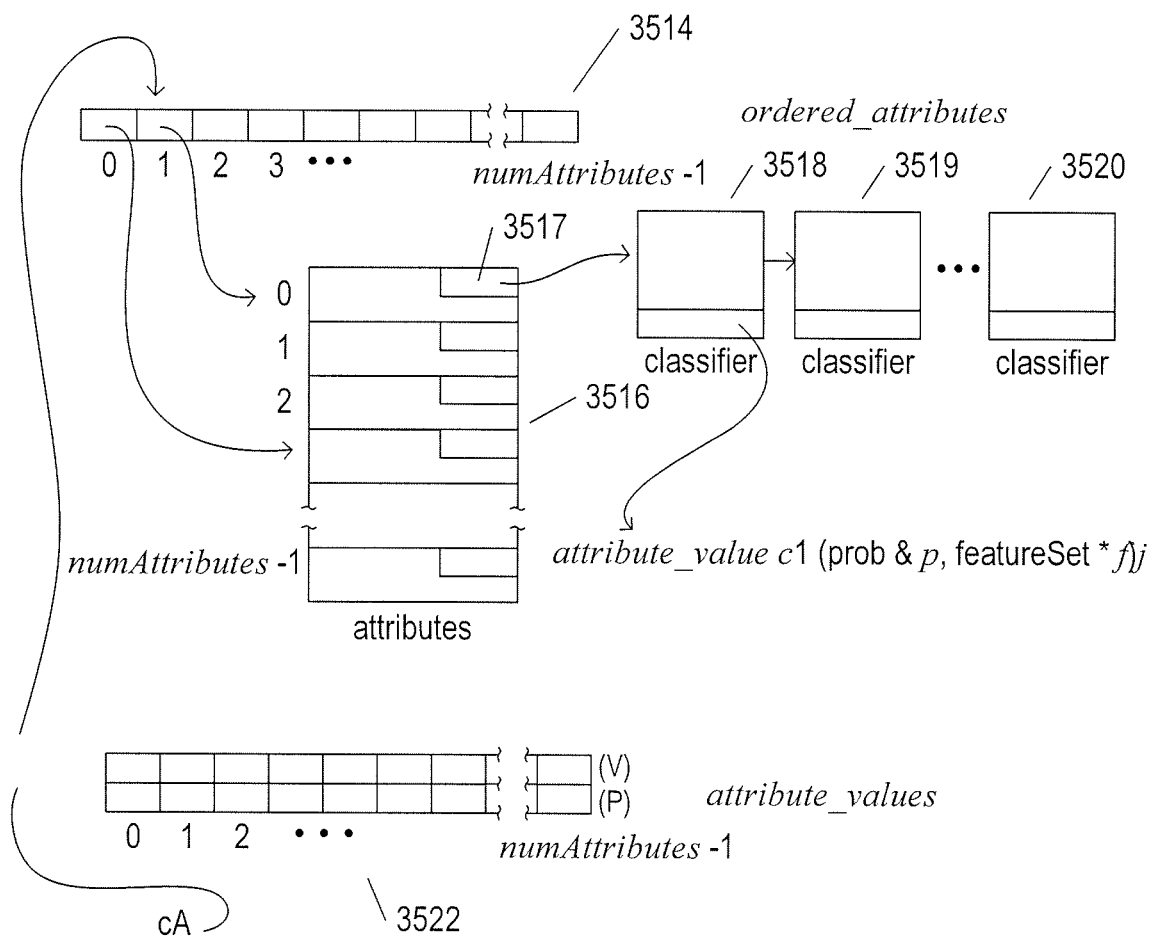

FIG. 35B illustrates certain data structures used by the recursive routine "determine attributes." An array ordered_attributes 3514 includes indexes into an attributes data structure 3516. The order of the indexes reflects the order in which attribute classifiers for the indexed attributes are applied, as discussed above with reference to FIGS. 32-34. The attributes data structure 3516 includes descriptors for the attributes, each descriptor including a reference, such as reference 3517, to a list of attribute classifiers available for the attribute, as discussed above with reference to FIG. 33. The two-dimensional array attribute_values 3522 includes indications of the attributes and associated probabilities assigned to attributes. The variable numAttributes includes a value that represents the number of attributes for which assignments are made.

Figure 35C:
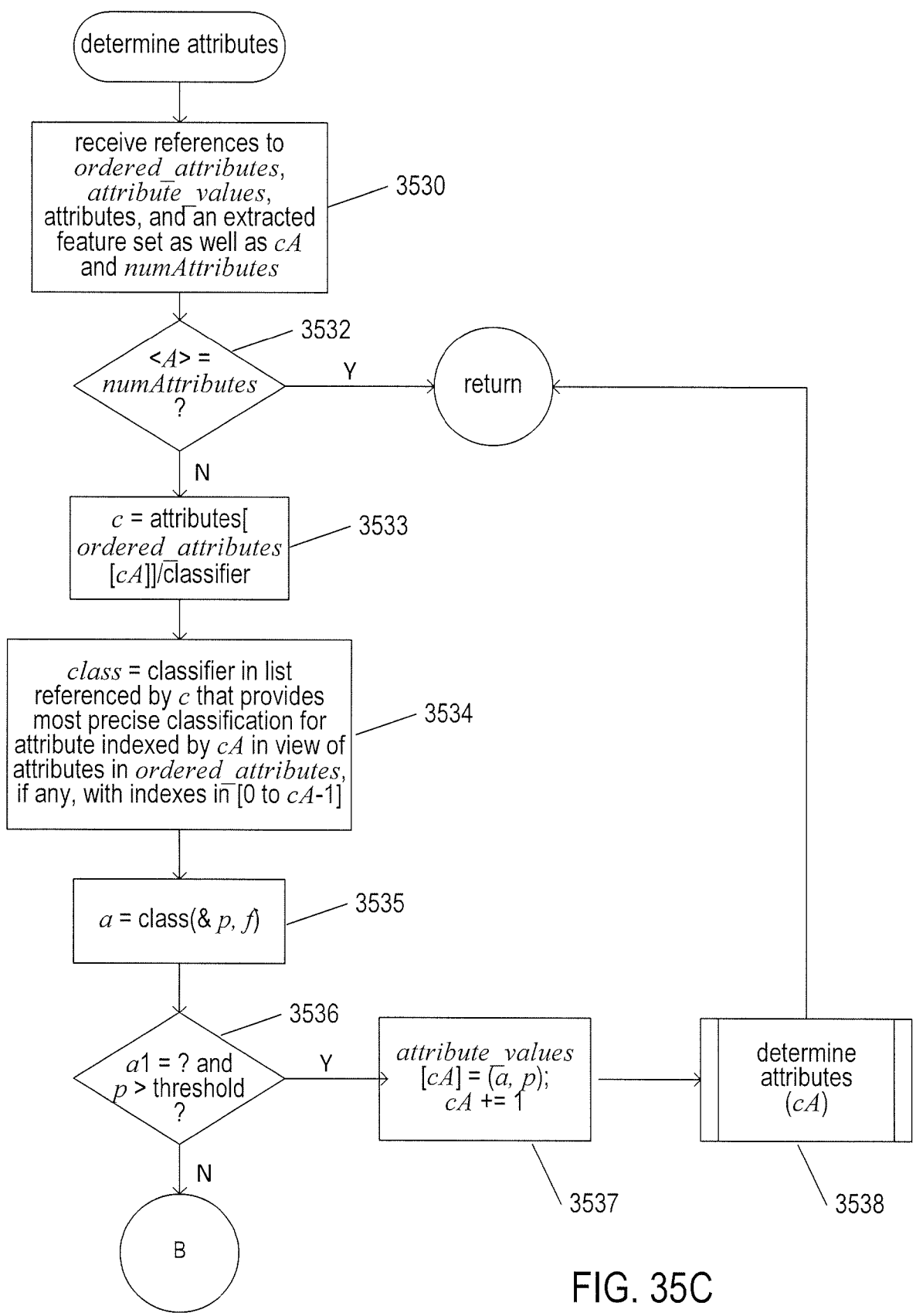
Figure 35D:
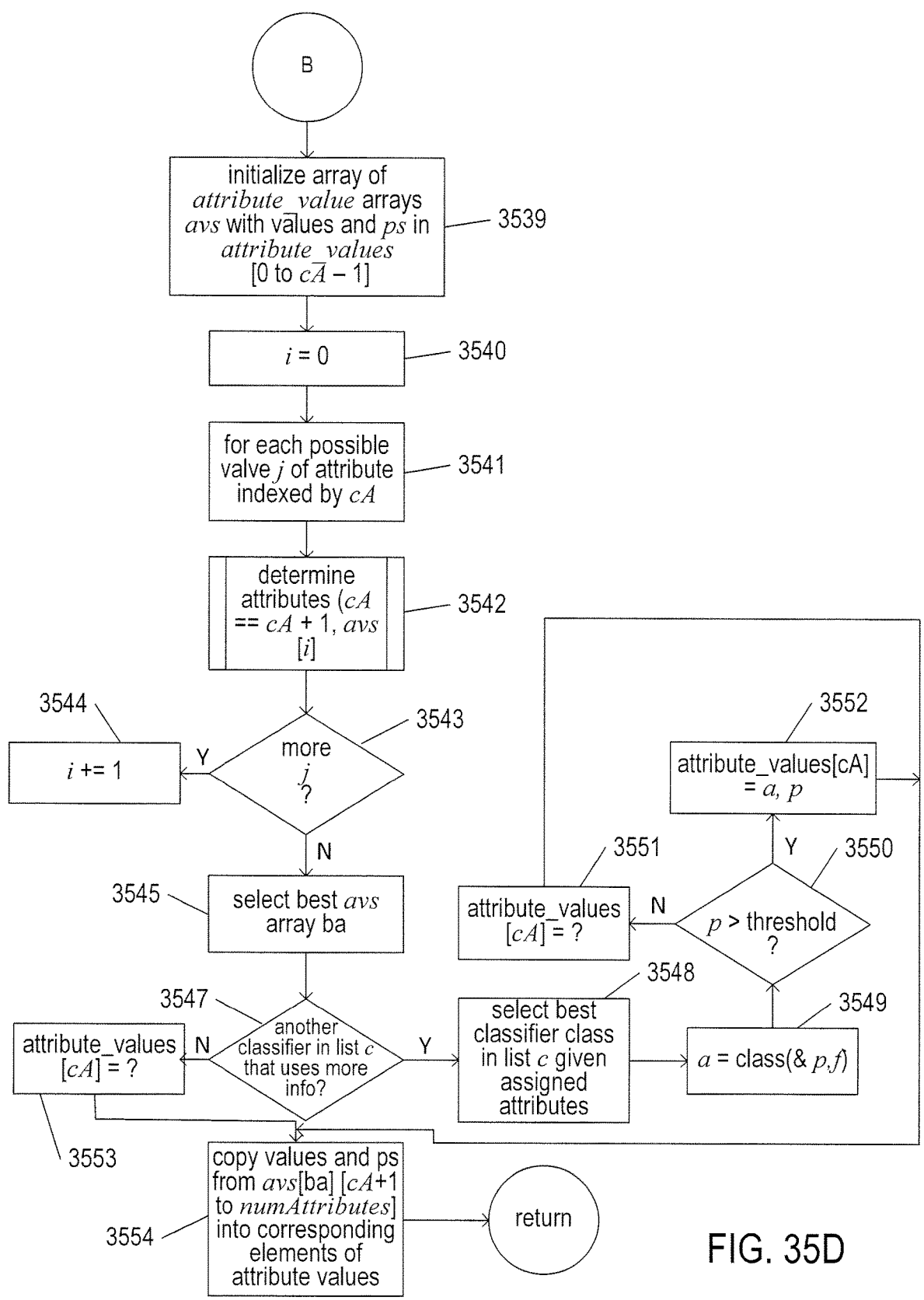

FIGS. 35C-D provide a control-flow diagram for the recursive routine "determine attributes," called in step 3511 of FIG. 35A. In step 3530, the routine "determine attributes" receives the data structures discussed above with reference to FIG. 35B, the feature vectors produced by the second-level feature detectors, in step 3509 of FIG. 35A, an a variable cA that indicates which attribute that needs to be next assigned a value. When the value in variable cA is greater or equal to the value in numAttributes, as determined in step 3532, all attribute values are assigned, in which case the current instance of the routine "determine attributes" returns. Otherwise, in step 3533, the variable c is set to reference the list of classifiers for the currently considered attribute. In step 3534, a classifier reference by the variable class is selected. This classifier is the classifier that is best suited for application to the feature vectors to determine a value for the currently considered attribute, based on the values already assigned to attributes, if any. In step 3535, an attribute value a and an associated probability p are generated by applying the classifier reference by the reference stored in the variable class. When the classifier returns a definite attribute value a with an associated probability p greater than a threshold value, as determined in step 3536, the returned values a and p are placed into the array attribute_values and cA is incremented, in step 3537, and the routine "determine attributes" is recursively called in step 3538. Otherwise, an attribute-assignment-path bifurcation occurs, and control flows to step 3539 of FIG. 35D.

In step 3539, an array of attribute_value arrays, avs, is initialized. Each attribute_value array in avs is initialized to contain the current attribute assignments. Each attribute value array in avs is used for a separate recursive call to the routine "determine attributes." In the for-loop of steps 3541-3544, the routine "determine attributes" is recursively called for each possible attribute value of the currently considered attribute, indexed by the value in cA. Following termination of the for-loop of steps 3541-3544, the attribute_value array in avs with the best associated probabilities is selected as the best assignment of attributes following the currently considered attribute, in step 3545. When, based on the values assigned to the following the currently considered attribute, there is another, more specific classifier for the currently considered attribute, as determined in step 3547, then that classifier is applied, in steps 3548-3549 to the feature vectors. When the more specific classifier returns an attribute with an associated probability greater than a threshold value, as determined in step 3550, the returned attribute value and associated probability are entered into the array attribute_values in step 3552. Otherwise, an indication that a value for the currently considered attribute cannot be determined is entered into the array attribute_values in step 3551. When there is no additional classifier to apply, as determined in step 3547, an indication that a value for the currently considered attribute cannot be determined is entered into the array attribute_values in step 3553. Finally, the attribute values for attributes following the currently considered attribute are copied from the selected avs array into the array attribute_values, in step 3554.

Methods and Systems that Identify and Characterize Face Tracks in Video

The current document is directed to methods and systems that apply the attribute-assignment methods, discussed above, to video in order to identify and characterize face tracks representing the presence of individuals within the space and time imaged by the video. These face tracks may be used for a variety of different purposes, including identifying particular individuals in surveillance videos, recognizing human-associated events in videos, interpreting the subject matter of videos and portions of videos, and for many other purposes.

FIG. 36 illustrates a video. Videos are normally produced by video cameras or other types of image-acquisition devices that capture successive images, or frames, over time. Each frame of a Motion-JPEG-encoded video is a still image, similar to the above-described digital images, but when a sequence of video frames is displayed through a video-display device, the displayed sequence of frames appears to be a continuous, moving image. Other types of video-encoding technologies compress frames by storing only a small portion of the frames, at regular intervals in the frame sequence, and by storing compressed information for the intervening frames based on motion vectors, quantization, and other compression techniques. While either type of video stream can be employed in the subsequently disclosed surveillance systems, Motion JPEG video streams generally involve lower processing overheads and the compression ratios obtainable by the compression-based techniques may be sufficiently low, for video of high-traffic areas, that the computational overheads involved in compression are not justified by the decrease in data-storage overheads. IN the remaining discussion, Motion JPEG video streams are assumed. As shown in FIG. 36, a video can be considered to be a sequence of successive frames 3602 associated with a temporal axis 3604. In most cases, frames are captured at regular intervals. The number of frames captured during a particular unit of time, where an example unit of time is demarcated by dashed lines 3606 and 3608 in FIG. 36, is referred to as the "frame rate" for the video 3610. Videos are characterized by many different parameters, including the type of digital encoding used to encode the still-image frames, the color model used in the encoding, the frame size, the frame rate, the camera type, and many other such parameters.

In the video-processing methods described below, the frames of a video are broken up into chunks. At the bottom of 36, a temporal axis 3612 represents a period of time, or, equivalently, a large number of frames spaced at regular intervals in time, within a video. A chunk-size parameter is used to divide the sequence of frames into chunks of a fixed size, such as chunk 3614. Certain sophisticated video-capture devices may use variable frame rates, in which case chunks may be determined either by a fixed elapsed time during normal-speed playback or recording or by a fixed number of frames.

Figure 37A:
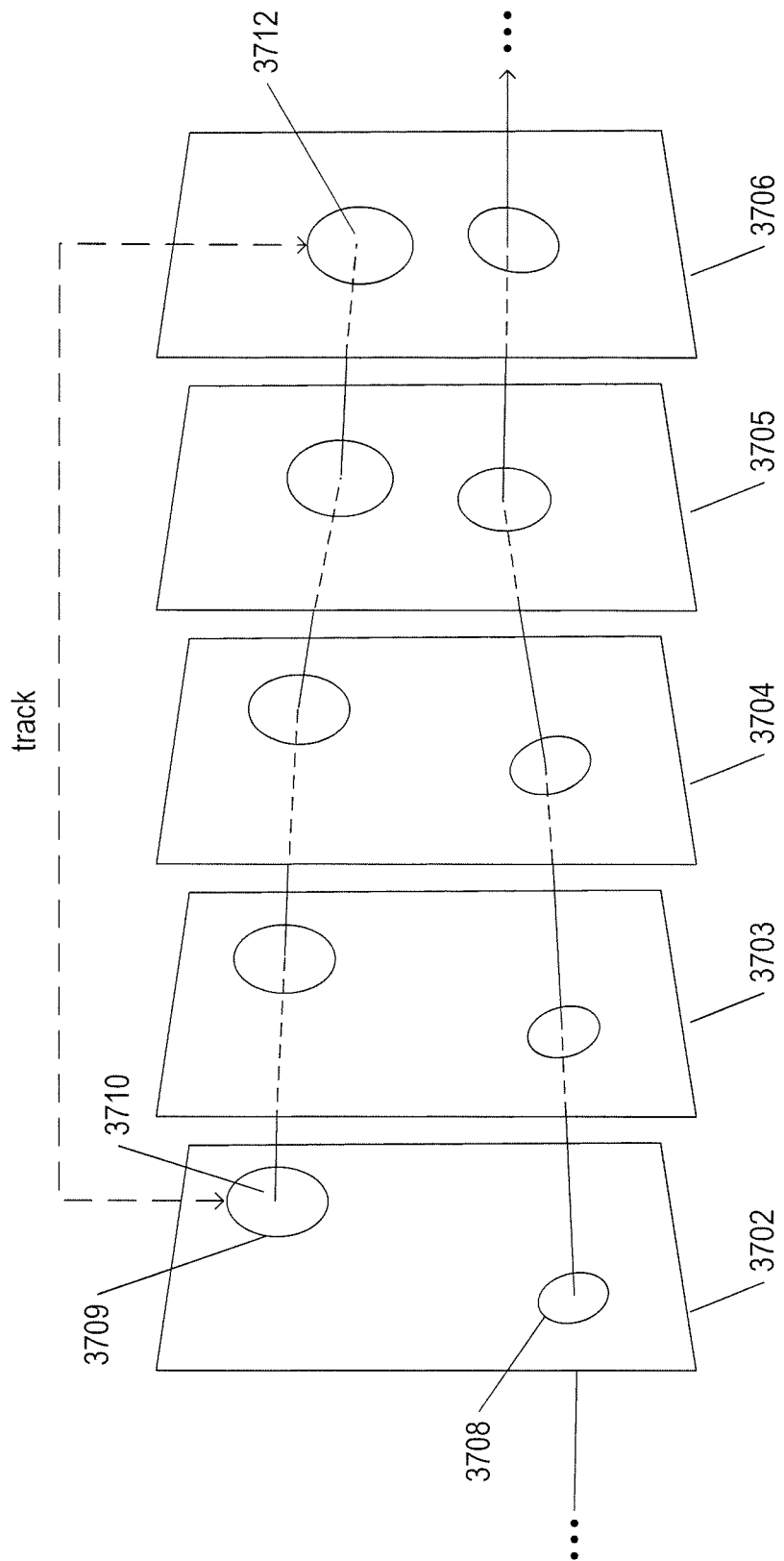
FIGS. 37A-D illustrate face tracks within videos.

FIGS. 37A-D illustrate face tracks within videos. In FIG. 37A, a number of frames within a video are shown in time order or, equivalently, ordered by frame sequence number. The frames may or may not be consecutive, but are at least closely spaced in time. There are two faces in each of the frames, represented by ellipses 3708 and 3709 in frame 3702 and by similar ellipses in the remaining frames 3702-3706. Because the scene from which the video is captured is dynamic, these face sub-images within the video frames change in location, size, and orientation over the course of time. For example, face 3709 moves from an upper-right-hand-corner position 3710 in FIG. 3702 to an upper-central position 3712 in frame 3706. Changes in location may correspond to changes in the position of the human, changes in position of the camera, changes in the orientation of the camera, changes in orientation of the individual possessing the face, or combinations of all four. Similarly, changes in the orientation of a face over the course of many frames may represent changes in the positioning of the head containing in the face in space, changes in the orientation of the camera, or both. Changes in the size of a face may correspond to changes in the relative distance between the camera and subject, changes in camera parameters, such as focal length or magnification, or combination of these different types of changes. Many other types of dynamic changes occur, including sufficient changes in the orientation of the face that the face is transformed, over time, from a full-face sub-image to a profile sub-image. Intensity, color, and other image properties may also change over time. A face track is the entire sequence of frames in between and including a first frame in which a particular face occurs, such as frame 3702 in the example shown in FIG. 37A, and the final frame in which the face appears, such as frame 3706 in the example shown in FIG. 37A. The face track includes all intervening video frames, including frames in which the face may be temporarily obscured or unrecognizable. Face tracks are allowed to have intervals of non-face-containing frames up a threshold number of frames, as they are identified during initial processing. Subsequent face-track-stitching operations may allow larger non-face-containing intervals to be spanned. A face track can be thought of as a cylindrical or tube-like volume in spacetime, with the time boundaries of the space-time volume defined by the times of acquisition of the first and final frames of the face track and the three-dimensional volume corresponding to the area occupied by the face sub-image within video frames integrated over time.

In general, the face-track-based approach disclosed in this document can be significantly more computationally efficient than alternative methods when the contents of the images in the video stream are dynamic, particularly when they are dynamic due to camera motion. Many alternative methods assume a static background and use background-subtraction to detect images of faces. When the background is not static, the computational overheads can geometrically increase, to the point that the processing machinery cannot keep pace with real-time or near-real-time video-stream processing.

Figure 37B:
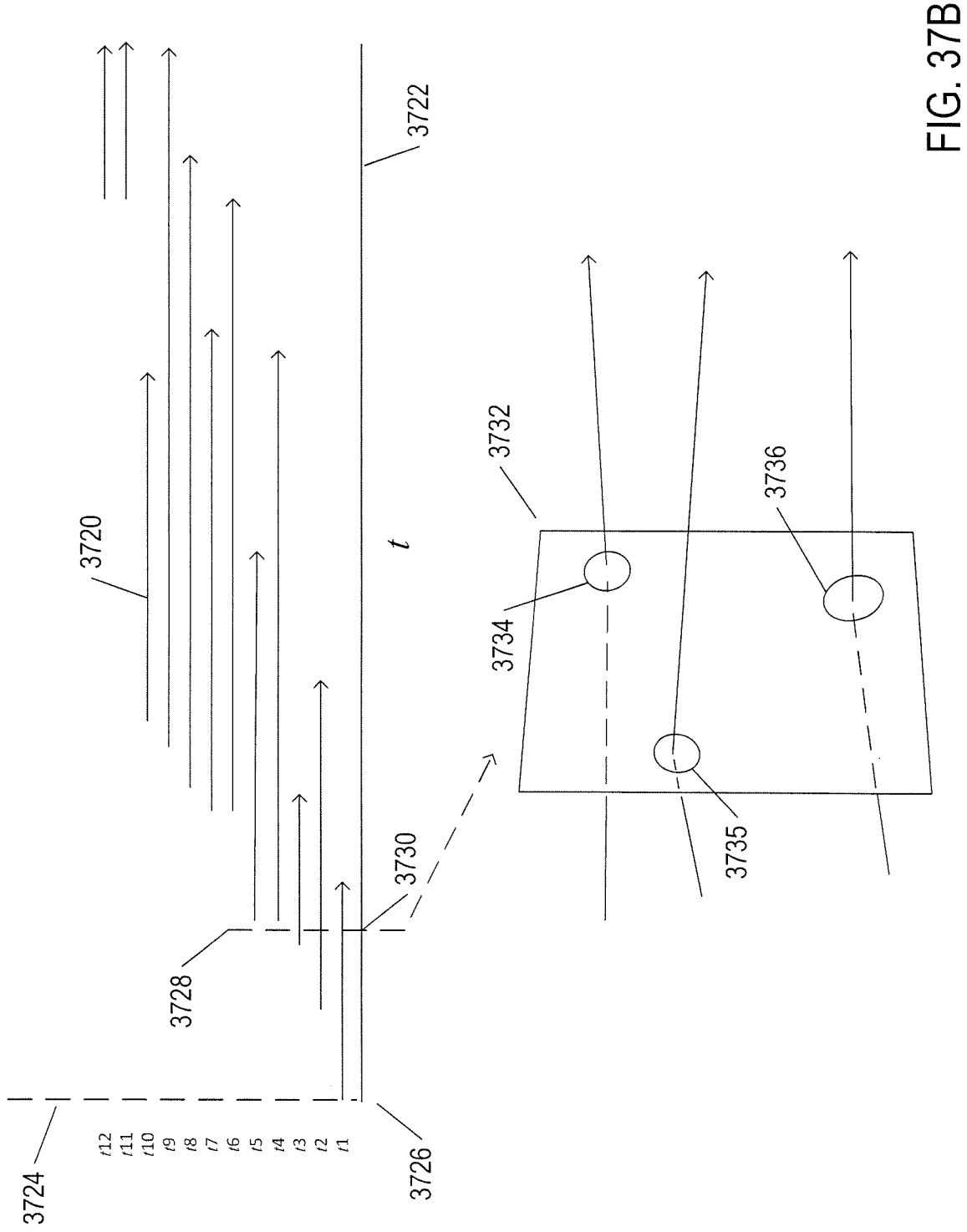

FIG. 37B illustrates multiple face tracks within a portion of a particular video. At the top of FIG. 37B, each face track is represented by a directed arrow, such as directed arrow 3720, plotted with respect to a horizontal time axis 3722 and a vertical track axis 3724. Face track 3720 is designated face track t10. As can be seen in plot 3726 of FIG. 37B, face tracks begin and end throughout the video. A particular frame within the video can be thought of as a cross-section 3728 through the face tracks at a particular instant in time 3730. The frame 3732 comprising the cross-section at time point 3730 includes three face sub-images 3734-3736 that represent cross-sections through the four-dimensional space-time volumes of face tracks t1, t2, and t3.

Figure 37C:
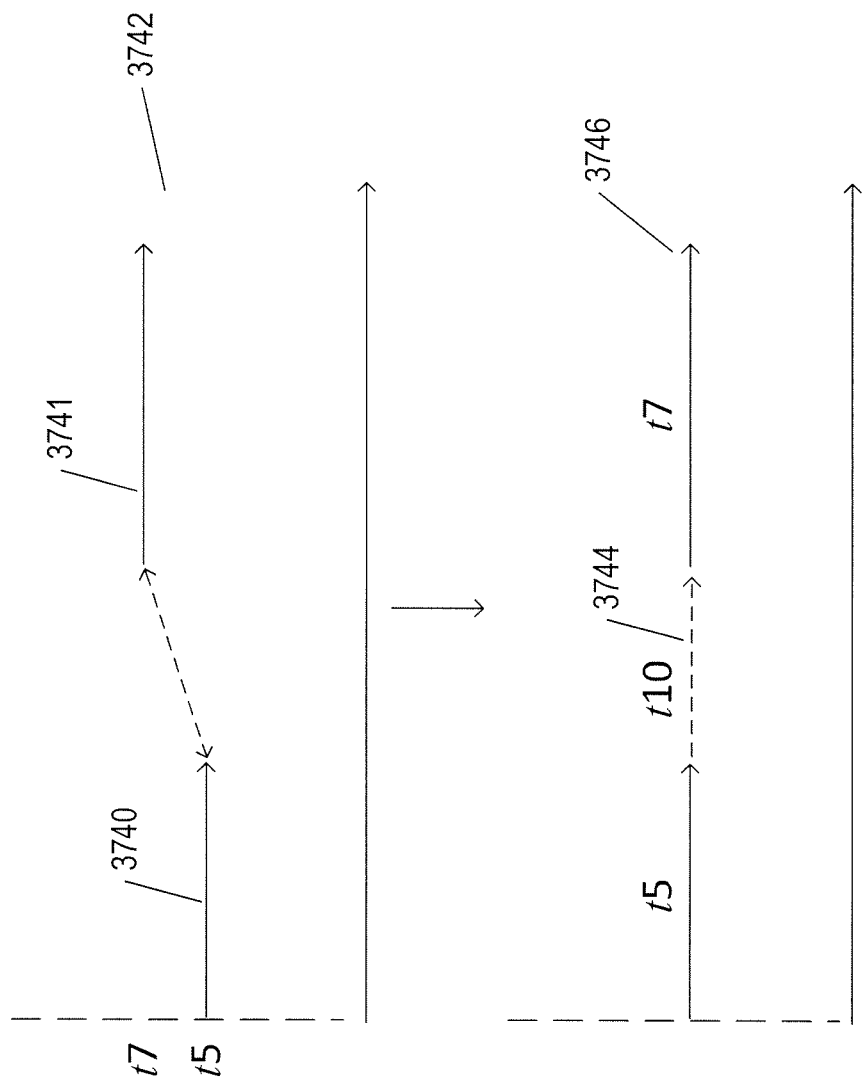
Figure 37D:
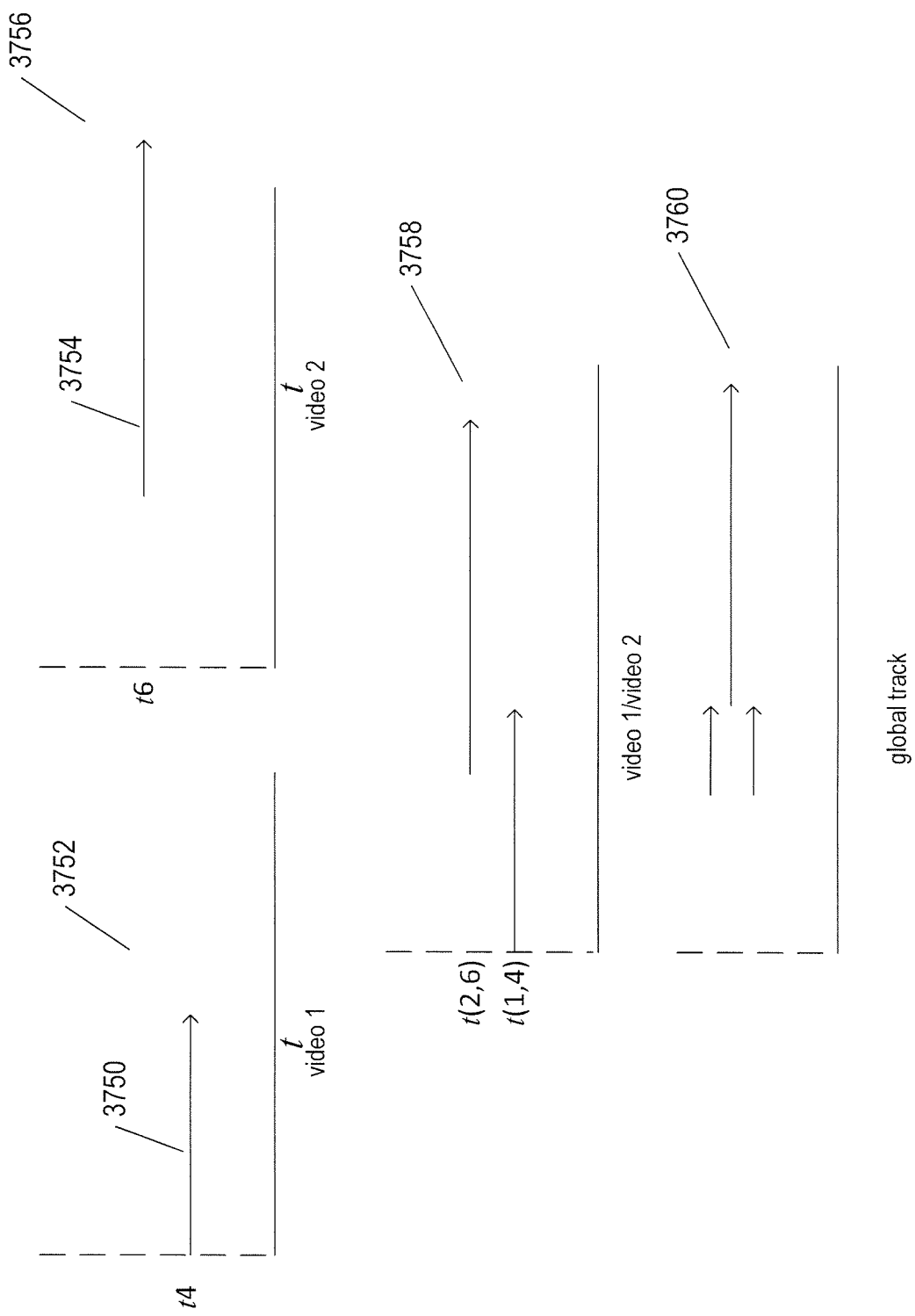

As shown in FIG. 37C, initial video processing may recognize two separate face tracks shown as face tracks t5 3740 and t7 3741 in plot 3742 at the top of FIG. 37C. Using attribute values for the face sub-image in the two tracks, a video-processing system may recognize that the two tracks correspond to the same individual or face. Therefore, the two face tracks may be combined, together with an intervening no-face track 3744, to produce a single continuous face track 3746 spanning the entire interval from the start of face track t5 to the end of face track t7. Similarly, as shown in FIG. 37D, two face tracks in two different videos that at least partially overlap with respect to the scenes that they include images of, face tracks t4 3750 in plot 3752 for a first video and face track t6 3754 in plot 3756 for a second video, may be recognized, by subsequent processing, to correspond to the same face and individual. The two face tracks are re-plotted in combined-video plot 3758. These two face tracks are combined, or stitched together, to produce a final face track 3760 that spans the period of time from the beginning of face track t4 to the end of face track t6. Face track-spanning videos may occur in a surveillance situation in which there are two surveillance cameras located at two different locations within a large space. A subject may be first imaged by a first camera as the subject enters the space at a near end of the space, may then be concurrently imaged by both cameras in the middle of the space, and then may be imaged by only the second camera as the subject leaves the space at the far end of the space.

Figure 38A:
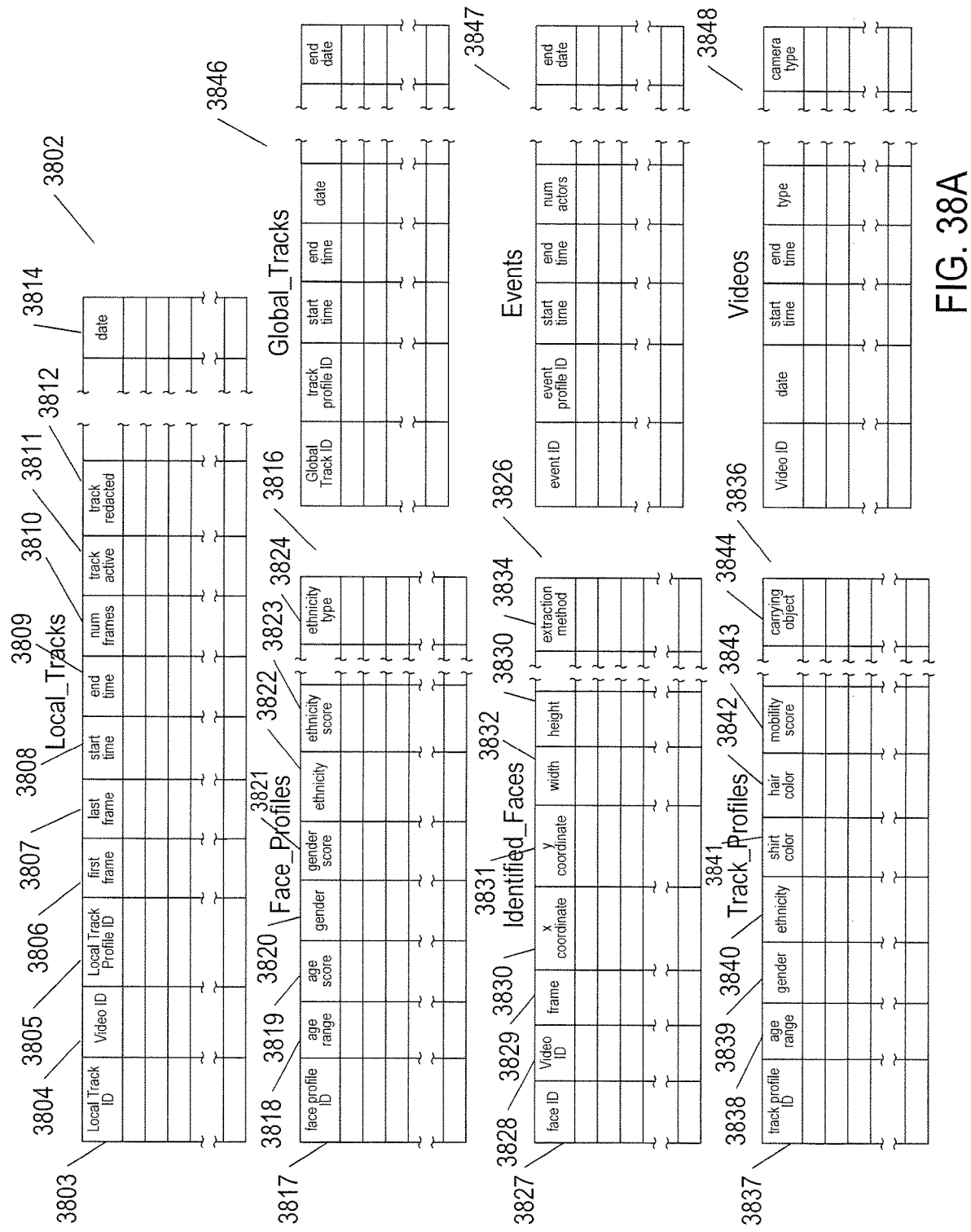
Figure 38B:
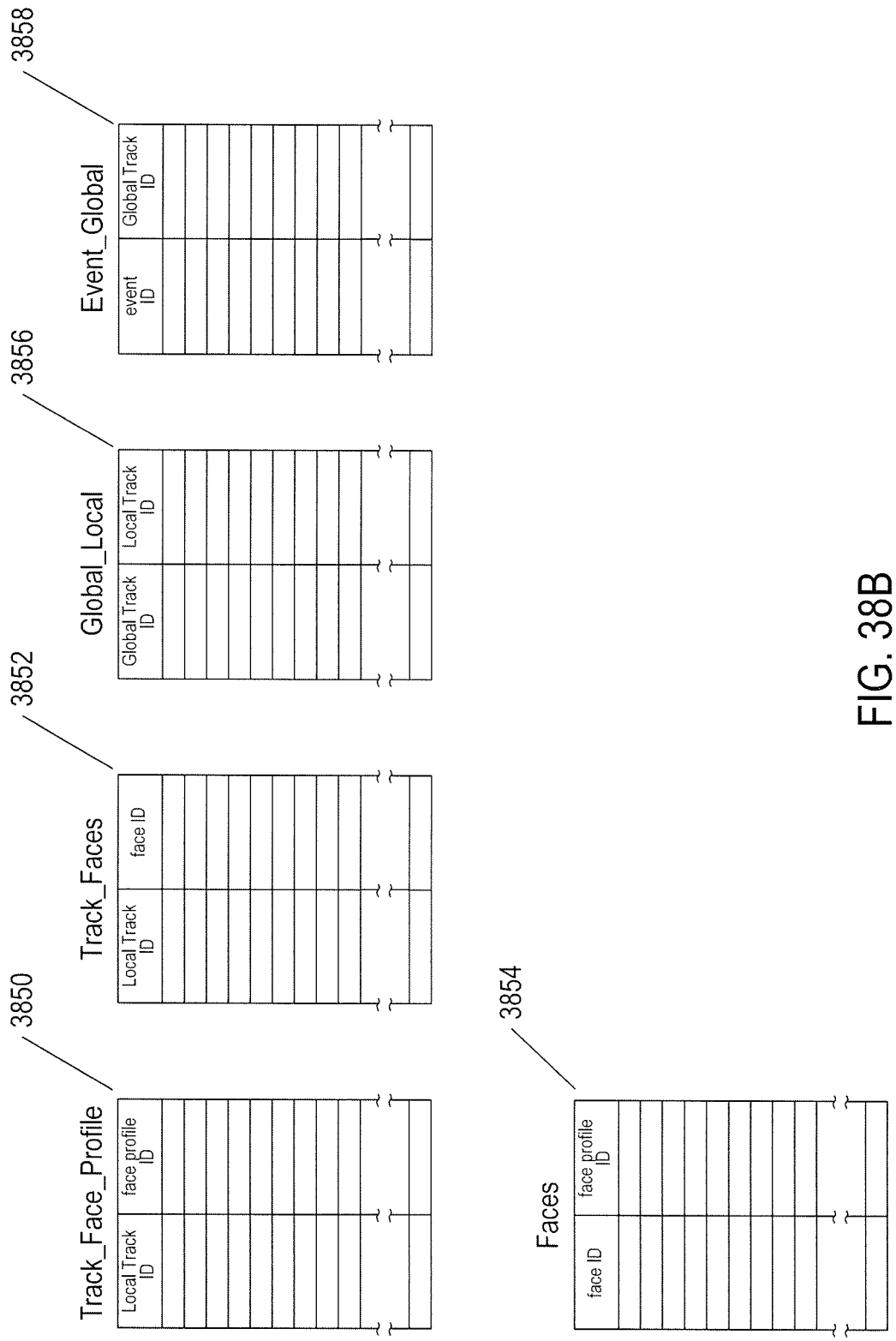

FIGS. 38A-C illustrate one relational-database implementation of a data-storage subsystem for the video-processing methods and systems to which the current document is directed. There are many possible alternative implementations, including database management systems that use alternative underlying organizational principles, including object-orientated databases and older hierarchical and network databases. In addition the data can be stored in various types of formatted records or text within file-system files that are indexed to provide for rapid searching and desired-value extraction. In many implementations, a significant portion of the data may be stored in memory or file-system files during immediate processing and then may be stored in database-management systems for longer-term analysis and higher-level processing.

FIG. 38A shows seven different relational-database tables that are used, in one implementation, to store certain of the data produced during video processing by the currently disclosed methods and systems. The local_tracks table 3802 stores entries, or rows, that each represent a face track identified within a particular video during initial processing. As with all relational-database tables, the rows in the table represent entries or records and the columns in the table represent fields within each record. Each entry in the local_tracks table includes the following fields, or columns: (1) local_track_ID 3803, a unique, generally numeric, identifier for the track; (2) video_ID 3804, a unique identifier for the video in which the face track occurs; (3) local_track_profile_ID 3805, a unique identifier for a track profile that includes attributes assigned to the track; (4) first_frame 3806, the sequence number of the first frame of the video in which the face corresponding to the face track occurs; (5) last_frame 3807, the sequence number of the last frame of the track; (6) start_time 3808, an indication of the starting time relative to the total time required to display the video at its specified frame rate; (7) end_time 3809, the relative ending time of the track; (8) num_frames 3810, the number of frames in the video; (9) track_active 3811, an indication of whether or not the face track is currently open or active with respect to initial video processing; (10) track_redacted 3812, an indication of whether or not the face track has been selected for removal or anonimyzation; (11) a broken field 3813 to indicate, for the local_tracks table, with the same conventions used in the following tables, that there may be one or more additional fields in any particular implementation; and (12) date 3814, the date when the video was acquired by a video-capture device. In alternative approaches, some of which are discussed below, timestamps are used, rather than sequence numbers, and thus a large portion of the computational effort needed to translate sequence numbers into time points is avoided.

The relational-database table face_profiles 3816 stores entries that each describe attributes assigned to a recognized face within a video frame. Fields in these entries include: (1) face_profile_ID 3817, a unique identifier for the face profile; (2) age_range 3818, an indication of the age range associated with a recognized face; (3) age_score 3819, a probability or score associated with the age_range value that indicates a confidence or estimated reliability of the value assigned to the attribute age_range; (4) gender 3820, an indication of the gender of the individual corresponding to the imaged face; (5) gender score 3821, a probability or score associated with the gender attribute to indicate a confidence in the value assignment to the gender attribute; (6) ethnicity 3822, an indication of the ethnicity of the individual corresponding to an imaged face; (7) ethnicity_score 3823, a confidence level, probability, or score associated with the value assignment to the ethnicity attribute; and (8) expression_type 3824, an indication of the type of expression attributable to the imaged face. Again, these fields are examples of the types of fields that may occur in the face_profiles-table entries. Different implementations may use fewer, more, or different fields, the majority of which correspond to attributes associated with face sub-images. In an implementation described below, for example, probabilities for all possible attribute values of an attribute are stored.

Relational-database table identified_faces 3826 stores entries that each describe position, dimension, and other parameters of an identified face within a video frame. Example fields for entries in this table include: (1) face_ID 3827, a unique identifier for the identified face; (2) video_ID 3828, an identifier for the video in which the face was identified; (3) frame 3829, the number of the frame within the video that includes the identified face; (4) x_coordinate 3830, the x coordinate for the centroid for the face sub-image; (5) y_coordinate 3831, they coordinate for the position of the centroid of the face; (6) width 3832, the width of an enclosing rectangle that includes the face sub-image; (7) height 3833, the height of the enclosing rectangle of the face sub-image; and (8) extraction_method 3834, an indication of the face-extraction method used to obtain the face.

The table track_profiles 3836 contains entries that each describe a profile associated with a face track, the profile including various types of attribute values obtained by analysis of the face profiles associated with the face sub-images corresponding to the face track of the frames within the track. In the example shown in FIG. 38A, each face track entry includes the fields: (1) track_profile ID 3837, a unique identifier for the face-track profile; (2) age_range 3838; (3) gender 3839; (4) ethnicity 3840; (5) shirt color 3841; (6) hair color 3842; (7) mobility score 3843, an attribute that indicates the spatial mobility of the individual whose face is represented by the track; and (8) carrying_object 3844, an indication of whether the individual whose face corresponds to the face track can be ascertained to be carrying an object in the video. Again, as with all tables, these are simply examples, and alternative implementations may use fewer, a greater number of, or different fields in each entry of the table track_profiles. As one example, confidence scores for each attribute-value assignment may be included as columns of the table track_profiles.

Three additional relational-database tables 3846-3848 contain entries that describe additional entities produced by video processing. The table global_tracks 3846 includes entries that each describe a global track, such as a face track spanning multiple videos or including component face tracks more widely spaced, over time, than those stitched together by the stitching operations discussed above with reference to FIGS. 37C-D. The table events 3847 includes entries, each representing a type of human-participant-associated event recognized from one or more face tracks identified in one or more videos. The table videos 3848 includes entries that each describe a video processed by the currently disclosed video-processing system. The fields in these tables are similar to fields in the previously discussed tables and are easily understood based on their names, as shown in FIG. 38A.

FIG. 38B shows five additional relational-database tables that are used during video processing. The table track_face_profile 3850 contains entries that each describe an association of a face profile with a local track. Each entry comprises a local-track ID/face-profile ID pair. Similarly, the table track_faces 3852 includes entries that represent associations between local face tracks and identified faces. The table faces 3854 includes face-ID/face-profile-ID pairs, representing a pairing of an identified face and the face profile generated for the face. The table global_local 3856 includes global-track ID/local-track ID pairs that represent the relationship between local face tracks identified in particular videos with global face tracks that span multiple videos. The table event_global 3858 includes entries comprising event-ID/global-track-ID pairs, representing associations of global face tracks to recognized events.

FIG. 38C illustrates simple structured query language ("SQL") statements that illustrate how the SQL query language is used to store, retrieve, and manipulate data in relational database tables. The create-table statement 3860 is used to create the relational-database table local_tracks, discussed above with reference to FIG. 38A. Ellipses 3862 indicates that additional field definitions may be included for the additional fields represented by the broken field 3813 in FIG. 38A. This same convention is used in certain other statements, below. The insert statement 3864 is used to insert a new entry into the local_tracks relational-database table. The fields into which values are to be inserted are first identified 3866 followed by a listing 3867 of the values for the fields. The select statement 3868 is used to retrieve data from a relational-database table or from multiple relational-database tables. In the example select statement 3868, the first frame number and last frame number are retrieved from the relational-database table local_tracks for the entry with local_track_ID field value equal to 211302. Additional SQL statements can create indexes on tables, such as statement 3869, and can obtain a number of rows or entries in a table, such as statement 3870. These are a few simple examples of SQL statements. More complex SQL statements can be used to obtain averages of fields within tables, create views into tables, and carry out complex joins in which entries of multiple tables are combined together with removal of redundant fields to create new tables. In any given implementation, additional relational-database tables may be employed to hold additional types of data used during video processing and provided as results of video processing.

FIGS. 39A-I provide control-flow diagrams that illustrate one implementation of the currently disclosed video-processing system. The video-processing system is generally implemented by multiple control programs within multiple servers of a large distributed computer system. In general, large data-storage facilities are used to store videos and the data generated from videos and multiple servers are used to provide user interfaces and application programming interfaces ("API") to remote computers that access the video-processing services provided through these interface. Numerous back-end servers carry out processing of frames to identify faces within frames and assign attributes to the faces and to process large video files that contain multiple frames. The currently illustrated implementation can statically analyze video files to identify tracks, events, and other entities and can also process video files in real time in order to display, in real time, various identified information, including highlighting of individuals within tracks, redacting or anonymizing particular faces within surveillance videos, and other such operations. Furthermore, various alerts and events may be generated during either static or real-time video processing to facilitate real-time annotation or enhancements of displayed video as well as to provide annotations and enhancements during review of the contents of video files in editing sessions. Real-world implementations rely on asynchronous, parallel execution of subtasks, as is discussed below with reference to FIGS. 57A-B. FIGS. 39A-I are intended to illustrate the computational steps involved, rather than illustrate the actual asynchronous-agent-based real-world implementation.

Figure 39A:
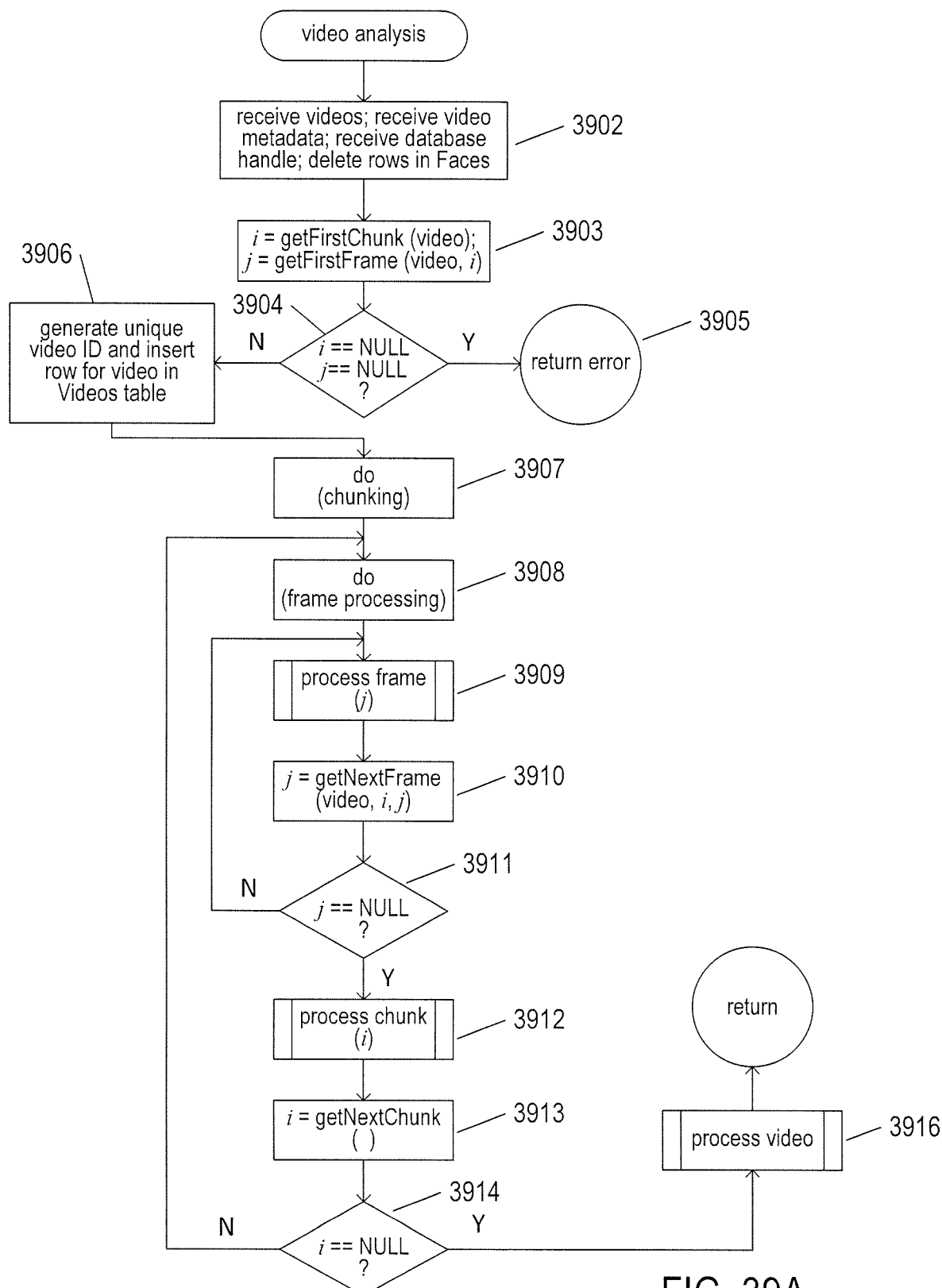
FIGS. 39A-I provide control-flow diagrams that illustrate one implementation of the currently disclosed video-processing system.

FIG. 39A provides a control-flow diagram for the high-level routine "video processing." This routine processes a video file in order to identify face tracks. In step 3902, the routine "video processing" receives a reference to a streaming video or video file for processing. In addition, metadata for the video that describe frame sizes, frame rate, type of digital encoding, and other such attributes are received as metadata. In addition, a database handle is received for a video-processing database that contains the data discussed above with reference to FIGS. 38A-C. Also, in step 3902, all rows are deleted from the relational-database table faces (3854 in FIG. 38B). As mentioned above, in alternative implementations, data produced by initial video processing may be temporarily stored in memory, text files, in other ways, rather than in a relational-database-management system. However, for clarity of exposition, FIGS. 39A-I assume a relational-database-management-system data-storage implementation.

In step 3903, the routine "video processing" calls the routines getFirstChunk and getFirstFrame to retrieve the first chunk from the video and the first frame from the first chunk. The reference variable i is set to reference the first chunk and the reference variable j is set to reference the first frame. If either of these reference variables has the value null after the calls to getFirstChunk and getFirstFrame, as determined in step 3904, then an error is returned in step 3905, since the received video either does not contain sufficient data for launching processing or is associated with a real-time-streaming problem that prevents data acquisition by the routine "video processing.". Note that, in real-time processing, calls to getFirstChunk and getNextChunk may involve wait operations that suspend execution of video processing until more data is available. Otherwise, in step 3906, a unique video ID is generated and used to insert a new entry, or row, for the video in the videos table (3848 in FIG. 38A). The received metadata for the video is used to set the values for certain of the fields in the new entry. In the inner do-while loop of steps 3907-3914, each chunk in the video is processed in time order. In the innermost do-while loop of steps 3908-3911, each frame in the currently considered chunk is processed. Each frame is processed by a call to the routine "process frame" in step 3909, after which a call to the routine getNextFrame( ) is made, in step 3910, to retrieve a next frame for processing. Once all the frames in a chunk have been processed, the currently considered chunk is processed by a call to the routine "process chunk," in step 3912. Following processing of all the chunks and their frames, the routine "process video" is called, in step 3916, to complete processing of the video and update the entry for the video in the videos table (3848 in FIG. 38A).

Figure 39B:
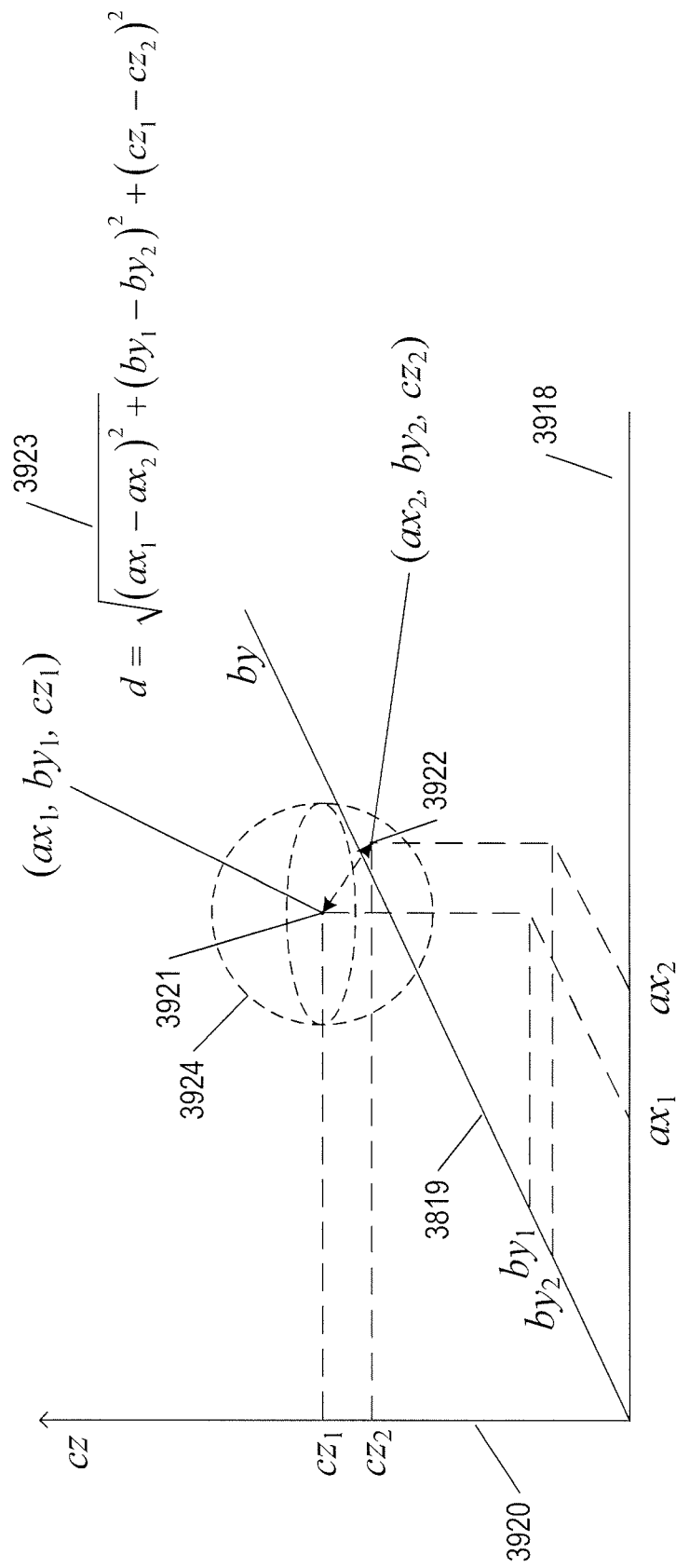

FIG. 39B illustrates a distance metric used for comparison between attribute-associated entities. In this example, each of a number of entities are associated with three attributes x, y, and z. The attributes may be scaled relative to one another by multiplicative weights a, b, and c. Thus, each entity may be considered to be a point within an attribute-value space having axes corresponding the x attribute 3918, they attribute 3919, and the Z attribute 3920. The comparison of two entities, based on their attribute values, is essentially carried out by computing a metric-space distance between the two points. In the example shown in FIG. 39B, a first point 3921 has coordinates $(ax_1, by_1, cz_1)$ and a second point 3922 has coordinates $(ax_2, by_2, cz_2)$. A distance in the metric space between these two points can be computed as the square root of the sum of the squares of the differences between the scaled coordinates 3923. In general, a threshold distance is used in the comparison that represents a volume or hyper-volume 3924 about one of the points that is being compared. When the distance between the two points is below the threshold value, equivalent to the second point lying within the volume or hyper-volume about the first point, then the two points may be considered to be equivalent or favorably comparable. In video processing, the attributes assigned to a face sub-image comprise the dimensions in a hyper-metric space. A distance metric can be defined for such hyper-metric spaces and used to compare to face sub-images or other attribute-associated entities. Basically, the comparison amounts to determining how closely the attribute values assigned to two entities, such as the attributes assigned to an identified face-containing subimage, correspond to one another. The multiplicative weights a, b, and c are used to adjust the relative importance of attributes in the comparison. Certain attributes may be omitted from the comparison, when their values are not considered relevant to the comparison.

Figure 39C:
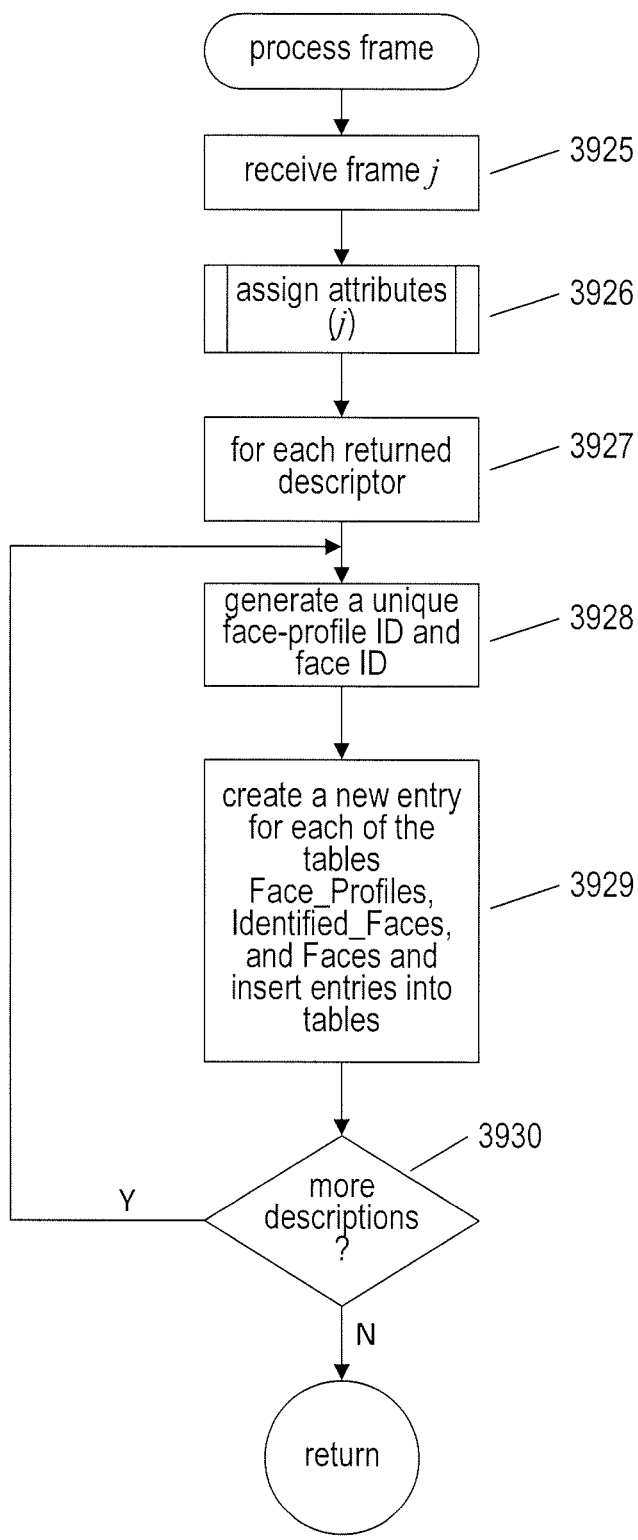

FIG. 39C shows a control-flow diagram for the routine "process frame," called in step 3909 of FIG. 39A. In step 3925, the routine "process frame" receives the reference j to a current frame. In this routine, as with other routines described below, the information about the video received in step 3902 of FIG. 39A is considered to be global information accessible to called routines. In step 3926, the routine "assign attributes" is called to identify faces and assign attribute values for attributes associated with the faces. This routine is described in the previous subsection. This routine returns a number of descriptors, as described above with reference to FIG. 35A. In the for-loop of steps 3927-3930, each descriptor returned by the routine "assign attributes" is processed. For the currently considered descriptor, a unique face-profile ID and face ID are generated, in step 3928. Then, a new entry for each of the tables face_profiles, identified_faces, and faces is created and inserted into the respective table in step 3929, using information contained in the descriptors as well as additional global information to identify values for the fields in these relational-database-table entries. For example, the values for attributes such as age range, gender, and ethnicity in entries of the face_profiles tables are included in the descriptors returned by the routine "assign attributes," as are the various location and size parameters for identified face sub-images included in entries of the relational-database table identified_faces.

Figure 39D:
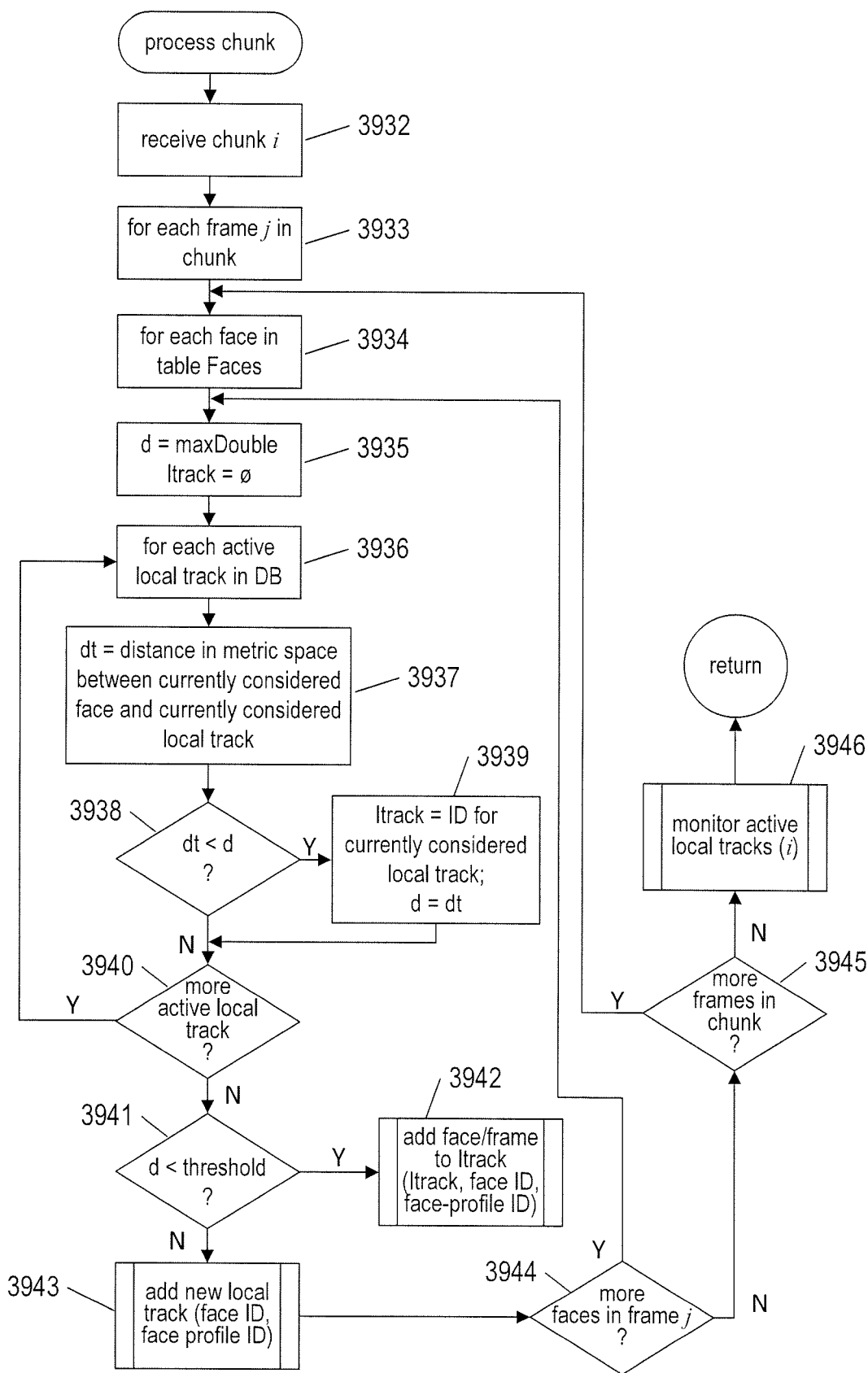

FIG. 39D provides a control-flow diagram for the routine "process chunk," called in step 3909 of FIG. 39A. In step 3932, the reference i to a chunk is received. In the outer for-loop of steps 3933-3945, each frame in the chunk is considered. In the inner for-loop of steps 3934-3944, each face identified by an entry in table faces associated with the currently considered frame is considered. In the innermost for-loop of steps 3936-3940, each active local face track in the table local_tracks is considered. For the currently considered face subimage with respect to the inner for-loop of steps 3934-3944, local variables d and ltrack are initialized to a large integer and a null value, respectively, in step 3935. Then, the currently considered face subimage is compared to each of the active face tracks in the table local_tracks (3802 in FIG. 38A) in the innermost for-loop of steps 3936-3940. In step 3937, a distance dt in the metric space for the attributes associated with the face subimage and the attributes associated with the last face in the currently considered active face track is computed. When the distance dt is less than the value stored in variable d, as determined in step 3938, then the variable ltrack is set to the ID of the currently considered local face track and the variable d is set to the computed value dt in step 3939. Following completion of the innermost for-loop of steps 3639-3940, when d is less than a threshold value, as determined in step 3941, the currently considered face subimage and the containing frame are added to the active face track referenced by the variable ltrack by a call to the routine "add face/frame to ltrack." Otherwise, a new face track is created and added to the table local_tracks via a call to the routine "add new local track" in step 3943. When there are more faces associated with the currently considered frame to consider, as determined in step 3944, control returns to step 3935. Otherwise, when there are more frames in the chunk i, as determined in step 3945, then control returns to step 3934. Following completion of the triply nested for-loops, the routine "monitor active local tracks" is called, in step 3946, to close any face tracks that have been inactive for more than a threshold number of frames or a threshold time.

Figure 39E:
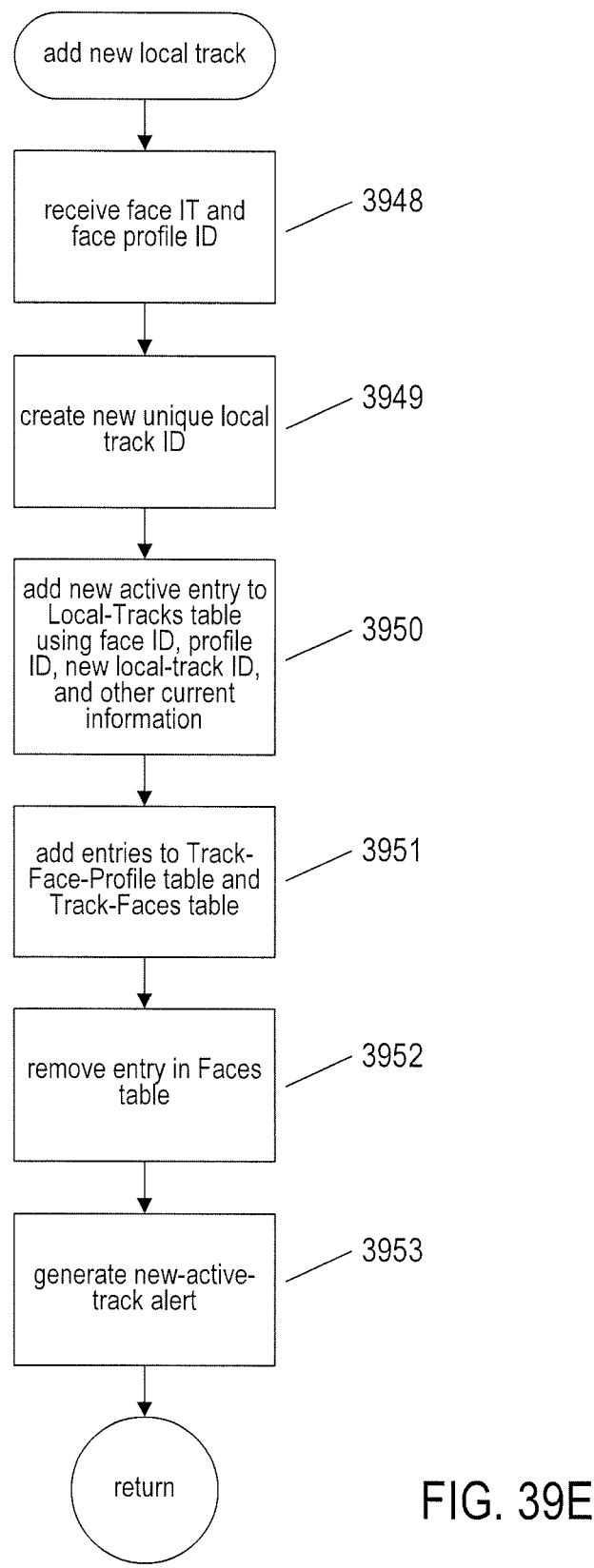

FIG. 39E provides a control-flow diagram for the routine "add new local track," called in step 3943 of FIG. 39D. In step 3948, the routine receives a face ID and face-profile ID. In step 3949, a new unique ID for a new local face track is generated. In step 3950, a new active entry is created for the table local tracks using the face ID and face-profile ID received in step 3948, the newly created local-track ID, and other current information such as the frame that is currently being processed by the routine "process chunk." This newly created entry is inserted into the local_tracks table. In step 3951, entries are added to the track_face_profile table and the track_faces table to store the relationship between the newly created local face track and the face ID and face-profile ID. In step 3952, the entry in the table faces corresponding to the received face ID and profile ID is removed. Finally, in step 3953, a new-active-track alert is generated for notification to display systems and other systems that use the information to annotate or enhance a displayed video.

Figure 39F:
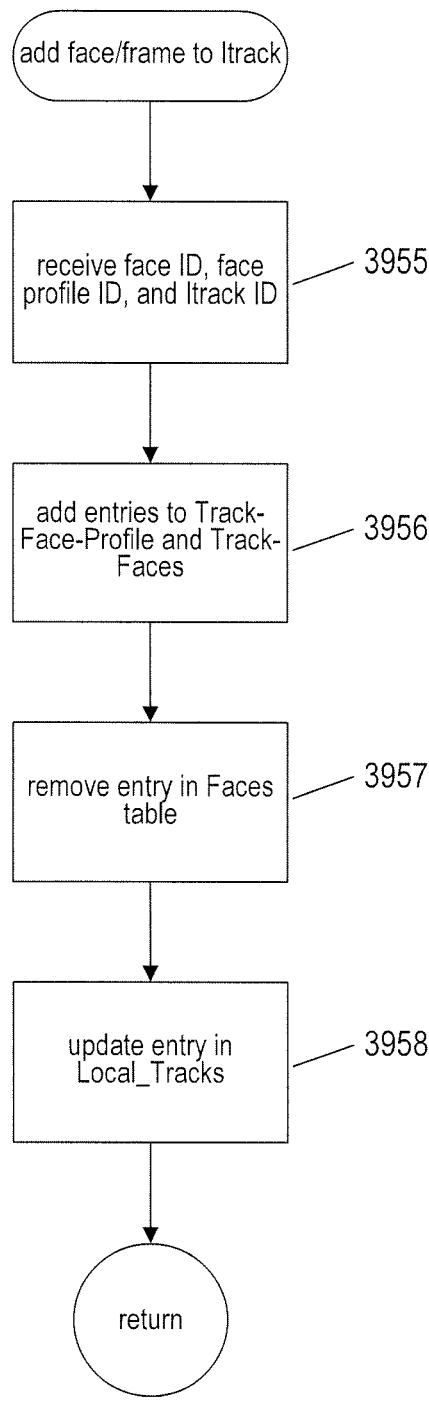

FIG. 39F provides a control-flow diagram for the routine "add face/frame to ltrack." called in step 3942 of FIG. 39D. In step 3955, a face ID, face-profile ID, and the ltrack ID are received. In step 3956, entries are added to the track_face_profile and track_faces table to store the association between the identified face and its attributes and the face track referenced by the value stored in the variable ltrack. In step 3857, the entry in the faces table corresponding to the received face ID and face-profile ID is removed. Finally, in step 3958, the entry in the table local_tracks corresponding to the ID and the variable ltrack is updated according to the identification of a new face and frame member of the track.

Figure 39G:
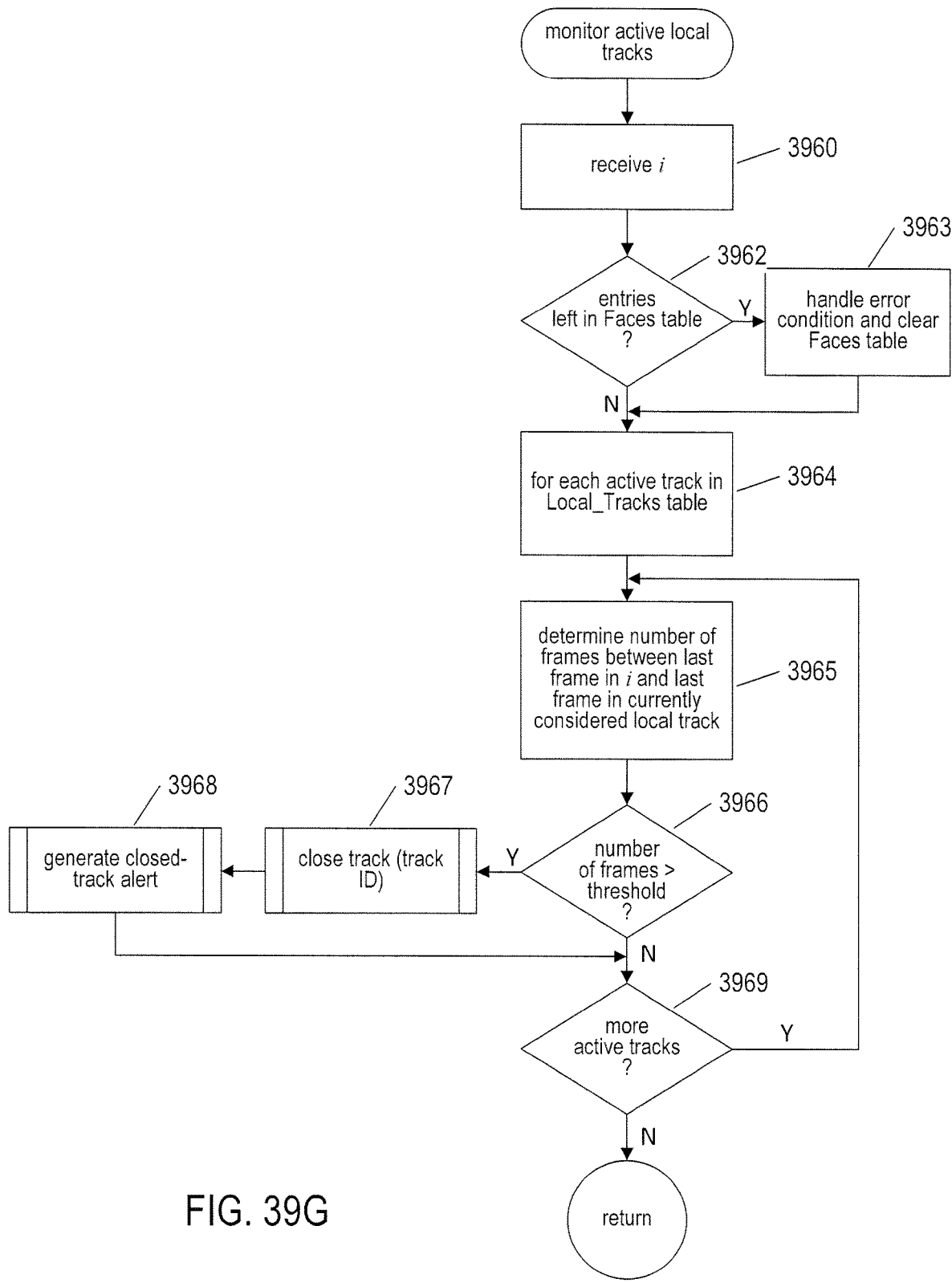

FIG. 39G provides a control-flow diagram for the routine "monitor active local tracks," called in step 3946 of FIG. 39D. In step 3960, the routine "monitor active local tracks" receives a reference to the currently considered chunk i. When there are entries remaining in the faces table, as determined in step 3962, an error condition ensues, which is handled in step 3963 along with deleting the remaining entries the faces table. Then, in the for-loop of steps 3964-3969, each active face track in the table local_tracks is considered. In step 3965, the number of frames between the last frame in the currently considered chunk and the last frame in the currently considered active face track is determined. When the number of frames determined in step 3965 is greater than a threshold value, as determined in step 3966, then the routine "close track" is called in step 3967 to deactivate the currently considered face track and, in step 3968, a closed-track alert is generated to notify real-time or other applications or routines that enhance and annotate displayed video according to identified tracks.

Figure 39H:
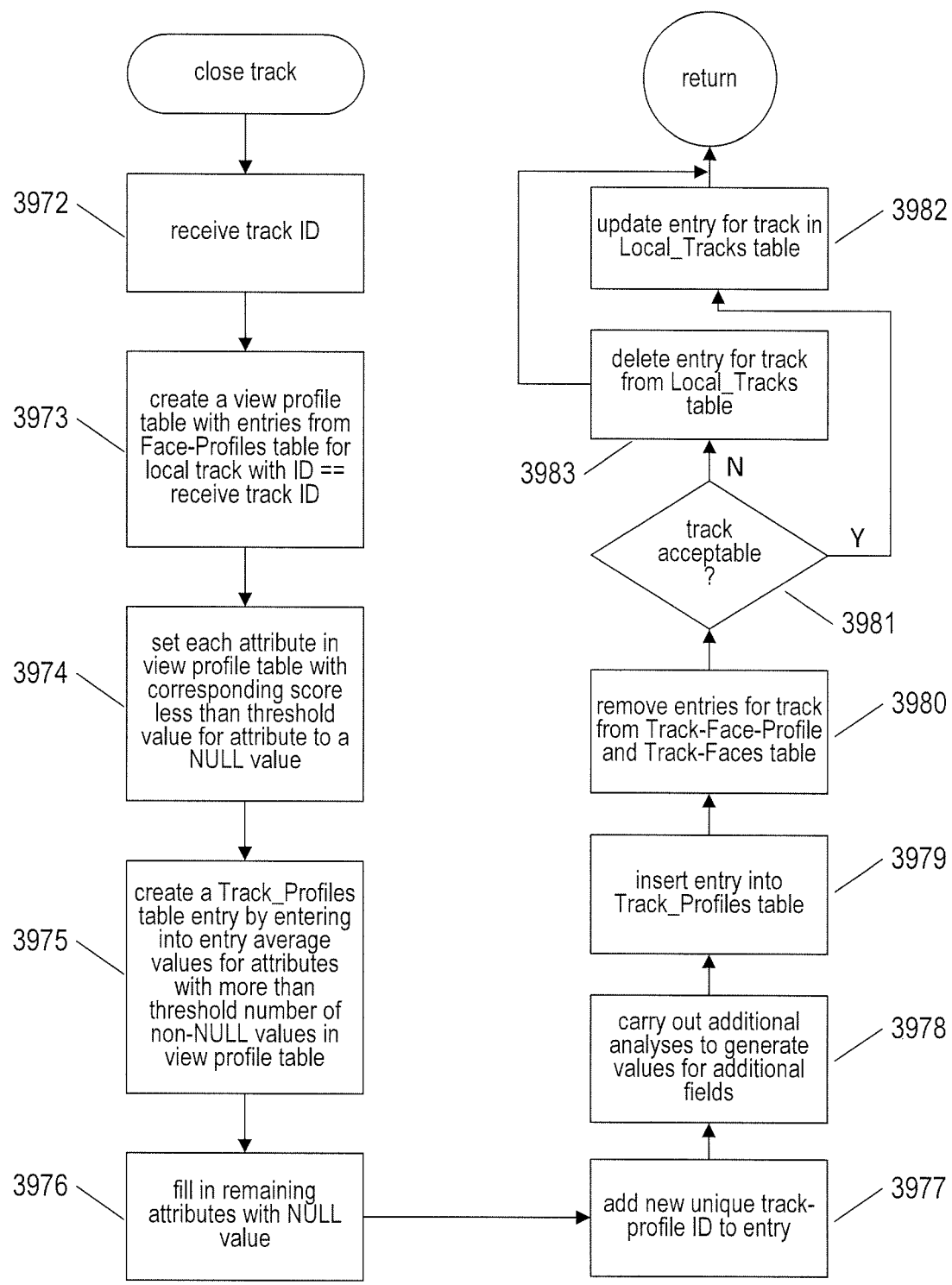

FIG. 39H provides a control-flow diagram for the routine "close track," called in step 3967 of FIG. 39G. In step 3972, the track ID for the local face track to close is received. In step 3973, a view of the face_profiles table is created to include entries associated with the local face track identified by the received ID. In step 3974, those fields corresponding to attributes with associated confidence scores less than a threshold value for the attribute are set to a null value. Only assigned attribute values with relatively high confidence are used to generate a face-track profile for the face track being closed. In step 3975, this new face-track profile is created as an entry in the track_profiles table, using average values for attributes in the entries in the view created in step 3973. Thus, the face-track profile contains attributes similar to the face profile obtained for each identified face in each frame, but the values for the attributes are computed over many instances of the identified face in many frames corresponding to the track. This generally provides attribute values with significantly greater probabilities or confidences, because they are computed over a much larger data set. For those attributes without at least a threshold number of non-null values, the values are set to null in step 3976. A unique track-profile ID is computed and added to the track_profiles-table entry in step 3977. In step 3978, any of many different additional analyses may be carried out on the frames of the face track to generate additional values for additional fields in the track_profiles table entry corresponding to the face track being closed. One example, discussed above, is an attribute "mobility score," which contains a value representative of how mobile the individual corresponding to the face has been with respect to location and orientation. In step 3979, the newly created entry is inserted into the track_profiles table. In step 3980, all entries associated with the closed face track are removed from the track_face and track_face profile tables. When the closed face track is acceptable as an identified track, as determined in step 3981, the entry for the face track is updated in the local_tracks table in step 3982. This involves setting the field track active to false and updating any fields with final values that can only be determined upon face track closing. Otherwise, the entry is deleted from the local_tracks table in step 3983. The criteria for accepting or deleting a face track may include the number of frames in the face track being greater than the threshold value, the confidences associated with particular face attributes, and other such criteria.

Figure 39I:
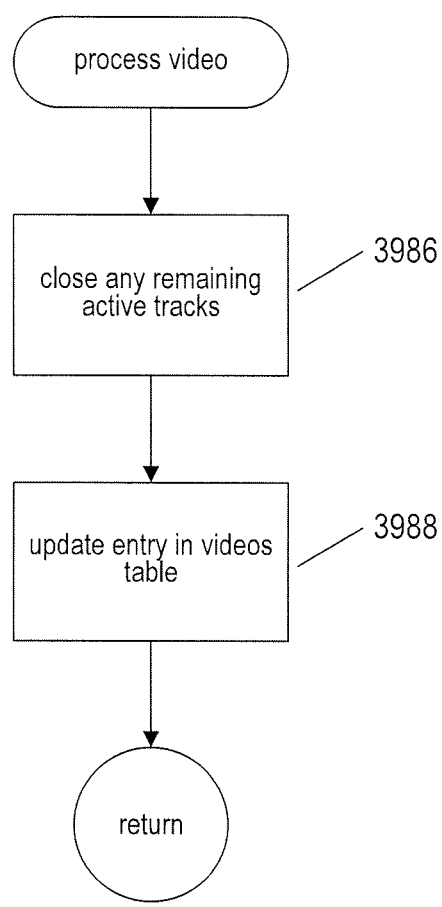

FIG. 39I provides a control-flow diagram for the routine "process video," called in step 3916 of FIG. 39A. In step 3986, any remaining active face tracks associated with the video are closed, as discussed above with reference to FIG. 39H. In step 3988, the entry for the video in the videos table is updated with final values for fields that can only be determined at the end of processing of the video.

The information generated during initial video processing and stored in the database or by other data-storage techniques, discussed above, facilitates a wide variety of higher-level analyses, data generation, and service provision. As discussed above, local face tracks may be combined to form global tracks that span multiple videos and/or larger periods of time that include intervals in which the faces corresponding to the local face tracks are obscured or otherwise unidentified. Face tracks can be used during display of videos to highlight or redact a particular individual. Face tracks that correspond to a particular individual or group of individuals can be used to automatically identify human-associated events that have been captured in one or more videos. Face tracks may also be used as the basis for inference and prediction of behaviors, motivations, and future events.

A variety of different types of architectures are used to implement the above-described methods and systems. In certain architectures, individual videos are initially processed, either sequentially or in parallel, and then higher level processing is carried out based on the face tracks identified and characterized in the individual videos. In other architectures, higher level processing, including stitching together face tracks from two or more different videos, is carried in parallel with lower-level processing. In these architectures, face-track profiles may be generated for active face tracks and modified as frames are added to the active face tracks, to facilitate immediate, in-parallel merging of active face tracks from multiple videos.

Alerts and events provided in real-time video processing systems may be used, in video monitoring environments, as feedback to control positions, orientations, frame rates, and other parameters of video cameras in order to direct video acquisition to particular spaces, particular individuals or groups of individuals, or to particular events. The alerts and events may trigger many additional types of actions or events, including automated, semi-automated, and manual intervention in control systems, security systems, or monitored spaces to address or prevent predicted events or evolving undesirable situations.

In certain architectures, not only can face tracks span multiple videos, but a particular video may contain frames acquired from different cameras, with associated camera-identifying attributes, to facilitate real-time processing of information acquired from two or more imaging devices. In addition, certain systems may allow for parallel processing of additional information, including audio tracks, sensor readouts, and other information along with frames to facilitate and enhance the information with which face tracks are characterized.

Currently Disclosed Surveillance and Monitoring Systems

Figure 40:
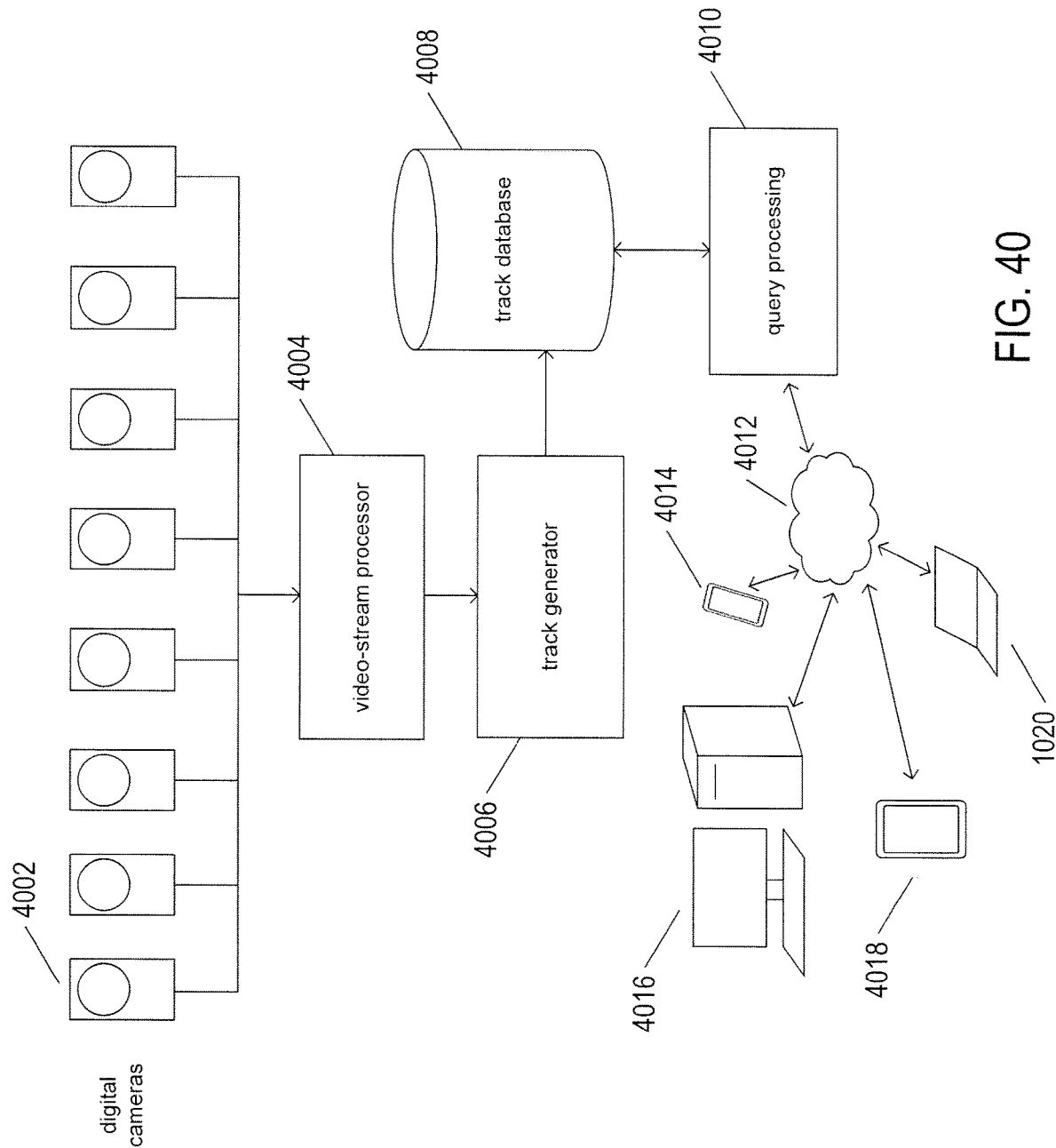
FIG. 40 illustrates the basic architecture of the currently disclosed surveillance and monitoring systems.

FIG. 40 illustrates the basic architecture of the currently disclosed surveillance and monitoring systems. A generally large number of digital video cameras, such as digital video camera 4002, continuously record video, for surveillance and monitoring purposes, and stream the video to a video-stream processing subsystem 4004. The video-stream processor carries out the video-processing tasks discussed in previous subsections of this document, stores video frames for a configurable period of time, and outputs processed video to a track-generator subsystem 4006 that generates face tracks, as described in previous sections of this document, for storage in a track database 4008. The surveillance and monitoring systems employ one or more of a variety of different types of query-processing techniques in a query-processing subsystem 4010 to execute queries against the track database. The query-processing subsystem is the fundamental subsystem that provides for many different automated and semi-automated surveillance and monitoring functionalities and facilities accessible through local communications networks and the Internet 4012 to a wide variety of different types of processor-controlled user and client devices, including smart phones 4014, personal computers and servers 4016, tablets 4018, and laptops 4020. The processor-controlled user and client devices generally run a client-side application that displays a graphical user interface to the client or user through which the client or user accesses the query-processing subsystem and other functionalities and facilities provided by the surveillance and monitoring system. Different implementations of the surveillance and monitoring system may choose to differently divide the computational overheads among the client-side applications and the surveillance and monitoring system.

A wide variety of different implementations for this basic architecture are possible. The video-stream processing and track-generator subsystem may be implemented on one or more server computers or may be implemented within many different virtual servers of a distributed computing system, including virtual servers provided by cloud-computing facilities. The various subsystems communicate using stateless protocols to enable straightforward scaling of implementations to a variety of different types of data centers and distributed computing facilities of different sizes which support dynamic allocation of computational resources on an as-needed basis to handle the surveillance and monitoring tasks.

FIGS. 41A-E illustrate one implementation of a track data structure that is stored in a track database to represent a face track. The track data structure shown in FIGS. 41A-E is encoded as a JSON object. The JSON object includes many key/value pairs, such as the key/value pair 4102 "cid": "10.0.0.15" which associates the string "10.0.0.15" with the keyword "cid." In English, this means that the camera ID for the camera which recorded the video frames from which the track has been extracted has the ID "10.0.0.15." There are many different key/value pairs included in the track data structure, or track object. Numerous key/value pairs, such as key/value pairs 4104, associate string values with the attributes of the person corresponding to the track, such as shirt color and hair color. Other attributes are track attributes, such as a track ID 4106, numerical identifiers for the first and last frames in the track 4108-4109, a numerical indication of the best frame in the track 4110, and a variable indicating whether or not the track is to be redacted 4112. In this implementation, these numerical identifiers are timestamps, in units of milliseconds. The timestamp is unique for each frame generated by a particular camera, and thus the combination of the camera ID and timestamp uniquely identifies a frame. The array "cic2" includes a large number of different attributes for the person associated with the track, such as the attribute AGE 4114. The example track data structure shown in FIGS. 41A-E represents a person with an age between 40 and 55, as indicated by the value "40to55" 4116. This value is the fifth 4118-4119 possible age-range value in the array "values" 4120. The array "scores" 4122 provides the probabilities for each of the possible values 4124. In this case, there is a nearly 85% probability 4126 that the person associated with the track data structure has an age within the range 40-55. The array "human4array" includes an indication of the bounded region of the first frame of the track and the best frame of the track that includes the face of the person associated with the track. The best frame is the frame that best meets criteria for a clear image of a face. The criteria may include the largest possible area of the image that represents the face and the probability that the identified facial area does, in fact, represent a face, as indicated by the value stored in the "isFace" attribute within the track data structure.

It should be noted that, although the phrase "face track" is used throughout this discussion, the phrase "face track" is intended to generally mean a data structure that describes a series of frames that include a sub-image, or image region, to which attribute values and characteristic values can be assigned. For many surveillance and monitoring purposes, the sub-images of interest contain pixels that represent all or a portion of a face, since faces are commonly the focus for identifying particular individuals. However, in general, face tracks represent frames that include images of all or a portion of an individual's entire body, and these non-face portions of the body can be described by attribute-and-characteristic values, just as an individual's face can be described by attribute-and-characteristic values. In fact, many of the face-track-data-structure attributes and characteristics, discussed above, are attributes and characteristics of the non-face portion of an individual's body. Track, however, can be even more generally descriptive, and can describe inanimate objects of interest, such as vehicles, animals, and just about any other physical object that may need to be identified and monitored by the surveillance-and-monitoring system. Thus, the phrase "face track" and the term "track" should be understood to refer to sub-images or image regions within a sequence of frames corresponding to something of interest that can be specified by one or more attribute and/or characteristic values. The following discussion is oriented to face tracks that represent sub-images or image regions within a sequence of frames corresponding to particular people, but, in other implementations, face tracks may represent sub-images or image regions within a sequence of frames corresponding to any type of entity or object of interest to users of a surveillance-and-monitoring system.

Figure 42:
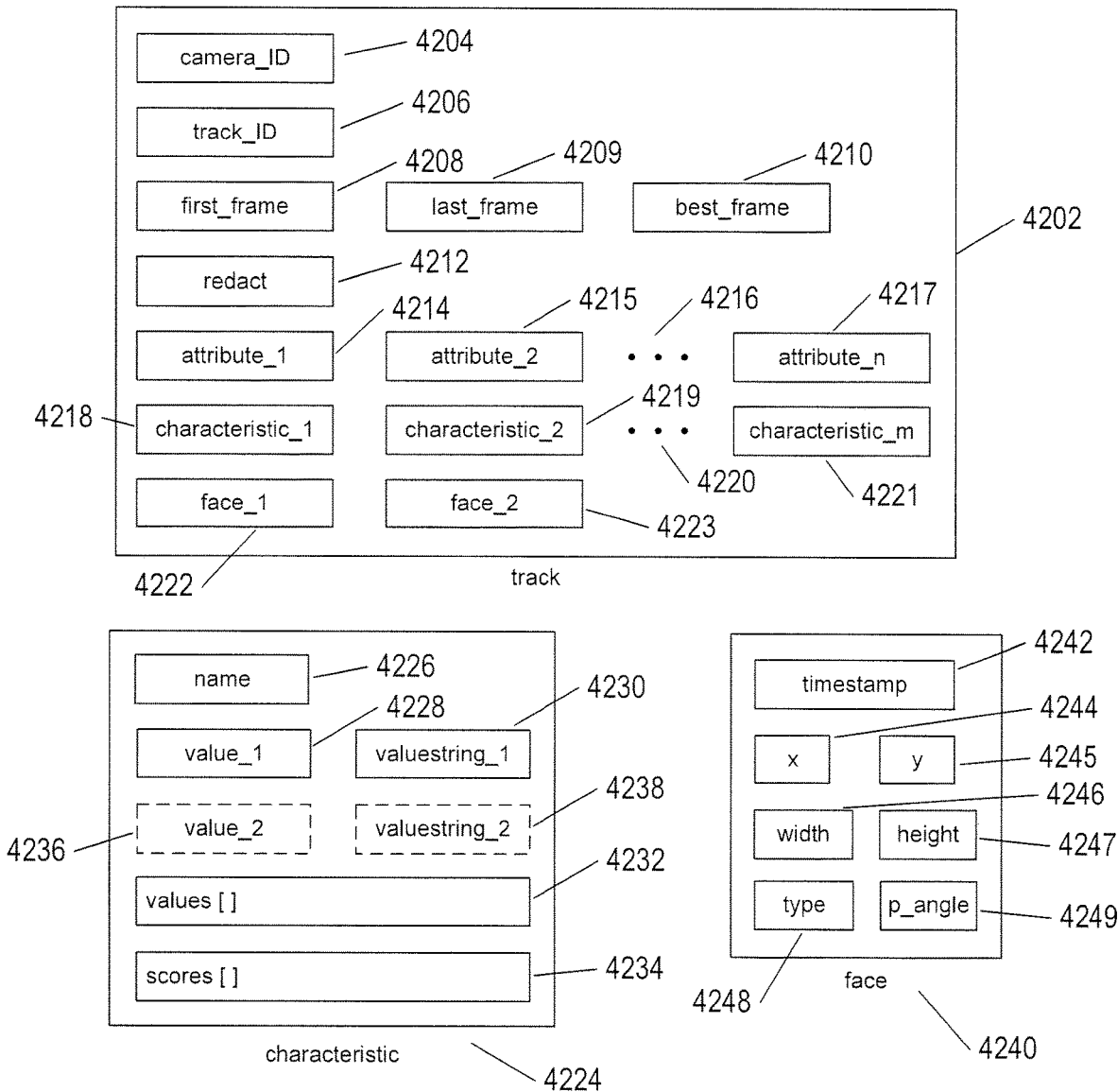
FIG. 42 provides a more abstract representation of the track data structure.

FIG. 42 provides a more abstract representation of the track data structure. The track data structure 4202 includes a camera ID 4204, a track ID 4206, indications of the first, last, and best frames 4208-4210, an indication of whether or not the track is to be redacted 4212, 11 attribute values 4214-4217, where ellipsis 4216 indicates that there may be many additional attribute values, M characteristic values 4218-4221, where ellipsis 4220 indicates that there may be many additional characteristic values, and indications of the face region in the first and best frames of the track 4222-4223. The characteristic values are encoded within characteristic data structures 4224, each of which includes a name 4226, a value index 4228 and value string 4230, where the value is an index into the array of possible values 4232 for the characteristic, and an array of scores, or probabilities 4234, for each possible value. Optionally, a second value index 4236 and second value string 4238 may be present to indicate the second most probable value for the characteristic. The face regions are described by face data structures 4240, each of which includes a frame number, or timestamp 4242, x and y positions 4244-4245, an indication of the width and height of the face region 4246-4247, an indication of the type of face image 4248, and an indication of the pose angle 4249.

Figure 43:
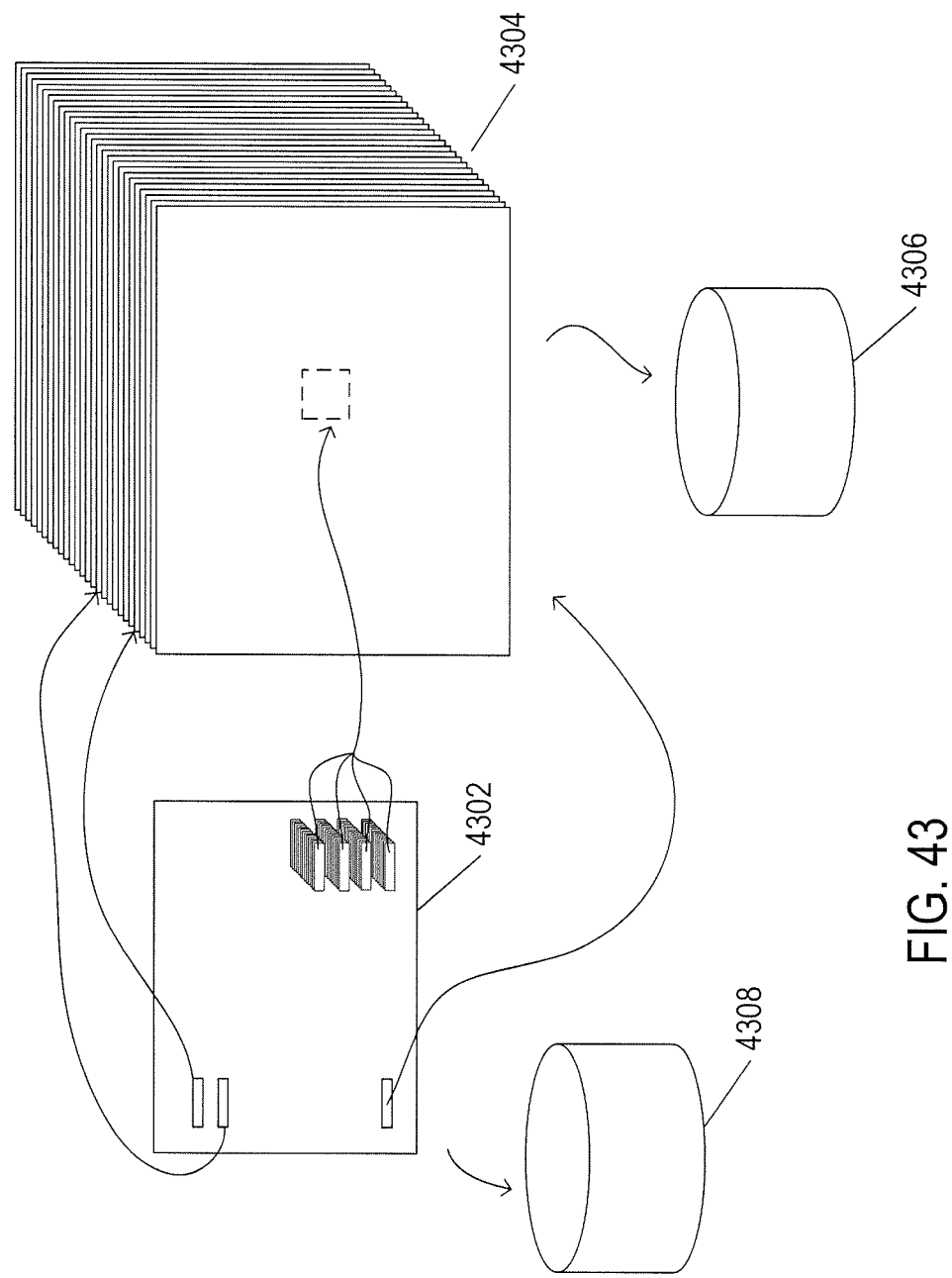
FIG. 43 illustrates the relationship between the track data structure and recorded video frames.

FIG. 43 illustrates the relationship between the track data structure and recorded video frames. The track data structure 4302 is essentially a data representation of a track. Every track can be thought of as a sequence of regions within a sequence of video frames associated with a particular individual, as discussed in preceding sections of this document. The video frames 4304 produced by a particular camera are stored separately 4306 from the track data structures within the track database 4308. In one implementation, the descriptions of the two face regions included in the track data structure indicate the region of the first and best frames of the sequence of frames from which the track is extracted that contain the image of the face of the person associated with the track, where the best frame includes the best facial image of the person associated with the track. In the currently described implementation, the track data structure contains a sequence of frame-region indications for each frame in the sequence of frames corresponding to the track. In alternative implementations, the track data structure contains fewer frame-region indications for regularly-spaced frames in the sequence of frames corresponding to the track, with the positions of the face recomputed for the remaining frames. These various possible implementations represent different trade-offs between the computational overhead of recomputing the positions of the face regions for various track-based operations versus the storage overhead for storing indications of the positions and sizes of many face regions.

Figure 44:
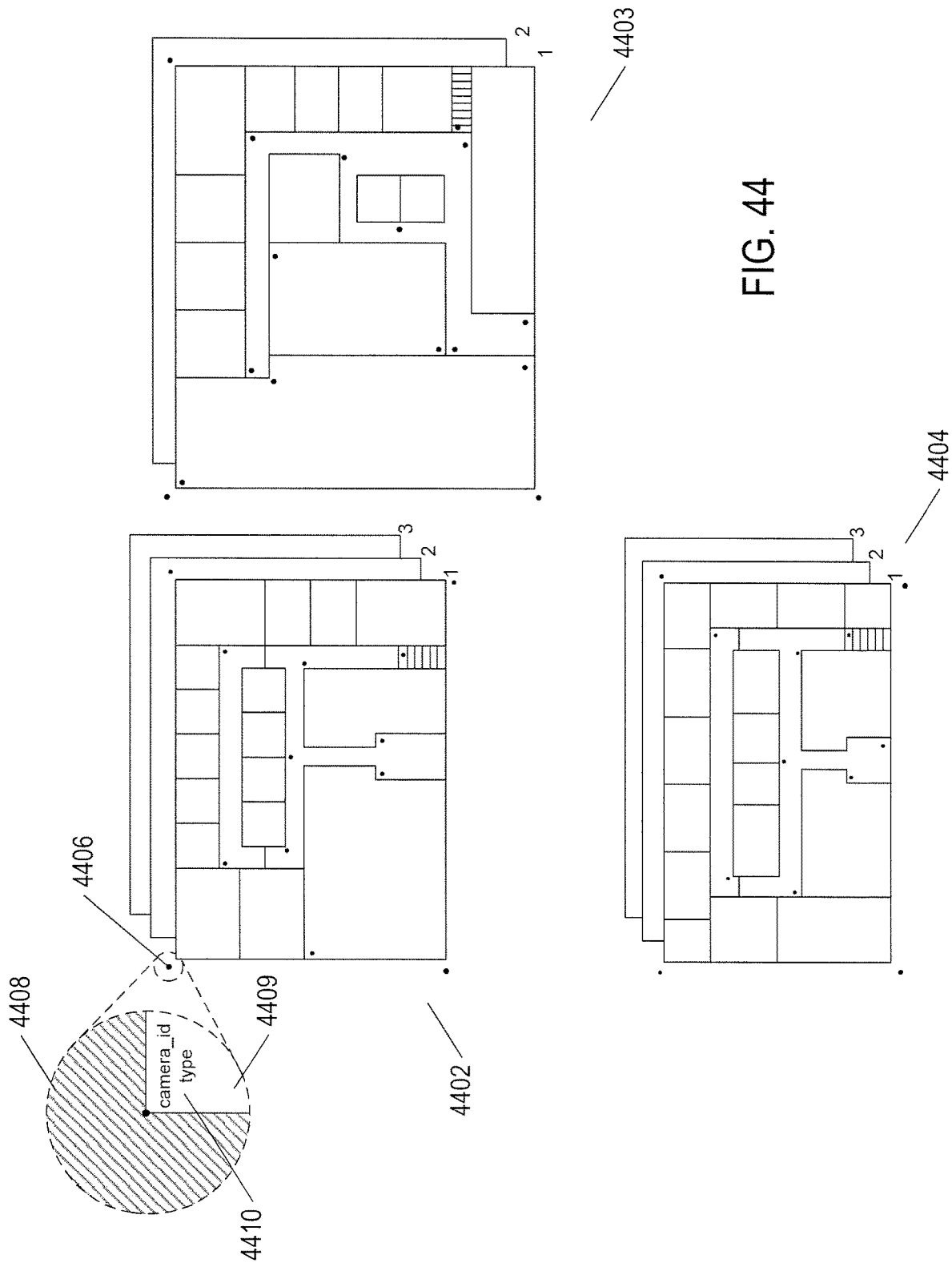
FIG. 44 shows the geographical area or volume that is monitored by the currently disclosed surveillance and monitoring system.

FIG. 44 shows the geographical area or volume that is monitored by the currently disclosed surveillance and monitoring system. In this example, the surveillance and monitoring system monitors three different buildings 4402-4404 of a campus. Building 4402 and 4404 are both 3-floor buildings while building 4403 is a 2-floor building. The positions of the digital video cameras used for monitoring and surveillance are indicated by small filled disks, such as small filled disk 4406. Each camera may be described by its field of view 4408, a camera type 4409, a camera ID 4410, and other information. The floor-plan-schematic representation of the geographical volume that is monitored is one of many different possible ways to represent the monitored area or volume.

Figure 45A:
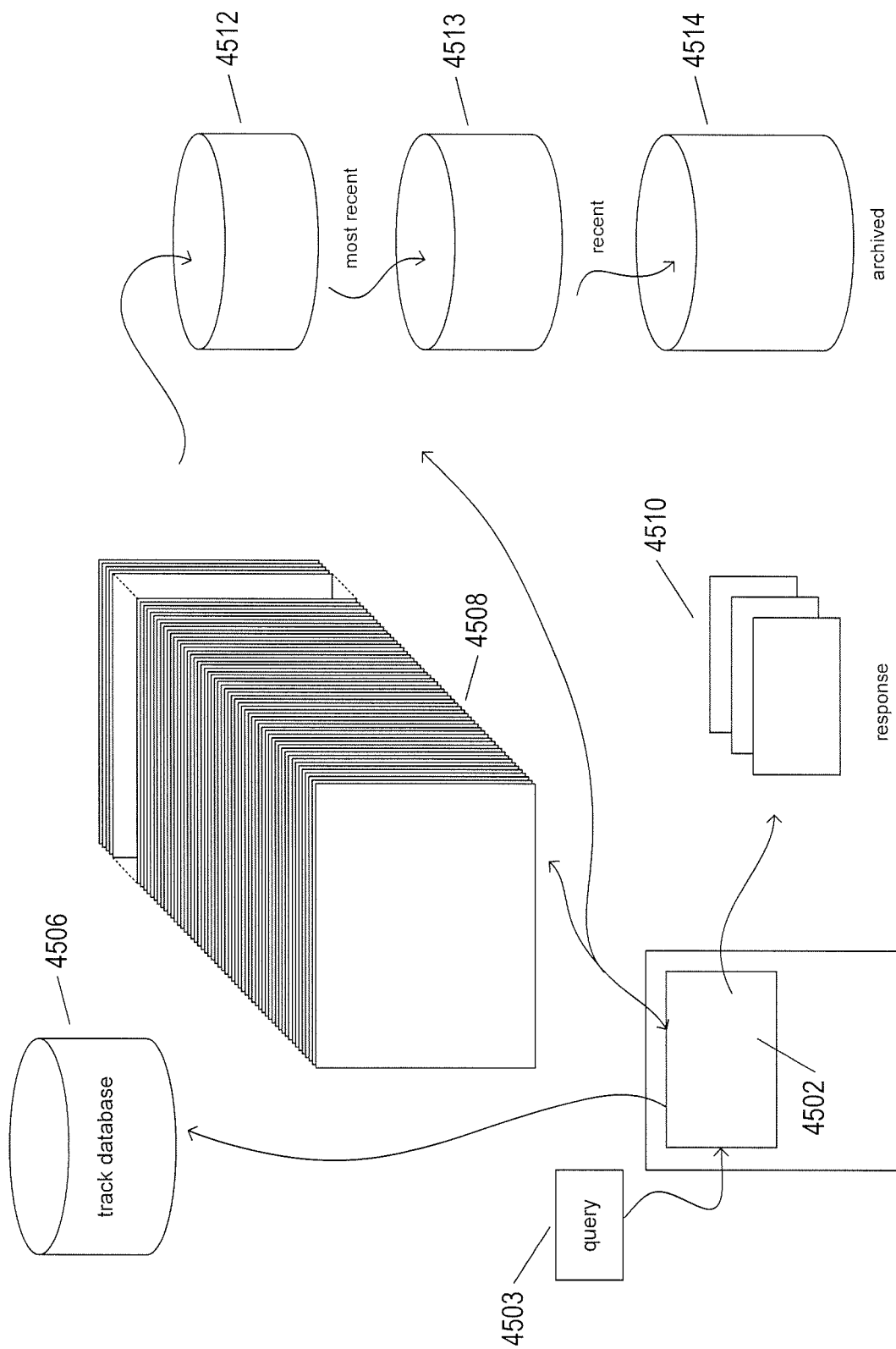
FIGS. 45A-D illustrate the basic search functionality provided by the track database and query-processing module within the currently disclosed surveillance and monitoring system.

FIGS. 45A-D illustrate the basic search functionality provided by the track database and query-processing module within the currently disclosed surveillance and monitoring system. As shown in FIG. 45A, the query-processing module 4502 receives a query 4503 from a client, user, or internal subsystem of the currently disclosed surveillance and monitoring system, accesses the track database 4506 and stored video-frame sequences for the various different digital video cameras 4508 in order to identify face tracks that meet the criteria specified in the query, and returns indications of the identified face tracks 4510 to the user, client, or internal subsystem from which the query was received. In many implementations, the recorded video may be initially stored within memory and then transitions through one or more levels of mass storage 4512-4513 before being archived 4514 and/or eventually discarded. In more elaborate implementations, selected portions of the recorded video identified as containing information related to anomalous phenomena or to identified events of interest may be retained for longer periods of time than the bulk recorded video.

Figure 45B:
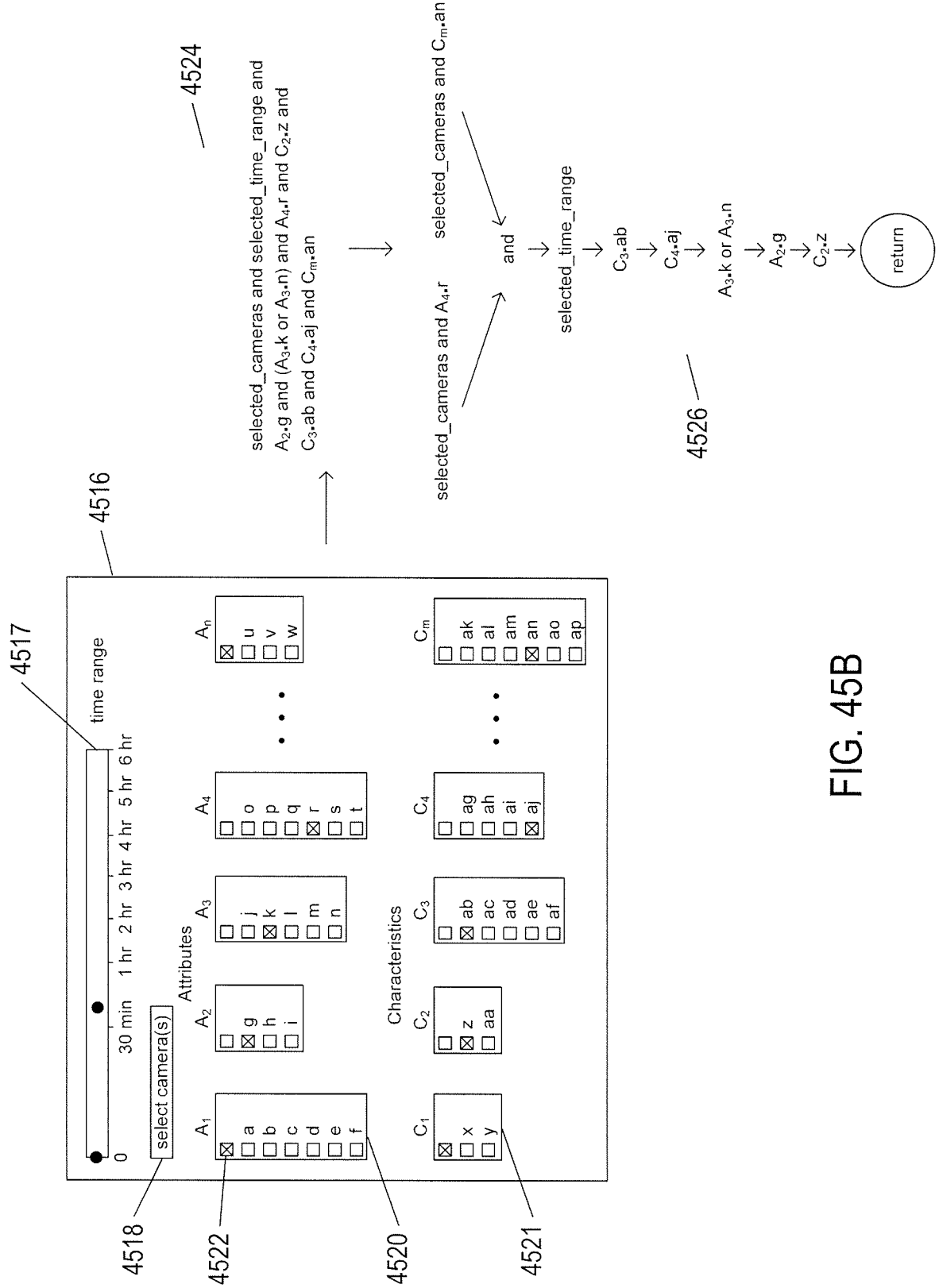
Figure 45C:
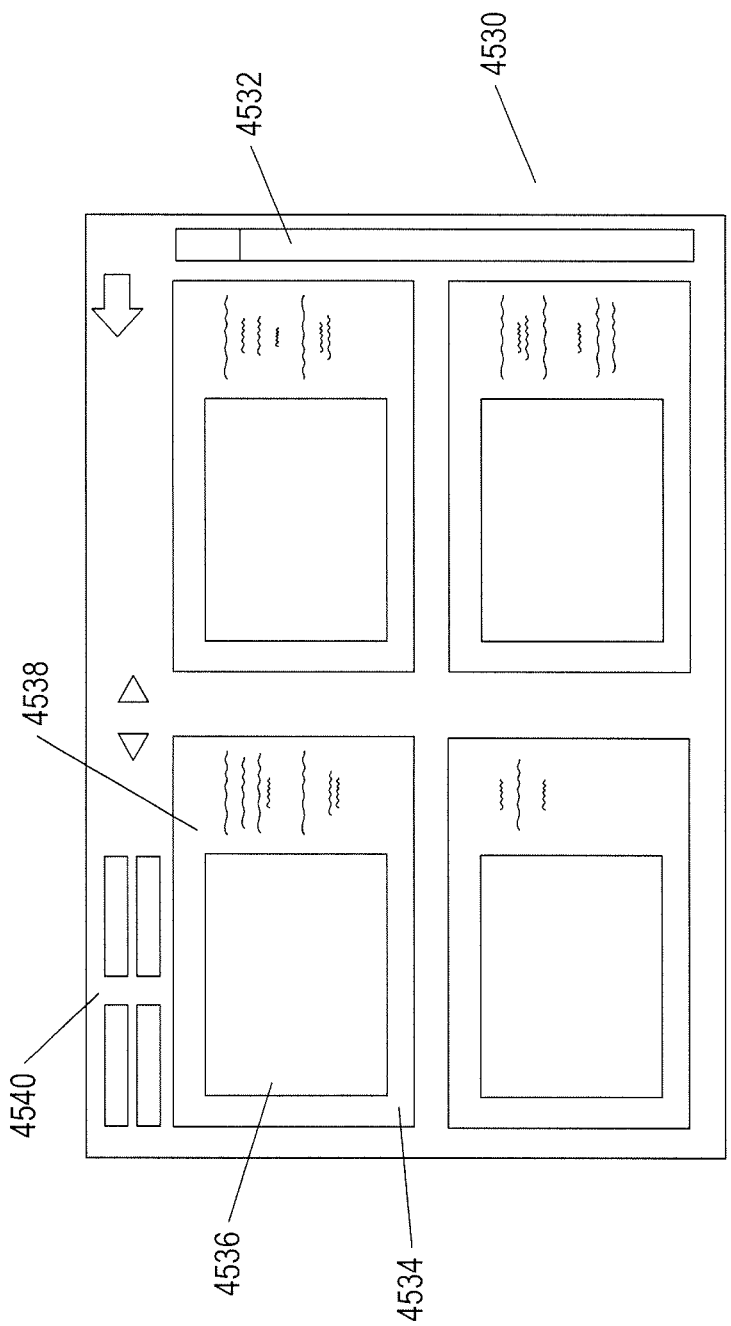
Figure 45D:
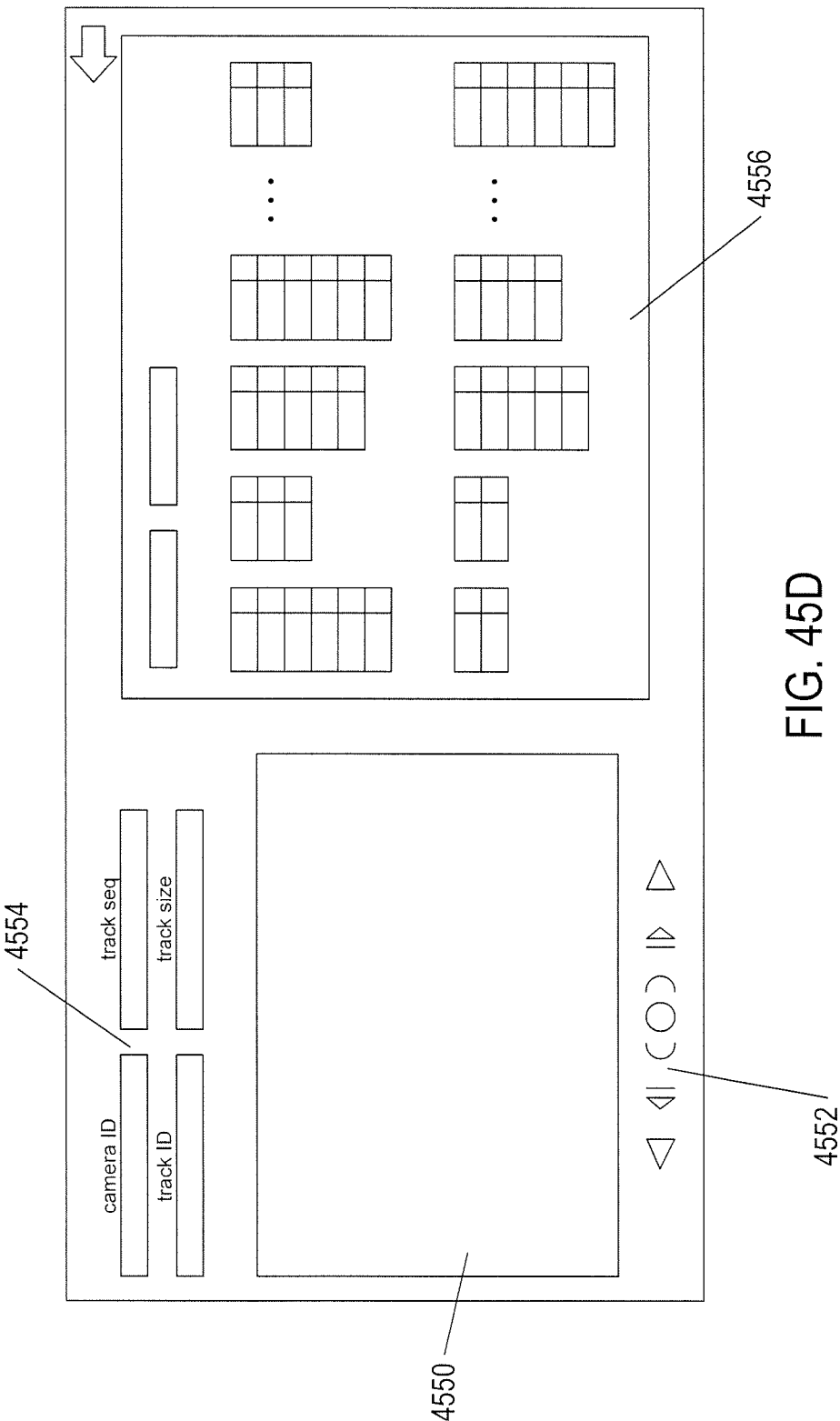

FIG. 45B illustrates a query and processing of the query in one implementation of the currently disclosed surveillance and monitoring system. In this implementation, a search for face tracks associated with people having certain characteristics and attributes and/or for face tracks associated with certain attributes, is input through a graphical user interface ("GUI") provided to a user or client by the client-side application running on the user's or client's processor-controlled device. The GUI presents one or more query-input pages 4516 through which a user or client can select a time range 4517 and one or more particular cameras 4518 and can specify the values for various attributes and characteristics. The values for a particular attribute or characteristic are shown in a values box below an indication of the attribute or characteristic, such as the values box 4520 associated with the attribute $A_1$ and values box 4521 associated with the characteristic $C_1$. The first entry in the values box indicates that no value for the attribute or characteristic is specified. Thus, the "X" symbol in the input field 4522 in values box 4520 indicates that the query specifies no value for attribute $A_1$. When there are more distinct values for an attribute or characteristic that can be conveniently displayed, the values box may be scrollable or may be displayed in a separate temporary window. Once a user or client has finished entering information into the query-input page or pages, the information is collected into a logical expression 4524 that represents the query. The types of logical expressions generated from an input query depends on the semantics associated with the input pages as well as the types of queries supported by the underlying track database. In preceding sections, a relational-database example was provided, which supports relational-algebra-based queries, such as SQL queries. In alternative implementations, any of many alternative types of database management subsystems may be used, such as the Mongo database. In the example shown in FIG. 45B, the underlying database supports simple logical queries composed of attribute values, or sets of attribute values, combined using the logical operators AND and OR. Expression 4524 stands for the query "find all face tracks extracted from the recorded video generated by the one or more selected cameras during the selected time range for which attribute $A_2$ has the value g, attribute $A_3$ has the value k or n, attribute $A_4$ has the value r, characteristic $C_2$ has the value z, characteristic $C_3$ has the value ab, characteristic $C_4$ has the value aj, and characteristic $C_m$ has the value an. Of course, in FIG. 45B, the values, such as g, stand for a particular character string and the attributes and characteristics are generally referred to by name, such as the characteristic AGE discussed above. The query expression is then submitted to a database-management subsystem which generally creates a query plan 4526 in order to most efficiently search for the specified face tracks and then executes the query plan to identify all of the face tracks that meet the criteria expressed by the query. The execution plan may attempt to execute subqueries in an order that most quickly decreases the number of face tracks that need to be searched by subsequent subqueries as well as executing subqueries that involve attributes and characteristics for which indexes have been created within the database to facilitate rapid searching. In the GUI-based implementation associated with the graphical query submission discussed with reference to FIG. 45B, the query-processing system returns a number of face tracks that are displayed to the user or client in a results page 4530 through which four of the returned face tracks can be concurrently reviewed. The results page, in certain implementations, may include a scrollbar 4532 that allows a user or client to scroll through all of the returned face tracks or may provide other types of navigational features. Each face track is represented by a rectangular region, such as rectangular region 4534, that includes an image of the person associated with the face track 4536 and may include additional summary information 4538, including camera ID, time of day, track length, and other such information. Meta information for the query results 4540 may be additionally displayed, such as the total number of face tracks identified. A user or client may input a mouse click or other indication to one of the displayed face-track results, producing a detailed face-track-result display, such as the face-track-result display shown in FIG. 45D. The face-track-result display provides a video window 4550 through which the client or user can view the face track, using viewing-control features 4552, indications of the camera ID, track ID, track size, and other information that characterizes the face track 4554, and a detailed presentation 4556 of the attribute and characteristic values and associated probabilities for the face track.

The returned results may be ordered according to a score reflective of how closely the face track meets the criteria and parameters specified by the query. FIG. 46 illustrates one possible face-track scoring implementation. The attribute and characteristic values specified in the query are indicated graphically 4602 in the left-hand portion of FIG. 46. Computation of the score for each returned face track as indicated by expression 4604 and 4606. First, as shown by expression 4604, a term is computed for each of the attributes and characteristics for which values are specified in the query, and the terms are summed together. Each term, such as term 4608, is the product of a weighting factor and the probability of the attribute or characteristic value specified in the query. The weighting factor allows for the different attributes and characteristics to be assigned different degrees of importance and the probability is the probability obtained from, for example, the scores array associated with each characteristic in the track data structure. For attributes that are not associated with a set of values and corresponding probabilities, the probability in the term may be arbitrarily assigned to be 1.0. Many other scoring approaches are, of course, possible.

The ability to quickly, in real time, search the recorded video of many different cameras used to monitor a geographical area or volume by the currently disclosed surveillance and monitoring system in order to find images of individuals that match specified attribute-and-characteristic values is, by itself, of great value to human personnel involved in surveillance and monitoring. For example, in an airport, security personnel may be alerted to watch for a particular individual, specified by attribute and characteristic values, who is believed to have entered the airport with a firearm and can then immediately query the track database to find images of the particular individual associated with particular cameras within the facility. Currently available surveillance monitoring systems depend on manual review and monitoring of recorded video, which cannot generally be carried out in real time in order to quickly respond to threats and anomalous situations. The ability to query, in real time, recorded video is provided by the currently disclosed surveillance and monitoring system by the continuous extraction of face tracks from recorded video streams and storage of the corresponding track data structures in the track database. The results of video processing are thus almost immediately available. In many currently available systems, the recorded video is merely stored, without initial processing, as a result of which extensive video processing must be carried out in order to retrieve any information from the recorded video. The currently disclosed surveillance and monitoring system provides real-time searching, as discussed above, and many additional functionalities based on real-time searching, without attempting to employ facial recognition. The currently disclosed surveillance and monitoring system does not attempt to find images of particular individuals based on an individual's name or other such identifying information, but instead finds images, in recorded video, of people having particular attributes and characteristics. Facial-recognition technologies are currently controversial and their use has been prohibited in certain jurisdictions. Furthermore, surveillance and monitoring systems that employ face-recognition technologies may exhibit numerous deficiencies and problems, including the need for face databases and the computational and storage overheads associated with face databases, face-misidentification failures, and failure to overcome disguises, partially occluded facial detail, and other such problems.

Figure 47A:
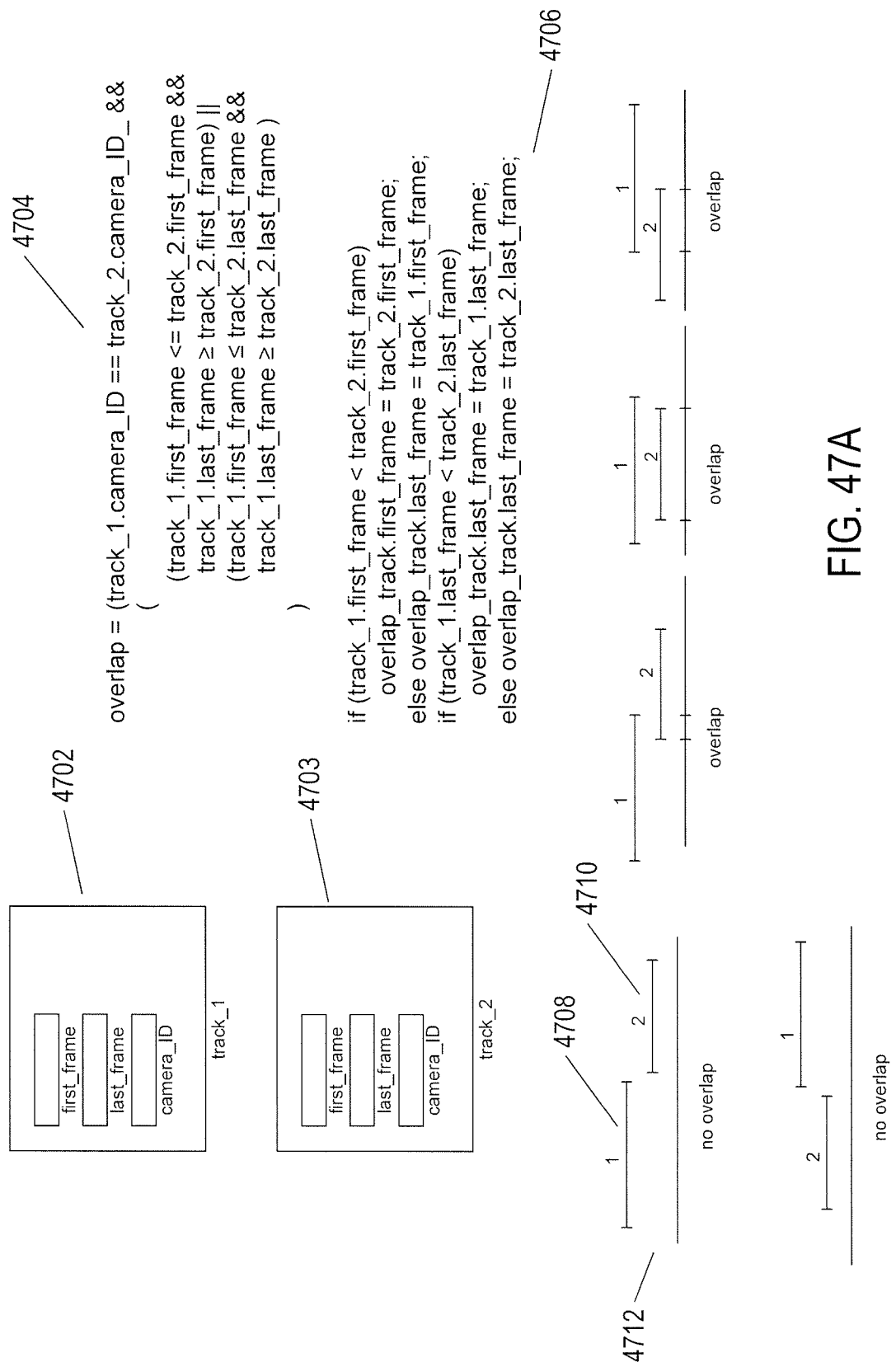
FIGS. 47A-B illustrate track overlap.
Figure 47B:
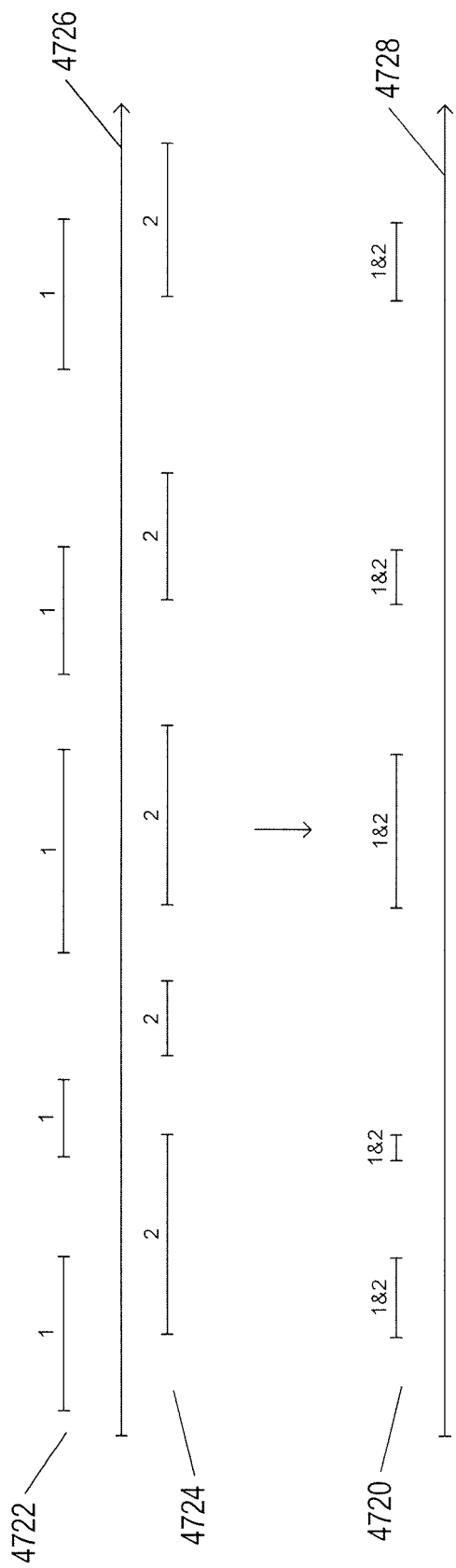

FIGS. 47A-B illustrate track overlap. Two face tracks overlap when the sets of frames from which they are extracted share at least one common frame. As shown in FIG. 47A, two face tracks represented by tracking data structures 4702 and 4703 overlap when, as indicated by expression 4704, they share a common camera ID and the two sets of frames corresponding to the two tracks share a common frame. The short code extract 4706 indicates how the frame boundaries of the overlap track computed from two face tracks is determined. The diagrams in the lower portion of FIG. 47A provide examples of nonoverlapping and overlapping face tracks, each diagram indicating the frame spans, or time spans, of a first track, such as first track 4708, and a second track such as second track 4710 in diagram 4712. As shown in FIG. 47B, a set of overlap tracks 4720 can be computed from a first set of face tracks 4722 and a second set of face tracks 4724, with the face tracks and overlap tracks plotted with respect to a horizontal timeline or frame sequence 4726 and 4728, respectively.

Figure 48A:
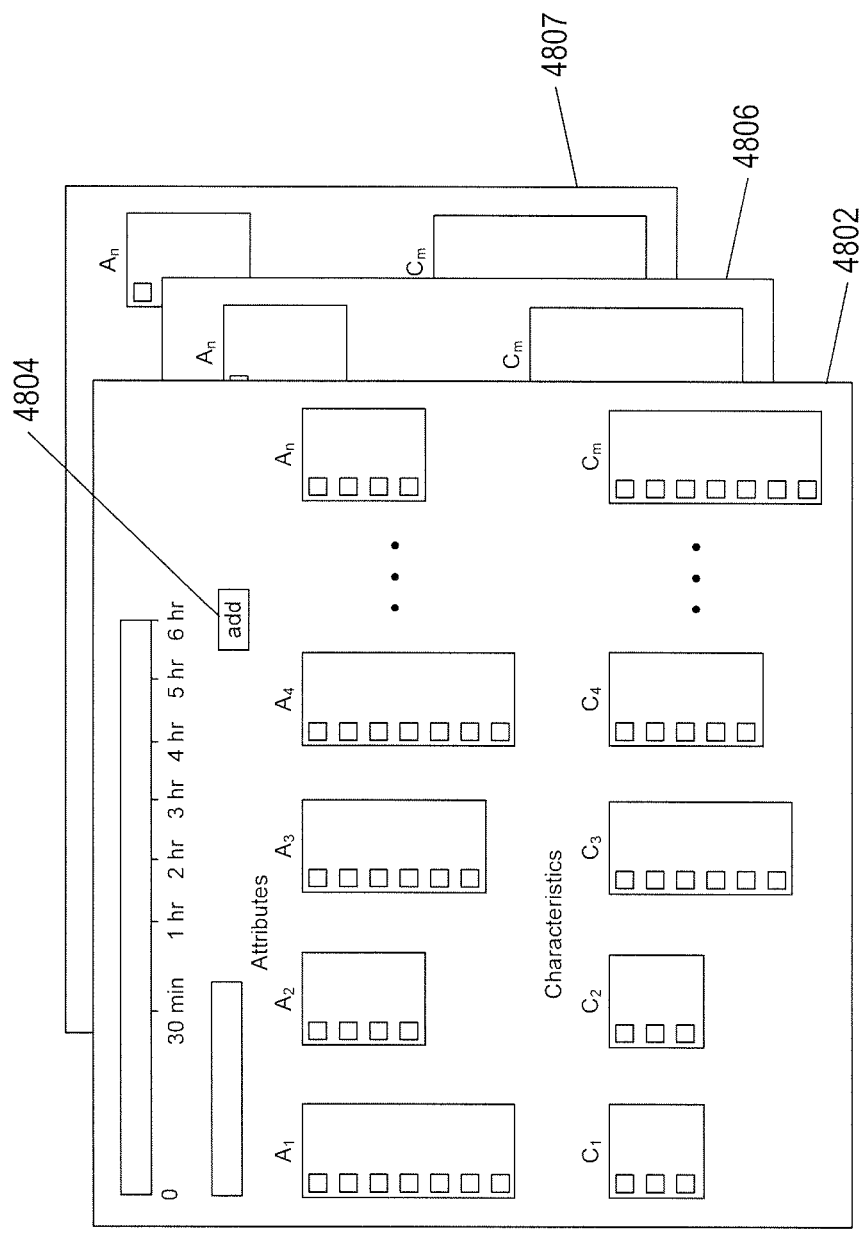
Figure 48C:
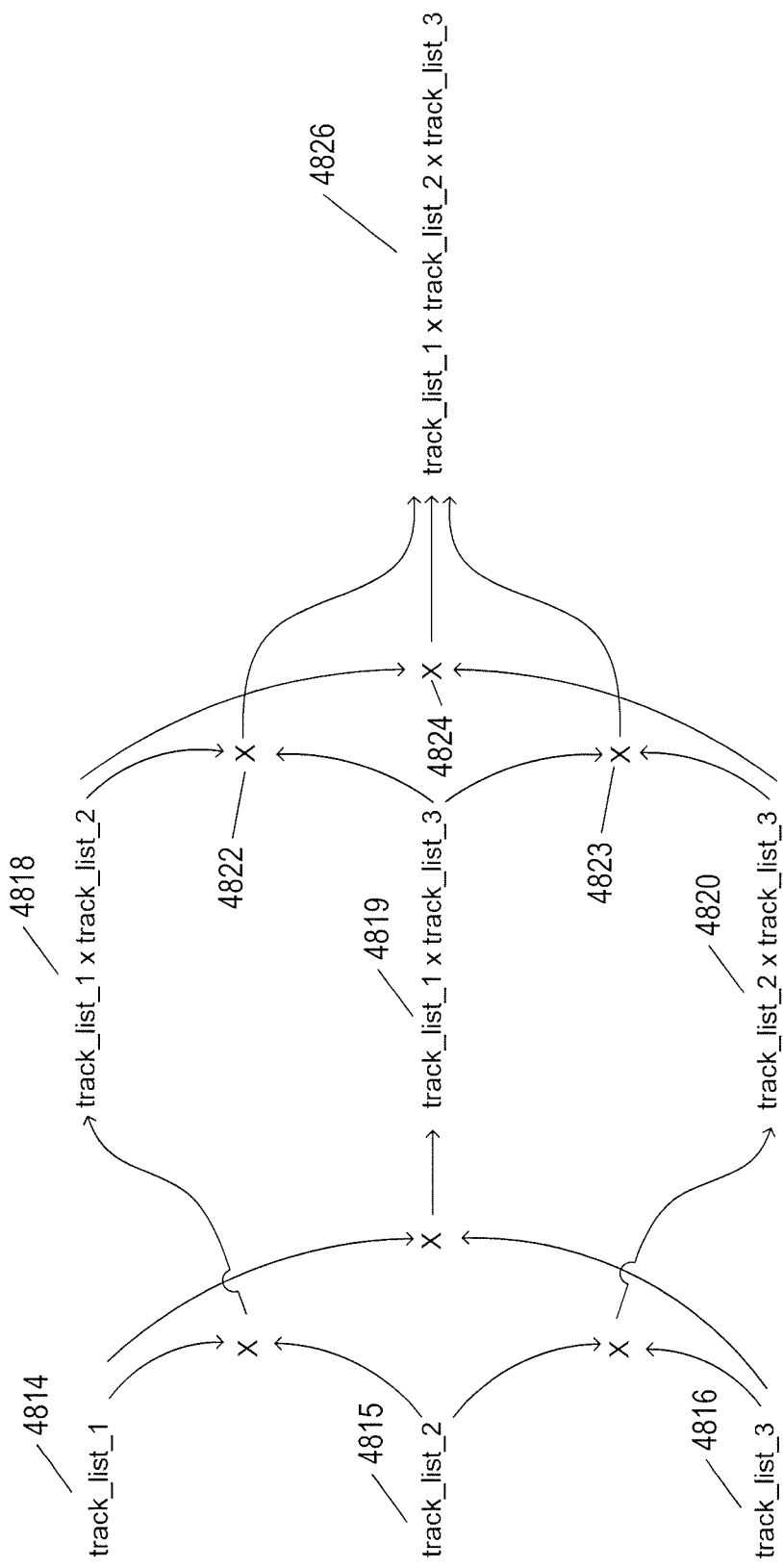
Figure 48D:
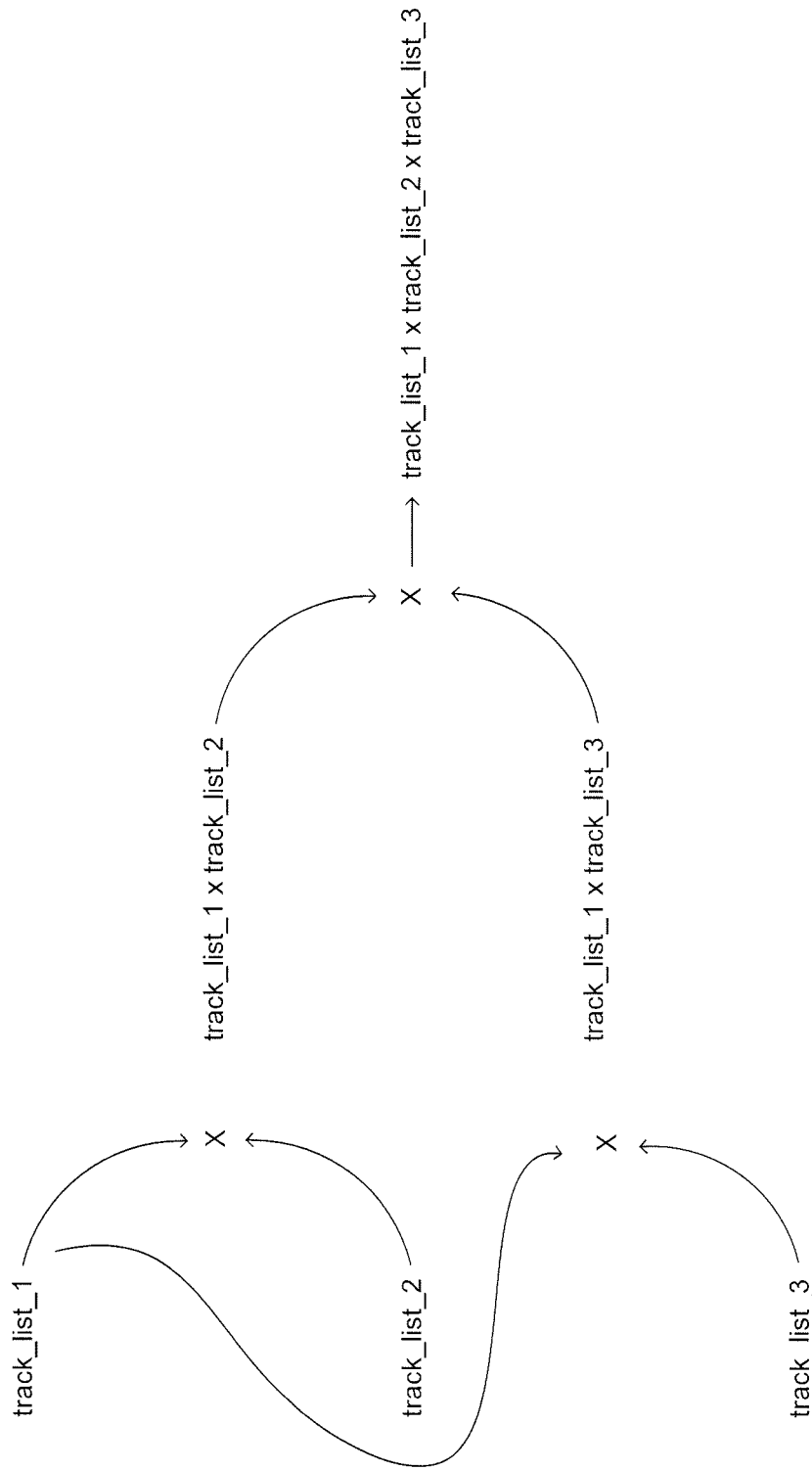
Figure 48E:
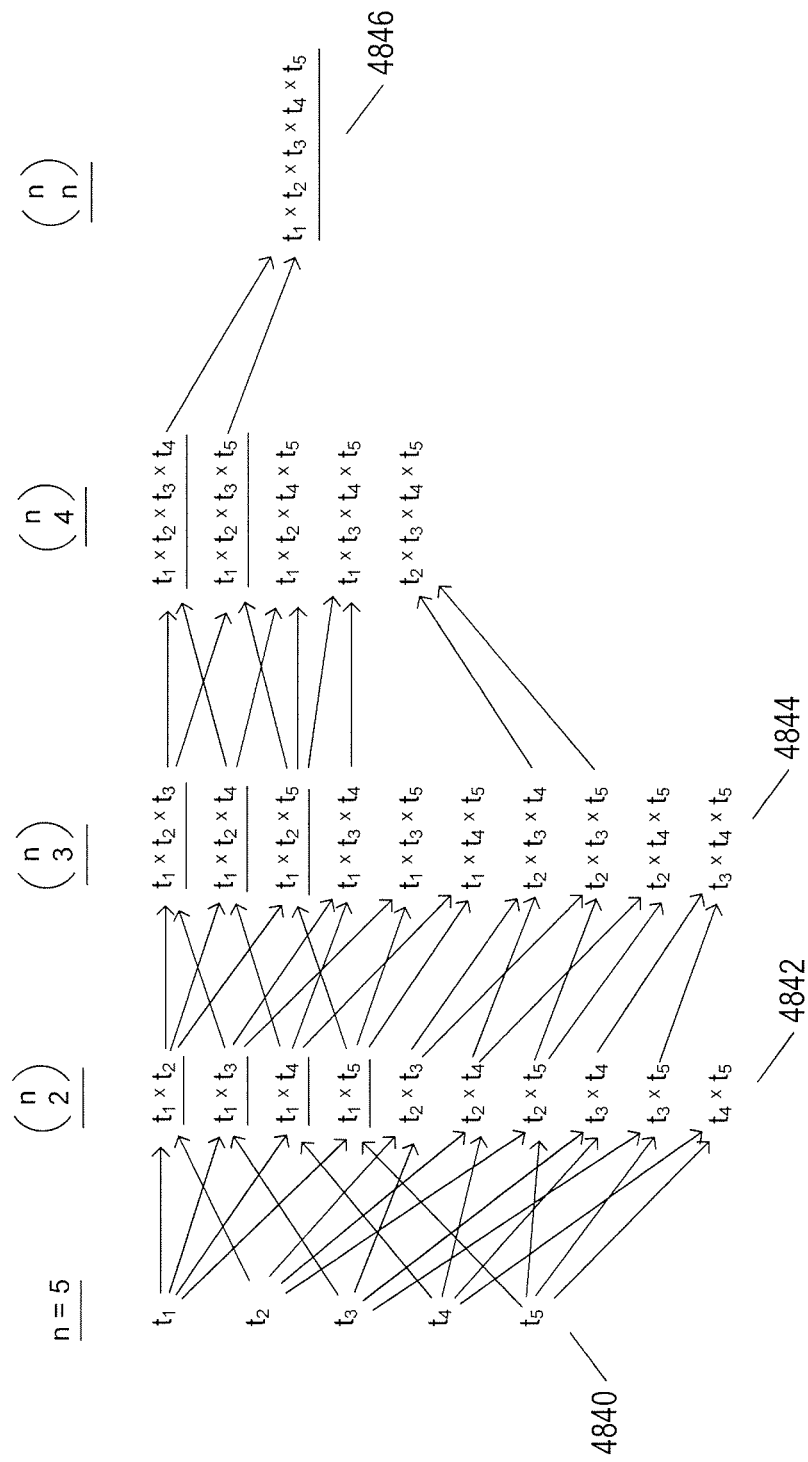

One additional functionality based on the basis search capability provided by the currently disclosed surveillance and monitoring system is the ability to locate frames recorded by particular digital video cameras in which the images of two or more people occur together. FIGS. 48A-E illustrate multi-person searches. FIG. 48A illustrates the GUI query-input pages for a multi-person query, in one implementation of the currently disclosed surveillance and monitoring system. The initial query-input page 4802 is identical to the single-person query-input page discussed above with reference to FIG. 45B. This query-input page includes an additional feature 4804 to which a user or client can input a mouse click or other indication in order to add additional attribute-and-characteristic values, via additional query-input pages 4806-4807, for additional individuals. In order to process a multi-person query, as shown in FIG. 48B, the portions of the query that provide attribute-and-characteristic values for each of the multiple people 4810-4812 are each executed to produce a list of tracks 4814-4816 for each person. Then, using a 3-person query example, overlap tracks are generated from the three sets of tracks by generating overlap tracks from each possible two-way combination of the initial sets of tracks, as shown in FIG. 48C. in this figure, the operator "X" stands for the generation of a set of overlap tracks from two input sets of tracks. Thus, as shown in FIG. 48C, from the initial sets of tracks for the three people 4814-4816, three sets of overlap tracks 4818-4820 are generated. Then, a further set of overlap tracks from any one of the three possible two-way combinations 4822-4824 of the three sets of overlap tracks 4818-4820 can be generated as a final set of overlap tracks 4826 that represent the frames in which all three people occur together. These overlap tracks can then be returned as the results for the multi-person query. As shown in FIG. 48D, if only overlap tracks containing all of the people specified in a multi-person query are desired, the final set of overlap tracks, if there are any, can be generated using fewer overlap-track-generation operations. However, in certain implementations, a multi-person query returns frames in which the maximum number of the query-specified people occur, even when the maximum number is less than the total number of specified people. In these cases, a full combinatoric overlap-track generation scheme is used. FIG. 48E illustrates the general approach to carrying out a multi-person query. FIG. 48E shows an example in which the attribute-and-characteristic values for five people are specified in the query. First, a query for each of the individuals is carried out, with the results of the individual queries shown in a first column 4840. Then, all possible pairwise overlap-track-generation operations are carried out, with the overlap-track results indicated in column 4842. Next, all possible three-person overlap tracks are generated, as represented by column 4844. This process continues until a final overlap track for all of the specified people is generated 4846. Of course, the process may be short-circuited when there are insufficient overlap tracks generated in any particular step. When only overlap tracks that contain all of the specified individuals are desired, then, as indicated by underlining in FIG. 48E, a much smaller number of overlap-track-generation steps are needed.

Figure 49A:
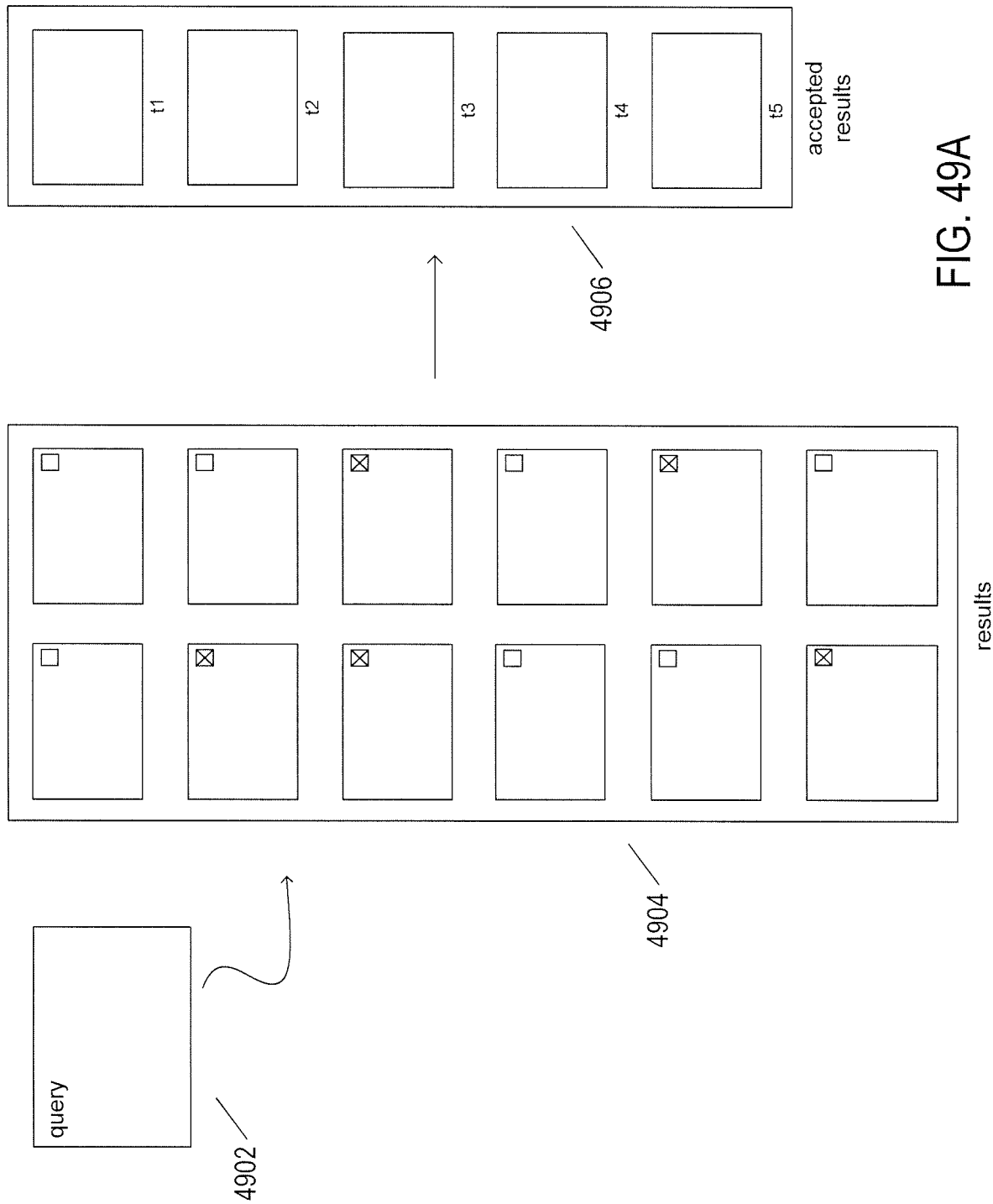
FIGS. 49A-B illustrate a trajectory search.
Figure 49B:
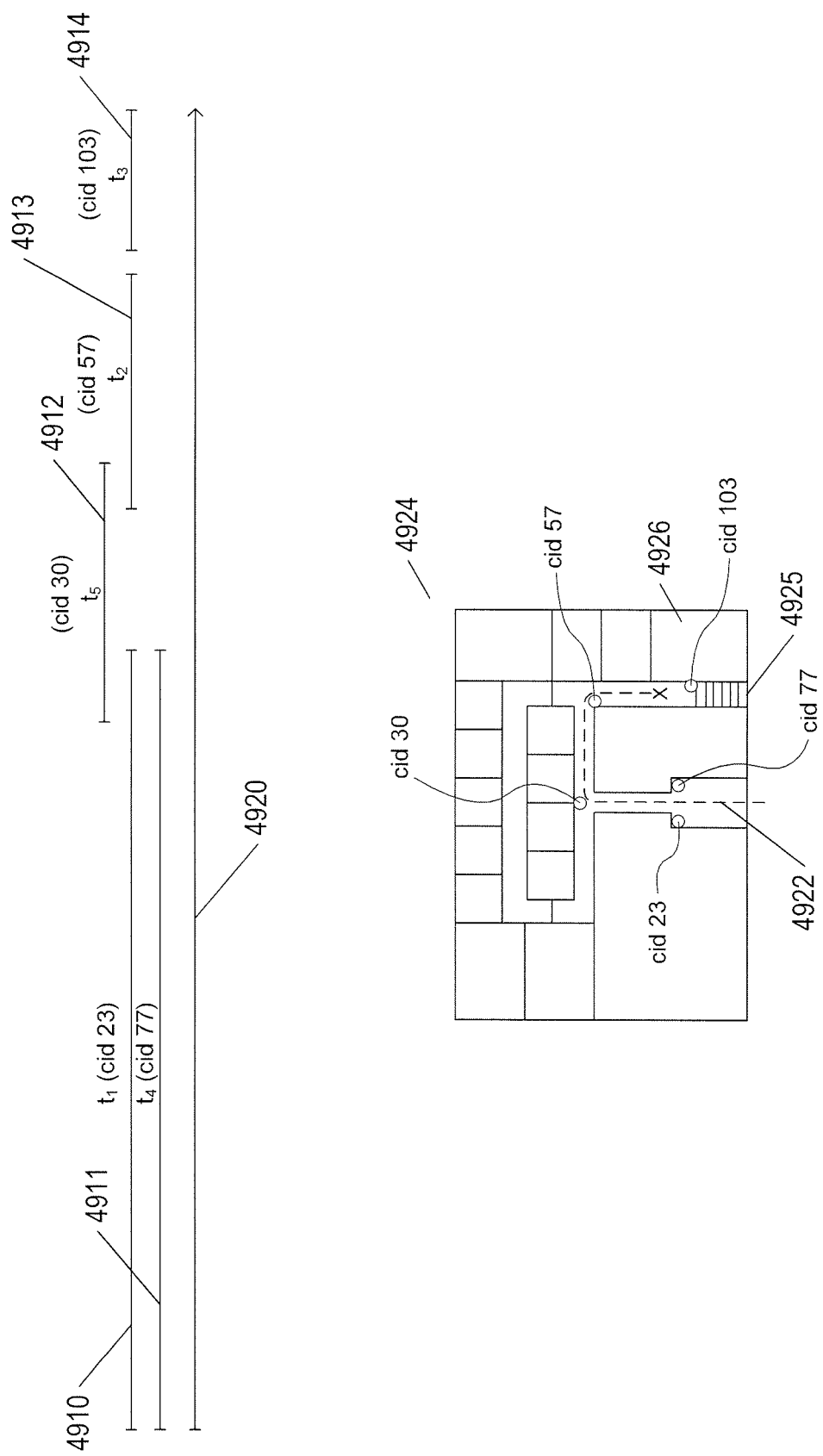

Another functionality provided by the currently disclosed surveillance and monitoring system is the ability to query for a trajectory of a particular individual within a monitored region or volume. FIGS. 49A-B illustrate a trajectory search. As indicated in FIG. 49A, a trajectory query begins with a standard query 4902 that specifies attribute-and-characteristic values for a particular individual for some particular time interval. An initial set of results 4904 is provided to the user or client. The user or client then marks the result tracks of interest, with the marks indicated by the symbol "X" in track-marking features in FIG. 49A, to specify a set of accepted results 4906. The accepted results are then input to a trajectory search. As shown in FIG. 49B, processing of the trajectory search is carried out by organizing the tracks of the accepted results 4910-4914 with respect to a timeline 4920. The time-ordered tracks can then be used to graphically display a trajectory, represented by the dashed curve 4922 in FIG. 49B, within a graphical representation of all or a portion of the monitored area or volume 4924. A trajectory search can be used to identify the path taken by a specified individual within the monitored area or volume, from which the individual's current location can be determined and from which subsequent trajectories may be inferred by security personnel. For example, in the example shown in FIG. 49B, it may be inferred that the individual may either be attempting to enter the stairway 4925 in order to access a floor above the floor represented by the layout scheme 4924 or may be attempting to enter the space 4926 of the floor represented by the layout scheme 4924.

Figure 50A:
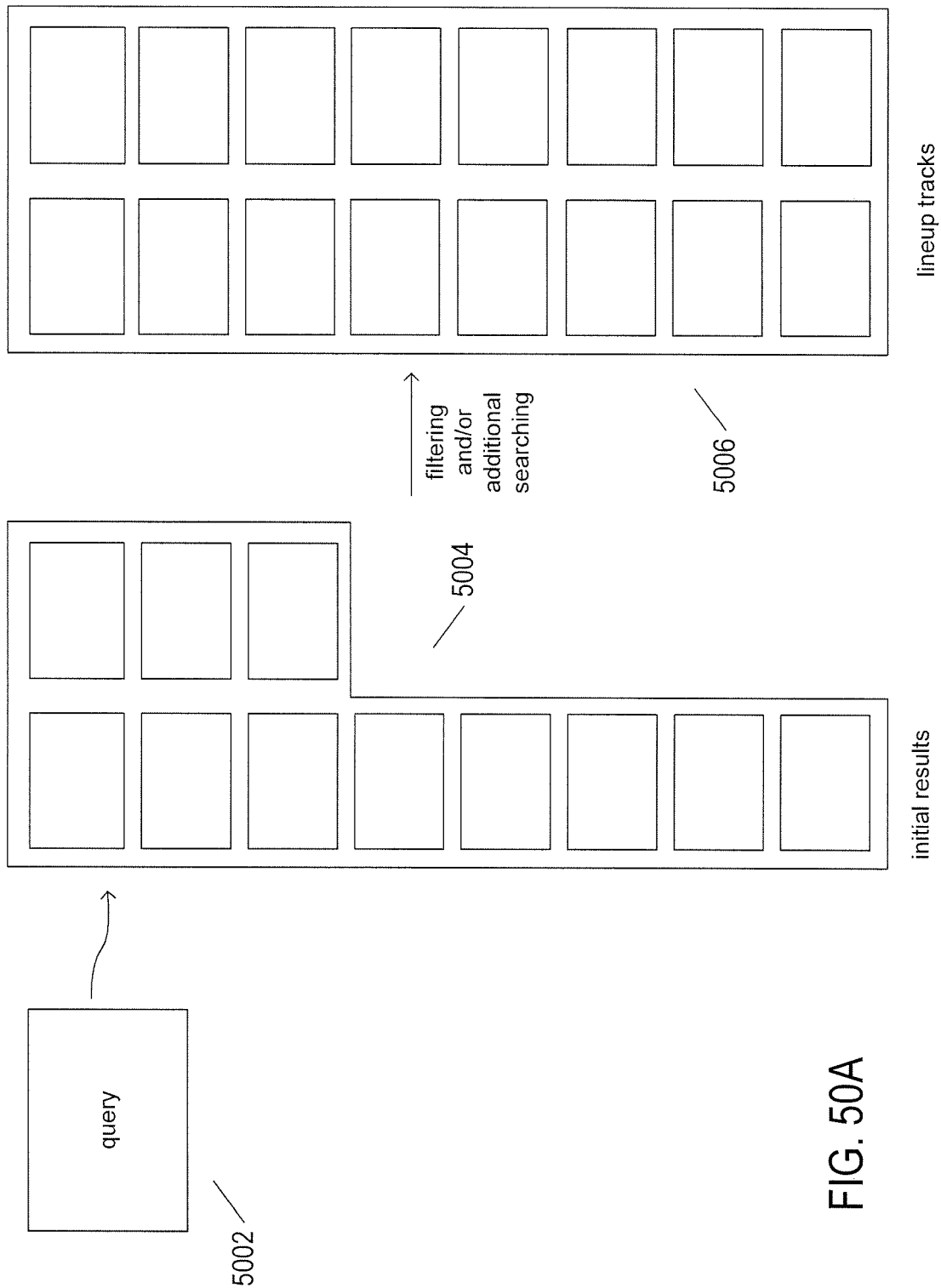
Figure 50C:
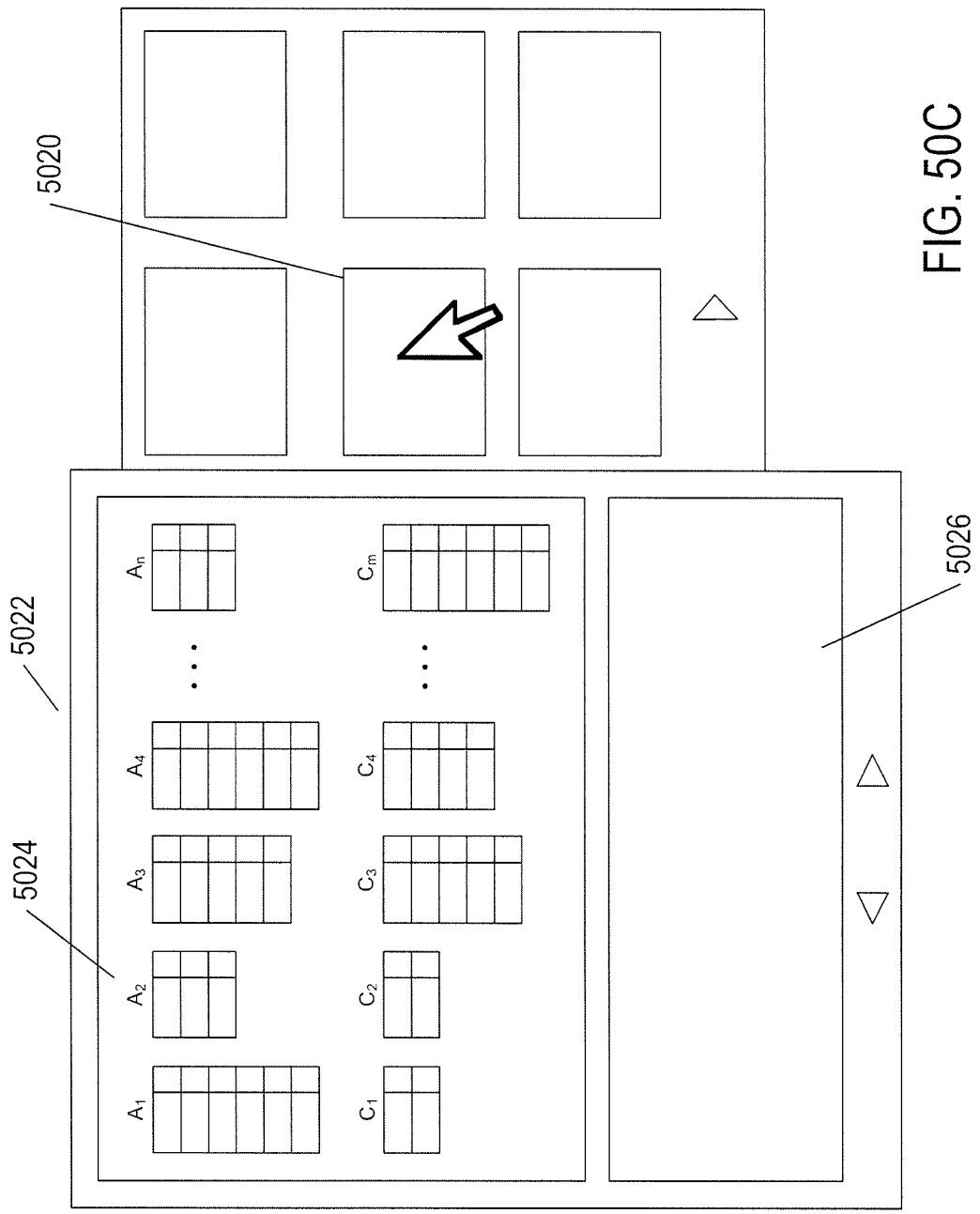

The currently disclosed surveillance and monitoring system also provides a lineup functionality. FIGS. 50A-C illustrate the lineup functionality. As shown in FIG. 50A, a query specifying an individual 5002 is first processed to produce a set of initial track results 5004. These results may be filtered and/or supplemented by additional searching to produce a set of lineup tracks 5006. A best facial image from each of these lineup tracks is then organized into one or more lineup display pages, such as lineup display page 5010 shown in FIG. 50B. When there are more than a threshold number of lineup tracks, the best facial images are displayed in multiple lineup display pages. The multiple lineup display pages can be navigated using navigation features 5012 and 5014. The lineup a display pages can be displayed to human witnesses on laptops or other processor-controlled devices by security personnel in order to solicit positive identification of a particular individual. As shown in FIG. 50C, input of a mouse click or other input to a facial image 5020 and a lineup page display produces a details page 5022, in one implementation, that shows the probabilities for the various attributes and characteristics 5024 associated with the lineup track as well as a track viewer 5026. When a witness is confident that the lineup track represents a particular individual observed by the witness, the attributes and characteristics associated with the lineup track can be used to search for more tracks containing the individual, which may, in turn, be used to identify the current location of the individual and/or carry out a trajectory search for the individual.

FIG. 51 illustrates the redaction operation. In many cases, it is desirable that the facial features of people in surveillance and monitoring videos be blurred or removed. For example, a frame 5102 containing the image of an individual 5104 may be redacted to produce a redacted corresponding frame 5106 by blurring or removing facial details of the individual 5108 from the frame. The currently disclosed surveillance and monitoring system can automatically redact facial features on a face-track by face-track basis, which vastly simplifies the reduction process currently carried out by manual operations and currently available digital-video-based surveillance and monitoring systems. Redaction rules can specify the age ranges, for example, or other attributes of people whose images are to be redacted.

Figure 52:
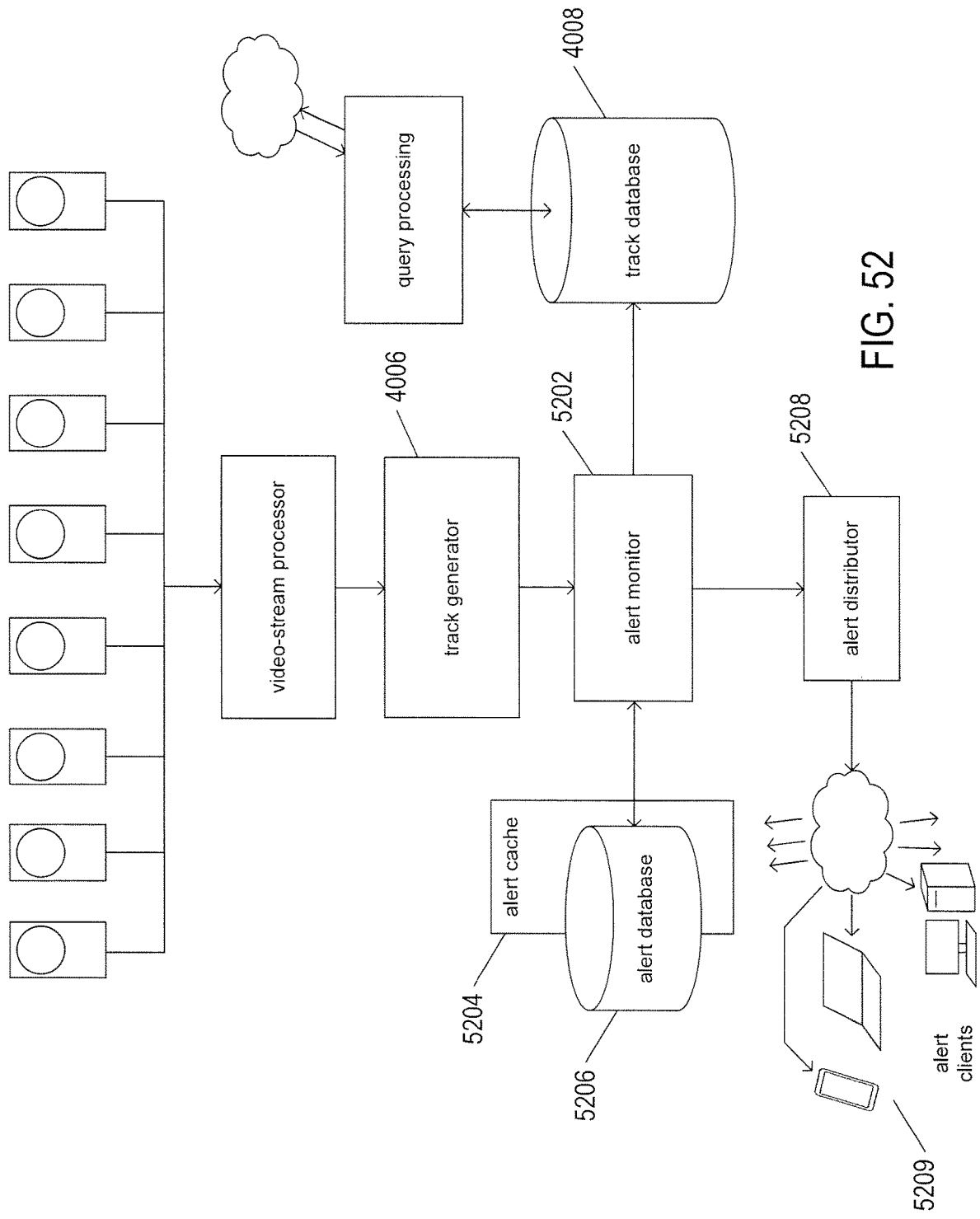
FIGS. 52-55 illustrate various additional features and functionalities of the currently disclosed surveillance and monitoring system.

FIGS. 52-55 illustrate various additional features and functionalities of the currently disclosed surveillance and monitoring system. FIGS. 52-55 use many of the same illustration conventions used in FIG. 40, Discussed above. FIG. 52 shows the alert monitor. The alert monitor 5202 receives tracks generated by the track generator (4006 in FIG. 40) prior to, concurrently with, or asynchronously to storage of the tracks in the track database (4008 in FIG. 40).

The alert monitor accesses alert rules that are stored in a combination of a memory cache 5204 and an alert-rule database 5206. When a next track is received from the track generator, the alert monitor searches the alert rules within the cache 5204 and/or database 5206 to determine any alert rules that may apply to the received track. When application of the determined alert rules to the received track indicate that an alarm condition is associated with the track, the alert monitor calls an alert-distributor module 5208 to distribute indications of the alert condition via a local area network and/or the Internet to the processor-controlled devices 5208 of surveillance-and-monitoring personnel designated to receive alert indications for the alert condition. The alert monitor therefore provides an automated alert system based on the information contained in face tracks generated by the track generator. For example, an alert rule may specify that an alert condition occurs whenever an individual matching particular attribute-and-characteristic values is detected within the monitored area or volume. Many other types of alert rules can be specified through an alert-rule interface provided by the currently disclosed surveillance-and-monitoring system to authorized users and clients, which are generally employed security personnel.

Figure 53:
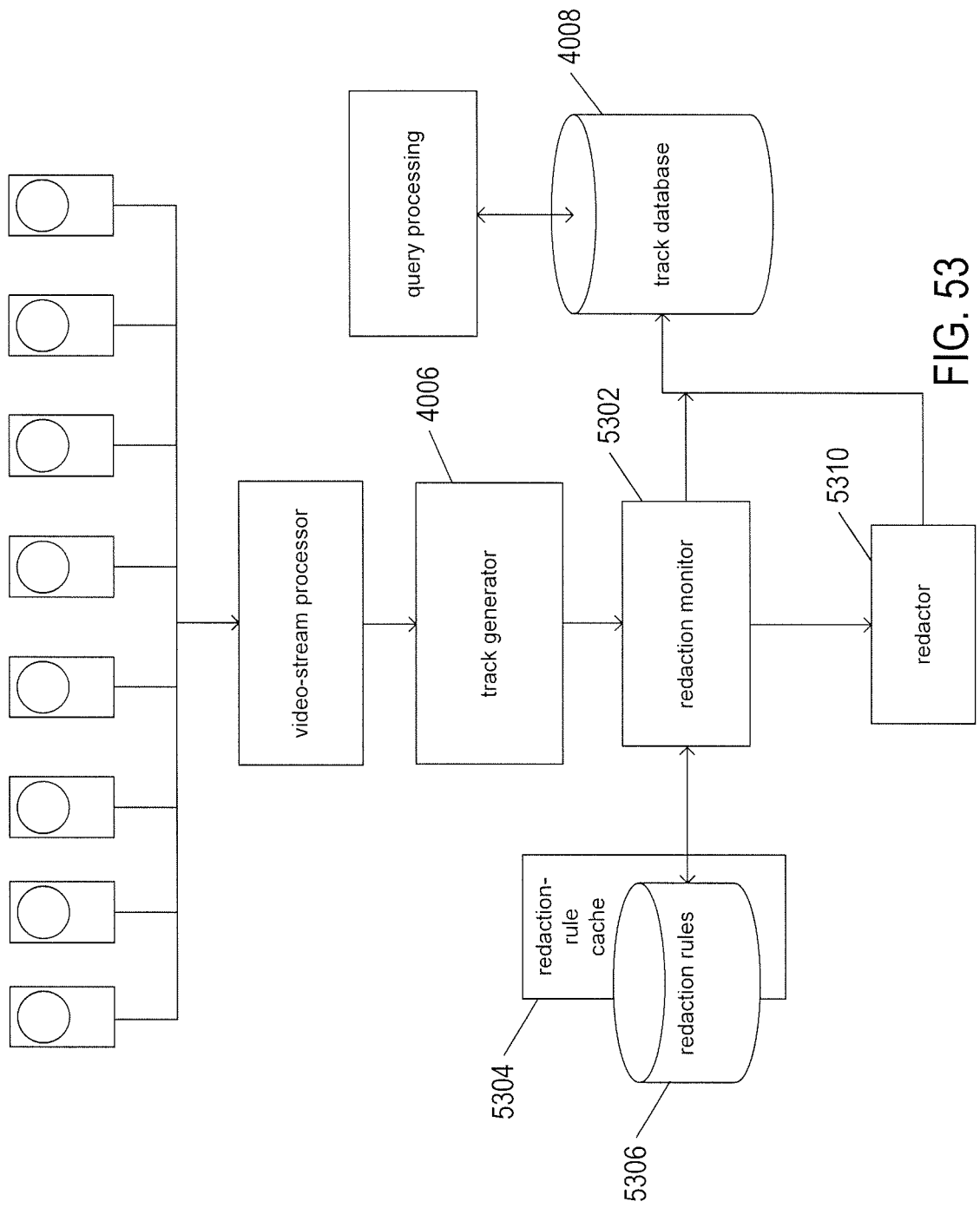

FIG. 53 illustrates the redaction monitor and redacted or modules. The redaction monitor 5302 receives tracks from the track generator 4006 prior to their storage in the track database 4008. The redaction monitor accesses redaction rules stored in one or more of a redaction-real memory cache 5304 and a redaction-rule database 5306. When the redaction monitor receives a next track generated by the track generator, the redaction monitor searches for any redaction rules applicable to the track and applies the redaction rules to the track. When application of a redaction rule to a track indicates that the track should be redacted, the redaction monitor calls the redactor module 5310 to redact the track prior to storage of the track and the track database. There are various different ways that tracks are redacted in different implementations of the currently disclosed surveillance and monitoring system. In certain implementations, in which only portions of recorded video corresponding to tracks can be viewed, the redact field within the tract data structure is set so that, whenever the track is viewed by a user or client, the facial regions are blurred or removed. In alternative implementations, the facial regions are blurred or removed from the underlying video frames, to prevent subsequent viewing of the facial regions of the individual corresponding to the track. Various degrees of redaction may be specified, varying from redaction of only facial features to redaction of a large portion of a person's image.

Figure 54:
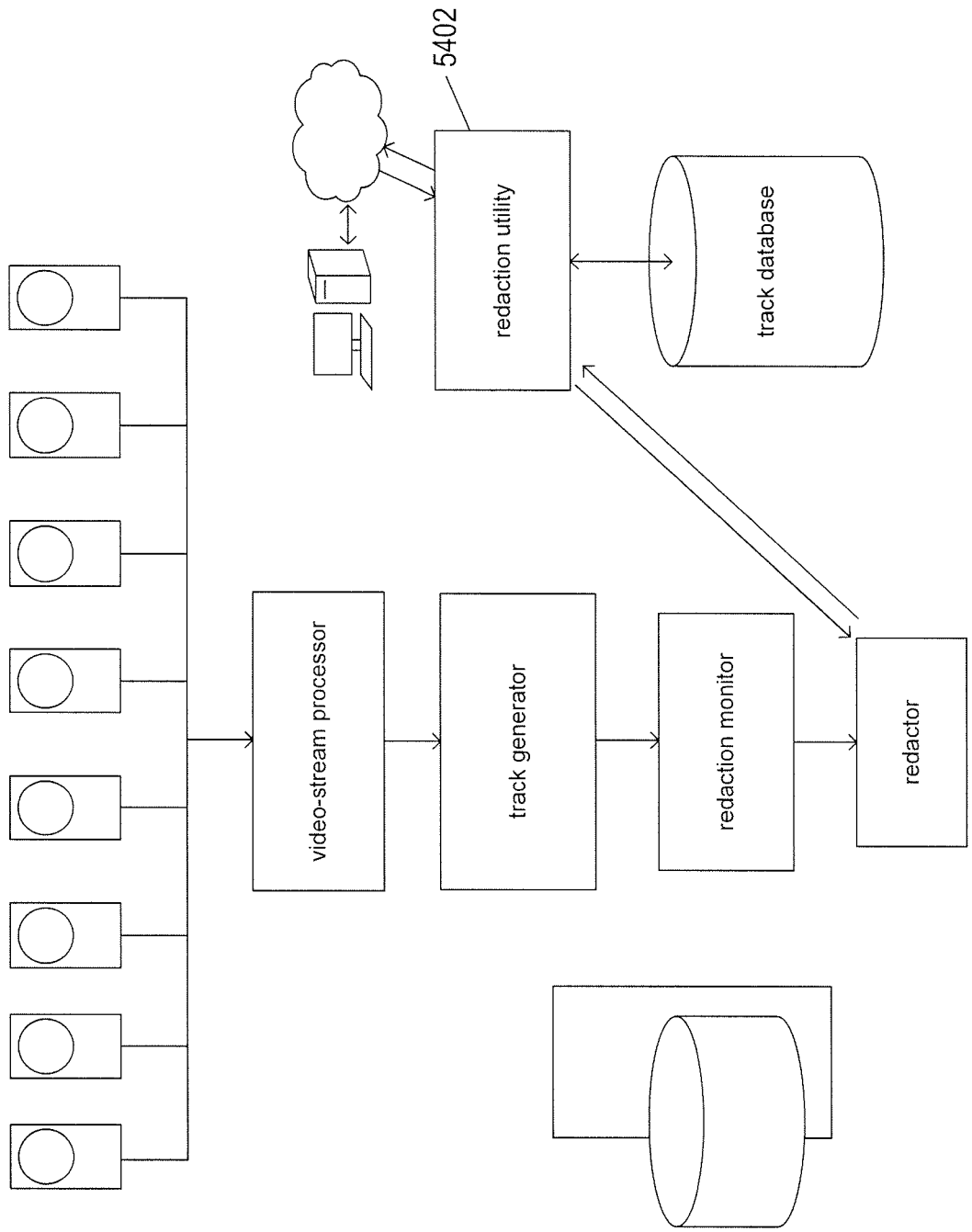

FIG. 54 illustrates additional redaction utilities provided by the currently disclosed surveillance and monitoring system. These additional utilities, provided by a redaction-utility module 5402, provides a redaction GUI to users or clients that allow users or clients to individually redact tracks from frames, on a frame-by-frame basis, or to specify redaction of tracks that cannot be specified or that have failed to be specified by the various redaction rules used by the redaction monitor.

Figure 55:
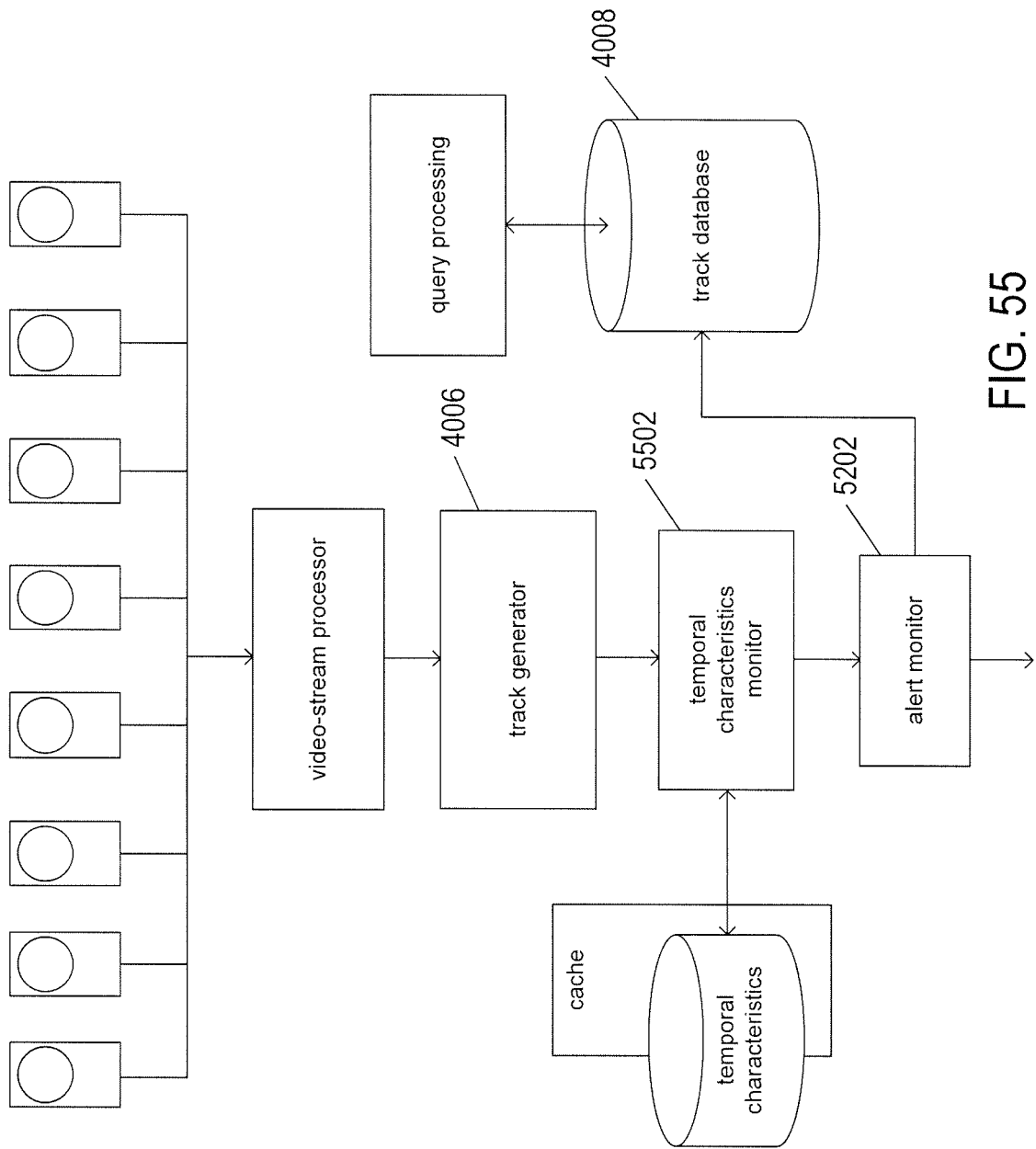

FIG. 55 illustrates a temporal-characteristics monitor. The temporal-characteristics monitor 5502 receives tracks generated by the track generator 4006 prior to, concurrently with, or asynchronously to storage of the tracks in the track database 4008. The temporal-characteristics monitor uses the information contained in tracks generated by the track generator to maintain various types of time-associated cumulative statistics and characteristics for each of the cameras used for surveillance and monitoring by the surveillance and monitoring system. For example, the temporal-characteristics monitor may monitor the age ranges, ethnicities, genders, and other such population characteristics of people within the field of view of a camera for particular times of day, particular times of day during particular times of the month, and for other time periods. The temporal-characteristics monitor can compare the current population statistics for the current time and for the camera associated with the currently received track to an average set of population statistics for the current time and camera in order to detect anomalous conditions and unexpected phenomena. When anomalous conditions another unexpected phenomena are detected, the temporal-characteristics monitor can generate an alert condition and forward the alert condition to the alert monitor 5202 for distribution to users and clients, generally employees of a surveillance and monitoring organization. In alternate implementations, temporal-characteristics-based anomaly detection may be carried out asynchronously to generated-track processing.

Figure 56A:
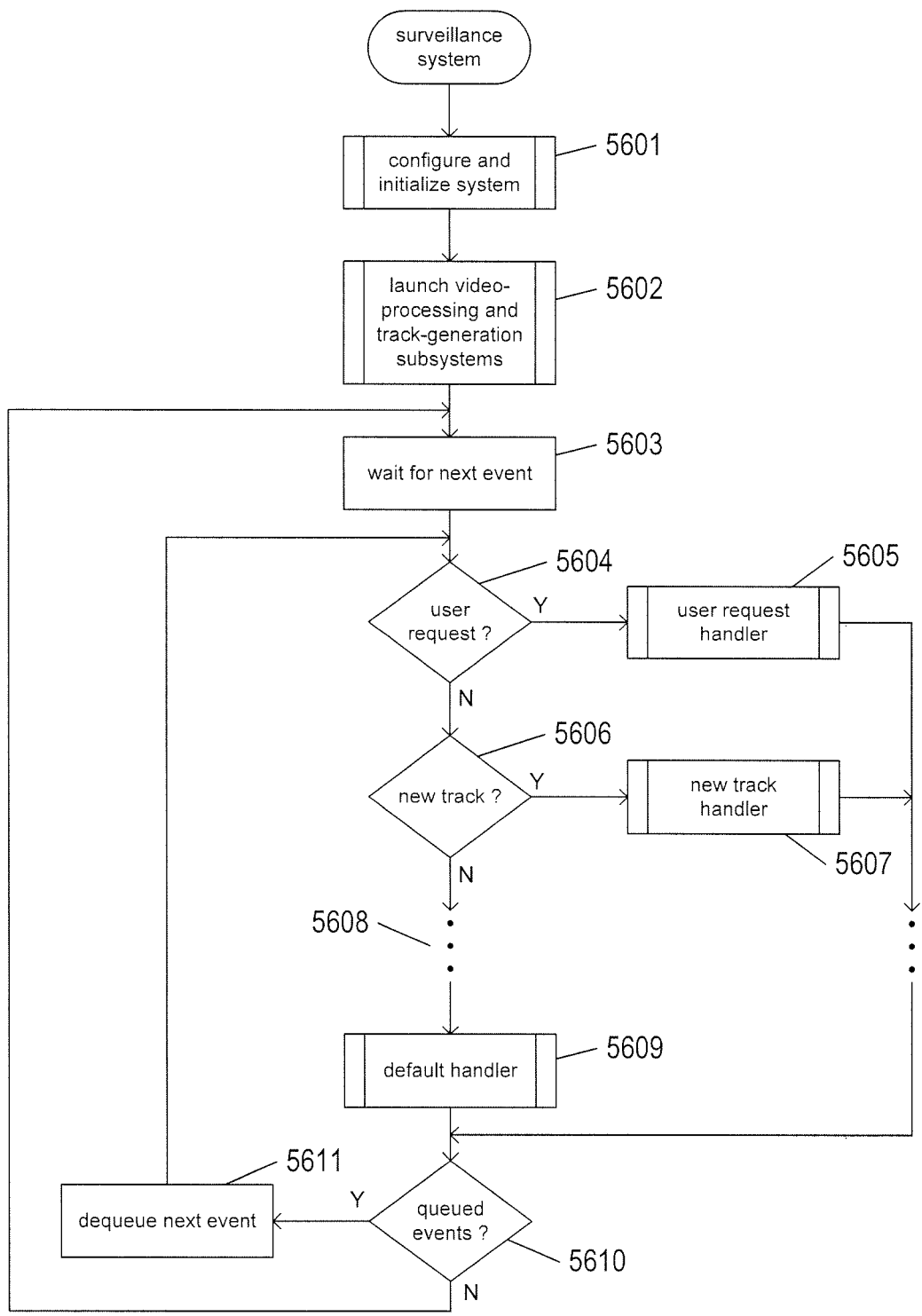
FIGS. 56A-G provide control-flow diagrams that illustrate one implementation of the currently disclosed surveillance and monitoring system.

FIGS. 56A-G provide control-flow diagrams that illustrate one implementation of the currently disclosed surveillance and monitoring system. FIG. 56A provides a control-flow diagram for the surveillance and monitoring system. In step 5601, the surveillance and monitoring system is configured and initialized. In step 5602, the surveillance and monitoring system is launched, including launching of the video-processing and track-generation subsystems, along with the additional subsystems and modules discussed above, including the alert module, redaction module, and temporal-characteristics module. Then, the surveillance and monitoring system begins to continuously execute an event loop, beginning with step 5603, where the surveillance monitoring system waits for a next event to occur. When the next occurring event is a user or client request, as determined in step 5604, a user-request handler is called in step 5605. When the next occurring event is a new-track-generation event, as determined in step 5606, a new-track handler is called in step 5607. Ellipsis 5608 indicates that many other types of events may be handled in the event loop. A default handler 5609 handles any unexpected or rare events. When there are additional events queued for handling, as determined in step 5610, the next queued event is dequeued, in step 5611 and control returns to step 5604. Otherwise, control flows to step 5603, where the surveillance monitoring system waits for a next event to occur.

Figure 56B:
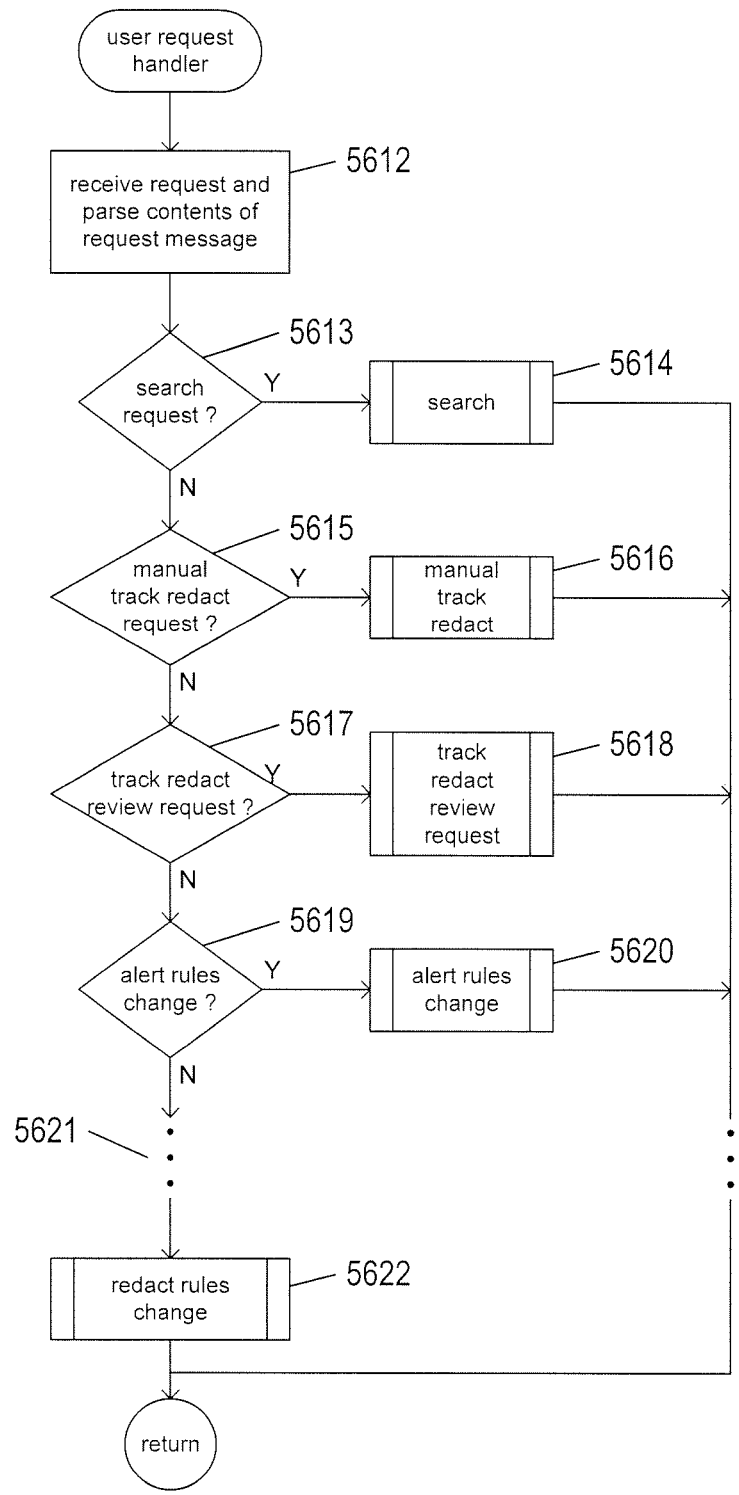

FIG. 56B illustrates the user-request handler called in step 5605 of FIG. 56A. In step 5612, the user-request handler receives a user request and parses the contents of the request message. When the user request is a search request, as determined in step 5613, the routine "search" is called in step 5614. When the user request is a manual track redaction request, as determined in step 5615, a manual track redaction routine is called in step 5616. When the next request is a frame-by-frame manual redaction review request, as determined in step 5617, a corresponding routine is called in step 5618. When the next user request is a request to change the set of alert rules maintained by the system, as determined in step 5619, a routine is called for adding, deleting, or editing the alert rules in step 5620. Ellipsis 5621 indicates that various other types of user and client requests may be received and handled by the user-request handler. In step 5622, a routine is called to add, delete, or edit redaction rules in response to a redaction-rules-change request.

Figure 56C:
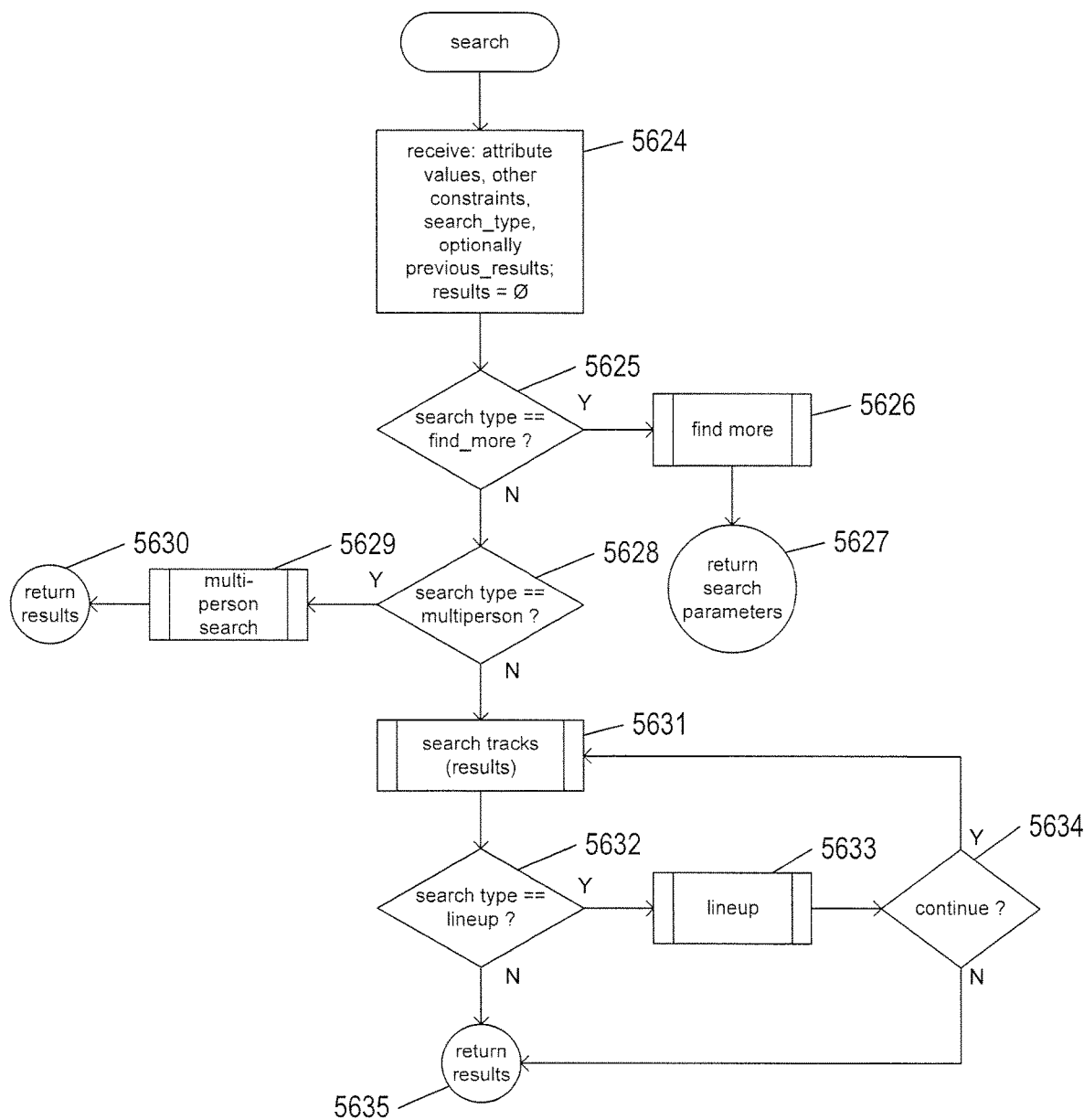

FIG. 56C illustrates the routine "search," called in step 5614 of FIG. 56B. In step 5624, the routine "search" receives attribute-and-characteristic values, other search parameters and constraints, an indication of the search type, and, optionally, an encoding of the previously generated search results and sets the local set variable results to null. When the search type is find_more, as determined in step 5625, the routine "find more" is called in step 5626, and the search parameters returned by this routine are returned in step 5627. The find_more search type represents a request to broaden the search to find additional tracks similar to tracks returned in a previous search. When the search type is multiperson, as determined in step 5628, the routine "multi-person search" is called, in step 5629, and the results returned by the routine "multi-person search" are returned in step 5630. Otherwise, the routine "search tracks" is called, in step 5631. The routine "search tracks" searches for tracks corresponding to the received search criteria. When the search type is lineup, as determined in step 5632, the routine "lineup" is called, in step 5633. When the value returned by the routine "lineup" is an indication to continue searching, as determined in step 5634, control flows back to step 5631. Otherwise, the current search results are returned in step 5635. It should be noted that the search results returned to a client-side application generally includes one or more face tracks retrieved from the face-track databases as well as one or more frames retrieved from, or generated by, a separate video store.

Figure 56D:
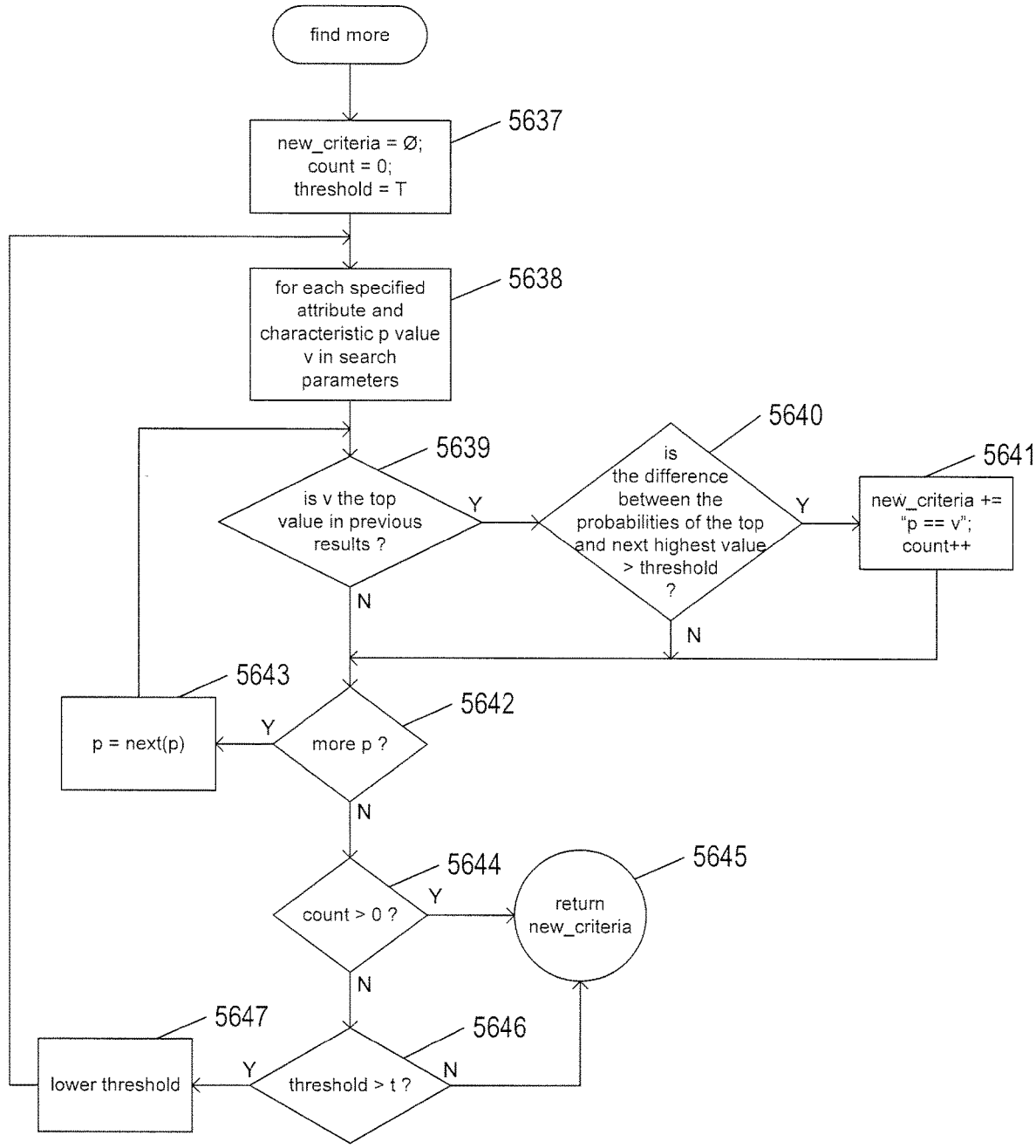

FIG. 56D provides a control-flow diagram for the routine "find more," called in step 5626 of FIG. 56C. In step 5637, the routine "find more" sets a local set variable new_criteria to null, sets a local variable count to 0, and sets a local variable threshold to a predetermined threshold T. Then, in the for-loop of steps 5638-5643, the value v for each attribute or characteristic p specified in the current search parameters is considered. When v is the most probable value according to the previous search results, as determined in step in step 3639, and when the difference between the probabilities associated with v and the next most probable value is greater than a threshold value, as determined in step 5640, then the specification of value v for attribute or characteristic p is added to the set represented by the local variable new_criteria, in step 5641, and the local variable count is incremented. Once the for-loop of steps 5638-5643 has completed, when the value of the variable count is greater than 0, as determined in step 5644, the contents of the local variable new_criteria is returned in step 5645. Otherwise, if the value of the local variable threshold is greater than a minimum value T, as determined in step 5646, the value of the local variable threshold is decreased, and step 5647, and control flows back to step 5638. Otherwise, the value of the local variable new_criteria is returned in step 5645. In essence, the attributes for which attribute values are most certain in the previous search results are used for a new search, which has the effect of broadening the next search.

Figure 56E:
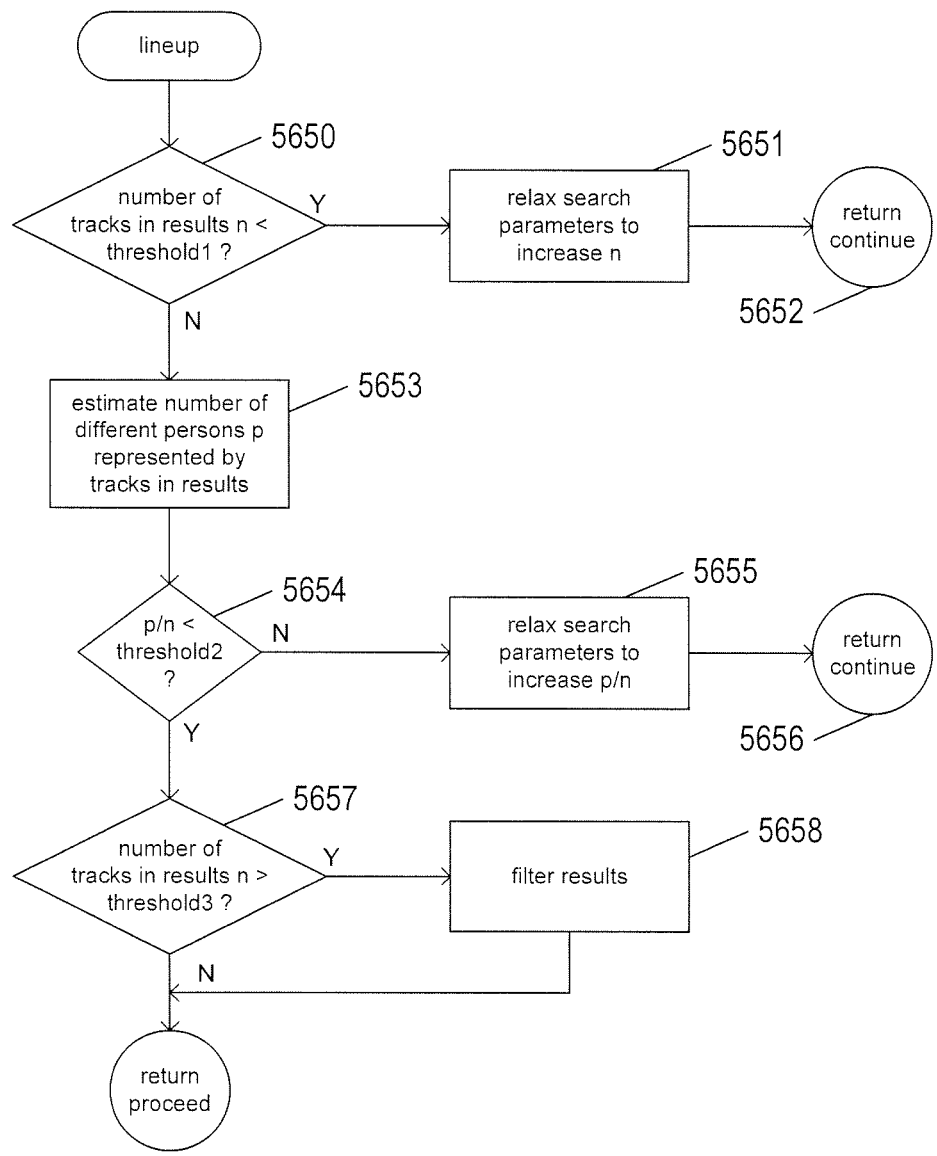

FIG. 56E provides a control-flow diagram for the routine "lineup," called in step 5633 of FIG. 56C. When the number of tracks in the previous search results, n, is less than a first threshold, as determined in step 5650, the current search parameters are modified, or relaxed, in step 5651, in order to attempt to increase the total number of tracks in the results set in a next search and an indication to continue searching is returned in step 5652. Otherwise, in step 5653, an estimate of the number of different people p represented by the tracks in the set of results from the previous search is determined. When the ratio of p to the number of tracks n in the set of results is less than a second threshold, as determined in step 5654, then, in step 5655, the search parameters are relaxed in order to increase the ratio p/n and an indication to continue searching is returned in step 5656. Otherwise, when the number of tracks in the current set of results is greater than a third threshold, as determined in step 5657, the results are filtered, in step 5658, to produce an acceptably sized set of results for generation of one or more lineup display pages.

Figure 56F:
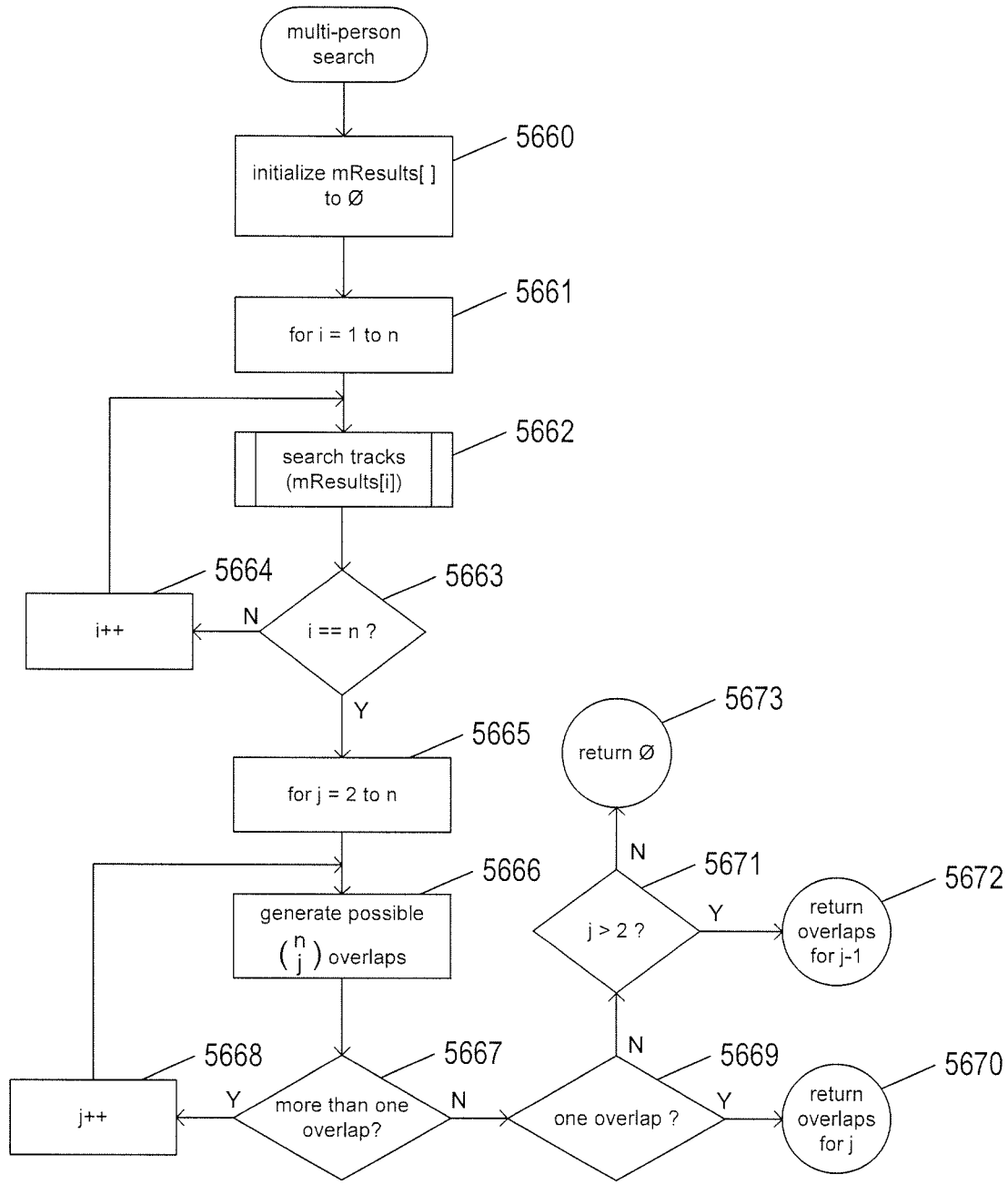

FIG. 56F provides a control-flow diagram for the routine "multi-person search" called in step 5629 of FIG. 56C. In step 5660, a local array variable mResults is cleared. In the for-loop of steps 5661-5664, results for a track search for each of the n persons specified in the search query is carried out, with the results stored in mResults. In the for-loop of steps 5665-5668, each successive step of overlap-track generation, discussed above with reference to FIG. 48E, is carried out until less than two overlap tracks are generated by the current step. When one overlap track was generated in the final step, as determined in step 5669, that overlap track is returned in step 5670. Otherwise, when at least one overlap track was generated in a previous step, as determined in step 5671, the overlap tracks generated in the previous step are returned in step 5672. Otherwise, a null value is returned in step 5673.

Figure 56G:
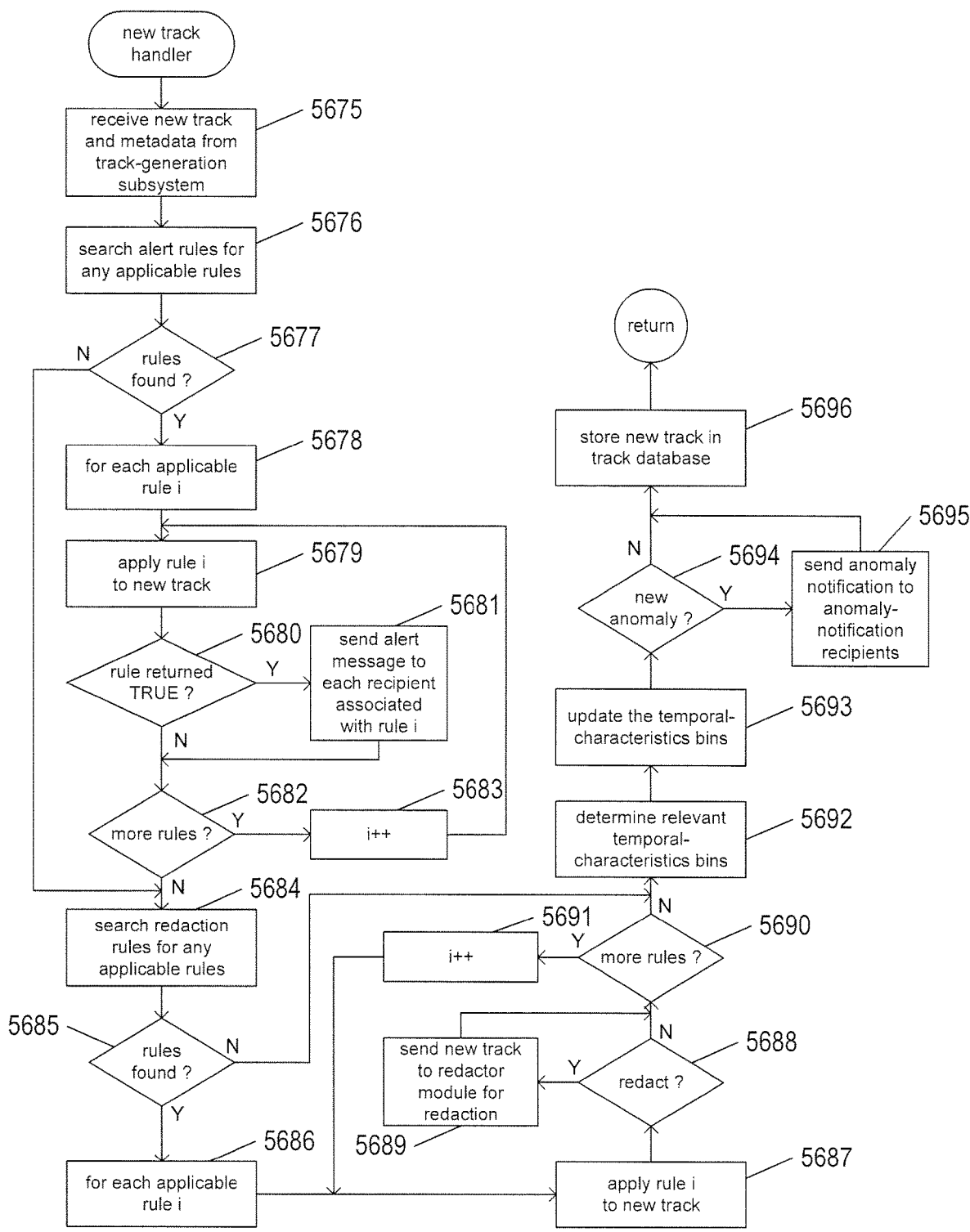

FIG. 56G provides a control-flow diagram for the new-track handler called in step 5607 of FIG. 56A. In step 5675, the new track and metadata are received from the track-generation subsystem. In step 5676, the handler searches the alert rules for any alert rules that may be applicable to the received new track. When one or more applicable rules are found, as determined in step 5677, then, in the for-loop of steps 5678-5683, each of the identified alert rules is applied to the new track and, when application of the alert rule indicates an alert condition, an alert message is sent to each recipient associated with the alert rule. In step 5684, the redaction rules are search for any applicable redaction rules for the currently received new track. When any redaction rules are identified as applicable, as determined in step 5685, then, in the for-loop of steps 5686-5691, the identified rules are applied to the new track and when application of any rule indicates that the track should be redacted, the track is sent to the redactor module for redaction. In step 5692, the various population-statistics categories, or bins, relevant to the data in the new track are determined. In step 5692, a score for the current population statistics relevant to the new track is computed from the data contained in the new track and the current population statistics for the associated camera. The score is less than a threshold value, as determined in step 5693, an anomaly notification is sent to anomaly-notification recipients in step 5694. In step 5695, the current population statistics are updated to include data contained in the new track and, in step 5696, the new track is stored in the track database. In general, anomaly-notification flags are set so that, once an anomaly notification has been distributed, no further notifications are distributed until the current population statistics reflect a different type of anomaly.

Figure 57A:
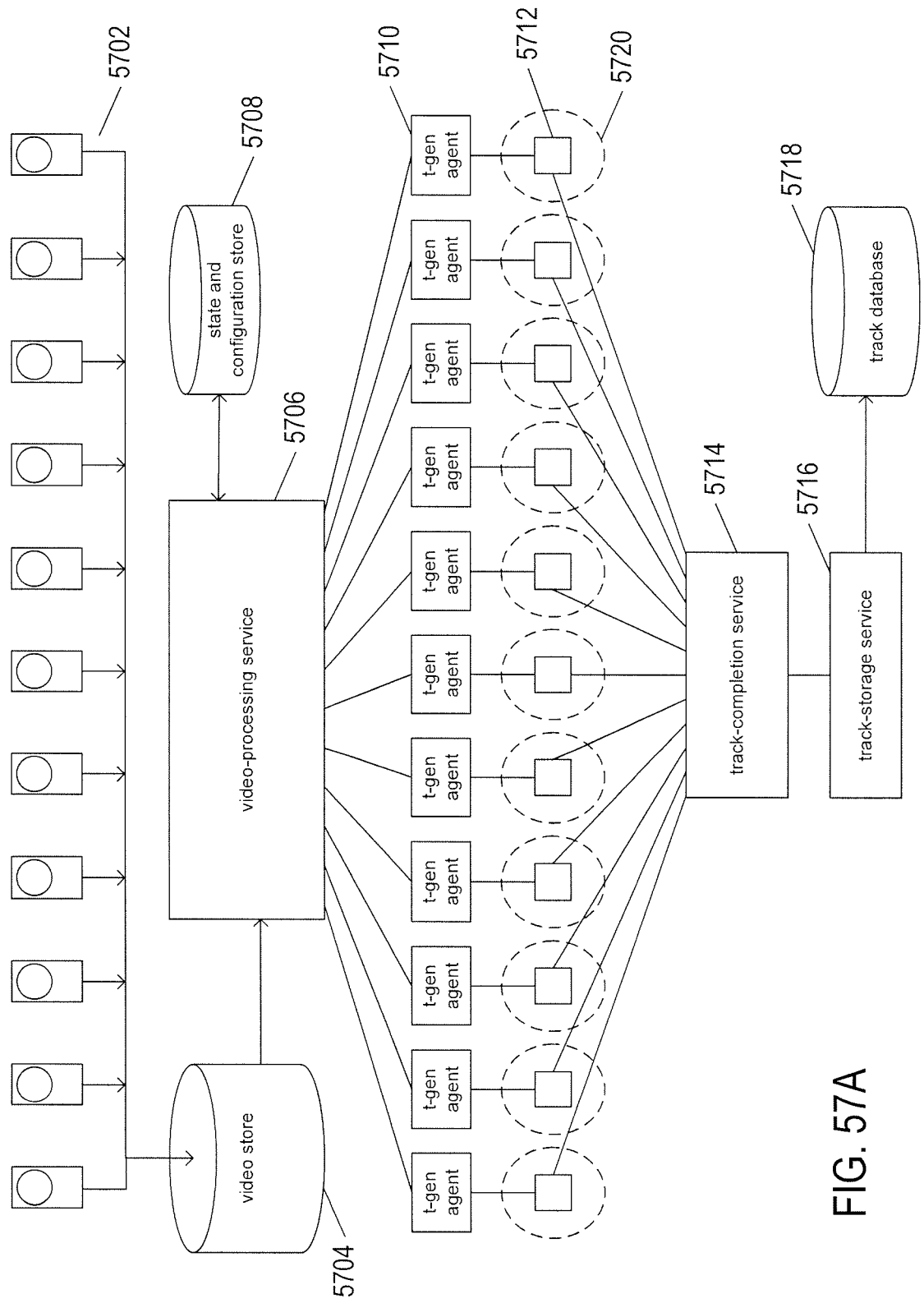
FIGS. 57A-B illustrate the asynchronous-agent-based architecture of the video-processing and face-track generation components of the currently disclosed surveillance and monitoring system.
Figure 57B:
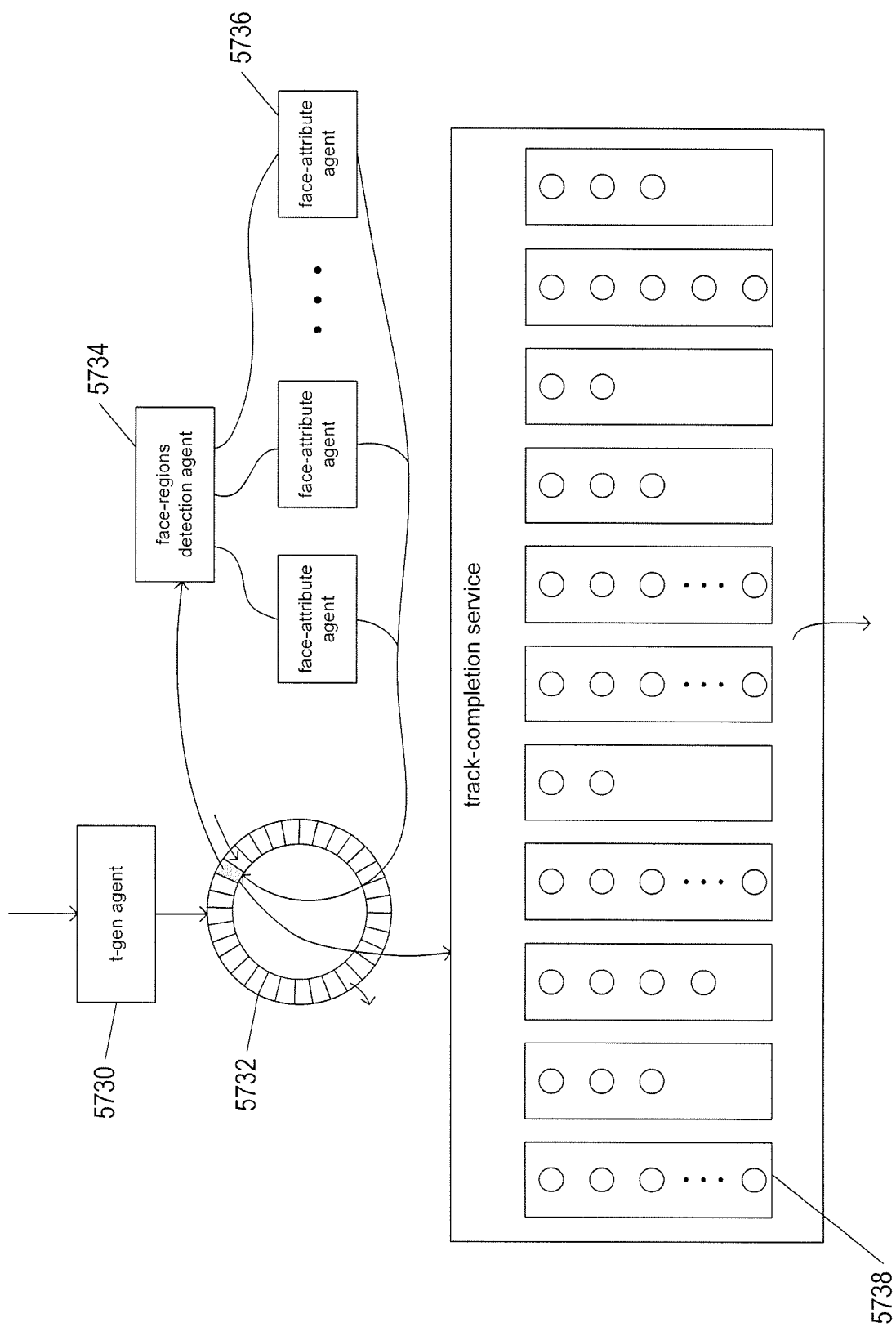

FIGS. 57A-B illustrate the asynchronous-agent-based architecture of the video-processing and face-track generation components of the currently disclosed surveillance and monitoring system. In FIG. 57A, numerous cameras, such as camera 5702, are shown at the top of the figure. These cameras continuously stream video frames to a video store 5704, where they are stored for up to a configurable length of time. The video-processing service 5706 retrieves or receives frames from the video store for processing and track generation. Various different types of video stores may be employed, including video stores that store compressed video and that computationally generate frames on request. In alternative implementations, the video streams may be directed to the video-processing service, which then both stores the video frames and forwards them to track-generation agents. The video-processing service maintains a current state and various types of configuration information in a data store 5708 to enable video processing to be resumed should the system suffer various types of failures. The video-processing service maintains a track-generation agent, such as track-generation agent 5710, for each of the video camera that outputs a video stream to the video store. Each of the frames generated by a video camera is forwarded, by the video-processing service, to the track-generation agent associated with the camera. The frames are temporarily stored by the track-generation agents in a queue, such as queue 5712 associated with track-generation agent 5710. The frames are processed by the track-generation agents asynchronously. Because the raw video frames have already been securely stored in the video store, there is no need for the track-generation agents or the video-processing service to return the frames or persistently store the video frames. Instead, the track-generation agents analyze video frames to detect face regions and assign attributes to each of the detected face regions, and this information is then forwarded to the track-completion service 5714, which monitors face regions across multiple frames in order to construct face tracks, as discussed above. When face tracks are completed, they are forwarded to the track-storage service 5716, which stores the face tracks in the track database 5718. Each frame received and queued by a track-generation agent is processed by multiple temporary agents instantiated for that purpose by the track-generation agent, with the dashed ellipses associated with each track-generation agents in FIG. 57A, such as dashed ellipse 5720, representing the many different face-regions-detection and face-attribute agents that process the frames for the track-generation agent. The video-processing service and track-completion service may each be implemented by one or more application instances running on a single server or as distributed services running one or application instances within each of multiple servers, and the computational resources devoted to implementation of the services may be dynamically adjusted to respond to varying load conditions.

Failures of the various different agents and services can be handled by the system, since current video-processing state information is maintained in data store 5708. Track-generation-agent failures and failures of the agents launched by the track-generation-agents are easily handled by instantiating replacement agents and resuming frame processing where the failed agents left off. In addition, loss of individuals frames is generally easily accommodated, because the above-described stitching operations are able to generate face tracks that span missing frames. Thus, the system is designed to prioritize processing the generated frames sufficiently rapidly to enable the real-time face-track searching, which is, in turn, used to implement all of the various different facilities and features discussed above. Rapid processing is more important than successfully identifying face regions and assigning attributes of the identified face regions for each and every frame. The system is easily scaled to accommodate the addition of new video cameras. The computational resources allocated to the system may be deallocated when they are not needed, due to a decrease in frame-processing overheads.

FIG. 57B illustrates further details with regard to track-generation agents discussed above with reference to FIG. 57A. As shown in FIG. 57B, a track-generation agent 5730 receives frames from the video-processing service and temporarily stores those frames in a frame queue 5732. For each received frame, the track-generation agent launches a face-regions-detection agent 5734, which receives a pointer to the frame temporarily stored in the queue. This agent carries out face-region detection, as discussed above. For each detected face, the face-regions-detection agent launches a face-attribute agent, such as face-attribute agent 5736. The face-attribute agent assigns values to each of the attributes and characteristics associated with face. This information is then made available to the track-completion service and the queue entry for the frame is modified to indicate that all of the processing agents have finished. The track-completion service maintains a set of active face tracks, such as face-tracks set 5738, for each video camera and uses the information returned by the face-region-detection agent and face-attribute agents to accumulate information for the track as well as to detect face-track initiation and face-track completion, as discussed above. When face tracks are completed, they are forwarded to the track-storage service (5716 in FIG. 57A). The track-generation agent monitors the queue 5732 to allow for overwriting the queue entries for timed-out frames and adjusts the input and output pointers associated with the queue to continuously free up space for new frames. Thus, video processing and face-track generation is carried out by a highly asynchronous and highly scalable collection of services and asynchronous agents, and is highly tolerant to various types of failures, including agent failures and frame-processing timeouts.

Although the present invention has been described in terms of particular embodiments, it is not intended that the invention be limited to these embodiments. Modifications within the spirit of the invention will be apparent to those skilled in the art. For example, any of a variety of alternative implementations can be obtained by varying any of many different design and implementation parameters, including hardware platforms, operating systems, virtualization layers, control structures, data structures, modular organization, and other such design and implementation parameters.

It is appreciated that the previous description of the embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A surveillance-and-monitoring system comprising:
multiple processors;
multiple memories;
multiple data-storage devices;
a video-processing subsystem, executed by one or more of the multiple processors, that uses one or more of the multiple memories and data-storage devices to
receive video streams from multiple video cameras,
store frames of the video streams in a video store,
and forward frames to a track-generator;
the track-generator, executed by one or more of the multiple processors, that uses one or more of the multiple memories and data-storage devices to generate face tracks and store the face tracks in a face-track database, each face track containing attribute values, characteristic values, and an indication of multiple video frames spanned by the face track, the attributes and characteristics including gender, ethnicity, age, and other attributes associated with an individual; and a search-and-services subsystem, executed by one or more of the multiple processors, that uses one or more of the multiple memories and data-storage devices to
receive requests that each includes an indication of a requested operation and one or more attribute and/or characteristic values,
search the face-track database to identify face tracks corresponding to the one or more attribute values and/or one or more characteristic values, and
use the identified face tracks to return responses to the received requests.

2. The surveillance-and-monitoring system of claim 1 wherein the search-and-services subsystem
receives a request for face tracks corresponding to an individual specified, in the request, by one or more attribute values and/or one or more characteristic values;
searches the face-track database to identify face tracks corresponding to the one or more attribute values and/or one or more characteristic values; and
returns the identified face tracks as a response to the request.

3. The surveillance-and-monitoring system of claim 1 wherein the search-and-services subsystem
receives a request for face tracks corresponding to multiple individuals, each individual specified, in the request, by one or more attribute values and/or one or more characteristic values;
searches the face-track database to identify face tracks corresponding to the one or more attribute values and/or one or more characteristic values;
selects one or more face tracks that correspond to a maximum number of the multiple individuals; and
returns the selected face tracks as a response to the request.

4. The surveillance-and-monitoring system of claim 1 wherein the search-and-services subsystem
receives a request to store alert rules for automatic application to newly generated face tracks; and
stores the alert rules in an alert-rule store.

5. The surveillance-and-monitoring system of claim 1 wherein the search-and-services subsystem
receives a request to store face-track-redaction rules for automatic application to newly generated face tracks and/or to stored face tracks; and
stores the face-track-redaction rules in a face-track-redaction-rule store.

6. The surveillance-and-monitoring system of claim 1 wherein the search-and-services subsystem
receives a request to mark a face track for redaction; and
marks the face track for redaction.

7. The surveillance-and-monitoring system of claim 1 wherein the search-and-services subsystem
receives a request for frame-by-frame face track redaction from a client-side application;
returns, to the client-side application; requested frames;
receives instructions to redact particular face tracks within the frames from the client-side application; and
redacts the particular face tracks according to the received instructions.

8. The surveillance-and-monitoring system of claim 1 wherein the search-and-services subsystem
receives a request for a lineup, from a client-side application, that includes one or more attribute values and/or one or more characteristic values;
searches the searches the face-track database to identify face tracks corresponding to the one or more attribute values and/or one or more characteristic values;
selects one or more face tracks according to lineup criteria; and
returns, to the client-side application, the selected face tracks as a response to the request for display by the client-side application as a lineup.

9. The surveillance-and-monitoring system of claim 1 wherein the video-processing subsystem additionally stores state and configuration information; and
wherein the video-processing subsystem is implemented as a distributed service.

10. The surveillance-and-monitoring system of claim 1 wherein the track-generator further comprises:
a track-generator agent associated with each video camera that
receives frames generated by the associated camera;
launches, for each frame, a face-regions-detection agent to detect face regions within the frame and to launch face-attribute agents to assign attributes to the detected face regions; and
a track-completion service that
receives face regions and face attributes generated by the face-regions-detection agents and face-attribute agents;
generates, from the received face regions and face attributes, face tracks; and
forwards the face tracks to a face-track-storage service for storage in the face-track database.

11. A method that identifies, stores, and retrieves face tracks implemented in a computer system that includes multiple processors, multiple memories, and multiple data-storage devices, the method comprising:
ingesting video streams by
receiving and storing video streams from multiple video cameras,
generating face tracks from the received video streams,
storing the face tracks in a face-track database, each face track containing attribute values, characteristic values, and an indication of multiple video frames spanned by the face track, the attributes and characteristics including gender, ethnicity, age, and other attributes associated with an individual; and
retrieving one or more face tracks by
receiving a request that includes an indication of a requested operation and one or more attribute and/or characteristic values,
searching the face-track database to identify and retrieve one or more face tracks corresponding to the one or more attribute values and/or one or more characteristic values from the face-track database, and
using the one or more retrieved face tracks to prepare and return a response to the received request.

12. The method of claim 11 further including:
after generating a face track, applying one or more alert rules to the face track to determine whether or not an alert condition is associated with the face track; and
when an alert condition is associated with the face track, distribute one or more indications of the alert to processor-controlled devices designated to receive alert indications for the alert condition.

13. The method of claim 11 further including:
after generating a face track, applying one or more redaction rules to the face track to determine whether or not the face track should be redacted; and when the face track should be redacted,
    redacting the face track.
14. The method of claim 11
    wherein the face track includes references to multiple video frames that includes images of a particular individual; and
    wherein the face track is redacted by one or more of blurring, obscuring, or removing features from the face of the individual in the referenced video frames.
15. The method of claim 11 further including:
    after generating a face track, applying one or more redaction rules to the face track to determine whether or not the face track should be redacted; and
    when the face track should be redacted,
    marking the face track for redaction.
16. The method of claim 11
    wherein the face track includes references to multiple video frames that includes images of a particular individual; and
    wherein, when the face track is retrieved from the face-track database and the video frames referenced by the face track are retrieved from the video store, redacting the face track by one or more of blurring, obscuring, or removing features from the face of the individual in the retrieved video frames prior to transmitting the retrieved video frames to a user device.
17. The method of claim 11 further including:
    receiving a request that requests redaction of one or more face tracks;
    searching the face-track database to identify and retrieve the one or more face tracks;
    retrieving the video frames referenced by the face track;
    redacting the one or more retrieved video frames; and
    and replacing the one or more retrieved video frames in the video store with the redacted face tracks.
18. The method of claim 11 further including:
    after generating a face track, using one or more attributes and/or characteristics in the face track to update time-associated cumulative statistics and characteristics for one or more of the multiple video cameras; and
    using the time-associated cumulative statistics and characteristics, by a temporal-characteristics monitor, to detect anomalous conditions.
19. The method of claim 11 further including:
    receiving a request that requests a lineup, for a specified location and time frame, that includes individuals with one or more specified attributes and, or characteristics;
    searching the face-track database to identify and retrieve multiple face tracks corresponding to the request;
    and returning all or a subset of the multiple face tracks.
20. A face-track database-management system comprising:
    multiple processors;
    one or more memories;
    one or more data-storage devices;
    face tracks, stored on one or more of the one or more data-storage devices, each face track comprising references to a sequence of video frames that include images of a particular individual, attribute and characteristic values, and additional information related to the face track; and
    a storage and retrieval subsystem that
        receives queries that each includes one or more attribute and/or characteristic values, the attribute and characteristic values including age, gender, and ethnicity;
        searches the face-track database to identify face tracks corresponding to the one or more attribute values and/or one or more characteristic values, and
        returns the identified face tracks as a query response.

* * * * *